(12) United States Patent
Herz et al.

(10) Patent No.: US 7,630,986 B1
(45) Date of Patent: Dec. 8, 2009

(54) SECURE DATA INTERCHANGE

(75) Inventors: Frederick S. M. Herz, Warrington, PA (US); Walter Paul Labys, Salt Lake City, UT (US); David C. Parkes, Philadelphia, PA (US); Sampath Kannan, Philadelphia, PA (US); Jason M. Eisner, Philadelphia, PA (US)

(73) Assignee: Pinpoint, Incorporated, Fort Worth, TX (US)

( * ) Notice: Subject to any disclaimer, the term of this patent is extended or adjusted under 35 U.S.C. 154(b) by 0 days.

(21) Appl. No.: 09/699,098

(22) Filed: Oct. 27, 2000

Related U.S. Application Data

(60) Provisional application No. 60/206,538, filed on May 23, 2000, provisional application No. 60/161,640, filed on Oct. 27, 1999.

(51) Int. Cl.
*G06F 17/30* (2006.01)
*G06F 15/16* (2006.01)

(52) U.S. Cl. .............. 707/10; 707/2; 707/9; 707/200; 709/217

(58) Field of Classification Search ................. 713/175, 713/201, 150, 155, 170, 176, 180; 707/6, 707/104.1, 10, 229, 2; 709/217, 223; 705/1, 705/26, 37
See application file for complete search history.

(56) References Cited

U.S. PATENT DOCUMENTS

| | | |
|---|---|---|
| 4,170,782 A | 10/1979 | Miller |
| 4,264,924 A | 4/1981 | Freeman |
| 4,381,522 A | 4/1983 | Lambert |
| 4,386,416 A | 5/1983 | Giltner et al. |
| 4,464,650 A | 8/1984 | Eastman et al. |
| 4,506,387 A | 3/1985 | Walter |
| 4,521,806 A | 6/1985 | Abraham |
| 4,529,870 A | 7/1985 | Chaum |
| 4,558,302 A | 12/1985 | Welch |
| 4,567,512 A | 1/1986 | Abraham |
| 4,590,516 A | 5/1986 | Abraham |
| 4,654,815 A | 3/1987 | Marin et al. |
| 4,672,679 A | 6/1987 | Freeman |
| 4,694,490 A | 9/1987 | Harvey et al. |
| 4,701,745 A | 10/1987 | Waterworth |

(Continued)

FOREIGN PATENT DOCUMENTS

EP 0 669 760 A2 8/1995

(Continued)

OTHER PUBLICATIONS

"Economic Majority Logic IC Realized by CMOS", Nikkei Electronics, Nov. 5, 1973, pp. 132-144.

(Continued)

*Primary Examiner*—Cam-Y Truong
(74) *Attorney, Agent, or Firm*—Wolf, Greenfield & Sacks, P.C.

(57) ABSTRACT

A system for exchanging data includes a communication system, a first and a second party connected to the communication system, wherein each party has personal data, and each party has a disclosure policy to control dissemination of its data, and a secure intermediate party connected to the communication system, wherein the secure intermediate party exchanges data between the first and second parties in accordance with their respective disclosure policies.

10 Claims, 12 Drawing Sheets

Agent SDI architecture: Personalization agent

U.S. PATENT DOCUMENTS

| | | |
|---|---|---|
| 4,704,725 A | 11/1987 | Harvey et al. |
| 4,706,080 A | 11/1987 | Sincoskie |
| 4,706,121 A | 11/1987 | Young |
| 4,745,549 A | 5/1988 | Hashimoto |
| 4,751,578 A | 6/1988 | Reiter et al. |
| 4,759,063 A | 7/1988 | Chaum |
| 4,761,684 A | 8/1988 | Clark et al. |
| 4,763,191 A | 8/1988 | Gordon et al. |
| 4,814,746 A | 3/1989 | Miller et al. |
| 4,831,526 A | 5/1989 | Luchs et al. |
| 4,847,619 A | 7/1989 | Kato et al. |
| 4,853,678 A | 8/1989 | Bishop, Jr. et al. |
| 4,870,579 A | 9/1989 | Hey |
| 4,876,541 A | 10/1989 | Storer |
| 4,881,075 A | 11/1989 | Weng |
| 4,885,757 A | 12/1989 | Provence |
| 4,906,991 A | 3/1990 | Fiala et al. |
| 4,914,698 A | 4/1990 | Chaum |
| 4,926,480 A | 5/1990 | Chaum |
| 4,947,430 A | 8/1990 | Chaum |
| 4,965,825 A | 10/1990 | Harvey et al. |
| 4,977,455 A | 12/1990 | Young |
| 4,979,118 A | 12/1990 | Kheradpir |
| 4,987,593 A | 1/1991 | Chaum |
| 4,988,998 A | 1/1991 | O'Brien |
| 4,996,642 A | 2/1991 | Hey |
| 5,001,478 A | 3/1991 | Nagy |
| 5,003,307 A | 3/1991 | Whiting et al. |
| 5,003,591 A | 3/1991 | Kauffman et al. |
| 5,016,009 A | 5/1991 | Whiting et al. |
| 5,023,610 A | 6/1991 | Rubow et al. |
| 5,038,211 A | 8/1991 | Hallenbeck |
| 5,047,867 A | 9/1991 | Strubbe et al. |
| 5,049,881 A | 9/1991 | Gibson et al. |
| 5,058,137 A | 10/1991 | Shah |
| 5,075,771 A | 12/1991 | Hashimoto |
| 5,087,913 A | 2/1992 | Eastman |
| 5,109,414 A | 4/1992 | Harvey et al. |
| 5,126,739 A | 6/1992 | Whiting et al. |
| 5,131,039 A | 7/1992 | Chaum |
| 5,136,501 A | 8/1992 | Silverman et al. |
| 5,140,321 A | 8/1992 | Jung |
| 5,144,663 A | 9/1992 | Kudelski et al. |
| 5,151,789 A | 9/1992 | Young |
| 5,153,591 A | 10/1992 | Clark |
| 5,155,484 A | 10/1992 | Chambers, IV |
| 5,155,591 A | 10/1992 | Wachob |
| 5,179,378 A | 1/1993 | Ranganathan et al. |
| 5,201,010 A | 4/1993 | Deaton et al. |
| 5,208,877 A | 5/1993 | Murphy et al. |
| 5,223,924 A | 6/1993 | Strubbe |
| 5,230,020 A | 7/1993 | Hardy et al. |
| 5,233,654 A | 8/1993 | Harvey et al. |
| 5,237,157 A | 8/1993 | Kaplan |
| 5,243,341 A | 9/1993 | Seroussi et al. |
| 5,245,420 A | 9/1993 | Harney et al. |
| 5,245,656 A | 9/1993 | Loeb et al. |
| 5,251,324 A | 10/1993 | McMullan, Jr. |
| 5,262,776 A | 11/1993 | Kutka |
| 5,276,736 A | 1/1994 | Chaum |
| 5,301,109 A | 4/1994 | Landauer et al. |
| 5,309,437 A | 5/1994 | Perlman et al. |
| 5,321,833 A | 6/1994 | Chang et al. |
| 5,323,240 A | 6/1994 | Amano et al. |
| 5,331,554 A | 7/1994 | Graham |
| 5,331,556 A | 7/1994 | Black, Jr. et al. |
| 5,341,427 A | 8/1994 | Hardy et al. |
| 5,347,304 A | 9/1994 | Moura et al. |
| 5,351,075 A | 9/1994 | Herz et al. |
| 5,353,121 A | 10/1994 | Young et al. |
| 5,371,794 A | 12/1994 | Diffie et al. |
| 5,373,290 A | 12/1994 | Lempel et al. |
| 5,373,558 A | 12/1994 | Chaum |
| 5,374,951 A | 12/1994 | Welsh |
| 5,410,344 A | 4/1995 | Graves et al. |
| 5,420,806 A | 5/1995 | Shan et al. |
| 5,420,807 A | 5/1995 | Shan et al. |
| 5,428,778 A | 6/1995 | Brookes |
| 5,430,729 A | 7/1995 | Rahnema |
| 5,444,499 A | 8/1995 | Saitoh |
| 5,446,891 A | 8/1995 | Kaplan et al. |
| 5,446,919 A | 8/1995 | Wilkins |
| 5,455,576 A | 10/1995 | Clark, II et al. |
| 5,455,862 A | 10/1995 | Hoskinson |
| 5,459,306 A | 10/1995 | Stein et al. |
| 5,469,206 A | 11/1995 | Strubbe et al. |
| 5,477,541 A | 12/1995 | White et al. |
| 5,483,278 A | 1/1996 | Strubbe et al. |
| 5,485,526 A | 1/1996 | Tobin |
| 5,490,140 A | 2/1996 | Abensour et al. |
| 5,519,858 A | 5/1996 | Walton et al. |
| 5,534,911 A | 7/1996 | Levitan |
| 5,537,315 A | 7/1996 | Mitcham |
| 5,537,586 A | 7/1996 | Amram et al. |
| 5,539,734 A | 7/1996 | Burwell et al. |
| 5,541,638 A | 7/1996 | Story |
| 5,541,911 A | 7/1996 | Nilakantan et al. |
| 5,546,370 A | 8/1996 | Ishikawa |
| 5,559,549 A | 9/1996 | Hendricks et al. |
| 5,561,421 A | 10/1996 | Smith et al. |
| 5,565,809 A | 10/1996 | Shou et al. |
| 5,583,763 A | 12/1996 | Atcheson et al. |
| 5,586,121 A | 12/1996 | Moura et al. |
| 5,600,364 A | 2/1997 | Hendricks et al. |
| 5,600,798 A | 2/1997 | Cherukuri et al. |
| 5,613,209 A | 3/1997 | Peterson et al. |
| 5,617,565 A | 4/1997 | Augenbraun et al. |
| 5,638,457 A | 6/1997 | Deaton |
| 5,642,484 A | 6/1997 | Harrison, III et al. |
| 5,642,485 A | 6/1997 | Deaton et al. |
| 5,644,723 A | 7/1997 | Deaton et al. |
| 5,649,114 A | 7/1997 | Deaton et al. |
| 5,649,186 A | 7/1997 | Ferguson |
| 5,659,469 A | 8/1997 | Deaton et al. |
| 5,675,662 A | 10/1997 | Deaton et al. |
| 5,680,116 A | 10/1997 | Hashimoto et al. |
| 5,687,322 A | 11/1997 | Deaton et al. |
| 5,689,648 A | 11/1997 | Diaz et al. |
| 5,710,884 A | 1/1998 | Dedrick |
| 5,710,887 A | 1/1998 | Chelliah et al. |
| 5,717,923 A | 2/1998 | Dedrick |
| 5,724,521 A | 3/1998 | Dedrick |
| 5,724,567 A | 3/1998 | Rose et al. |
| 5,734,719 A | 3/1998 | Tsevdos et al. |
| 5,740,549 A | 4/1998 | Reilly et al. |
| 5,754,938 A | 5/1998 | Herz et al. |
| 5,754,939 A | 5/1998 | Herz et al. |
| 5,758,257 A | 5/1998 | Herz et al. |
| 5,761,662 A | 6/1998 | Dasan |
| 5,768,521 A | 6/1998 | Dedrick |
| 5,798,785 A | 8/1998 | Hendricks et al. |
| 5,802,054 A | 9/1998 | Bellenger |
| 5,805,156 A | 9/1998 | Richmond et al. |
| 5,809,478 A | 9/1998 | Greco et al. |
| 5,812,776 A | 9/1998 | Gifford |
| 5,835,087 A | 11/1998 | Herz et al. |
| 5,835,710 A | 11/1998 | Nagami et al. |
| 5,848,396 A | 12/1998 | Gerace |
| 5,855,008 A | 12/1998 | Goldhaber et al. |
| 5,856,981 A | 1/1999 | Voelker |
| 5,873,066 A | 2/1999 | Underwood et al. |
| 5,884,270 A * | 3/1999 | Walker et al. .................. 705/1 |
| 5,892,924 A | 4/1999 | Lyon et al. |
| 5,903,559 A | 5/1999 | Acharya et al. |

| | | | |
|---|---|---|---|
| 5,933,811 | A | 8/1999 | Angles et al. |
| 5,945,988 | A | 8/1999 | Williams et al. |
| 5,960,411 | A | 9/1999 | Hartman et al. |
| 5,961,593 | A | 10/1999 | Gabber et al. |
| 5,991,735 | A | 11/1999 | Gerace |
| 5,991,740 | A | 11/1999 | Messer |
| 6,014,090 | A | 1/2000 | Rosen et al. |
| 6,029,141 | A | 2/2000 | Bezos et al. |
| 6,047,327 | A | 4/2000 | Tso et al. |
| 6,052,064 | A | 4/2000 | Budnik et al. |
| 6,052,718 | A | 4/2000 | Gifford |
| 6,055,513 | A | 4/2000 | Katz et al. |
| 6,058,379 | A * | 5/2000 | Odom et al. ............... 705/37 |
| 6,064,970 | A | 5/2000 | McMillan et al. |
| 6,064,980 | A | 5/2000 | Jacobi et al. |
| 6,088,722 | A | 7/2000 | Herz et al. |
| 6,134,658 | A * | 10/2000 | Multerer et al. ............ 713/175 |
| 6,154,745 | A | 11/2000 | Kari et al. |
| 6,199,045 | B1 | 3/2001 | Giniger et al. |
| 6,243,467 | B1 * | 6/2001 | Reiter et al. ............... 713/170 |
| 6,256,675 | B1 | 7/2001 | Rabinovich |
| 6,275,824 | B1 | 8/2001 | O'Flaherty et al. |
| 6,285,989 | B1 * | 9/2001 | Shoham ................... 705/37 |
| 6,377,972 | B1 | 4/2002 | Guo et al. |
| 6,381,465 | B1 | 4/2002 | Chern et al. |
| 6,397,040 | B1 | 5/2002 | Titmuss et al. |
| 6,456,852 | B2 | 9/2002 | Bar et al. |
| 6,553,376 | B1 | 4/2003 | Lewis et al. |
| 6,563,910 | B2 * | 5/2003 | Menard et al. ............... 379/45 |
| 6,571,279 | B1 | 5/2003 | Herz et al. |
| 6,591,103 | B1 | 7/2003 | Dunn et al. |
| 6,697,824 | B1 * | 2/2004 | Bowman-Amuah ......... 707/229 |
| 6,708,213 | B1 | 3/2004 | Bommaiah et al. |
| 2003/0101124 | A1 * | 5/2003 | Semret et al. ............... 705/37 |

FOREIGN PATENT DOCUMENTS

| | | |
|---|---|---|
| EP | 0 682 452 A2 | 11/1995 |
| EP | 0 700 226 A2 | 3/1996 |
| FR | 2 536 922 A1 | 6/1984 |
| WO | WO 86/06050 A1 | 10/1986 |
| WO | WO 94/10775 A1 | 5/1994 |
| WO | WO 94/11967 A1 | 5/1994 |
| WO | WO 95/15658 A1 | 6/1995 |
| WO | WO 97/41654 A1 | 11/1997 |
| WO | WO 99/30273 A1 | 6/1999 |
| WO | WO 00/04730 A1 | 1/2000 |

OTHER PUBLICATIONS

Abdeddaim, M. N., "Fingerhut's 30-day wonder plan; Fingerhut Companies Inc. offers 30-day free trial of its floor care products," *HFD-The Weekly Home Furnishings Newspaper*, Oct. 4, 1993, p. 155, vol. 67, No. 40.

Allen, R. B., "User models: theory, method, and practice," *Int. J. Man-Machine Studies*, May 1990, pp. 511-543, vol. 32, No. 5.

Anklesaria, F., McCahill, M., Lindner, P., Johnson, D., Torrey, D., and Alberti, B., "The Internet Gopher Protocol," University of Minnesota, Network Working Group, Request for Comments: 1436, Mar. 1993, pp. 1-16.

Belkin, N. J. and Croft, W. B., "Information Filtering and Information Retrieval: Two Sides of the Same Coin?", *Communications of the ACM*, Dec. 1992, pp. 29-38, vol. 35, No. 12.

Bell, T. C. et al., "Adaptive Dictionary Encoders: Ziv-Lempel Coding", Dictionary Techniques, Chapter 8, pp. 214-234.

Bell, T. C., "Better OPM-L Text Compression", *IEEE Trans. on Comm.*, Dec. 1986, pp. 1176-1182, vol. COM-34, No. 12.

Bender, W., Lie, H., Orwant, J., Teodosio, L. and Abramson, N., "Newspace: Mass Media and Personal Computing," USENIX, Summer 1991, Nashville, TN, pp. 329-348.

Bentley, J. L., Sleator, D. D., Tarjan, R. E. and Wei, V. K., "A Locally Adaptive Data Compression Scheme", *Comm. of the ACM*, Apr. 1986, pp. 320-330, vol. 29, No. 4.

Berry, J., Verity, J., Kerwin, K., and DeGeorge, G., "A Potent New Tool for Selling Database Marketing," *Business Week*, Sep. 5, 1994, pp. 56-62.

Bessen, J., "A New, Powerful Marketing Tool; Merchandise Advertising Technology," *Direct Marketing International*, Nov. 1991, p. 30, No. 19.

Bessen, J., "Riding The Marketing Information Wave," *Harvard Business Review*, Reprint 93501, Sep.-Oct. 1993, pp. 150-160.

Binkley, J. and Young, L., "RAMA: An Architecture for Internet Information Filtering," *Journal of Intelligent Information Systems: Integrating Artificial Intelligence and Database Technologies*, Sep. 1995, pp. 81-99, vol. 5, No. 2.

Blattberg, R. C. and Deighton, J., "Interactive Marketing: Exploiting the Age of Addressability," *Information Access Company*, Sep. 22, 1991, p. 5, vol. 33, No. 1.

Blount, A. W., "Display Manager for a Video Processing System," *Student Thesis, Massachusetts Institute of Technology*, Jun. 1991, 45 pages.

Bolot, J., Turletti, T. and Wakeman, I., "Scalable Feedback Control for Multicast Video Distribution in the Internet", *Computer Communications Review, Proceedings of SIGCOMM 94*, Oct. 1994, pp. 58-67, vol. 24, No. 4.

Bove, V. M., Jr., "Personalcasting: Interactive Local Augmentation of Television Programming," *M.S Thesis, Massachusetts Institute of Technology*, Sep. 1985, 46 pages.

Brewer, R., "URN: A New Way to Think About Usenet," *Collaborative Software Development Laboratory, Department of Information and Computer Sciences, University of Hawaii, Honolulu, Hawaii*, May 1, 1993, pp. 1-13.

Brewer, R. S. and Johnson, P. M., "Collaborative Classification and Evaluation of Usenet," *Collaborative Software Development Laboratory, Department of Information and Computer Sciences, University of Hawaii, Honolulu, Hawaii*, pp. 1-10.

Brewer, R. S. and Johnson, P. M., "Toward Collaborative Knowledge Management within Large, Dynamically Structured Information Systems," *Collaborative Software Development Laboratory, Department of Information and Computer Sciences, University of Hawaii, Honolulu, Hawaii*, Nov. 1, 1994, pp. 1-22.

Bulick, S. and Irven, J., "Broadband Information Services: Concepts and Prototypes," *IEEE/IEICE Global Telecommunications Conference, Nov. 15-18, 1987, Tokyo, Japan*, pp. 1982-1989.

Bussey, H. E., Egido, C., Kaplan, A., Rohall, S. L. amd Yuan, R., "Service Architecture, Prototype Description, and Network Implications of a Personalized Information Grazing Service," *1990 IEEE*, pp. 1046-1053.

Chalmers, M. and Chitson, P., "Bead: Explorations in Information Visualization", *15th Ann. Int'l SIGIR '92/Denmark* —6/92, pp. 330-337.

Chaum, D. and Evertse, J., "A Secure and Privacy-Protecting Protocol for Transmitting Personal Information Between Organizations," pp. 118-167, no date.

Chaum, D., "Security without Identification: Card Computers to Make Big Brother Obsolete," *Communications of the ACM*, Oct. 1985, pp. 1030-1044, vol. 28, No. 10.

Chaum, D., "Untraceable Electronic Mail, Return Addresses, and Digital Pseudonyms," *Communications of the ACM*, Feb. 1981, 11 pages, vol. 24, No. 2.

Chaum, D., "Achieving Electronic Privacy," *Scientific American*, Aug. 1992, pp. 96-101.

Chen, C. H., Harman, W. M., Jain, S. K., and Karayannopoulos, G. J., "Integrated Services Workbench: A Testbed for ISDN Services," *IEEE-IEICE Global Telecommunications Conference 1987*, Conference Record vol. 3 of 3, Nov. 15-18, 1987, Tokyo, Japan, pp. 1546-1550.

Chesnais, P. R., Mucklo, M. J. and Sheena, J. A., "The Fishwrap Personalized News System", *IEEE 1995*, pp. 275-282.

Chislenko, A., "New Software to Optimize Message Flow Suggested," Messages from Thread from Alexander Chislenko, Google, 1994.

Chislenko, A., "Rating Of Internet News Messages," Messages from Thread from Alexander Chislenko, Jul. 5, 2005, Google.

Cutting, D. R., Karger, D. R.; Pedersen, J. O. and Tukey, J. W., "Scatter/Gather: A Cluster-based Approach to Browsing Large Document Collections," *15 Ann. Int'l SIGIR '92, ACM*, 1992, pp. 318-329.

Damashek, M., "Gauging Similarity via N-Grams: Language-Independent Sorting, Categorization, and Retrieval of Text," Jan. 24, 1995, pp. 1-11.

Yan, T. W. and Garcia-Molina, H., "Index Structures for Selective Dissemination of Information," *Department of Computer Science, Stanford University*, Stanford, California, Dec. 14, 1992, pp. 1-48.

Yan, T. W., "Netnews Filtering Service," netnews@db.stanford.edu Google search, May 12, 1981.

Zipf, G. K., "Human Behavior and the Principle of Least Effort," 1949, 1 page, abstract-summary ONLY.

Ziv, J. and Lempel, A., "A Universal Algorithm for Sequential Data Compression", *IEEE Trans. on Information Theory*, May 1977, pp. 337-343, vol. IT-23, No. 3.

Ziv, J. and Lempel, A., "Compression of Individual Sequences via Variable-rate Coding", *IEEE Trans. on Information Theory*, Sep. 1978, pp. 530-536, vol. IT-224, No. 5.

*Pinpoint v. Amazon.com*; U.S.D.C. Northern District Illinois; CASE# 1:05-CV-01330; Opinion signed by Judge Richard A. Posner on May 17, 2005, 12 pages.

Deering, S., Estrin, D., Farinacci, D., Jacobson, V., Liu, C. and Wei, L., "An Architecture for Wide-Area Multicast Routing," *Computer Communcations Review, Proceedings of SIGCOMM 94*, Oct. 1994, pp. 126-135, vol. 24, No. 4.

Denitto, E., "Intergrated Marketing Execs Eye Interactive," *Advertising Age, News*, Nov. 15, 1993, p. 44.

Denton, J., "Grocery Stores Offer Electronic Coupons Process Personalizes Rebates," *The Daily Oklahoman*, Business, Oct. 7, 1993, p. 19.

Dienes, K., "Newskit: An Extensible Toolkit for Interactive Electronic News," *B.S. Thesis, Massachusetts Institute Of Technology*, May 1993, pp. 1-23.

Direct Marketing Magazine, "Long Journeys Start With Small Steps; Database Marketing," Sep. 1992, p. 26, vol. 55, No. 5.

Esty, S. A., "Fiber to the Home Activity in the United States of America," *IEEE/IEICE Global Telecommunications Conference, Nov. 15-18, 1987, Tokyo, Japan*, pp. 1995-1999.

Foltz, P. W., and Dumais, S. T., "Personalized Information Delivery: An Analysis of Information Filtering Methods," *Communications of the ACM*, Dec. 1992, pp. 51-60, vol. 35, No. 12.

Goldberg, D., Nichols, D., Oki, B. M. and Terry, D., "Using Collaborative Filtering to Weave an Information Tapestry," *Communications of the ACM*, Dec. 1992, pp. 61-70, vol. 35, No. 12.

Gregorian et al., "Analog MOS Integrated Circuits for Signal Processing" by John Wiley & Sons, Inc. p. 413.

Haas, Z. J. and Paul, S., "Secure Access to Electronic Newspaper", *IEEE-ICCC 1994*, pp. 805-809.

Hill, W., Stead. L., Rosentein, M. and Furnas, G., "Recommending and Evaluating Choices in a Virtual Community of Use," *CHI '95 Proceedings Papers*, 11 pages.

Hill, W. C. and Hollan, J. D., "Edit Wear amd Read Wear," *CHI '92*, May 3-7, 1992, pp. 3-9.

Hill, W. and Hollan, J., "History-Enriched Digital Objects," *The Third Conference on Computers, Freedom and Privacy*, CFP '93, Mar. 9-12, 1993, pp. 9.17-9.20.

Huffman, D.A., "A Method for the Construction of Minimum-Redundancy Codes," *Proceedings of the I.R.E*, Sep. 1952, pp. 1098-1101, vol. 40.

International Search Report for International application No. PCT/US00/13858.

Irven, J. H., Nilson, M. E., Judd, T. H., Patterson, J. F. and Shibata, Y., "Multi-Media Information Services: A Laboratory Study," *IEEE Communications Magazine*, Jun. 1988, pp. 27-44, vol. 26, No. 6.

Jennings, A. and Higuchi, H., "A Personal News Service Based on a User Model Neural Network," *IEICE Transactions on Information and Systems*, Mar. 1992, pp. 198-209, vol. E75-D, No. 2.

Jennings, A., "Customer Adaptive Communications Services," *IEEE Region 10 Conference, Teacon 92*, Nov. 11-13, 1992, pp. 886-890.

Karlgren, J., "Newsgroup Clustering Based On User Behavior—A Recommendation Algebra," Mar. 1994, pp. 1-15.

Kass, R., "Building A User Model Implicitly from a Cooperative Advisory Dialog," *User Modeling And User-Adapted Interaction 1*: 203-258, 1991.

King D. and Jones, K., "Competitive Intelligence, Software Robots and the Internet: The NewsAlert Prototype," *Proceedings of the 28th Hawaii International Conference on System Sciences (HICSS '95)*, pp. 624-631.

Kishino, F., Tokikuni, K., Kondo, F. and Takemoto, K., "Overview of Broadband Telecommuncations Services - Trial Experiences in Japan -," *IEEE/IEICE Global Telecommunications Conference, Nov. 15-18, 1987, Tokyo, Japan*, pp. 1990-1994.

Kitami, K., Izumi, T. and Itoh, H., "A Network Control Architecture Flexible to Service Additions or Enhancements," *IEEE/IEICE Global Telecommunications Conference, Nov. 15-18, 1987, Tokyo, Japan*, pp. 1541-1545.

Kok, A. J. and Botman, A M., "Retrieval Based On User Behaviour," *Department of Mathematics & Computer Science, Vrije Universiteit, The Netherlands*, 1988, pp. 343-357.

Kurihara, S., Ichikawa, T., Konishi, T. and Hada, T., "Control Methods for Facsimile Store and Forward Communication Services," *IEEE/IEICE Global Telecommuncations Conference, Nov. 15-18, 1987, Tokyo, Japan*, pp. 1556-1560.

Lambert, P., "Personalized Mass Media Corp. Seeks Patent Partners," *Cable Technologies*, Nov. 30, 1993, p. 32.

Langdon, Jr., G. G., "A Note on the Ziv-Lempel Model for Compressing Individual Sequences," *IEEE Trans. on Information Theory*, Mar. 1983, pp. 284-287, vol. IT-29, No. 2.

Lashkari, Y., Metral, M. and Maes, P., "Collaborative Interface Agents," *Proceedings of the Twelfth National Conference on Artificial Intelligence*, Jul. 31 - Aug. 4, 1994, pp. 444-449, vol. One, AAAI Press/The MIT Press.

Lie, H. W., "The Electronic Broadsheet—All the News that Fits the Display," *M.S. Thesis, Massachusetts Institute Of Technology*, Jun. 1991, pp. 1-96.

Lippman, A. and Bender, W., "News and Movies in the 50 Megabit Living Room," *IEEE/IEICE Global Telecommunications Conference, Nov. 15-18, 1987, Tokyo, Japan*, pp. 1976-1981.

Little, T. D. C., Ahanger, G., Folz, R. J., Gibbon, J. F., Reeve, F. W. Schelleng, D. H. and Venkatesh, D., "A Digital On-Demand Video Service Supporting Content-Based Queries," Boston University, pp. 1-10.

Loeb, S., "Architecting Personalized Delivery of Multimedia Information," *Communications of the ACM*, Dec. 1992, pp. 39-50, vol. 35, No. 12.

Loeb, S., Hill, R. and Brinck, T., "Lessons from LyricTime™: A Prototype Multimedia System," Extended Abstract, *Bell Communications Research*, Morristown, N.J., p. 106-113.

Luhn, H. P., "A Business Intelligence System," *IBM Journal*, Oct. 1958, pp. 314-319.

Lutz, K. A., "Broadband ISDN, A Hybrid Network with Continous and Packetized Information," *IEEE/IEICE Global Telecommunications Conference, Nov. 15-18, 1987, Tokyo, Japan*, pp. 2015-2019.

Maes, P., "Agents that Reduce Work and Information Overload," *Communications of the ACM*, Jul. 1994, pp. 31-40 and 146, vol. 37, No. 7.

Maes, P. and Kozierok, R., "Learning Interface Agents," *Proceedings of the Eleventh National Conference on Artificial Intelligence*, 1993, pp. 459-465, AAAI Press/The MIT Press.

Malone, T. W., Grant, K. R., Turbak, F. A., Brobst, S. A. and Cohen, M.D., "Intelligent Information-Sharing Systems," *Communications of the ACM*, May 1987, pp. 390-402, vol. 30, No. 5.

Maltz, D. A., "Distributing Information for Collaborative Filtering On Usenet Net News," *M.S Thesis, Massachusetts Institute Of Technology*, May 1994, pp. 1-78.

Marcus, M. P., Marcinkiewicz, M. A. and Santorini, B., "Building a Large Annotated Corpus of English: The Penn Treebank", *Computational Linguistics*, 1993, pp. 313-330, vol. 19, No. 2.

Miller, G., Baber, G. and Gilliland, M., "News On-Demand for Multimedia Networks," *ACM Press*, 1993, pp. 383-392.

Miller, V. S. and Wegman M. N., "Variations on a Theme by Ziv and Lempel," *in Combinatorial Algorithms on Words, NATO ASI Series*, Apostolico, A. and Galil, Z., eds., 1985, pp. 131-140, vol. F12.

Morita, M. and Shinoda, Y., "Information Filtering Based on User Behavior Analysis and Best Match Text Retrieval," *SIGIR '94*, Dublin, Jul. 3-6, No. Conf. 17, Jul. 3, 1994, pp. 271-281.

Morita, M., "Analysis of Activities Relating to Information and Research on Applicability to Information Filtering," *Master's Thesis, Japan Advanced Institute of Science and Technology*, Feb. 1994, 82 pages.

Moss, L., "ADcom Starts Cable-Meter Rollout in California," *Multichannel News*, Apr. 25, 1994, p. 34.

Orwant, J., "Doppelganger Goes To School: Machine Learning For User Modeling," *Master's Thesis, Massachusetts Institute of Technology*, Sep. 1993, pp. 1-89.

Orwant, J. L., "Doppelganger: A User Modeling System," *B. S. Thesis, Massachusetts Institute of Technology*, May 20, 1991, pp. 1-65.

*Pinpoint v. Amazon.com*; U.S.D.C. Northern District Illinois; Civil Docket For Case# 1:03-CV-04954, pp. 1-34.

*Pinpoint v. Amazon.com*; U.S.D.C. Northern District Illinois; Civil Docket For Case# 1:05-CV-01330, pp. 1-12.

*Pinpoint v. Amazon.com*; U.S.D.C. Northern District Illinois; Case# 1:03-CV-04954; Defendants' Memorandum Of Law In Support Of Their Motion For Claim Construction.

*Pinpoint v. Amazon.com*; U.S.D.C. Northern District Illinois; Case# 1:03-CV-04954; Declaration Of Paul D. Resnick Ph.D., In Support Of Defendants' Motion For Claim Construction.

*Pinpoint v. Amazon.com*; U.S.D.C. Northern District Illinois; Case# 1:03-CV-04954; Declaration of Todd C. Jacobs in Support of Defendants' Motion for Claim Construction.

*Pinpoint v. Amazon.com*; U.S.D.C. Northern District Illinois; Case# 1:03-CV-04954; Declaration of Russell Dicker in Support of Defendants' Motion for Summary Judgment.

*Pinpoint v. Amazon.com*; U.S.D.C. Northern District Illinois; Case# 1:03-CV-04954; Declaration Of Dr. Paul Resnick, Ph.D., In Support Of Defendants' Motion For Summary Judgment.

*Pinpoint v. Amazon.com*; U.S.D.C. Northern District Illinois; Case# 1:03-CV-04954; Declaration of Walter Bender In Support on Defendants' Motion for Smmary Judgment of Non-Infringement and Invalidity of the Patents-in-Suit.

*Pinpoint v. Amazon.com*; U.S.D.C. Northern District Illinois; Case# 1:03-CV-04954; Declaration of Todd C. Jacobs in Support of Defendants' Motion for Summary Judgment of Non-Infringement and linvalidity of the Patents-in-Suit.

*Pinpoint v. Amazon.com*; U.S.D.C. Northern District Illinois; Case# 1:03-CV-04954; Minute Order of Jul. 15, 2004 by Hon. Suzanne B. Conlon : Defendants' motion for leave to file documents under seal is granted on good cause shown.

*Pinpoint v. Amazon.com*; U.S.D.C. Northern District Illinois; Case# 1:03-CV-04954; Pinpoint's Memorandum of Law on Claim Constuction.

*Pinpoint v. Amazon.com*; U.S.D.C. Northern District Illinois; Case# 1:03-CV-04954; Declaration of Michael Pazzani, Ph.D., in Support of Pinpoint's Memorandum of Law on Claim Construction.

*Pinpoint v. Amazon.com*; U.S.D.C. Northern District Illinois; Case# 1:03-CV-04954; Appendix filed by Pinpoint Inc in support of their memorandum of law on claim construction.

*Pinpoint v. Amazon.com*; U.S.D.C. Northern District Illinois; Case# 1:03-CV-04954; Declaration of Buddy Stein in support of Plaintiff's Opposition to Defendants' Motion for Summary Judgment of Non-Infringement and Invalidity.

*Pinpoint v. Amazon.com*; U.S.D.C. Northern District Illinois; Case# 1:03-CV-04954; Declaration of Frederick S.M. Herz in Support of Plaintiff's Opposition to Defendants' Motion for Summary Judgment of Non-infringement and Invalidity.

*Pinpoint v. Amazon.com*; U.S.D.C. Northern District Illinois; Case# 1:03-CV-04954; Minute Order of Aug. 11, 2004 by Hon. Suzanne B. Conlon; Plaintiff's motion for leave to file under seal is granted.

*Pinpoint v. Amazon.com*; U.S.D.C. Northern District Illinois; Case# 1:03-CV-04954; Declaration of Todd C. Jacobs in Support of Defendants' Reply to PinPoint's Opposition to Defendants' Motion for Summary Judgment on Non-Infringement and Invalidity of the Patents-in-Suit.

*Pinpoint v. Amazon.com*; U.S.D.C. Northern District Illinois; Case# 1:03-CV-04954; Declaration of Shoshana Loeb, Ph.D.

*Pinpoint v. Amazon.com*; U.S.D.C. Northern District Illinois; Case# 1:03-CV-04954; Notice Of Pinpoint's Rule 37(C)(1) Motion To Exclude Evidence Relating To Defendants' Contention That "Videos@Bellcore" Invalidates Pinpoint's Asserted Claims.

*Pinpoint v. Amazon.com*; U.S.D.C. Northern District Illinois; Case# 1:03-CV-04954; Pinpoint's Reply Memorandum Of Points And Authorities In Support Of Its Rule 37(c)(1) Motion To Exclude Evidence Relating To Defendants'Contention That "Videos@Bellcore" Invalidates Pinpoint's Asserted Claims.

*Pinpoint v. Amazon.com*; U.S.D.C. Northern District Illinois; Case# 1:03-CV-04954; Expert report of Paul D. Resnick, Ph.D.

*Pinpoint v. Amazon.com*; U.S.D.C. Northern District Illinois; Case# 1:05-CV-01330; Claim Charts Showing the Parties' Proposed Constructions.

*Pinpoint v. Amazon.com*; U.S.D.C. Northern District Illinois; Case# 1;05-CV-01330; Pinpoint's Filing of Aug. 2004 Sur-Reply on claim construction; Notice.

*Pinpoint v. Amazon.com*; U.S.D.C. Northern District Illinois; Case# 1:05-CV-01330; Defendants' Memorandum of Points and Authorities in Support of Their Claim Construction of "Scheduling," "Customer Profile," and "Content Profile" Claim Elements.

*Pinpoint v. Amazon.com*; U.S.D.C. Northern District Illinois; Case# 1:05-CV-01330; Declaration of Michael Pazzani Ph.D. in support of Pinpoint's Jul. 2004 memorandum of law on claim construction.

*Pinpoint v. Amazon.com*; U.S.D.C. Northern District Illinois; Case# 1:05-CV-01330; filing of Jul. 2004 by Pinpoint Incorporated's memorandum of law on claim construction.

*Pinpoint v. Amazon.com*; U.S.D.C. Northern District Illinois; Case# 1:05-CV-01330; Appendix by Pinpoint Incorporated in support of Pinpoint's Jul. 2004 memorandum of law on claim construction.

*Pinpoint v. Amazon.com*; U.S.D.C. Northern District Illinois; Case# 1:05-CV-01330; Supplemental Appendix by Pinpoint Incorporated to in support of Pinpoint's Aug. 2004 sur-reply on claim construction.

*Pinpoint v. Amazon.com*; U.S.D.C. Northern District Illinois; Case# 1:05-CV-01330; Declaration of Michael J. Pazzani Ph.D., in support of Pinpoint's supplemental memorandum of law on claim construction.

*Pinpoint v. Amazon.com*; U.S.D.C. Northern District Illinois; Case# 1:05-CV-01330; Appendix by plaintiff in support of Pinpoints supplemental memorandum of law on claim construction.

*Pinpoint v. Amazon.com*; Amazon.com's Claim Charts for videos@bellcore.

Port, O., "Wonder Chips - How They'll Make Computing Power Ultrafast and Ultracheap," *Business Week*, Jul. 4, 1994, pp. 86-92.

Raggett, D., "HTML + (Hypertext Markup Language)," Hewlett Packard Request For Comments, Jul. 12, 1993, pp. 1-31.

Ramanathan, S. and Rangan, P. V., "Architectures for Personalized Multimedia," *IEEE MultiMedia*, Spring 1994, pp. 37-46.

Resnick, P., Iacovou, N., Suchak, M., Bergstrom, P. and Riedl, J., "GroupLens: An Open Architecture for Collaborative Flitering of Netnews," *CSCW 94 Submission*, pp. 1-12.

Rich, E. A., "Building and Exploiting User Models," *Ph.D. Thesis, Carnegie-Mellon University*, 1979, pp. 1-193.

Rivest, R. L.; Shamir, A. and Adleman, L.; "A Method for Obtaining Digital Signatures and Public-Key Cryptosystems," *Communications of the ACM*, Feb. 1978, pp. 120-126, vol. 21, No. 2.

Robinson, M., "Through a Lens Smartly," *BYTE*; May 1991, pp. 177-187.

Rodeh, M., Pratt, V. R. and Even, S., "Linear Algorithm for Data Compression via String Matching," *J. of the Assoc. for Computing Machinery*, Jan. 1981, pp. 16-24, vol. 28, No. 1.

Rose, D. E.; Mander, R.; Oren, T.; Ponceleón, D. B.; Salomon, G. and Wong, Y.Y.; "Content Awareness in a File System Interface: Implementing the 'Pile' Metaphor for Organizing Information," *16 Ann. Int'l SIGIR '93 -Jun. 2003*, Pittsburgh, Pa., pp. 260-269.

Salton, G., "Developments in Automatic Text Retrieval," *Science*, Aug. 30, 1991, pp. 974-980, vol. 253.

Salton, G. and McGill, M. J., "The SMART and SIRE Experimental Retrieval Systems," *Introduction to Modern Information Retrieval*, Mcgraw-Hill Book Company, 1983, pp. 118-156.

Scheifler, R. W. and Gettys, J., "The X Window System," *ACM Transactions on Graphics*, Apr. 1986, pp. 79-109, vol. 5, No. 2.

Schneier, *Applied Cryptography*, Oct. 1993, pp. 177-178; John Wiley & Sons, Inc.

Schneier, *Applied Cryptography*; Second Edition, Oct. 1995, pp. 32-34; John Wiley & Sons, Inc.

Seno, H., Kai, K. and Isobe, T., "Multimedia Information Broadcasting Service "Present"", *IEEE 1994 Vehicle Navigation & Information Systems Conference Proceedings*, pp. 117-120.

Shardanand, U., "Social Information Filtering for Music Recommendation," *B.S., M.E. Thesis, Massachusetts Institute of Technology*, Sep. 1994, pp. 1-93.

Sheth, B. and Maes, P.; "Evolving Agents for Personalized Information Filtering," *Proc. 9th IEEE Conference*, 1993, pp. 345-352.

Sheth, B. D., "A Learning Approach to Personalized Information Filtering," *M.S.Thesis Massachusetts Institute of Technology*, Feb. 1994, pp. 1-75.

Shneiderman, B. "Designing the User Interface: Strategies for Effective Human - Computer Interation," *Addison-Wesley Publishing Company*, 1992, pp. 207-213.

Sincoskie, W. D. and Cotton, C. J., "Extended Bridge Algorithms for Large Networks," *IEEE Network*, Jan. 1988, pp. 16-24, vol. 2, No. 1.

Stein, R. M., "Browsing Through Terabytes," *BYTE*, May 1991, pp. 157-164.

St. Pierre, M., "Wide Area Information Servers (WAIS) over Z39.50-1988 and Beyond," http:--ftp.se.kde.org-pub-z39.50-wais-protocol-ConneXions-02-94.txt, Feb. 1994, pp. 1-6.

Stevens, C., "Knowledge-Based Assistance for Accessing Large, Poorly Structured Information Spaces," *Ph.D. Thesis, University of Colorado*, 1993, pp. 1-115.

Storer, J. A. and Szymanski, T. G., "Data Compression via Textual Substitution", *J. of the Assoc. for Computing Machinery*, Oct. 1982, pp. 928-951, vol. 19, No. 4.

Story, G. A., O'Gorman, L., Fox, D., Schaper, L.L. and Jagadish, H. V., "The RightPages Image-Based Electronic Library for Alerting and Browsing," *Computer*, Sep. 1992, pp. 17-26.

Suchak, M. A., "Goodnews: A Collaborative Filter For Network News," *B.S., M.S. Thesis, Massachusetts Institute of Technology*, Feb. 1994, pp. 1-64.

Terry, D. B., "A Tour Through Tapestry," *COOCS '93*, Nov. 1993, pp. 21-44.

Thomas, W. L. "Electronic Program Guide Applications - The Basics of System Design," *1994 NCTA Technical Papers*, pp. 15-20.

Thompson, J., "A Graphic Representation of Interaction with the Nexis News Database," *B.S. Thesis, Massachusetts Institute of Technology*, May 1983, pp. 1-44.

Troy, T. N., "Servicing With Software; The Current Trend In Hotel Property-Management Systems Gets Back To The Basics: Improving Guest Service; Includes Property Management Systems Terminology," *Information Access Company*, Sep. 20, 1993, p. 16, vol. 208, No. 16.

Voorhees, E. M., "Software Agents for Information Retrieval," Siemens Corporate Research, Inc., Princeton, N.J., 1993, 4 pages.

Waechter, D. B., "Considerations for the Use of Adjunct Technology in the Telecommunications Network," *IEEE/IEICE Global Telecommunications Conference, Nov. 15-18, 1987, Tokyo, Japan*, pp. 1551-1555.

Welch, T.A., "A Technique for High-Performance Data Compression," *Computer*, Jun. 1984, pp. 8-19.

Wieffering, E. J., "' I Can't Afford To Fail': Ted Deikel Has A Net Worth of $100 Million, But He'll Never Forget Growing Up Poor In North Minneapolis," UMI Inc., vol. 25, No. 1, Sec. 1, Jan. 1994, p. 52.

Willett, P., "Recent Trends in Hierarchic Document Clustering: A Critical Review," *Information Processing & Management*, 1988, pp. 557-597, vol. 24, No. 5.

Wittig, H. and Griwodz, C., "Intelligent Media Agents in Interactive Television Systems," IEEE, 1995, p. 182.

World Wide Web Consortium (W3C), "Basic HTTP as defined in 1992," Internet Draft, http:--www.w3.org/Protocols/HTTP/HTTP2.html.

Yamaguchi, T., Ohtsuka, T., Taniguchi, A. and Fujimoto, N., "Digital Optical CATV System Using Hubbed Distribution Architecture," *IEEE/IEICE Global Telecommunications Conference, Nov. 15-18, 1987, Tokyo, Japan*, pp. 2005-2009.

Yamanaka, N. and Kikuchi, S., "High-Speed Time-Division Switch for Broadband ISDN," *IEEE/IEICE Global Telecommunications Conference, Nov. 15-18, 1987, Tokyo, Japan*, pp. 2010-2014.

Yan, T. W. and Garcia-Molina, H., "SIFT—A Tool for Wide-Area Information Dissemination," *1995 USENIX Technical Conference*, New Orleans, LA, Jan. 16-20, 1995, pp. 177-186.

* cited by examiner

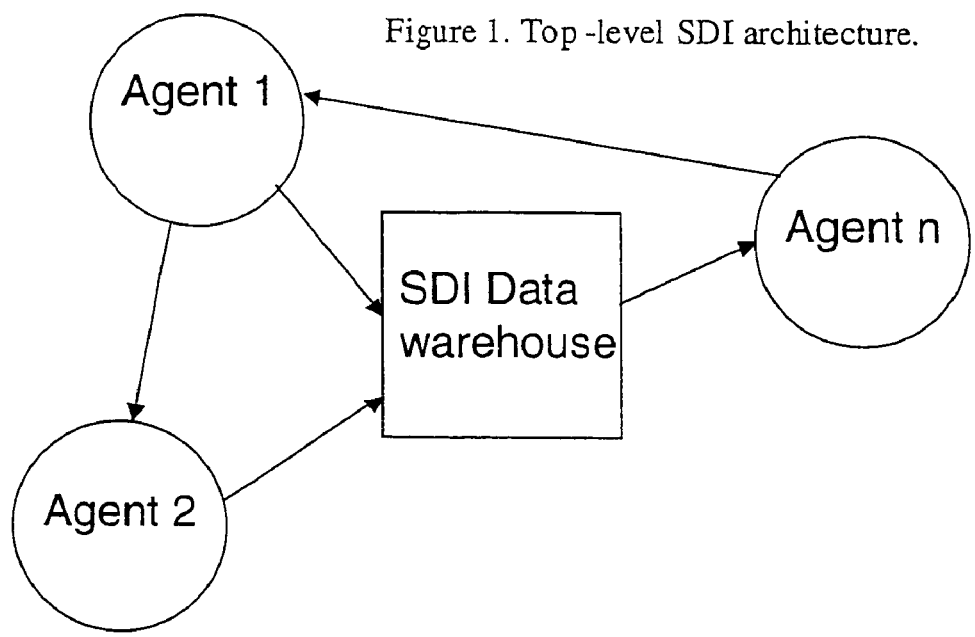
Figure 1. Top-level SDI architecture.
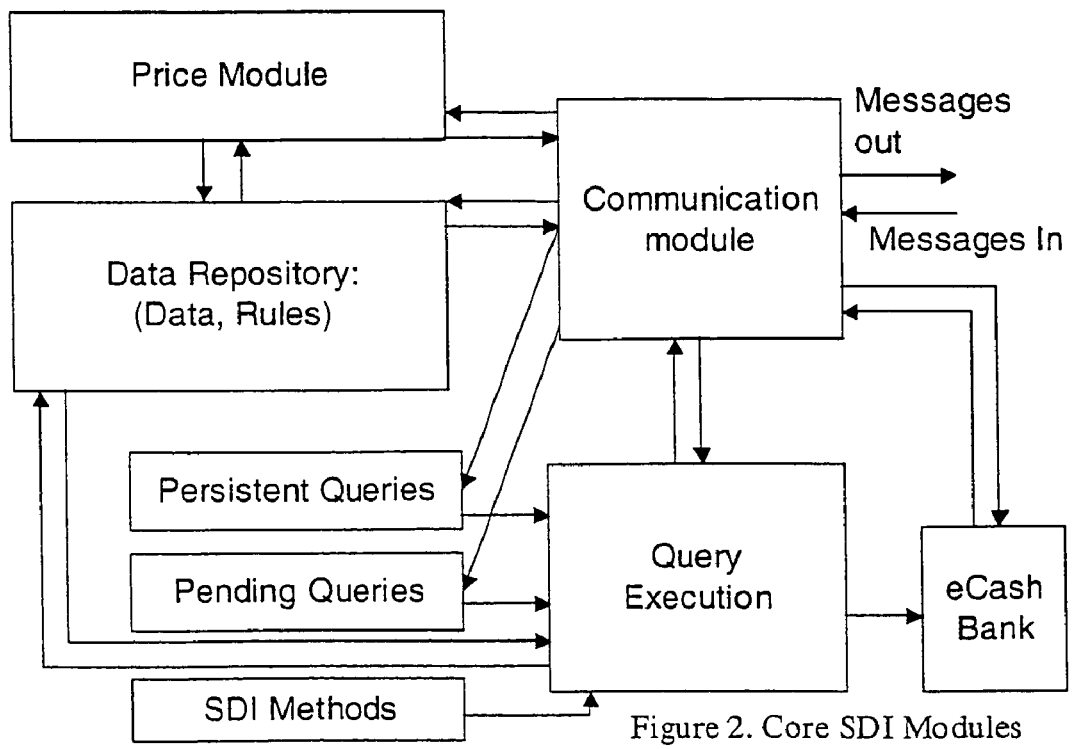
Figure 2. Core SDI Modules

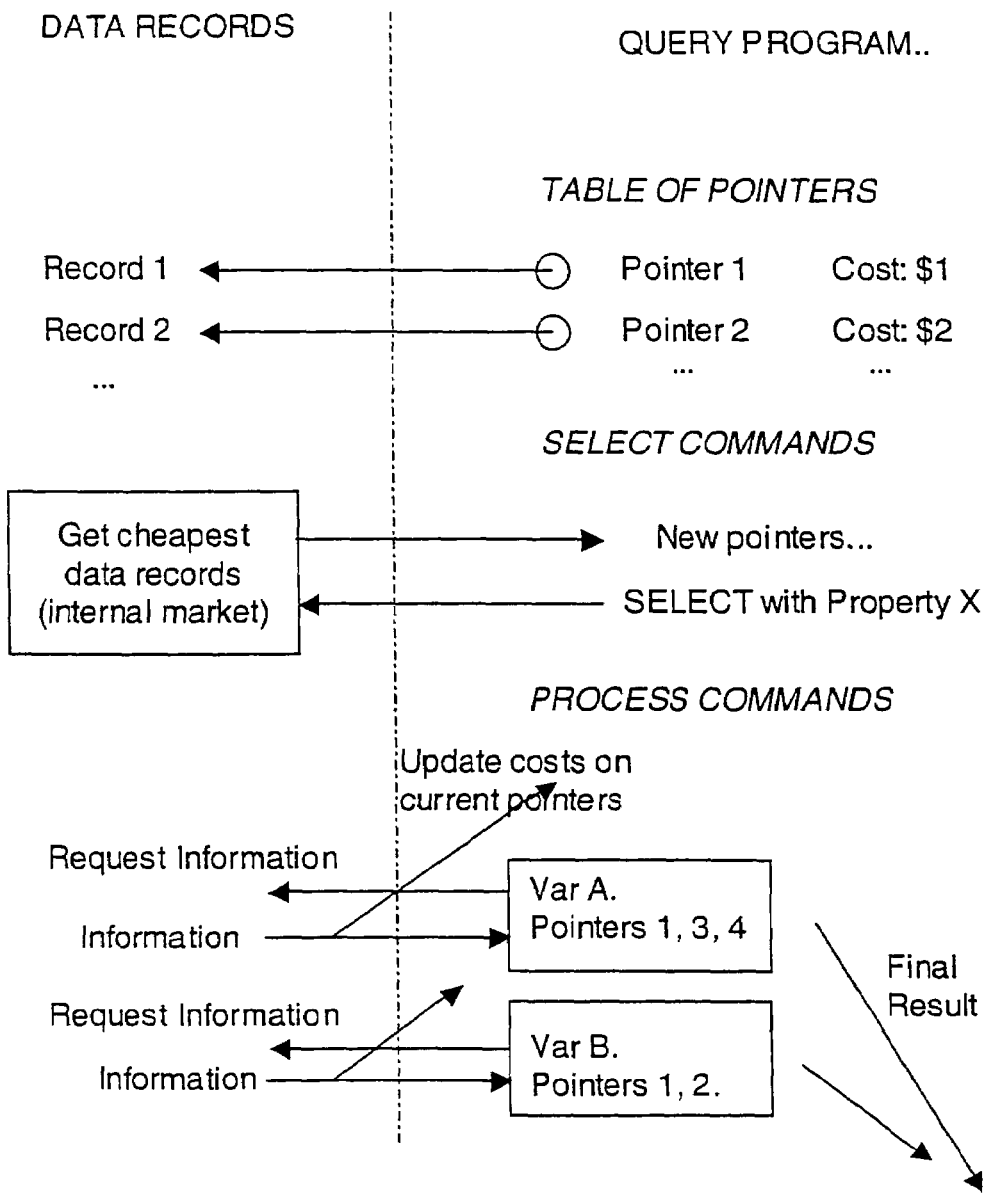
Figure 3: Query Execution

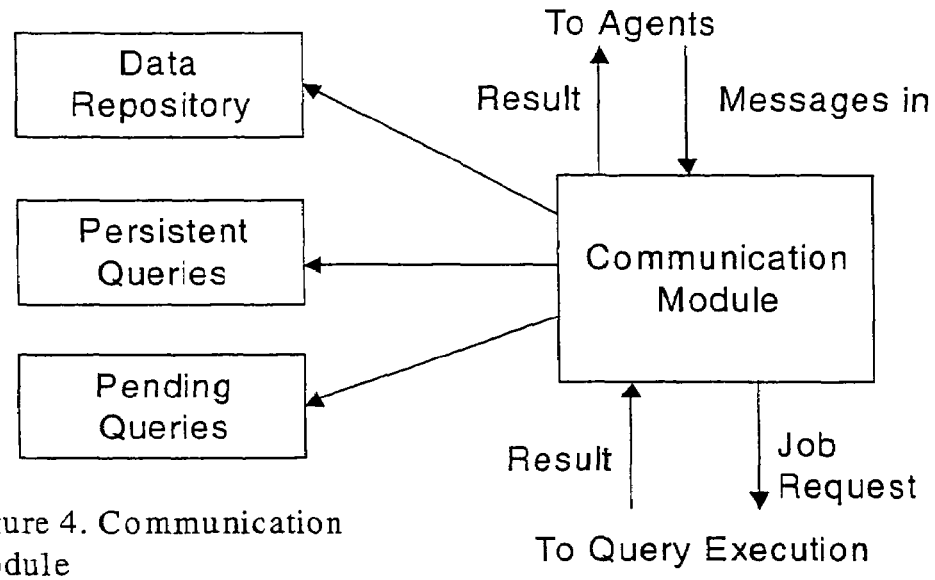
Figure 4. Communication Module
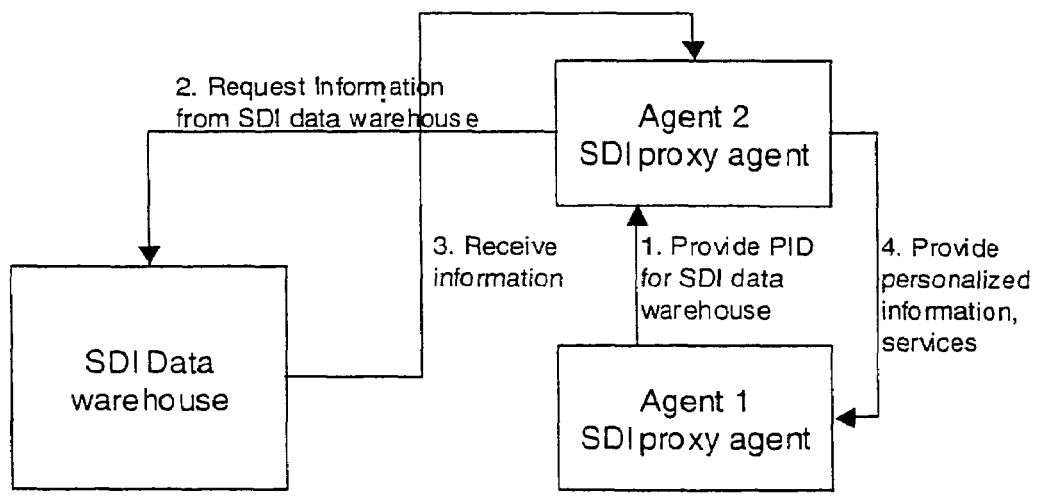
Figure 5: Data in the central SDI data warehouse.

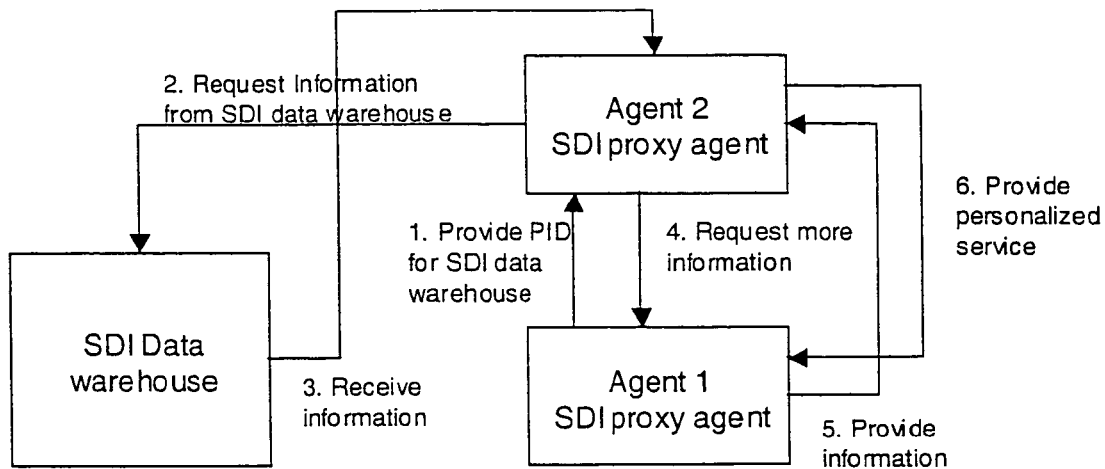
Figure 6: Data Stored Client Side and in the SDI data warehouse
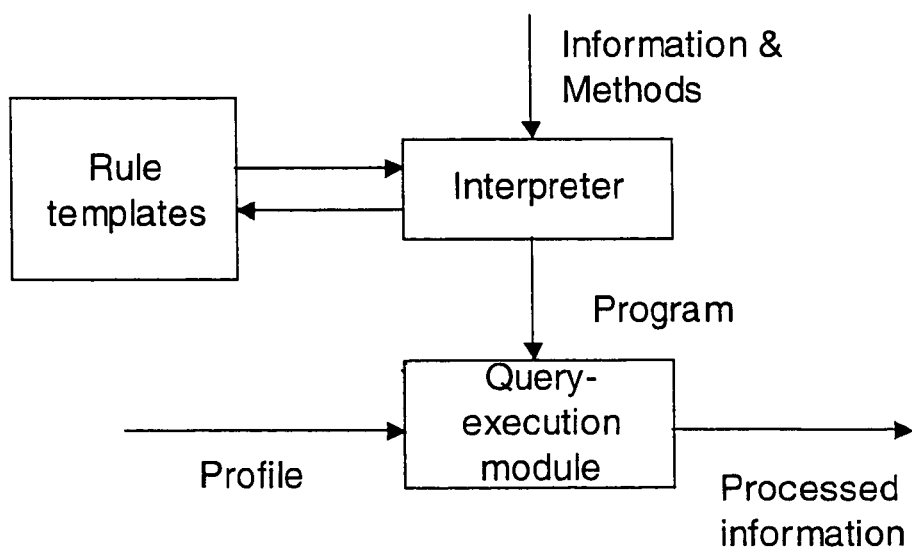
Figure 7. Client-side Personalization.

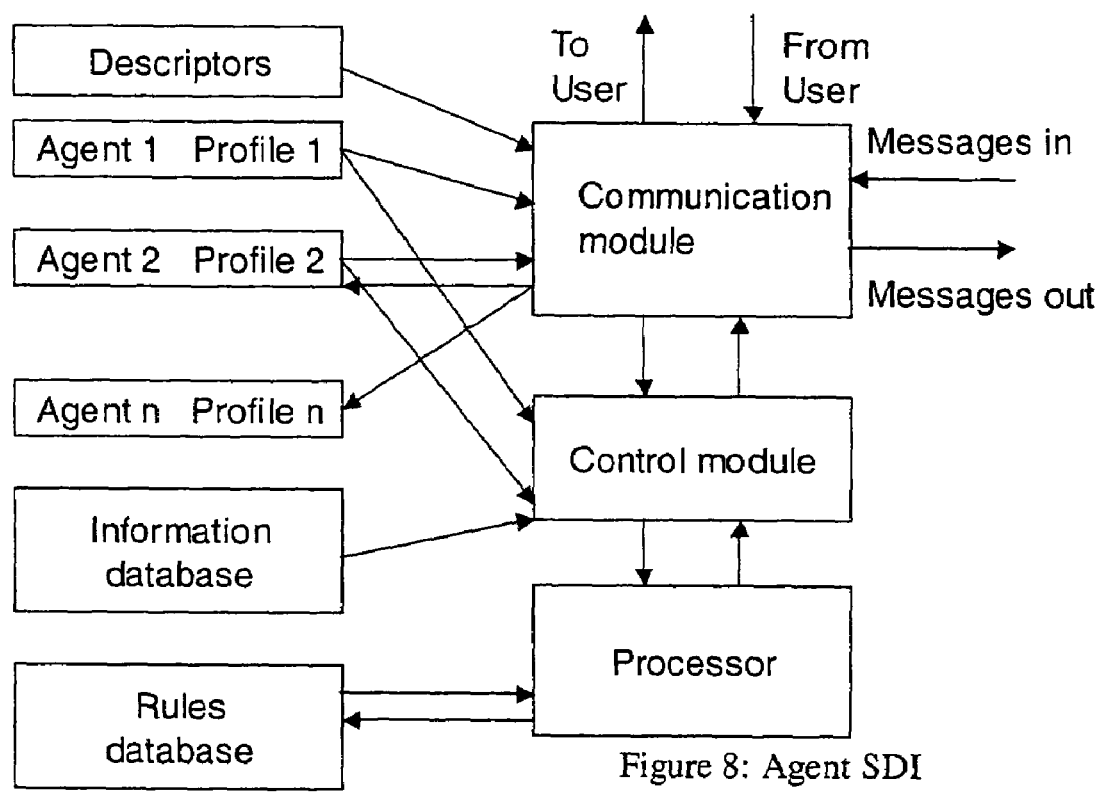
Figure 8: Agent SDI architecture: Personalization agent

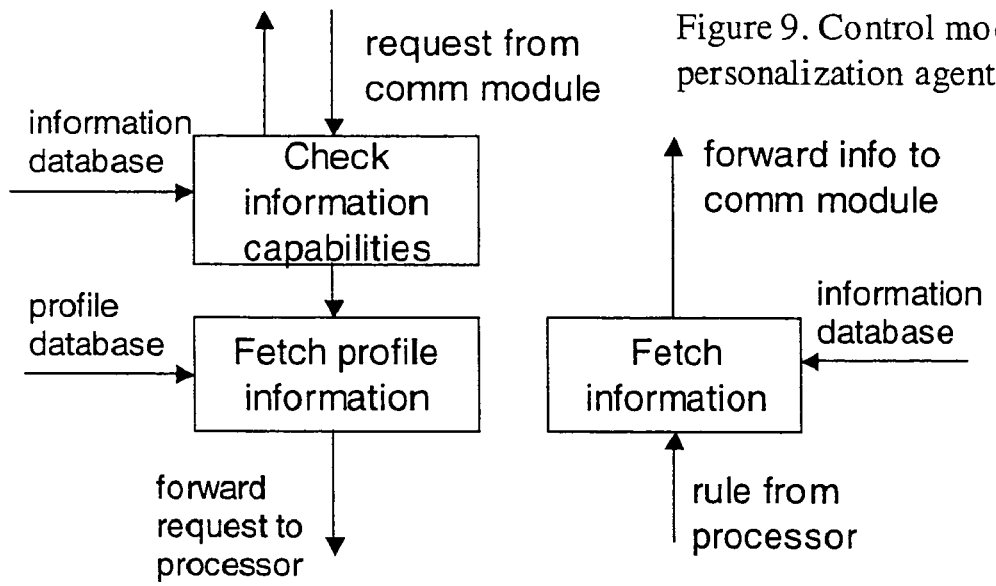
Figure 9. Control module, personalization agents
(Figure 9 above)
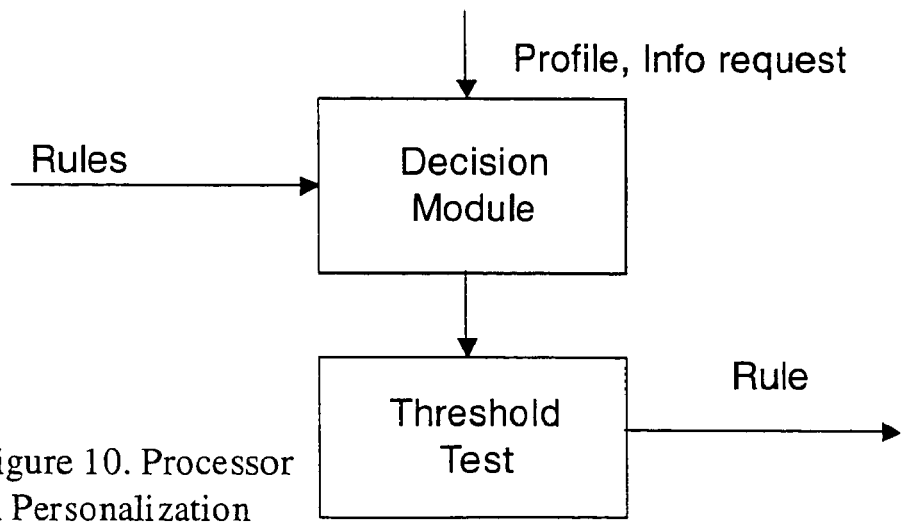
Figure 10. Processor in Personalization agent
Figure 10

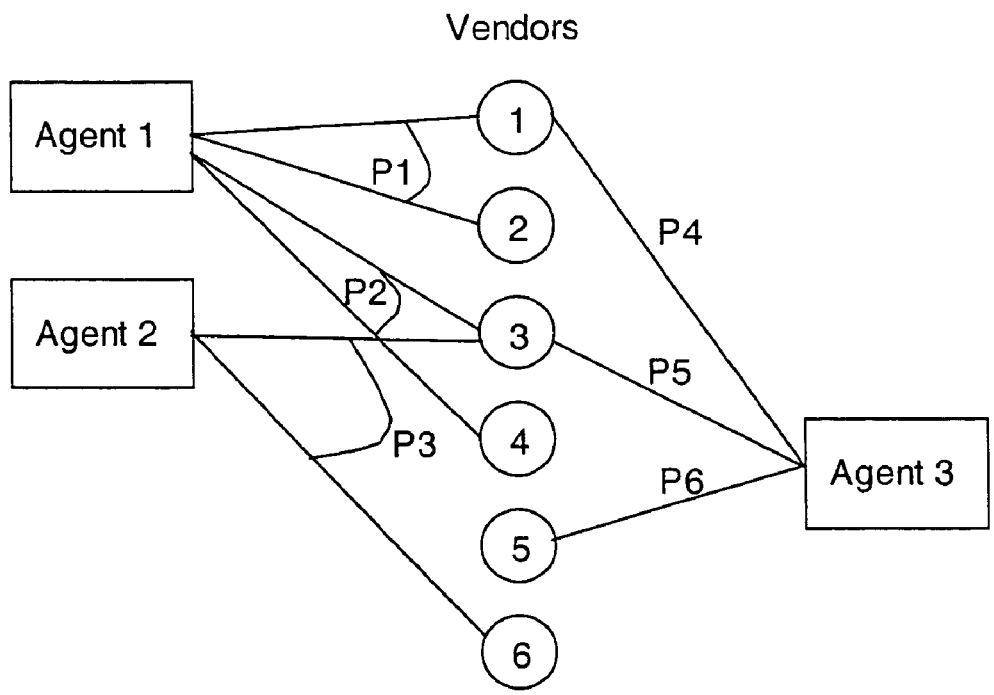
Figure 11. Client-side Identity Management
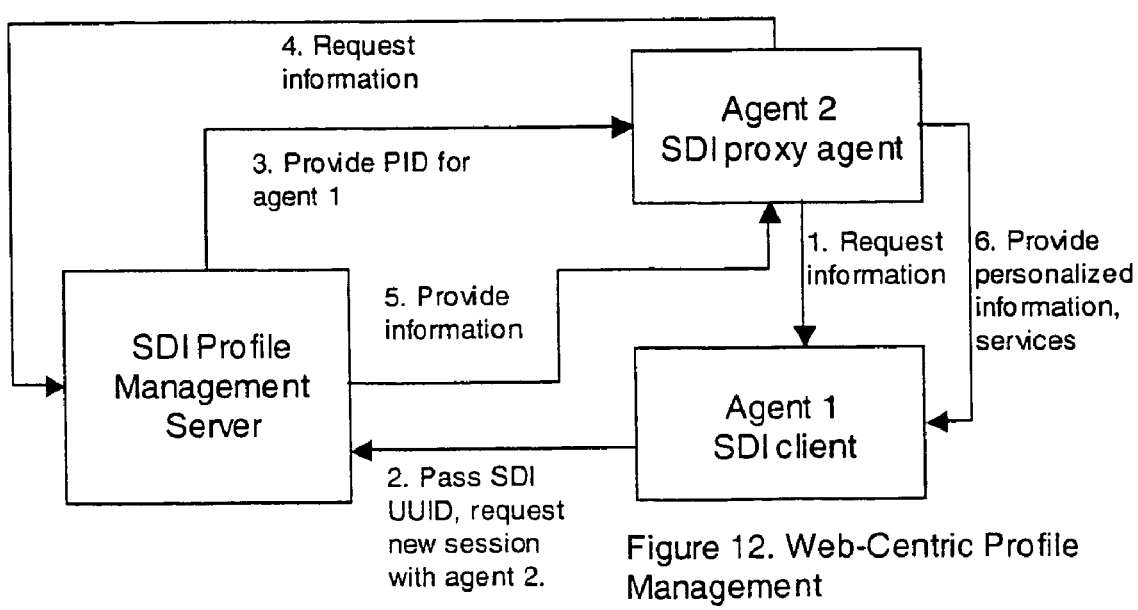
Figure 12. Web-Centric Profile Management

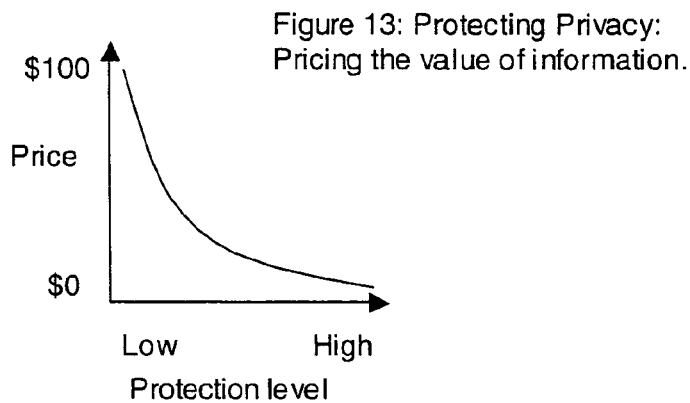
Figure 13: Protecting Privacy: Pricing the value of information.
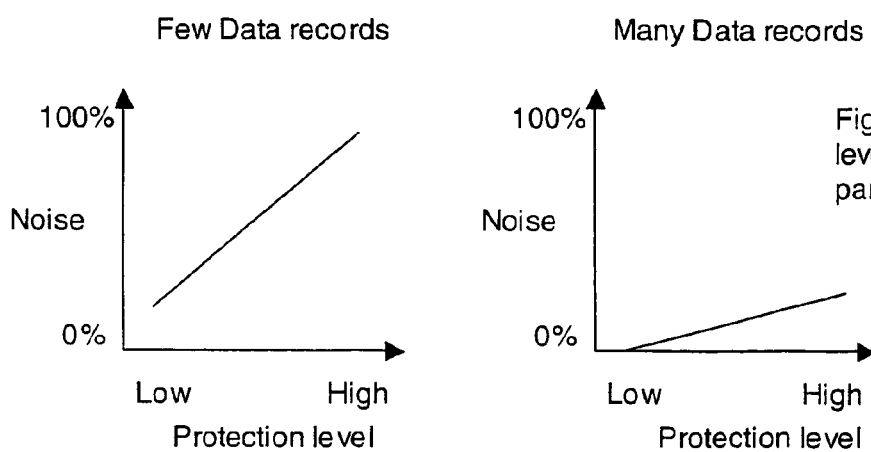
Figure 14. Selecting a level of noise to provide a particular protection level.

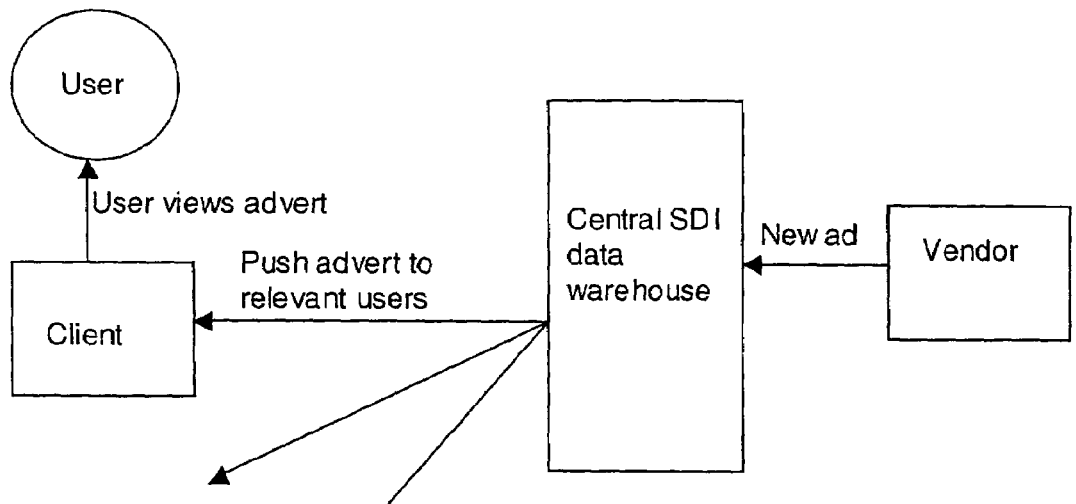
Figure 15. System for push of targeted ads to users in iamworthit.
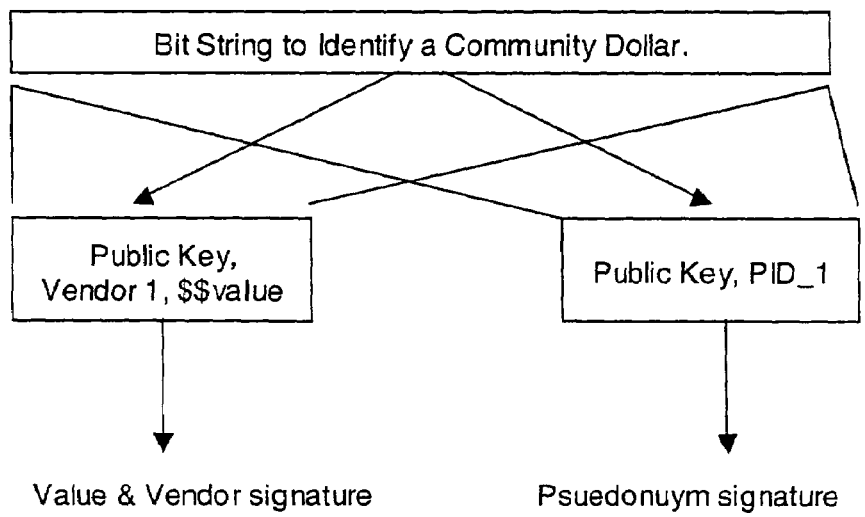
Figure 16. E-cash method to deliver community dollars.

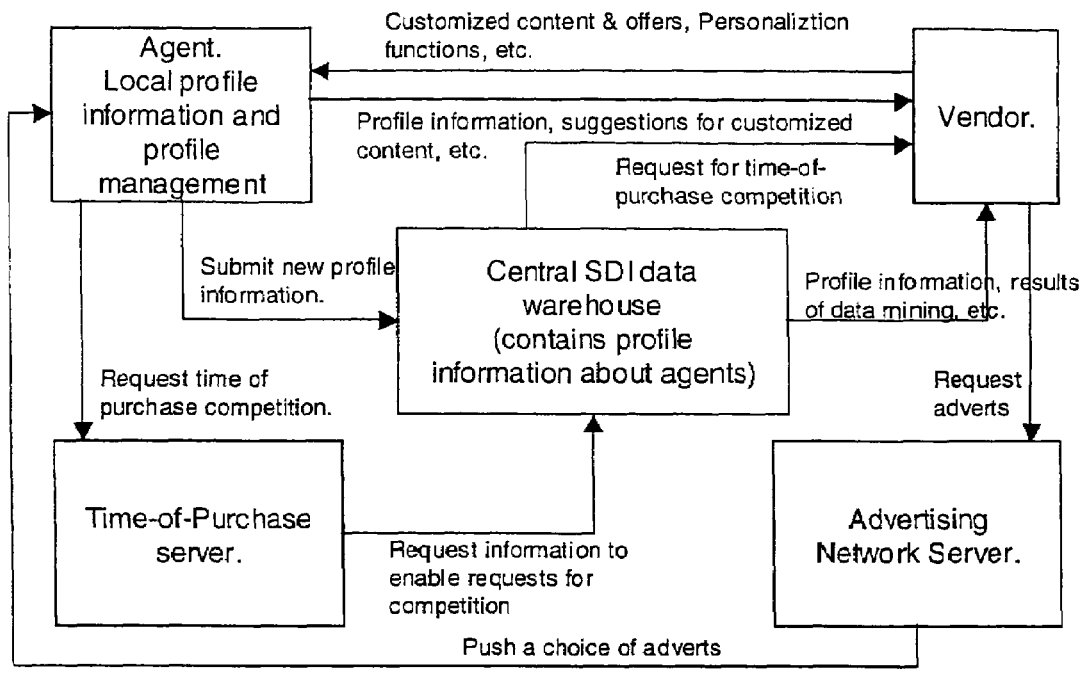
Figure 17. Time-of-Purchase/Iamworthit system
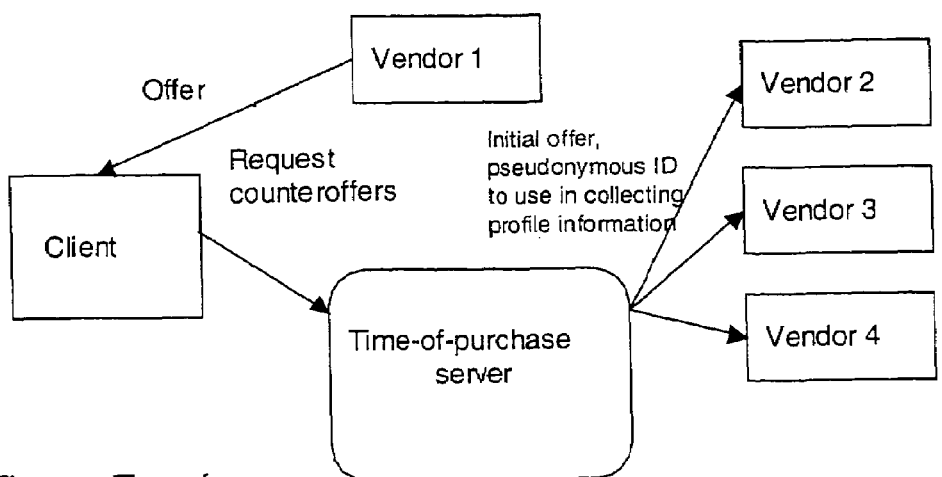
Figure 18. Time of purchase competition

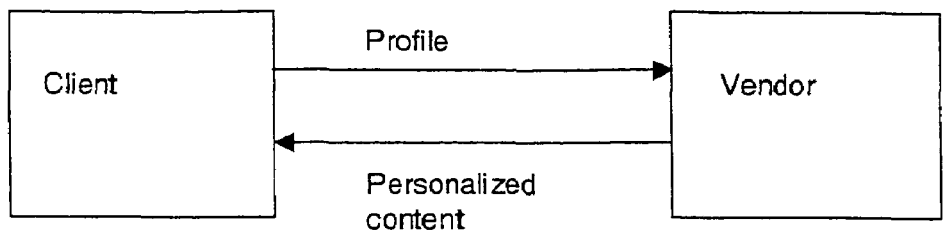
(a) Traditional Method
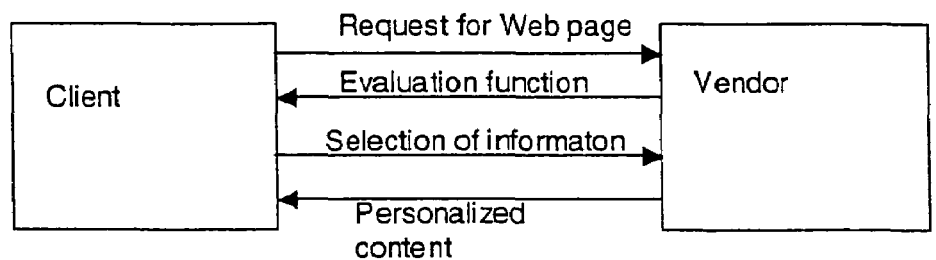
(b) Iamworthit/SDI Method
Figure 19. Customization of information to users.
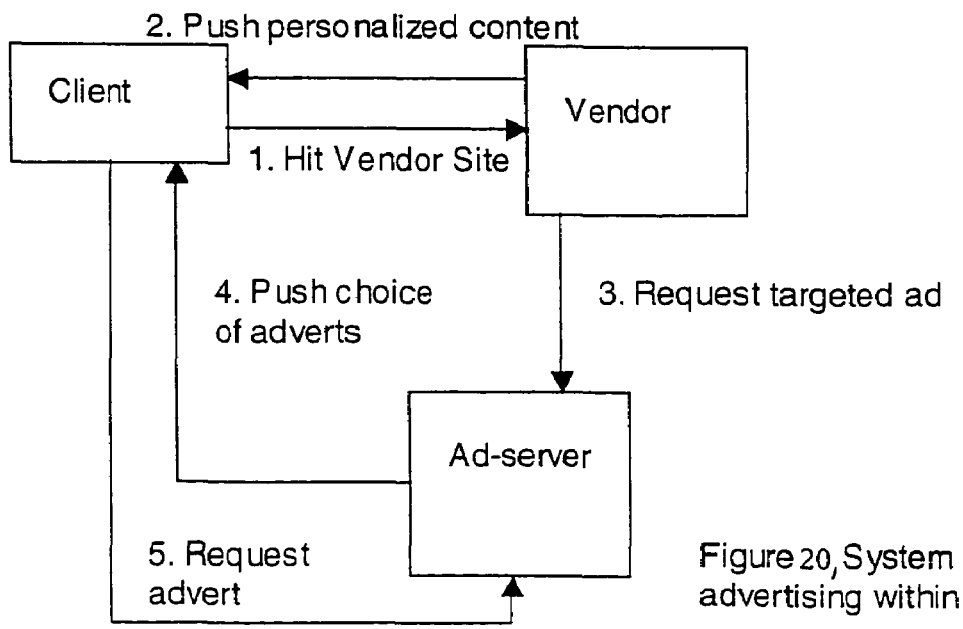
Figure 20. System for targeted advertising within iamworthit.

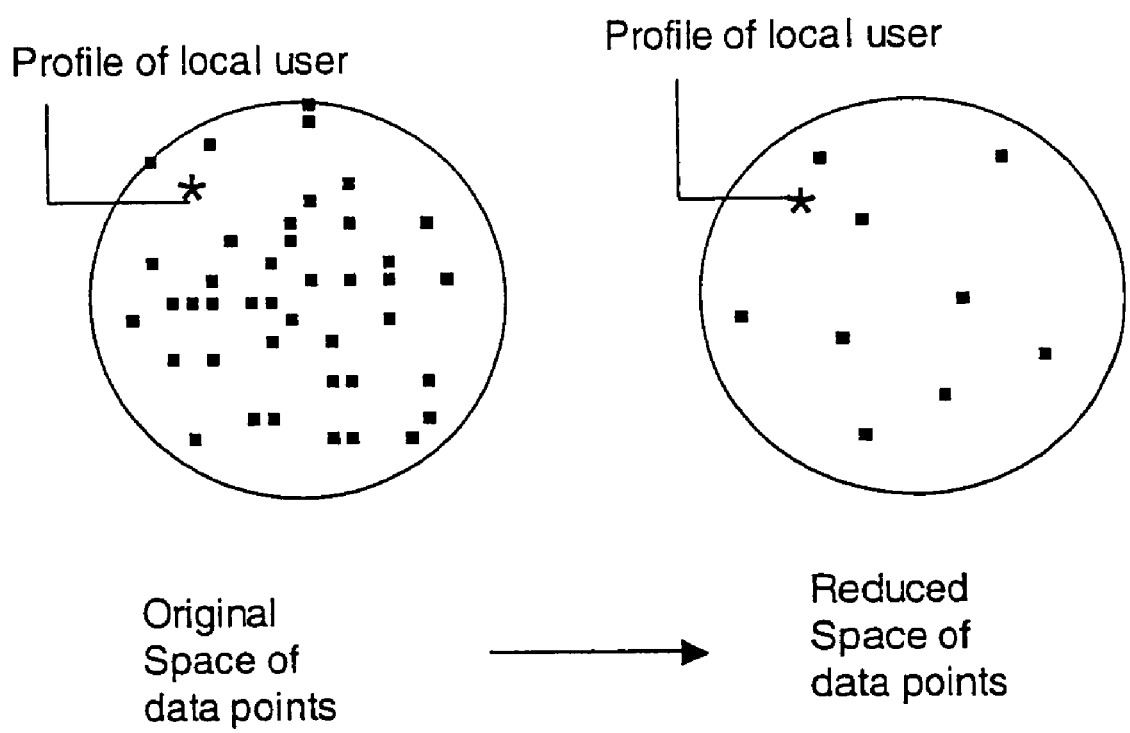
Figure 21. Concise Client-Side Method Descriptions.

SECURE DATA INTERCHANGE

CROSS REFERENCE TO RELATED APPLICATIONS

The present application claims the benefit of U.S. Provisional Application No. 60/161,640, filed Oct. 27, 1999, titled SECURE DATA INTERCHANGE, and Provisional Application No. 60/206,538, filed May 23, 2000, titled SECURE DATA INTERCHANGE, both of which are hereby incorporated by reference.

BACKGROUND OF THE INVENTION

1. Field of the Invention

The Secure Data Interchange invention describes a system to allow a privacy-protected market for data exchange between multiple self-interested parties. The system presents a general infrastructure for the exchange of information within a safe privacy-protected environment, between multiple self-interested parties. We propose a central data warehouse that maintains data submitted by different users, and executes queries and programs on the data. Rules are associated with data that define how the data can be used and queried, to allow agents that submit data to maintain absolute control over its use. SDI acts as a trusted-intermediary to all parties, and implements an internal market for queries on the information, allowing agents to specify prices for data access. Furthermore, SDI supports complex queries such as collaborative filtering, that can provide a querying agent with a one-time benefit of data access but without long-term access to the data that was used to compute valuable results.

The invention relates to systems that provide personalized information, profiling, automated matchmaking and information exchange, providing a framework that protects privacy and allows information collection and profiling within a carefully controlled environment. Although the marginal cost of data duplication is small, there are hidden costs associated with data, for example because of privacy concerns, and data can be a valuable resource in many problems. In business-to-consumer (B2C) applications Secure Data Interchange addresses the direct conflict between the goal of personalization and the need for privacy, preventing the exchange and collection of information without knowledge and consent. In business-to-business e-commerce applications (B2B) SDI allows vendors to provide sensitive and valuable information, for example about business needs and customer bases, in a secure environment that controls access and leverages value.

2. Description of the Prior Art

The invention of Secure Data Interchange relates to a wide-range of application domains, all of which are characterized by a need to exchange information in a privacy-protected and carefully controlled market-based environment.

As a key application we suggest a system for personalized information delivery in a networked environment, in which the SDI-proxy can fact as a local filter on information, based on what it knows about a user's preferences and methods for filtering pushed by the provider of content. The system allows collaborative filtering through information that is provided to the central data warehouse, but never released directly to other agents; collaborative filtering methods are computed in the central SDI data warehouse. Further motivation is provided with reference to some electronic commerce applications, that we describe in (A) business-to-consumer and (B) business-to-business e-commerce applications.

In addition to applications within commerce, the system of Secure Data Interchanges is central to developing many other new products. Examples include the formation of "self-help" groups between a set of individuals with common interests, and applications to personal information delivery systems, e.g. for educational and informational purposes.

A. Business-to-Consumer (B2C) Electronic Commerce.

The recent explosion of electronic commerce, in particular Internet-based individual-to-business electronic commerce, presents new opportunities for automated personalized information delivery and the automated customization of products and services. This type of personalization is very valuable to vendors because it can increase sales volumes, enable cross-selling and up-selling of goods and services, and allows vendors to price products dynamically based on information about the preferences and goals of customers. Personalization is also useful to customers when it correctly identifies the requirements and preferences of a customer, because it can reduce search cost and enhance the "shopping experience". Perhaps a customer can find the good or service (i.e. desirable price/quality/feature tradeoff) that he/she wants more quickly than without personalization, or receive information about an interesting new product or service that he/she did not know about.

The basis for these new services is that Internet-based "shop fronts" can be individualized on a per-customer basis, dynamically and in real-time. Traditional main-street shops must offer the same store layout to every customer, because the layout is physical, although some level of personalized service can be achieved through well-trained sales assistants, that act as a "guide" for a customer within a store. On-line "shop fronts" are virtual, and configurable at negligible cost to the customer or the vendor, assuming that computation is cheap and fast.

Furthermore, Internet-based electronic commerce can allow business to collect vast amounts of consumer information, because customers interact through a computer-based interface. Customers can be monitored as they browse a Web site for products and services. Information such as the search-terms that users enter into a search engine, the links that users follow, and the length of time spent on each page, can all provide an insight into the current goal of a customer, i.e. the type of product that he/she wants. When combined across different sessions, and with similar information about the browsing and purchasing habits of other customers, the information can be folded into a long-term view of the preferences and needs of a customer.

Moreover, new network connectivity enables different vendors to exchange profiles for common customers, either statically or dynamically, in order to build broad and detailed profiles across vendor domains. There exist many potentially powerful synergies between the data sets that are collected by different vendors, that can be leveraged to provide appropriate services and products to customers. When analyzed with the proper statistical tools these data sets can reveal fundamental patterns in the behavior of users, and enable a vendor to provide appropriate information to a user. Furthermore, access to user-profiles collected by other vendors can enable vendors to provide focused information delivery to first-time users, and also cross-market services with other appropriate vendors.

Providing user profile information within a carefully controlled environment can benefit vendors and users:

Vendors would find benefit in sharing data with other vendors; this would deepen their understanding of their customers' behaviors and preferences, especially if some customers were traceable across several data sets.

Users would benefit from sharing data with other users. This is already evident in the popularity of news groups and web discussion pages catering to individuals with shared interests. By learning what other people with similar tastes and preferences have discovered and enjoyed, a user can sidestep information overload in the search for personally satisfying information.

Vendors can benefit from receiving data about users. An obvious example would be in the use of collaborative filtering for the marketing of targeted promotions; rather than being deluged with coupons and advertisements that are of absolutely no interest, a user would benefit by being presented with advertising that is highly relevant. In the process, the vendor would increase advertising response rates, boosting overall efficiency.

Users can receive benefits from providing information to vendors. Personalization of content at vendors' web pages, and well-focused banner advertisements at other web sites that they visit.

The problem is that a user wants controlled personalization, in the sense that it might not be desirable for information about every on-line transaction that a user performs, every on-line document that a user reads, and every web page that a user visits, and demographic information, to be available to every business that the user interacts with, in the virtual and physical world.

A.1 Focused Banner Advertising/Content Provision

Internet-based media sites have followed preceding formats in generating revenue from advertising, with content to users often provided free-of-charge. The business model is similar to that in newspapers, magazines, and television, where circulation and audience/readership demographics are used to drive revenue. Electronic media presents new opportunities for media-based business: for example multimedia techniques and interactivity, personalized delivery of information, and personalized targeting of advertising.

The problem—as before, is to acquire and leverage information about the preferences and interests of a user, within a system that protects user privacy (i.e. controls the collection and exchange of information about users, and controls the use that is made of that information). A further problem is to extrapolate information from a large corpus of data about an individual user.

A.2 Mailing Lists

As another example, suppose that business A requests a list of individuals that meet a particular criteria. Consumer B meets the criteria, but is only listed for business A if A also meets criteria specified by B, for example if A will provide information about new products and services that are interesting to B. In an application to the profiling of users on-line, the problem is that users want to receive the benefits of targeted products and advertisements, but want to avoid the abuse of profile information and control vendors' access to that information.

B. Business-to-Business (B2B) Electronic Commerce

The Internet provides businesses with network connectivity with other business, both competitors and partners. This connectivity allows businesses to exchange information about customers (dynamically or statically), in order to identify potential new customers, build better profiles for existing customers, and up-sell/cross-sell products and services in real-time. The problem with this exchange of information (that can include swaps, sells, and rental access) is that businesses need to (a) protect the privacy of their customers; (b) prevent information release to competitors, either directly or through third-parties.

B.1 Privacy-Protected Identification of Synergies/Matches

There are many scenarios where autonomous agents would like to be informed of matches under conditions of mutual consent, but without information leakage to any agent if any one of the agents declines the match. Consider two vendors, A and B, and suppose the vendors seek strategic partnerships with other vendors that have appropriate skills and goals. However, vendor A does not want to broadcast to all vendors its need for a business partner or a new alliance, instead vendor A wants to be introduced to another vendor with the right mix of capabilities; similarly for vendor B. What is required is a system that only introduces vendor A to vendor B, and perhaps anonymously at first, if both vendors consent to the introduction. The problem is to provide information that enables matches, without allowing bad matches and abuse of information—i.e. within an environment of secure data interchange.

B.2 Credential-based Introductions, Contracting and Messaging-Systems.

There are many situations where individual parties, for example individuals or businesses, require introductions to credentialed individuals and/or businesses, with the aim of building a new relationship or making a new contract. Consider for example business associations, where credentials about non-bankruptcy, and no previous attempts to defraud could be important. Consider social introductions, where individuals might be concerned about past criminal activities of new contacts. In the domain of automobiles, we could consider a system that identifies other automobiles in the physical location of a vehicle that have recently been involved in an accident. The problem is to manage certificates within a system where users can maintain multiple identities, and to protect the release of certificates without suitable provisions for terms-of-use and criteria for request.

SUMMARY OF THE INVENTION

The above problems are solved, and a technical advance achieved, by the system of Secure Data Interchange. The Secure Data Interchange system enables information about bilateral and multilateral interactions between multiple persistent parties to be exchanged and leveraged within an environment that uses a combination of techniques to control access to information, release of information, and matching of information back to parties.

The system of Secure Data Interchange (SDI) provides a trusted server containing a large database of information that is owned by its providers. Each data record has an associated price rule, that controls access to data. The pricing model allows a data owner to specify a price for different types and amounts of information access, and whether the identity of the information owner is required, and the system of SDI computes a composite price for a query based on aggregated prices for a query over a number of different data owners, with an internal market that favors low priced data. The pricing model allows discounts based on certificates of a requesting agent, and as a special case implements the standard capability-based access control systems, where information is provided to users with appropriate permissions (i.e. with zero and infinite prices). In addition, the system of Secure Data Interchange allows data to be submitted with a level of random perturbation (noise), to provide added privacy protection, or alternatively allow an agent to specify in conditions under which additional noise should be added to data. A query is priced before execution, to allow an agent to decide whether or not to execute a query, and select between alternative types of queries. Binding price quotes are provided to querying agents, and queries can be scaled to meet a budget.

Data owners can submit data to the central data warehouse with different degrees of identification, for example anonymously, pseudonymously, or with a true identity. For example, in the case of data that represents a user's profile information, for example information about the interests of a user, a user might prefer to use a number of different pseudonyms for different types of activities that he/she likes to engage in online. A user might maintain a number of different aliases within the database, for example to represent different types of things he/she likes to do which have little bearing on each other.

Various types of queries can be executed on the server, ranging from traditional SQL style queries to collaborative-filtering style queries. The inventions of SDI is not predicated on the type of queries supported, describing instead a general system to execute those queries within a secure data-controlled environment. We leave the algorithms that implements the semantics of a query undefined, but define the interface between that algorithm and the data in the database, which is protected with price rules.

A query can perform a considerable amount of computation on records in the database before any information is provided in response to a query. We allow general purpose programs to run on the server, that might for example perform collaborative filtering or other data mining techniques before returning aggregate information, for example a new model of the profiles of users of a particular interest to a vendor. However, the total charge for a complete query session is computed as the sum payment charged by all record pointers that are used in computing the final response.

Furthermore, queries can also take an action on behalf of a querying agent, for example asking another agent to provide more information about something. We allow queries to be priced, based on a model of "revenue collection", in which the SDI server sells the right to access to data on behalf of the agents that submit data into the database. We also propose to allow "persistent queries", which reside on the server for a fixed period of time and return a response to the querying agent whenever conditions are met in the data.

Interesting variations of SDI place data in different distributed locations, and move the control of information access between a central SDI server and distributed client-side SDI proxy agents. This allows different tradeoffs between privacy and information sharing. It also has implications for bandwidth and computational requirements within SDI. One role of a client-side SDI data warehouse is to provide the same functionality as the central shared SDI database, but with processing only performed on information provided by that agent. This can allow greater privacy by allowing a user to retain absolute control over his/her data on his/her local machine without even releasing data to the shared database.

In an application to personalized on-line interactions, we describe a client-side SDI proxy which manages a user's interactions with the on-line sites of vendors and also manages a user's interactions with the central SDI data warehouse, i.e. providing profile information and controlling profile access. The client-side SDI proxy for an agent that represents an individual browsing the Internet can manage that user's profiles in interactions with other agents, for example representing vendors and content providers. The client-side SDI proxy can also handle decisions about what types of information to submit to the server, and manages query execution on behalf of the agent. The client-side SDI proxy agent can also push information about a user's on-line activities to the central SDI data-warehouse in real time. This enables a system of "time-of-purchase-competition" system, in which a user can request competitive counteroffers from other vendors before making a purchase.

The system addresses the fundamental conflict that exists between rights of privacy and efficiency gains from better bilateral exchange of profile/preference information. SDI as applied to B2C e-commerce allows consumers to receive targeted information about products and services, but without the loss-of-privacy that can easily occur in the current on-line profiling "free-for-all". The cookie technology provided by Netscape to supported personalized sessions with a single vendor on-line has been used by advertising network providers such as DoubleClick to track users across multiple sites, often without either the consent or knowledge of that individual [New York Times, Feb. 7, 2000].

In describing the system of secure data interchange we claim the following novel technical ideas:

(a) Agents can associate price-rules with information that is placed in the central database, and retain absolute control and ownership over all uses of that data. As a special case of price rules, the system supports access based on certified properties of querying agents (with zero and infinite prices). The pricing model allows information providing agents to receive direct value for data, and allows agents that request access to information to receive a price before a query is executed, and make appropriate decisions about what type of queries to execute.

(b) A number of novel techniques are proposed to allow data processing within the data warehouse without releasing too much information to an agent. General programs, for example collaborative filtering techniques, can be executed in situ within the data warehouse, so that agents can receive the aggregate benefits of information, without receiving details about the information. We might also allow an agent to receive anonymous or randomized information, and control the amount of information that can be received from a particular record.

(c) The system of SDI can act as a trusted intermediary between agents, notifying agents about information of a particular type, and for example sending messages between agents without breaking the identity of agents except by consent. A special type of query that we call a persistent query allows an agent to maintain a permanent "searching" presence in the central database, always on the lookout for useful information.

(d) In a key variation we push a small version of the SDI data warehouse onto an user's client computer, where it acts as a proxy agent, and further proxies an agent's interaction with other agents in real time. The local SDI data warehouse, called the client-side SDI database, is a trusted party to the client, trusted to maintain information that it is valuable to the client and use that information is appropriate ways. The advantage of this method is that an individual never needs to release sensitive profile information, it is always held on its local computer—but can still receive the benefits of personalization.

(e) We also suggest a client-side SDI proxy that can collect information about a user, for example within an Internet browsing application, and periodically push the collected information to the SDI data warehouse in a controlled way. The client-side SDI proxy can also be responsible for certain data certification functions, and can manage a user's interactions with other agents to protect its privacy in non-SDI mediated transactions.

As an application to B2C e-commerce, the system of SDI allows client-side personalization instead of provider-side personalization. Instead of passing profile information to a provider and receiving personalized information in return, providers can provide personalization methods that are used interactively with local profile information about consumers to target products and services without receiving explicit information about a user's profile. In a simple form, the vendor provides complete information about its services, and a method to display them to the user based on his/her local profile. When describing the application of SDI to electronic commerce we also describe methods to implement necessary ancillary systems that are essential to supporting full e-commerce functionality within an identity-protected system, such as systems for pseudonymous payments and physical mailing of products.

Collaborative filtering based on profiling information from multiple users is supported within the central SDI data warehouse, but within a system of economic incentives, where users provide profile information in return for receiving payments from vendors for that information. This allows broad network-wide information to be used for profiling, in addition to deep vendor-specific information.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 1 through 21 illustrate various parts and embodiments of the invention.

DESCRIPTION OF THE PREFERRED EMBODIMENT

1. Introduction

The invention of Secure Data Interchange (SDI) describes a general infrastructure for the exchange of information within a controlled environment. We propose a central data warehouse that maintains data submitted by different users, and executes queries and programs on the data. Rules are associated with data that define how the data can be used and queried. As such, the system of SDI prevents the exchange and collection of information without knowledge and consent. The system allows for payments to be received by the providers of information, in return for data access. In application, the invention enables new systems for the delivery of personalized information, profiling and automated matchmaking and information exchange, all within a framework that protects privacy and maintains data security. SDI supports the collection and exchange of information between, and relating to, autonomous (and possibly self-interested) agents within a distributed environment.

1.1 Definitions

Agent. An agent in SDI is a any party that wants to sell or give away data to other parties, or buy or receive data, or in general both provide and receive data. Agents may represent any party with individual goals, autonomy of control, and a persistent identity. Examples in business-to-consumer e-commerce include business such as newspapers, book stores and travel companies, that wish to receive data about the profiles and buying habits of users so that they can personalize the information, products and services that are sold to users. We assume that agents are autonomous from the system of Secure Data Interchange, and follow actions consistent with their preferences, abilities and resources. Similarly, an on-line consumer is an agent that wishes to provide data about its preferences and buying habits to vendors and other consumers, in return for well targeted products and financial reward.

Agent Computers Agents are represented in the system of secure data interchange with dedicated computational resources, agent computers, with permanent memory, processing power, and network connectivity. For example, an agent computer might be a consumer's home PC that will act as a client machine in interactions with the central SDI data server and the servers of on-line vendors. For a vendor, an agent computer might be the server computer that it uses to execute its on-line business. Agent computers might also be thin clients, such as mobile computing devices, handheld devices, cell phones. We push different amounts of data and functionality within SDI to agent computers and away from web centric devices depending on the nature of the computer and an agent's preferences.

Certificates: Certificates are used within SDI to establish trust between different agents, and to help agents to reach useful agreements.

Profile: Each agent can have one or more profiles, which the agent can assume in its interactions with other agents. Part of a profile is a user's identity, that provides a (possibly limited) method for another agent to identify the agent in the future when it assumes the same profile. We allow three types of agent identities: anonymous, pseudonymous, persistent pseudonymous, and true identity. An agent may assume a profile and an identity in any interaction with another agent.

Anonymous. To assume an anonymous identity agent A creates a one-time identifier that it uses in interactions with one other agent. The identifier may allow the other agent to respond zero or one times.

Pseudonymous. A pseudonymous identifier created by agent A may be used with more than one other agent, and allows agents to respond to agent A as many times as they like, but agent A can terminate the pseudonym at any time and separate from the identity. Agent A can optionally restrict the number of agents that may reply to the pseudonym, for example to the agents that it explicitly provides with the identifier.

Persistent pseudonymous. A persistent pseudonymous identifier is created by agent A for use with agents in set S, and provides the added condition that agent A promises to use the same pseudonym for all interactions with all agents in set S for all time into the future. Agent A can optionally restrict the number of agents that may reply to the pseudonym, for example to the agents that it explicitly provides with the identifier.

True identity. If agent A interacts with another agent under its true identity then it has no method to prevent the agent or any other agent responding to agent A in the future.

The identity that an agent assumes with a profile matters not only to the ability of an agent to control the agents that can send it messages, but also its ability to control the amount of information that can be exchanged about the agent in the open marketplace, out of the agent's control. A basic premise in the system of Secure Data Interchange is to keep control of data. We provide methods that allow an agent to release data, or performing processing on data, to one agent but prevent that agent from selling the data on to another agent with which agent A also interacts. For example, one key technique is for agent A to use a unique pseudonym with every agent that it interacts. This allows an agent (so long as it is careful not to release other identifying information) to release profile information to other agents without losing the value of that information, because there can be no secondary market in the agent's profile. If agent A provides information to agent B, then agent B cannot pass that information onto another agent C and have it still linked to agent A because agent C does not know the identity of agent A among the agents that it interacts with.

An agent's profile contains any and all data that an agent might wish to exchange with another agent when it assumes a particular identity. However, just because the data is in the profile it does not mean that it is available to another agent. Possible information in the profile of an on-line consumer includes: transactions that it has performed with other agents; information that relates to its true identity (e.g. salary range or education level); information provided by the agent (such as its preferences for a particular type of product, etc.); and other information that has been compiled based on observing the behavior of the agent (e.g. physical location for a mobile user, such as a user in a vehicle, or trace of recent web pages visited for a user that is browsing the Internet.)

SDI-Proxy: An SDI-proxy refers to the software that runs on top of an agent's computer device, and configures that device for Secure Data Interchange. The proxy intermediates interactions between pairs of agents, and also intermediates transactions between agents and the SDI data server. For example, an on-line consumer might define a profile-management policy at the client-side SDI proxy that automatically configures the agent's profile and identity when as the agent interacts with other agents. The profile-management policy implements an appropriate policy to select the user's profile and identity on the basis of the information that is available about the other agent (for example from certificates).

1.2 System Architecture

The basic architecture for SDI is a system of agent computers, connected via a network (Internet, wireless, or otherwise) to other agent computers, and with a central SDI shared data warehouse. In FIG. 1 we illustrate the top-level architecture of Secure Data Interchange, the networked system of agent computers and a centralized server computer that acts as a repository for data, rules and code. This is called the SDI data warehouse. Each user is associated with an agent computer, and in general users can be individuals, groups of individuals, or companies. In its most general form, the system of Secure Data Interchange is for a system of multiple autonomous agent computers, involved in multilateral communication. We restrict the system description to bilateral communication between agents, without loss of generality because any multilateral (multicast or broadcast) can be implemented as a set of bilateral communications. In any bilateral communication there are two parties, the sender and the receiver (and the parties can dynamically change over a communication session).

SDI proxy agents and profile management policies on agent computers mediate bilateral agent interactions. Agents define profile-management policies that are implemented on agent computers and determine appropriate profiles and identities for an agent in interactions. Every time an agent initiates a new interaction, new information is available about the agent, that can be compiled by the agent's own computer device, and also by the computer device of the agent with which it interacts. Careful profile and identity management provides an agent with absolute control over the ability of other agents to profile the agent and exchange information about the agent, for example the agent can use a unique pseudonymous identifier with every other agent. However, the core of the SDI invention is that we encourage agents to exchange information, by providing a secure central data interchange for that purpose. Agents can submit profile information, and other data, to the central data warehouse and make it available for particular types of data mining by other agents, and receive financial reward for providing data. Products and services can also be targeted for agent A on that agent's computer, without the provider agent receiving information about agent A's profile. For example, vendor B might provide generic information about its products to agent A, and a personalization rule that it has constructed from data mining the central SDI data warehouse. The agent computer of agent A can then use its local and private profile information to decide what products to target to the agent, based on the instructions that it receives from agent B.

The arrows indicate possible flows of information between the different elements within the system. We allow agents to communicate directly, via bilateral or multilateral communication, and also indirectly via the central data warehouse. Information can be submitted to the central data warehouse, for example new data and new rules, or queries that the data warehouse will execute. The data warehouse returns information to agents, for example the results of a query. The Secure Data Interchange invention is independent of the implementation details of the communication platform. We assume that the system of SDI is built on top of a secure communications platform, for example via a SSL-encrypted TCP/IP session in an application to the Internet. Furthermore, we draw on cryptographic techniques known in the art for identity management, and additional techniques to support pseudonymous identities within a particular network protocol, e.g. the stripping of sender URL addresses from HTTP packets on the Internet.

In overview, the top-level claim in the system of Secure Data Interchange, of a privacy-protected market-based system for data exchange between self-interested parties, is constructed from the following core components:

- A Central Data Warehouse, with associated price-rules and constraints submitted by the owners of data. Architectural variations allow virtual links to data in the central data warehouse, with data physically located in distributed locations.
- A Query-execution and Price module, which executes queries on the data within constraints on the types of queries that can be performed, and computes the price of queries, collecting payment.

and the following optional components:

- Distributed data management, via client-side SDI "proxy" agents, that intermediate the interactions between agents, and manage data provided to the central SDI data warehouse. Distributed data management includes methods to manage an agent's identity in interactions with other agents, for example via pseudonymous and anonymous interactions.
- Distributed query-execution, via client-side SDI query-execution modules, that allow data that is physically stored in distributed locations to be queried on distributed nodes, without an explicit release of the data.
- Data perturbation methods to augment data values with randomized noise, to allow queries to tradeoff price and quality, and to allow a user to protect his/her identity by hiding revealing details of submitted data elements.

In describing key applications of the system of Secure Data Interchange, we describe in later sections additional features that extend the functionality of the invention:

Community dollars: an extended payment scheme that allows extended forms of payment within the system, for example allowing payment to be made in terms of discounts in purchases from particular vendors, or in return for agreements to purchase a certain number of products over an extended period of time.

Within an Internet-browser based system, methods to control a user's browsing experience via a personalized portal, where personalization is performed via data mining techniques executed by the system of SDI on data in the central data warehouse.

Methods to support anonymous and pseudonymous electronic commerce, e.g. delivery and payment services.

In the next section we provide an overview of each of the central SDI data warehouse, which forms the core component of Secure Data Interchange. We then add technical details for specific components, to make our ideas more concrete.

1.3 Implementation Details

In this we describe some of the core technologies known in the art that would be used to build up an implementation of the SDI system. The technologies span areas in cryptography, for pseudonym management, digital certificates, payment mechanisms, etc.; and information theoretic-methods, for example to protect the identity of the originator of a message by routing messages through local "crowds" of agents.

1.3.1 Certificate Management

Cryptographic techniques well-know in the art [Chaum 81; Chaum 85; Chaum 91] provide the ability for a certificate to be linked to an agent's identity, and not transferred to other agents. This is the basic functionality required of a certificate management system. For example, a certifying agency can sign the public key of an agent with the private key of the certifying agency, to indicate that the agent satisfies requirements for certification. Another agent can verify the certificate with the public key of the agent and the public key of the certifying agency. The certificate cannot be transferred to another agent unless that agent assumes the same public key. We assume a public key infrastructure to manage this process.

1.3.2 Support for Anonymous and Pseudonymous Identities

We have already noted that it is important to provide whatever additional support is required because of the underlying communication infrastructure to protect agents' profile management policies. For example, in the TCP/IP mechanism a message must be stripped of the network address of the originating Internet server, because this can provide information to allow pseudonyms to be linked. Similarly, messages can be routed through a common gateway or random "forwarders" as in the "CROWDS" system [GOMM98; RR98] to provide pseudonymity. Furthermore, other e-commerce functions, such as payment and the anonymous mailing of goods must be supported.

The ability to embed data within web pages allows client-side processing of information. By embedding profile and location information directly within a web document we can alleviate the bandwidth and computational bottlenecks that can occur at a centralized profile server if profiles are fetched on-the-fly when web pages are downloaded by clients. The origin server (supported by the vendor) requests periodic profile updates from the central SDI server. This duplication of information enables the profile and the page contents to be provided directly from a vendor's server.

There are some potential drawbacks of this approach: (1) the profile information associated with a web page and target objects can be out-of-date; (2) the profile information is available to all clients and proxy servers, not just those that are SDI-enabled; (3) the profile information can be altered. We suggest technical solutions to each of these problems below.

In one variation of SDI the profile of a user is maintained on the user's client, and partitioned into separate profiles for each pseudonym that a user chooses to maintain. Personalization of products and services (product types, prices, etc.) is performed at the client, through the execution of trusted code that is embedded as a Java applet or as JavaScript within the web document of a vendor. In this way a vendor never receives access to the profile of a user, but is nevertheless able to personalize its response to users, even when a user first visits a site (on the basis of the profile for a user from his/her previous online transactions). Profiles for the target objects of a vendor that enable appropriate objects (representing particular products, or news stories for example) to be presented to a user are embedded as XML data within the vendor's web document.

In another variation of SDI personalization is not performed at the client, but either at the ISP-level SDI proxy server or the vendor's server. The location and other profile information that relates to a user are pushed to the ISP-level proxy or vendor server when a user requests a web page. In the same way as XML allows profile information about web sites and vendor products to be associated with a web document, and profile information to be provided from the central SDI server to a vendor, XML can be used to encode a user's profile. The system of SDI allows for profile and location information to be randomized slightly (and even anonymized) to protect the identity of a user, for example when an ISP-level proxy is not trusted.

1.3.3 Maintaining the Integrity and Security of Messages

The privacy of information in transit between servers and clients can be assured through standard end-to-end cryptographic solutions that establish a secure session prior to any data exchange, such as Secure Sockets Layer (SSL) that uses X.509 certificates and is supported by current browser technology.

In order to prevent the possibility of individual users being bribed by vendors to disclose target object profile data which reflects this type of information, users should not be provided access to directly decrypt the metatags for these portions of the target objects profile data, but rather this decryption and release of profile data should be performed securely in conjunction with the functions of the profile processing (profile matching module) upon the client level proxy server rather this decryption and release of profile.

In addition, we prevent unauthorized access of embedded profile information through the encryption of the metadata that is represented within the XML structure of a web page.

Profile information can be encrypted using a hierarchy of keys, so that different levels of access to the information may be provided according to the access levels of users and vendors. All users that request web pages from SDI-enabled vendors, whether or not the user is a member of SDI receive the same profile information. We provide encrypted profiles to vendors in the 'Profile Update' messages from SDI to vendor servers, so that: (a) unauthorized agents cannot tamper with the profiles; (b) the profiles cannot be read by unauthorized agents.

The SDI system supplies a private key to trusted SDI client software, that enables only SDI-enabled clients to access profile information, and only access that information to the extent permitted by privacy policies of users and vendors. Different levels of encryption enforce multiple levels of access. Periodically the key pairs are changed to prevent extended attempts at cryptographic attacks. The SDI system uploads the key that provides the correct level of access for a user to a user's client, once terms of access and profile management have been agreed. A client can only access embedded information once enabled with a relevant key. Finally, profile information is signed with a digital certificate, to prevent third parties from tampering with profiles for commercial gain.

2. Core Modules

FIG. 2 illustrates the core modules within the system of Secure Data Interchange. In this section we briefly describe each module in relation to the other modules, and provide more details in later sections.

The central SDI data warehouse is the core system in SDI, managing data records on behalf of agents. In combination with the query-execution module, these two modules implement the privacy-protected market for query-execution, where queries are executed:

If the querying agent has the right certificates, as defined by the owner of data (and) If the querying agent pays the cost of performing a query Furthermore, the system of SDI implements an internal market, with queries executed as cheaply as possible, within quality constraints provided by a querying agent. The eBank module in SDI collects payments, and allows those payments to be transferred to external bank accounts, or used in part payment for products and services to SDI-enabled vendors.

We allow the central SDI data warehouse to be replicated and/or partitioned across a network, for example a small single-user SDI data warehouse can be situated at a user's client machine to allow vendors to provide personalized products and services without releasing personal information (e.g. profiles). The rules that personalize products are queries, which can be executed in the SDI proxy on a user's machine.

The central data warehouse acts as a repository for data submitted by agent computers on behalf of users. Consider, for example, data that represents user profiles (i.e. what types of books they like to read, what there political interests are, etc.), or data that represents business rules (i.e. what type of customer a business is seeking, what types of products it offers, what type of strategic agreements it is looking to make with other businesses, etc.)

The data repository contains information submitted by agents to the central data warehouse. It is not necessary that a single agent links all information submitted by one agent, because agents can submit information anonymously or pseudonymously. Although agents submit data to the central shared warehouse they maintain key aspects of ownership of that data, but without minute-by-minute management of the data. In particular, providers of information provide the central SDI warehouse with a certain amount of autonomy to control how the information is used: the types of uses that are permitted, the type that are not prohibited, and what types of rewards (financial or otherwise) are required for access to the information. The system of SDI, in the access that it allows to information in the database, acts as a trusted agent for information. One role of SDI is to protect the identity of an agent that requests and provides information—allowing agents to remain anonymous when that is desirable. We outline in this description the key technical solutions with which this is achieved.

The data is heterogeneous, best represented within an object-oriented database system. Each data object is associated with an accessor function, which describes the syntax of valid queries on a particular type of data, and executes queries. As data types become standardized, we could suppose a library of standard accessor functions for different data types, perhaps provided by third parties. For example, a special data type could be developed to represent the profiles of online customers. As part of query execution therefore, is the execution of methods associated with heterogeneous types of data. Of course, we can also describe a simple special case where the data types are more transparent to SDI, and data fields are directly indexed as in standard databases.

Agents can submit queries to the SDI data warehouse, these are placed in the pending queries queue if they are one-time and to be executed as quickly as possible, or in the persistent queries queue if they are to be executed periodically, as the data in the repository changes. The query execution module contains the processor that performs instructions on behalf of agents, within the constraints of price rules.

Price rules are associated with data records. Price rules compute a charge for requested information about the data record. We describe a number of simple price languages, to allow an owner of information to configure access to the data. In general the price rules can be quite complex, and implemented within an object-oriented framework, so that the system of SDI is expandable to new data types. The query-execution module can execute both the methods to access data in objects, and the methods to price access to data. In performing query execution, we suggest some techniques to minimize the price paid to perform a query—for example we implement a simple internal marketplace where the data records with the smallest price are selected, with all other things equal.

As a special case, prices can implement the standard capability-based access control systems, such as those in UNIX, where a user must possess the necessary properties to read information. A price $0 corresponds to permission to access information, while a price $infinity prevents a user from reading information. The price rule computes a price for accessing information based on a number of factors: the properties of the requesting agent, as demonstrated with certificates; the information requested; and whether the identity of the owner of the information is revealed to the requesting agent. SDI enforces the price rules, with payment collected from agents before the results of queries are reported. SDI allows an agent to contribute information to the shared database but maintain control over access to the data. Price rules can also specify different prices based on the degree of random perturbation that is performed on data before a query is executed. This can protect the identity of the owner of information but still allow valuable information to be provided in response to a query.

The system of SDI also expands the possible space of agreements through anonymity techniques and through random perturbation of data. Agents can provide information anonymously or pseudonymously, or with their true identities revealed. Furthermore, agents can charge less for information provided anonymously than for information provided under a revealed identity. Meta-information associated with data can also specify whether the information has been certified by a third-party, or whether it has been randomized slightly before placing in the SDI data warehouse.

The data repository is linked to the query-execution module, that performs queries that are queued to be executed in the pending queries queue. We allow queries to be general programs, an extension from the simple queries that are found in SQL-based database languages. The key novelty is that the query-execution module can maintain intermediate results, for example pointers to records selected as part of intermediate queries. In a standard database there is more of a separation between data access and data processing, with data accessed, pulled outside of the database, and then processed. We allow data to be accessed and processed in the database, with results pushed to clients. This is has useful privacy properties, because less information is finally provided in response to a query. It is very useful in the space of secure data interchange because it expands the set of agreements that can be reached between providers of information and requesters of information.

Data manipulation is via record pointers, which are one-time and anonymous pointers to data records. We associate a single query (possibly a complex query, i.e. a query program) with a query session. A record pointer is a temporary identifier for a record that is selected. The pointer allows persistent queries to be performed on the same record during a single query session, but is not valid in other sessions. The same data record might be accessed multiple times during a single session, and with multiple record pointers when the accesses are independent (i.e. when the querying agent does not know that it is requesting information of the same data record). Provisional payments are tallied against each record pointer, and relate to the degree of information provided about that record. For example, consider the problem of finding a set of profiles of a particular type. As the search is performed over data records in the database the query-execution module assesses a provisional payment, as records are accessed. However, the requester of the information only pays the sum payment charged by the records that are actually selected as suitable. The owners of the data records that were not selected in the final result returned to the user receive no payment, because no information about their data was released and the information was only used in intermediate processing steps. This is important, because it makes it unnecessary to formulate queries carefully in order to avoid extra cost because of redundant intermediate steps.

Complex queries, including query-programs, with intermediate results and anonymous record pointers expand the space of data manipulation in a system with providers of information that are more willing to release information if that information is never made directly available to another agent except in aggregated system-wide terms. An agent might be willing to allow submitted data to be used for data mining applications so long as the data remains in the trusted data repository. The central SDI server can provide standard types of query-programs, stored in the SDI-methods module, for example methods to perform collaborative filtering.

The query-execution module also performs persistent queries that are submitted by agents to be executed when particular conditions in the data repository are true. Persistent queries check for certain information to reside in the data warehouse, and notify a requesting agent whenever these conditions exist, perhaps automatically making an action.

The pricing module is responsible for pricing queries before execution. The basic problem is to aggregate the charge over all data records that provide information to form part of the result of the query, and to estimate the price of a complex query without performing the query. We suggest a simple top-level query language to allow a user to price quality-cost tradeoffs in the query that is finally executed. For example, statistical techniques can be used to compute aggregate statistics without accessing all data records in the database. To give another example, a query can be performed on the basis of accurate information or on the basis of slightly randomized information. The pricing module reports a price to a requesting agent, and then allocates payment to appropriate agents in the e-Bank if and when a query is actually executed for a user.

The e-Bank is a module that maintains a balance of payments received for each data entry in the warehouse, one balance for each of the unique SDI identifiers with which an agent submits information.

There can be multiple accounts for a user in the case that the same person or company submits information under multiple IDs (see below).

The communication module receives messages from agents. Agent messages can be updates about information or access rules in the data warehouse, information received from the owner of data. Messages might also be new queries. The module also sends messages to agents, for example messages that indicate the results of an instruction are available, or to send messages that are generated by instructions from other agents and consistent with the rules associated with an agent's profile. The module also chooses an action to perform based on messages received, i.e. processes incoming messages and either discards them, places them in the appropriate location if they are a query, or updates the data and rules when a message contains new data.

The following sections describe each of the key components in turn.

3. Data Repository

The data repository in the SDI data warehouse is a general-purpose database that stores information submitted by agents. Multiple agents submit information, each of which retains control over access to their data. Access to information is controlled via the price rules that an agent specifies when providing information. The SDI query execution module enforces price rules, collecting revenue from requesting agents before providing results. The system of SDI allows users to receive economic benefits from information, and realize synergies—in a controlled environment. SDI implements an internal market for information, such that data records with the best price are used in queries, given a number of records that satisfy other requirements.

For example: SDI can be used to store the profiles on online customers, to allow vendors to better personalize services and identify market opportunities and to allow customers to receive value for their profiles; SDI can be used to store job offers and job applications, where job offers can contain salaries that are only revealed to applicants with suitable qualifications.

SDI is designed to allow users to submit many different types of information, from many different sources, and for many different purposes. The application is particularly useful when it becomes a de facto data repository for lots of different types of information, information that can in fact be analyzed for the purpose of extracting patterns and other useful data (e.g. with collaborative filtering techniques). However, we provide three key variations in the following description, which are not necessarily exclusive.

1. A single unified database, with information residing on a central server (or a number of central servers). We describe two possible implementations for such a heterogeneous database, one XML-based and another object-oriented model.
2. Multiple databases, partitioned into "data types". For example, one SDI database might contain profiles on online customers, while another database might contain information about job offers and job applications. This type of database can be implemented using a standard "indexed-field" representation. Again, the information resides on a central server (or a number of central servers).

3. Distributed data, with some data residing on a central server, and some data physically located on distributed servers (e.g. on the servers of vendors that subscribe to SDI), but with virtual "hyper links" from the central server to give one unified view of the data.

The key over-riding problem is one of data representation, the way in which information is encoded. We describe a general infrastructure for information exchange, and do not mean to limit the description to any one type of data. Furthermore, the system of SDI should be expandable, so that new data types can be introduced. In this specification the type of information in the Secure Data Interchange shared data warehouse is not constrained in any way, but may include for example user profiles (e.g. preferences, recent purchases, etc.) or business services (e.g. costs for services, service capabilities, etc.).

One approach is to use a single native SDI ontology, which is expanded as necessary. It would be the responsibility of providers of information in alternative forms to provide "translation services" to convert local data formats into the SDI native data format. A typical technology to support a shared ontological representation is XML (Extended Meta Language), which allows a grammar to be defined for a document, with meaning embedded in tags. The trend towards XML-based applications should facilitate a shared ontology structure, and allow metainformation to be associated with information and describe data. XML allows intelligent integration of data from multiple databases.

Alternatively, we can allow data to be stored in heterogeneous formats across a single unified database, within an object-oriented infrastructure. Each data object has a "wrapper" that controls access, and provides an interface for queries. When a query is executed, the method is invoked, and the result computed with the method and the data. This is perhaps more efficient than the aforementioned approach, in that efficient data formats are query structures are retained.

3.1 Data Structure

In this section we describe the structure of the records in the SDI database. The next section describes the interface that allows user agents to submit data and update information.

The data repository has the following key features: price rules are associated with information, to control access to information on the basis of information requested and properties about the requesting agent; meta-information to specify additional information about data records, for example has the information been certified by a third party.

We describe the abstract structure of data records in the data repository. The semantics of the data field and the price rules depend on the type of information. All data records, whatever the information that they represent, contain the following elements:

1. OwnerID.
    The owner ID is a three-tuple (Public Key, SDI identity code, Remote address). The public key is provided by an agent that submits data, and is one half of a public/private key pair in a public key based cryptographic infrastructure. The public key is used to provide authentication of the agent, in case it wants to amend the record in the future. The agent can submit a message signed with its public key to prove its identity. An agent can use a different public key for each alias that it maintains within SDI. The SDI identity code is a unique code, generated by SDI for each agent alias, and provided to an agent to allow the agent to access the eBank and other ancillary SDI services, for example to collect payments received for access to the data. The remote address is an (optional) contact address for the agent that submits the information, for example an email address to a pseudonymizing module that will forward email to the agent under a number of different aliases.
2. Record ID.
    The record ID is generated by SDI, and is used in the case that a user creates a number of different data records with the same owner ID.
3. Data object.
    As noted above, we allow data in SDI to be of different types, and a general data object might be represented in an internal coding that is not known to SDI. Such an object must provide an accessor function to allow queries to be performed. The query-execution module takes an object and invokes the accessor methods to perform a query. In the most general form, a data object is represented as a three-tuple: (data type, data field, data accessor). The data type specifies what the type of data is, for example is it a user profile or a business rule. The data field specifies the data, and can be a private record that is only accessed by the accessor, which provides an interface to allow queries of the correct format for the data type to be performed.
    In a simple special case, with data types designated by SDI centrally and data indexed with fixed fields, a data object is more appropriately represented as an association list between field names and values, e.g. (Field1, Value1), (Field2, Value2), etc.
4. Price rules.
    The price rules provide the owner of information with control over the type of queries that can be performed on a particular data record. The price rules compute an ask price for a proposed query, on the basis of three pieces of information: what type of information, and what accuracy of information is requested; what certificates can the querying agent present; can the information be provided anonymously or must the identity of the owner of the information be revealed? As special cases, a price $0 corresponds to "access is possible for free", and a price $infinity corresponds to "no access is possible". The unit of currency need not be US dollars, but can be any unit of currency, or as we also suggest in one useful variation "Community Dollars" that are SDI-specific dollars which can only be spent with vendors that are registered with SDI, and can also be restricted in various ways. As a special case, the prices allow a simple capability-based security system, because they can be set to $0 or $infinity on the basis of certificates owned by an agent that requests information. The price-rules are described in more detail in the next section.
5. Meta-information
    The meta-information associated with a data record is expandable, but at present we suggest the following pieces of information: is the data is randomized, and is the information certified? The method of random data perturbation is fully described later in this document. Certification can be provided by third-parties, who can verify for example the age or nationality of an individual represented with an electronic profile. We provide more information on metainformation below.

3.2 Price Rules

The price rules that can be associated with a data element are described in the next main section, the Query Execution Module section. The user associates a rule with data that the system uses to compute the price of a query during query execution. The price is further used within SDI to operate a data marketplace. Again, this is described in the next section. The user will eventually pay the total price for its access to all data elements used to compute the final response to a query; for example negative responses do not incur a price, it is only data that actively makes it into the process of computing the result of a query that matters.

We describe in the Query-execution module section the methods that are used to determine which data elements are used to compute the final response made to an agent, and therefore to compute the sum price for the final query. An agent is not charged for every access to data elements made during intermediate stages of executing a query. For example, if a query requests information about ten data records with high value associated with a particular field, the price of the query is the cumulative price for the access to the ten data records returned in response to the query, and not for all the data records queried in determining the ten records to return.

In general, a query of a data record can be part of a larger query session, as discussed in the section on query execution. Within a larger query session, the same data record might be queried a number of times, for example with a large compound query split into a number of steps with continual execution contingent on continued correct responses. E.g. Select records of type A, then from those records select records of type B, then from those records select records of type C . . . . In this case, because price rules might be non-linear in the amount of information provided, it is important to provide a price-rule method with information to allow it to track a sequential query.

As discussed in more detail in the next section, the system of SDI handles this by generating temporary and anonymous pointers to data records, that are valid only for a single session, and allow a price-rule to track sequential queries. The data record pointer allows the history of queries to be recovered, and a new price to be computed on the basis of total information provided. Similarly, this is important when a query might collect a lot of information about a data record and then request the identity of the agent that provided the information to SDI. The cost of revealing an agent's identity (and therefore allowing a secondary market in its information) might well increase with the amount of information that has already been released.

Similarly, in some cases the same data record might be accessed on multiple occasions, but independently, such that the environment performing queries does not know that the data record is the same record from before. E.g., select records of type A and extract information with rule B, then select records of type C and extract information with rule D. A single record can be of type A and of type C, and therefore be selected for information extraction in both cases. In this case, each independent sequential query (i.e. A, B and C, D) has a set of data record pointers, so that the cost of extracting information is computed independently for any record that has type A and type C.

Here is a simple example of a non-linear pricing function, that accounts for cumulative information that has been provided to a requesting agent. Suppose that any sequential query receives a temporary and anonymous pointer to a data record, that is only useful in the current query session. The data record pointer allows the price rule to implement a non-linear pricing rule. For example, consider the query 'what is the value of field A, B and C', split into queries 'what is the value of field A', then 'what is the value of field B', then 'what is the value of field C'? The pricing rule might state:

$0.1 for any one of A, B or C
$0.2 for any pair of A, B and C
$10 for all of A, B and C.

In this case, by tracking the data record pointer with which a data record is accessed, the price of the first two requests can incur an incremental charge of $0.1, while the price of a third request can incur an incremental charge of $9.80.

At a per data-record level the price of a query depends on the response made to the query. This is important because an affirmative answer to the question 'are you the president of the united states' carries more information than a negative answer. This has a slightly undesirable side-effect, in that when estimating the price of a query in the pricing module, the estimated price of a query might leak information about the result, even without performing the query. However, we believe that the benefits of linking price to information content in a query outweigh this potential loss in value of information. Note in particular, that in general the ask prices associated with data records are private information and independently set, and therefore are not very revealing, especially within a competitive market place.

3.3 Data Submission/Update Methods

In this section we describe the basic methods to register with SDI, submit data, update data records, and access payments collected by SDI as information is queried. We use "agent" to refer to the computer system that interacts with the central SDI data warehouse, submitting data and requesting payment from the eBank. Agents may represent individuals, vendors, or other self-interested parties.

Data records can be submitted under multiple aliases by a single agent, to provide an additional level of control and flexibility in managing data submitted to SDI. For example, if an agent represents an individual that is an online consumer, interacting with different types of vendors, then perhaps the agent will use two aliases: one for while the consumer is at work, and one for while the consumer is at home. Alternatively, the agent can maintain a number of identities for different activities, or interests of the user. In the preferred implementation agents, for example web-browser based client agents, can manage an agent's selection of identities as it submits data to the central SDI warehouse local to the user. The ability to submit information under multiple identities protects the ability of an individual to prevent another agent building a complete picture about its preferences and profile, while still allowing that individual to leverage as much of the value associated with its information as possible. The SDI proxy agent, situated on user's client machines, implements this functionality. It is described later in this patent.

A standard cryptographic public key/private key infrastructure provides a useful technique to implement a system in which agents can maintain different aliases. As proposed in the work of D. Chaum [Chaum 81; Chaum 85; Chaum91] a public key (PK) and private key (SK) serves a number of purposes. First, the public key acts as an identifier for the alias, a name. Second, the agent can compute a new private key/public key pair when it requires a new alias. The agent keeps the private key secure, and this provides a method to allow the agent to validate its identity, for example by cryptographically signing a message with the private key. The signature can be verified with the public key, and the keys can be selected with enough bits to make falsification a computational impossibility. This infrastructure is outside of the current patent, but standard in the art.

As described in the JANUS/LPWA system [BGGMM 97; BGGMM 98; GGMM 98], it is also possible to associate a public/private key pair with a pseudonymous e-mail address, to allow information to be pushed to an agent that owns information under its alias. The system is implemented via pseudonymous proxies which a user agent to poll and check for new messages.

An alias can also be completely anonymous, but in this case the value of the data provided may be less in the internal market place implemented within SDI (in the query execution module). The convention for an anonymous alias is that the user agent continues to provide a public key, and use a private key for validation of its identity. However, in this case the public/private key is one-off and just for this data record, and no return address is provided. An agent that submits information anonymously can still recover payments from the eBank.

When a data record is first created SDI returns a data ID, so that the agent that submits information can specify a particular data records in future, in case it creates a number of data entries in the central SDI data warehouse. Submitting a new data record to the SDI data warehouse is accomplished with the following semantics:

(SDI identity code, SDI record ID)=SUBMIT(alias, data object, price rule, metainformation).

The following protocol is followed in the SDI data warehouse in response to a SUBMIT message:

1. SDI first checks the alias against its record of existing aliases. If the alias exists, then SDI first verifies that the alias is not anonymous (in which case it should only have one record), and then challenges the agent to sign a random message with its private key—to validate its identity. Once validated, the SDI identity code is returned to the agent. Otherwise, if the alias is not found, then a new SDI identity code is created.

2. SDI then creates a new data record, with the data object, price rule, and metainformation provided by the agent, and then computes a new record ID, which is also returned to the agent as proof that the record has been created. This record ID is used to change the data in the future.

The owner of a data record can change the record with the following rules:

Ok=CHANGE(alias, record ID, data change)

Ok=CHANGE(alias, record ID, price change)

Ok=CHANGE(alias, record ID, metainformation change)

As with the SUBMIT command, first the SDI data warehouse checks that the alias exists, and challenges the agent that submits the CHANGE request to sign a random message with its private key, to validate its identity. Then the record ID is located, and again it is verified that the record is owned by the agent with the alias. Finally, changes are made to either the data record, the price rules, or the metainformation. If everything checks out, then SDI returns TRUE, otherwise SDI returns FALSE.

Finally, an owner of data can remove a data record with the following command:

Ok=REMOVE(alias, record ID)

The checks on the identity of the agent that requests that a data record be deleted are made as for the CHANGE command.

3.4 Meta-Information

An agent can associate meta-information with a data record, that can serve a number of different purposes. Data records can be tagged with meta-information, that can include but is not limited to, Has this information been randomized? Certificates relating to the data record. For example, the meta-information might be a certificate from a third party about the integrity of information, or a certificate from an agent's client-side SDI proxy agent that the information in the record is unique, and not submitted under any other aliases by that agent.

A key example of the role of a certificate is described later in the patent, where we explain how the client-side SDI proxy can provide a certificate to state that this is the only data record with information X. This is useful, because it allows an agent that submits information to maintain multiple records, but still provide a guarantee to querying agents that certain valuable information is not duplicated across multiple records.

The meta-information may be associated with particular fields in the data associated with a data element, for example specifying that a particular piece of information has been randomized, or that a particular piece of information is highly sensitive and should be randomized before release.

4. Query Execution Module

The query execution module is a key component of the SDI system. Its key functionality is:

a. Implement an internal market for information as queries are executed, ensuring that information that is provided for a lower ask price is used in preference to information at a higher ask price.

b. Compute the price of queries based on information finally provided in response to a query, by keeping track of the data records that are used to compute a result.

c. Interface with the pricing module to allow the price of a query to be computed without executing the complete query.

d. Interface with the data repository, performing queries either on fields with fixed index labels (i.e. within a traditional database framework), or with respect to an object-oriented framework with queries performed by invoking methods that are associated with data.

e. Monitor conditions for the persistent queries, and provide a response to a query if conditions are satisfied.

A central part of the invention of SDI is the method to compute the price of a query as it is executed. We described the semantics of price rules, which price access to data. They are defined by the owner of information. The SDI query execution module implements an internal market for queries, and ensures that queries are executed at minimal cost to agents. The SDI query execution module is also responsible for collecting revenue on behalf of owners of information.

We describe this methodology in this section, describing how the total price of a query is computed, as a sum of the price charged by the owners of data records that provide information which contributes to the final response.

The query execution module follows a protocol to execute queries:

1. Request_For_Price(Query, Agent_Certificates)

2. Estimate Price with call to the Pricing Module

3. Price_Quote(Quote_ID)

4. Request_Query(Quote_ID)

5. Get_Payment( )

6. Execute the Query

7. Report_Answer( )

In step (1) an agent makes a request for a query to be priced, stating the query, and providing certificates to allow the query to be priced. In step (2) the query execution module makes a call to the pricing module, and a price for the query is computed (described in the next section). In step (3) the agent receives a price quote, and can then decide whether or not to execute the query, and also a query ID. In step (4) the query execution module receives a request to perform the query, and then in step (5) requests payment from the agent. When payment is received the query is executed (6), and appropriate payment is credited to agents that provide information, scaled to make the budget balance as necessary (in the case of an over or under price quote). Finally, the response to the query is provided (7).

4.1 Price Rule Semantics

Each data record has an associated price rule that controls the price of accessing information. A data record can contain a number of different pieces of information, and data can be provided to different degrees of accuracy, so the price rule can be quite complex in general. In particular, consider a data record that represents the profile of an individual. The individual might be happy to have information released about some fields, for example its ZIP code, or its recent book purchases, but less happy to have information released about different fields, for example its salary or social security number. Clearly, different pieces of information within a single data record require different prices.

Furthermore, a price rule for the data record as a whole might need to be superadditive across data elements, such that it becomes very expensive to request too much information about data associated with the same user. One of the driving concerns behind the present invention is that at present it is possible for on-line vendors to collect information about a single individual via "cookies" (identifying codes which are left on a user's client machine), and form a portfolio of information about various activities and preferences of that individual.

While information about an individual might be acceptable in small amounts, in large amounts the same information can soon become unacceptable. Furthermore, even if users release information anonymously in response to a query, if a lot of information is released the identity of the user can be compromised. Every additional piece of independent information that I state about my profile identifies myself a little more clearly, and acts to distinguish me from the profiles of other individuals. We discuss this further in a later section on random data perturbation, which describes how random noise can be added to data to counteract this effect.

The basic idea is that the system of SDI allows a user to associate a price rule with every data record, that computes the price that a user must pay to execute a query over that data. We allow the price to vary, depending on properties about the requesting agent, the amount of information requested, and the level of identification that is required of the owner of the information in responding to the query.

The abstract form of a price rule for a data record is a function:

Information-request×Certificates×Level-of-identification)→Price

Given a request for information, a set of certificates that a requesting agent can present, and the level-of-identification that is required of the agent that provides information (i.e. anonymous, or revealed identity), then a price rule computes an ask price. This is the price that an agent must pay to execute the query on the data record.

However, as we describe in the next section, an agent only actually pays this price if the information provided is used to compute information in the final response provided to a query. For example, consider query "Select all data records close to record X". The query is most simply executed by computing the distance between each record and record X. Although a negative response from a record that is not close to X provides some information about that record, the information is not used to compute the information (i.e. set of records) that is finally provided in response to the query.

As in the representation of heterogeneous price rules in SDI, the invention of SDI allows heterogeneous methods to compute prices for queries. In the most general case, we allow a price rule to be computed as a price method, which is invoked for a data record before a query is to be performed. The query-execution and pricing modules simply invoke the price method, and the data object provided by an agent returns a price for the query. In this most general version, the role of SDI is limited to providing the price method with the query, the certificates of the requesting agent, and the level-of-identification that is required.

In a simpler variation the system of SDI can provide a number of default price rule languages, which allow a user to specify in simple but quite flexible terms a price schedule for queries. We describe two such rule languages: an uncertainty-based additive price rule; and a grouped additive price rule which is a simplified version of the general uncertainty-based rule.

The uncertainty-based additive price rule allows a user to adjust the price for a query based on information about the requesting agent, the amount of information requested, and whether the information is required anonymously or with a revealed identity. It does not allow a non-linear coupling across the price of information about multiple attributes, but instead includes a simple upper-bound on the amount of information that can be requested. Such a non-linear coupling could be added with simple interaction terms between the prices on elements, for example if "information about more than half of the elements in this set is released, then add price term L".

4.1.1 An Uncertainty-Based Additive Price Rule

The uncertainty-based additive price rule allows a querying agent to present a certificate to prove that it is entitled to query a user's data for free, or prove that it is entitled to receive data at a price. If a querying agent can present no certificate from either set, then it is not allowed to query the data.

Then, a user can define two different price rules, one for data revealed anonymously, and one for data revealed with an identity. A price rule computes a price-term for each data element that is queried, with the total price for a query computed as the additive sum of all single element terms. The price for a query on an individual element is a linear function of the uncertainty with which the information is provided. For example, if a query requests the exact value of an element there is zero uncertainty, if a query requests a range of values for the element, or a 'value+random perturbation' there is some residual uncertainty, and we allow a user to associate a cheaper price with this result. The uncertainty is normalized with respect to the population of data elements in the SDI data warehouse, e.g. an uncertainty of 10% indicates that the reported information is consistent with 10% of data elements in the database.

The price-rule is parameterized with the following information for each data element (or set of data elements, if a user chooses to associate data elements with a type):

A set of certificates that allow a query to be performed for free.

The price of an accurate response

A function to compute a discount from the accurate price, based on the uncertainty of the response.

There are many possible discount functions, that include but are not limited to the following:

- A linear price discount functions, such that 100% uncertainty corresponds to a discount equal to the accurate price. In this case, the user must only provide the price for an accurate response.
- A step price discount function, where the level of discount is associated with a set of discrete uncertainty ranges, e.g. <10% no discount, 10-30% receives a 20% discount, and 30-100% receives a 70% discount.
- A quadratic price discount function, where the level of discount is associated with a quadratic polynomial function of the uncertainty, in this case a user needs to specify a number of intermediate discount points and SDI can compute a best-fit quadratic function.

Stage 1: Present a Certificate (Price-discrimination)

First, the querying agent can present a certificate to allow it to query information for free, or to allow it to query the data for a payment. If the agent can present no such certificate, then it is not allowed to access the data.

Assume that the requesting agents falls into one of three classes: it presents certificates to make its access free, it presents certificates to make access possible at a price, it presents certificates to make access impossible (infinite price). Let Free denote the set of certificates that allow a query to be performed for free, and Charge denote the set of certificates that allow a query to be performed for some charge. The failure to present certificates in either class indicates that an agent is not permitted to query the information. We do not suppose that the presence of a certificate can indicate a negative property, because there is no method to force a querying agent to provide a certificate. We also assume that agents must present the same certificates to access all data elements. It is trivial to relax this assumption.

Stage 2: Specify the type of information required.

Second, the querying agent specifies whether it is required that the information be provided along with the identity of the owner of the information. Assume that the agent's identity is either revealed (with a real or pseudonymous identity), or anonymous. The price required for particular types of information will vary with the level of identification.

Stage 3: Select the appropriate price rule; Compute sub-prices.

The "cross-product" of the certificate (i.e. free, price, or none) and the level-of-identification (i.e. anonymous, revealed) triggers a price rule. We allow the owner of the information to associate a price rule for each combination of certificate and identification, and with each data element. Many simplifications, for example "no access with no certificate" and labeling data elements in a class, and providing a price rule for a class of data elements are possible.

Without loss of generality, we can describe the price rule for a particular data element, and a particular cross-product of certification and identification. The price-rule contains a base-price, which is the price for accurate information about the data element, and a discount-factor, which reduces that base price by an amount related to the level of uncertainty in the response.

A query might permit a response that includes a level of uncertainty, for example:

Is the value of the data field greater than a threshold value?
What is the range of values in which the value lies?

Compute an additive noise perturbation, and respond with a "value plus noise perturbation".

The randomized perturbation technique, which allows the agent to return randomized information about its true value, is disclosed later in this patent. For simplicity, we can assume that any non-exact query can be associated with an uncertainty-value, which is computed based on the proportion of the population of data elements that can have values within the accuracy of the response. The system of SDI can compute this uncertainty-value, perhaps approximately based on static statistics computed on a periodic basis over information in the database.

For example, SDI might assume that values are uniformly distributed between the lower and upper values over the population of data elements, and compute uncertainty as the fraction of values within the range indicated in an agent's response. Suppose that all data records have values between 0 and 100, then a query 'is x>70' has residual uncertainty 30/100 (normalized) if it receives a positive response or 70/100 if it receives a negative response, while a query 'what is your value of x' has zero uncertainty for all responses.

Assume that the uncertainty value is between 0 and 100%. The discount factor, discount(X), is computed as a function of the uncertainty X, with a larger uncertainty leading to a larger discount.

$$\text{Price}(Q)=\text{Base-Price}(Q)-\text{discount}(\text{Uncertainty}(Q))$$

where Q defines the query that is to be executed on the data element, for example "what is the value of the data element", or "does the value of the data element lie within this range of values". The value Uncertainty(Q) is a measure of the residual uncertainty in the agent's value for the field after making a response. A simple discount function is a linear function, for example $$\text{discount}(Q)=Q*\text{Base-Price}$$

such that an uncertainty of 0% receives no discount, while an uncertainty of 50% receives a 50% discount. A simple extension might add a multiplier, value between 0 and 1, to the discount term—so that the discounted price is always greater than zero. As discussed above, other more general functions are possible, e.g. non-linear and step functions.

Stage 4. Compute total price.

Finally, the total price of a composite query, query=Q_1, Q_2, . . . , Q_N, is computed in this additive price-rule as the sum of the component prices, where it is possible that different certificates are required for each element that is queried, as described by the price-rules for each individual data element. Note, however, that if any one of the queried elements can not be priced because the querying agent cannot present a certificate in the set Free or Charge for that element, the price of the complete query is "infinite", and cannot be performed. An agent that breaks a query into a sequence of sub-queries could perform all queries that do not relate to that data element, but then the first query that relates to that data element is blocked.

4.1.2 Grouped Additive Price Rule

The grouped additive price rule allows a number of simplifications to the basic additive uncertainty-based price rule described above. It is designed to allow a user to define less information in order to specify a price rule for all of its data in the SDI data warehouse. The basic idea is to group data, so that data elements of the same type can share the same price rules. We propose data sensitivity types, where each data element of the same type has the same price function.

Furthermore, this can be used on combination with very simple price functions, that compute one of four prices:

Zero price, if an agent presents a Free certificate.

Low price, if an agent presents a Charge certificate, and requests information with a High degree of uncertainty.

High price, if an agent presents a Charge certificate, and requests information with a Low degree of uncertainty.

Infinite" price, if an agent cannot present a Charge certificate.

Different price functions can be defined for anonymous and revealed-identity. The price rule has the following components:

a) A set of certificates that allow data access for free.
b) A set of certificates that allow data access for some charge.
c) A list of price-functions, each defined with two prices for revealed-identity and two prices for anonymous identity. The pairs of prices are for accurate information, and approximate information (with a minimal level of approximation).
d) A mapping of data elements to price-functions.

Again, the price of a full query is computed as the sum price over all information requests to all data elements.

4.1.3 Superadditive Price Rules

We can allow a non-linear interaction between the price of queries on individual data elements with the introduction of additive interaction prices, which are fired when a threshold is exceeded for the total amount of information released over all data elements accessed in the same query. This is a simple approximation to a more general combinatorial price rule, which would price all combinations of data access terms explicitly. For example, a rule could state: "If more than T data elements are accessed in set Sensitive then add a "bundle price" L to the total sum price of the query."; or: "If the total weighted access to data elements in set Sensitive exceeds threshold $T\_1$, then add bundle price $L\_1$ to the total price of the query"; where the weighted-access is computed with weights equal to the degree of uncertainty associated with queries on elements.

4.2 Computing the Price of a Query

A query can be quite complex, involving a number of operations on data stored in the data repository. Call a query session a sequence of operations performed in response to a query, and before the answer is returned to the agent that submits the query.

A general query specifies a program that operates over data stored in the data warehouse. All queries are of the form:

A=SELECT records with property X1;
PROCESS records in A with method Y1;
B=SELECT records in A with property X2;
PROCESS records in B with method Y2;
C=SELECT records with property X3;
. . .

i.e., a general query is a sequence of select and process commands, where process commands are specified over temporary record pointers that are returned by SELECT commands. A temporary record pointer is valid only in a particular query session.

Properties define Boolean conditions that are computed as the result of requesting information from a data record. For example, 'is your distance to record X<0.1', or 'have you purchased a flight in the past month', etc. Methods define computational steps that are performed with record pointers. For example, 'if your salary >$40,000 then compute the similarity between your profile and the profile of record Y', etc. . . . Both methods and properties may be executed by calls to accessor methods that are associated with data in the case of a database with heterogeneous data and an object-oriented methodology to access information.

One possible syntax for a language to structure such a query could be loosely based around C++ or Java, with commands to be invoked as methods of data objects specified with object oriented notation. The language could be quite general purpose, but made consistent with the SDI database with a clear separation between the data in the repository, and the state of the query program.

Access to data is tightly regulated, via data record pointers. Data record pointers are analogous to variable pointers in C++, and allow a query program to manipulate data and perform general operations on data records. Data record pointers in SDI provide a key role, because they ensure that access to information is controlled, according to price rules that are associated with data. We maintain a single copy of data on a secure server, and pass dynamic and temporary pointers around while data is processed. A clear separation is maintained between the data and the state of the program that executes queries.

Each query session is associated with a table of data record pointers. The table records valid data record pointers, that can be referenced in later query operations, and the current price of queries performed with the data record:

| Data Record Pointer | Current price |
|---|---|
| P__1 | $0.10 |
| P__2 | $0.20 |
| . . . | . . . |

The SDI query execution module performs another key bookkeeping service, recording a list of data record pointers that have been used to compute a result in the program that executes a query.

For example, suppose that set PS contains a list of data record pointers, and a subsequent query operation makes the following command:

_count=Count(PS,'property X')

which can be interpreted as "count the number of records in set PS with property X". The query-execution module maintains a table of variable accounts, which records the data records that were used to compute a result:

| Variable Name | Associated data record pointers |
|---|---|
| _count | P__1, P__4, P__6 |
| _tmp | P__3, P__8, P__10 |
| . . . | . . . |

Whenever the value of a variable is computed from the values of a number of existing variables, then the list of data record pointers is the union over the data record pointers which were used to compute the values of the other variables.

Eventually, when a result is reported at the end of the execution of a query, the price of the query is the sum of the requested payment for the data record pointers that were used to compute the information provided, as stored in the table of data record pointers.

FIG. 3 illustrates the method diagrammatically. We maintain a "firewall" between data and the state of the query execution, with all access to the values in data records via data record pointers, and invoking price rules associated with data records. On the query-program side we maintain a table of data record pointers, and the cost of the cumulative information received from that data record under that pointer, and a table of variables and the data record pointers which were used to compute the values in the variables.

All manipulation with the values of variables on the "query-side" of the data firewall can be performed with no additional data-access charge, because data access charges are only incurred in computing values of variables, when that directly or indirectly requires that additional information be collected about the data records.

The only charges are incurred when the processor receives information. This information might be in the form of a number, that represents the count of records with a particular property, aggregate information in the form of a new collaborative filter, or raw data extracted from data records.

For example, SELECT operations are free until information in the data record is used to compute the value of something which is used in computing the final response returned in answering a query. A charge is accounted for against the data records which are queried and selected, but that charge is only levied if information is used.

4.1.1 Internal Market within the Query Execution Module

The data side of the firewall is also responsible for performing the cheapest queries possible. For example, if there is a request to retrieve 100 data records with property X, then the database retrieves the data as cheaply as possible based on the access-control rules of the owners of the information in the database.

All operations are implemented within an internal market. The internal market ensures that information is provided according to the price rules associated with data records, and also places providers of data in competition with each other.

The system of SDI implements an internal market, with queries executed as cheaply as possible. Both the SELECT and the PROCESS commands allow an associated restriction on size, e.g. "SELECT 100 records with property X", or "PROCESS 10 of the records with data pointers in list X1 with method Y".

In one greedy variation, each stage of a sequential query is executed as cheaply as possible. For example, for each operation the query is implemented by choosing the cheapest data records that satisfy the criteria. For example, the records that are selected are the 100 cheapest records to query that satisfy property X, and the 10 records in X1 that are cheapest to process with method Y are selected.

This greedy method is not necessarily optimal for a sequence of queries, for example when the records that are cheapest for the current query are more expensive for a later query. Another variation allows a set of records to be maintained, with the cheapest records used in reporting the final result to the user. It might not be optimal to use the cheapest records at every point. For example, if a query is described as "SELECT 100 records with property X", then "PROCESS with method Y", and "RETURN result", it can be cheaper to select more records (e.g. 1000) initially, process all the records, and then return the 100 records that are cheapest after the processing.

The method of storing the data record pointers in a table, along with the price required for information, and keeping a record of the data record pointers that are used to compute values during the execution of a query program provides a technique to compute the total price of a query.

In the previous section we described price rules, which are associated with data records and prescribe on a record-by-record basis the price of executing a query. However, only data records that are used in computing the final result that is returned to an agent at the end of a query receive payment.

4.1.2 Query Optimization

Finally, consider the following two examples:
COUNT the data records with PROPERTY X and COUNT the data records with PROPERTY (not X)

In an optimal pricing model these queries both have the same cost. To focus ideas further, suppose that no data records have property X, such that without additional query optimization the cost of the first query is $0, while the cost of the second query is the sum cost over all data records of reporting that they do have data property X.

To solve this problem we add a simple query optimization routine in the pricing module, which can test different formulations of properties (i.e. negatives), and the effect of reformulation on price. The order of operations for a given expression of properties does not change the price, but the way in which properties are expressed can affect the price.

In another extension, we can use statistical methods to optimize performance. For example, a query 'what % of data records have property X' can be computed using a sample of the total data records, for an accuracy/price tradeoff. This functionality can be offered within the pricing module.

Another key technique for query optimization is to allow the SDI central server to perform pre-computation, for example to classify data records into useful bundles, and allow future queries from agents to limit themselves to bundles of data records that would appear to have useful properties. The cost is then incurred for further information revelation from these records, and avoided for information revelation from records which may not have useful properties.

4.2 Example of Query Execution

As an example, consider the following composite query:

1—SELECT all data records that relate to users that have purchased a flight in the past month, 2—PROCESS: Sort the data records according to salary, 3—SUBSELECT: Limit the records to those users that are willing to have their identities revealed, 4—RETURN RESULT: Return the identities of the remaining users with the top 100 salaries.

In step 1 data records from the SDI data repository are selected which have the required property, in this case corresponding to profiles of individuals who have purchased a flight in the past month. The table of data record pointers is augmented with temporary pointers (valid for this query session) to records with this property, and the price charged by each data record to reveal this information. Notice that the table only includes pointers to data records that have this property. Although data records that respond negatively to the query reveal information to the query-execution module, that information is never revealed to the agent requesting the query, and therefore no payment is received.

In step 2 the data records that relate to profiles of users that have recently purchased a flight are now sorted in terms of their salary field. An algorithm to sort performs a sequence of comparisons between data records, with each comparison requiring that more information is revealed about the underlying salary of the profile, and changing the price associated with the data record. The prices are updated in the data pointer table according to the data record price rules, and the query program now has a list of ordered data record pointers.

Now, in step 3, the query program initializes a new set of data record pointers. This includes all the pointers for users that are willing to have their identities revealed. The pointers are maintained in order of salary. At this stage the entry for this new in the table of variable accounts only associates the data records with this new property.

Finally, in step 4, a new variable is initialized to contain the first 100 data record pointers from step 3. These are the data record pointers listed in the variable accounts table. These are the only data record pointers that receive payment as a result of this query, because the intermediate information provided by other data records remains within the SDI query execution module and is not released to the agent that performs the query.

4.3 Discussion

The pricing model as outlined above has the following attractive property:

The price of a query is independent of the order in which operations are performed, and optimization of order is not necessary for reasons of price.

This is nice, because it means that agents do not have to perform lengthy optimization to structure queries in cost-efficient ways. The pricing module also ensures that:

Agents only pay for information received as the result of executing a query. Finally, we implement an internal market, so that with all other things equal, data mining and other types of queries are executed as cheaply as possible:

An internal market favors data records with low cost pricing instead of records with high cost pricing, with all other things equal.

As an example, consider this query:

COUNT (SELECT 'FIELD1=X' and 'FIELD 2=Y')

This query can be structured as 'Count (Select(X and Y))', or 'Count(Select(X, Select(Y)))', or 'Count(Select(Y, Select (X)))', all with the same cost. Although different amounts of information is requested from all data records in computing the query in the three different formulations, the final cost is computed only over the records that have property X and Y, and these records are the same across formulations and have released the same information.

Similarly, consider the query:

SELECT(Z, Select(Y, Select(X))); return '2'.

i.e., perform some complex nested query but return the fixed value '2'. The query execution module tracks that no data pointers are used to compute the value returned to the agent, and the querying agent is not charged for the information provided about data records to compute the SELECT operations, because that information is retained within the central SDI data server.

In a SELECT query the agent can only ever pay for information provided about data records that respond positively to a SELECT, because no information is ever released to agents about the data records that respond negatively.

In another example, consider a query 'COUNT the data records with PROPERTY X', that returns the result 'none', i.e. there are no data records with this property. This query is priced at $0 because none of the agents that own information provide information to compute the Therefore, a query of the type 'how many data records have type X' that answers 'none' has price $0, because the individual agents have not revealed any information. Similarly, because we would like all equivalent queries to have the same price, a query "how many data records do not have type X" in the same database (answer "all of them") should cost $0 because the same query could have been formulated the other way. A reasonable way to ensure that a query is formulated in the cheapest possible way is to use an query optimization manipulation program, of the type that is common in database research, during the 'price quote' phase in order to find the formulation with the cheapest price.

5. Pricing Module

The pricing module is a core component of the central SDI data warehouse. It has two functions: (a) to predict the price of a query without executing a complete query; (b) to aid in the allocation of payment given a price quote.

We build into the pricing module a method to allow an agent to make a quality/cost tradeoff before executing a query, and even to specify a restricted query that will respect an agent's budget. Already embedded in the query-execution module is an internal market for data records, to ensure that cheaper data is used in preference to more expensive data access, given two identical data records. Furthermore, already embedded in the query-execution module is that agents only pay for the provision of information. Finally, the method computes a price for a query which is independent of the order of operations.

We propose the following method for providing initial price quotes to agents in SDI:

1. Compute a range of price quotes in response to a query, for different amounts of computation (which can be varied by limiting the input set of data records), and for corresponding values of a "quality metric" provided by an agent that submits a query.
2. Allow the querying agent to select an optimal price/quality/computation tradeoff, and then receive payment, execute the query, and provide the response.
3. Allocate payments to accounts in the eBank that correspond with data records which are used to compute the value of the result of the query, with payments adjusted if necessary to account for any error in the price quote.

5.1 Computing a Price for a Query

We allow a small fixed price F for an initial price quote, to cover the cost of computation and prevent agents saturating the server. The price module computes a price quote based on a statistical technique to compute the price of the full query without executing the full query.

The basic idea is to perform the query on a number of records, e.g. 1%, 5%, and 10% of the total records that will be used for the full query, and then extrapolate to the full query size. We need to perform the complete query because on a subset of data records, instead of part of the query on all data records, because query programs can have different phases—and each phase might incur very different information costs. The number of records that are used for the query can be restricted by making a random sample of the total domain of data records used for a full query.

5.2 Allowing a Price/Accuracy Tradeoff

In computing the initial price quote we also suggest a tradeoff for the user between "result quality" and cost. Quality is subjective, and usually best measured by the agent that requests a query on the data. Therefore, we suggest that the querying agent should provide the metric, but limit this metric to a scalar value to prevent information leakage. We allow an agent in formulating a query to specify a key metric that it will use to choose an appropriate size of query to execute.

The core technique that we use to control the accuracy of the result of a computation is to limit the number of total data records that a query runs over as input to the query. Take a random selection of all the data, and use that for the processing. At this initial step we limit the price and the amount of computation performed.

As an example, consider a query to collect pseudonyms for agents with useful properties. The metric of interest in this case is the average per-pseudonym cost, and this can be provided by the pricing module without providing any useful information to the querying agent. Given this information the agent can then decide whether to proceed with a query, and how much money to allocate.

Similarly, perhaps a querying agent cares about the quality of match between data records and data records with ideal properties. The agent can provide a method to instrument its query to compute this quality, and the price module can in pricing the query provide guidance about the tradeoff between running the query over different numbers of data records.

Another more involved method is to introduce randomization as the query is processed, because some owners of information may provide randomized information more cheaply than exact information.

That will vary depending on the number of data elements that are queried.

5.3 Making a Price Quote for a Budget

Consider the problem of an agent that wished to perform a query with a budget B. For example, I would like to spend $1000 to compute a collaborative filtering model. There is a particularly simple way to allow this:

First, estimate the cost of building a collaborative filtering model on the basis of N data records, selected at random (or with some preprocessing of the database to identify useful data records). Estimate price P for the query.

Second, adjust the number of data records used to compute the actual query based on the price P that was computed, and the budget B. The number of data records, assuming a linear model of per-data record charging is simply N×B/P.

If there is reason to believe that the cost of a query is a non-linear function of the number of data records, then a number of samples could be priced, for suitable sample sizes $N\_1, N\_2, \ldots$ etc.

Ultimately, the result is a query that is adjusted in scope by an upfront limit on the number of records used for the query domain. The price module can scale the cost of the query, and make an appropriate price quote.

5.4 Optimizing the Price of a Query

We also suggest a technique to adjust the formulation of properties in a query, e.g. 'COUNT(SELECT records with property X)', could be reformulated as 'Count(all records)–COUNT(SELECT records without property X)', possibly for a smaller price. A random search technique can provide one simple approach to optimize query formulas.

6. Communication Module

The communication module in the central data warehouse takes incoming messages from agents and decides how to handle them, and sends responses to queries back to agents.

The action selected in the communication module depends on the type of the message, for example the message can be a data-update request, a new query to execute, a request to add new profile information, a request to find agent profiles that match, or a request for processing a set of profiles that meet a particular criteria with an application in the database.

FIG. 4 illustrates the communication module in block diagram form. Messages are received from agents, and passed to the data repository in the case of data-update commands, or requests to add new information to the data repository. Alternatively, if the message represents a query then it is either placed in the queue for execution, i.e. the pending queries queue, or in the set of persistent queries—which are periodically checked by the query execution module and executed when the correct conditions exist in the data warehouse. The communication module can be implemented using standard message-handling methods known to those skilled in the art.

7. Physical Location of Data

The default implementation of SDI assumes that information is physically stored in the central SDI data warehouse. However, this is not necessary. The system of SDI is designed to present a privacy-protected marketplace for data, where queries can be executed with complete transparency as to the physical location of the data over a network. It is not necessary that data is physically uploaded to the central SDI data warehouse. Instead, we allow a user of SDI to provide a virtual pointer to the location of the data on another machine, for example hosted by a trusted third-party, or for example their own data server when that server is located within their own facility and always online. Alternative data locations provide tradeoffs between computation efficiency, communication cost, delays, and privacy.

7.1 The Convergence of Network Devices

The invention of SDI is in no way limited to a centralized implementation. The invention is characterized by its methods and protocols for handling personal information and query execution. As best as possible the invention applies to any distributed system implementation that follows the disclosed methods.

Users with different types of personal computing devices can interact in a seamless fashion with the information and personalization methods provided within SDI, with implementations that allow remote data access and mobile data. The user must either be identified by permanent devices as he/she moves around, or the user has his/her dedicated mobile device.

Co-pending patent application, entitled Location Enhanced Information Architecture (LEIA), provides a basic framework for this type of multiple-device data collection and delivery network environment. It describes a device and location independent methodology for identifying individuals utilizing an artifact termed a user identifier (or UID). This artifact encompasses a variety of more specific media for identifying individuals such as smart cards, credit cards, biometrics, EZ Pass, GPS, and the like. Additionally our issued parent application to this case entitled: "Pseudonymous Server for System for Customized Identification of Desirable Objects" [U.S. Pat. No. 5,754,938] suggests a means for cross correlating user data for profiling purposes. The data may be collected from both on-line and off-line media sources, including the user's personal computer, purchase data collected by a vendor or credit card company. The profiling can be used to deliver personalized recommendations to the user through the web, through email, or even through point of sale terminals at a retailer's physical store location.

Other devices which may be used to push personalized information, and to collect profile information, include the users set-top box, in home appliances (such as stereo system), an automobile on-board computer, a personal digital assistant (PDA), a cellular phone, a pager, an ATM, a fuel pump, point of sales-terminal, wearable computers, etc. In most of these examples, the device is typically a light client (which is descriptive of these "Network appliances"). One variation of SDI's privacy architecture pushes a proxy server to the client-level, where a user's personal profile information is stored. This provides a secure technical framework for protecting user profile data. In the case that the client memory is limited, because the user has a "light" network client, then the proxy server functionality can be pushed to the ISP or a central SDI server. If the light client consists of a remote shared terminal (e.g. ATM kiosk, POS device), personal data may be transmitted from the user's own client device if/when and at the time it is needed and authorized by the user. This approach would be certainly feasible within the "always on" client scenario, for example with a user's data stored at his/her set-top box, which is always "on-line".

The devices with which a user interacts can check a user's data use policy, and then push data accordingly to the SDI network servers. Because servers at the network level are inherently not as secure as the user's own client, extremely sensitive personal information may still be stored even at a light client, i.e. data can be split across multiple locations. In general the user may make a tradeoff between data management (latencies, bandwidth) costs and with the potential loss of information that can occur when data is released to other parties, even if that party is the central SDI data server. Infrastructure for Smart Home/Smart Office Intelligence The management of the potentially vast amount of information generated by such devices, as well as its privacy protection, is enabled by the "personal agent", an on-line software entity that represents and acts on the behalf of the individual user. Furthermore, this agent is capable of communicating with and negotiating terms with agents representing other entities, including systems that form the infrastructure backbone for intelligent homes and offices.

Such systems (as embodied by the LEIA disclosure) have access to a broad range of input sources, allowing them to monitor different aspects of the user's activities or location. Inputs can include data derived from:

Email, wireless PDA, telephone communications.
Web browsing
Personal Computers
Personal Digital Assistants
Pagers
Wrist watches (typically one-way, receive only)
ATM machines, point of sale kiosks
Ceiling-mounted video cameras
room-based motion and heat detectors
Internet-enabled automobile
Chip-enabled appliances
Electronic Schedule Books Smart Home Application The concept of a "smart home" is not a new one: Even in the 1950's futurists discussed the possibility of imbedding intelligent systems into a house, relieving the homeowners of such boring daily tasks as watering plants or adjusting the thermostat. Such a system could easily be implemented today using control computers running simple sets of IF-THEN rules, but might soon prove unreliable because of its inability to adapt to new situations. For example, a garden party could easily be ruined if inadvertently scheduled at the same time as a scheduled lawn-watering.

LEIA provides a much more sophisticated alternative. Given a house that incorporates an internal local area network (LAN) linking household appliances, sensors, communication devices, and home computers, LEIA could easily form the basis for a truly intelligent and adaptive home environment capable of handling daily chores, security, and information delivery.

Firstly, LEIA could easily subsume the tasks traditionally slated for use in a smart home; however, its ability to infer the location and needs of family members would greatly enhance the handling of these tasks. For example, the above-mentioned garden party would not be spoiled because a motion sensor would inform the watering system that a party is taking place on the lawn. Or, being set in a power-saving mode, LEIA could light only those rooms currently being used; as a family member moved around the house, lights would be turned off and on, tracking the person's movement so that only their immediate surroundings are lit.

Secondly, LEIA could use its ability to predict informational needs (in a manner very similar to that used for the Automotive Information Delivery System) in the house, customized to the personal tastes of different family members. One could imagine recipes being delivered audibly in the kitchen, or a television program that follows a family member from room-to-room as he strolls around the house.

Finally, LEIA would have the sophistication needed to deal with intelligent appliances, telling the swimming pool to clean itself, for example, an hour before the commuter returns home.

LEIA provides a unified infrastructure for the increasingly sophisticated systems being incorporated into modern homes. It would act as the central manager, making sure that basic household tasks, security, and informational needs all work in a coordinated and intelligent manner, adapting smoothly to the uncertainties of daily life.

A smart home would have several different types of sensors:
  i) "Passive" detectors—
  motion detectors
  sound detectors (including voiceprint and speech analysis module)
  Active Badge detectors
  Window and door sensors (are they open/closed?)
  ii) sampled communications
  telephone
  e-mail
  radio/TV
  computer usage
  iii) appliances
  alarm clock
  light switches
  stove
  dish washer/clothes washer
  water taps In addition, accessed via secure channels (perhaps using a personal agent as an intermediary), three major types of personal data are also useful for running the smart home:
  i) Explicit rules for routine tasks (E.g., desired schedule for lawn watering)
  ii) Expressed preferences (E.g., a desire for morning news about international events)
  iii) Historical database of previous interactions between the family and the house (This will allow LEIA to learn daily routines and family habits).

There are two major classes of data that need to be served by LEIA: (1) control signals for household systems and appliances, and (2) information desired by household members.

To a large extent, household systems can be appropriately controlled using a traditional rule-base, although a fuzzy rule-base would be inherently more flexible (IF <the bedroom is somewhat chilly> AND <it's almost time to wake up> THEN <substantially increase the bedroom's heat>). Many of these rules would be explicitly programmed by the family from the beginning; others could be learned using inductive methods.

Although most of the household systems could run unsupervised using such a rule base, LEIA would remain the ultimate arbiter, and could override the rule-based system in exceptional cases. For example, if the family suddenly has to go out-of-town, LEIA can infer their absence and inform the household systems to go on energy-saving modes.

It should be noted that certain state variables will have a major impact on this analysis. The date, time, mood (inferred from sounds levels and voice content), and current composition and location of people in the house should be carefully conditioned on. Strong daily routines will emerge (for example, a typical working day), but exceptions will also be noted (when the teenaged son is home alone, and in an exuberant mood, play pop music LOUDLY).

Extension to Data Delivery Given the ensemble of sensors that form part of the smart home, it would not be difficult to monitor the types of off-line information being consumed by the inhabitants. Biometrics (systems monitoring body state, facial expressions, retinal reactions), sound sensors (capable of translating speech to text, and then text to content, using natural language processing techniques), and video monitors (which could observe reading material such as magazines, textbooks, tv viewing guides, cookbooks, etc., and again use NLP methods to scan for content), would all form part of the input set.

This information is combined with all other sensor readings to infer the general focus of user interest. Within the scope of the present network architecture, the parent patent application describes how such contextual data can be converted into target object profiles and through the use of the profile processing module "similar" target objects may be retrieved from the electronic medial distribution system (cached locally or over the network) and delivered and displayed at the local user terminal device for viewing by the user. Such media (which may be tailored for delivery at a RV set-top) may include streaming video/audio, multi-medial files or video-on-demand which are delivered in near real time upon activation of the request and which are of matching similarity (or complementarity) to the print media viewed by the user presently. Alternatively, the data captured by the miniature camera device relating to the particular pages of print media presently observed by the user may consist exclusively of an identifier code a portion of which is used by the system for purposes of identification of the code (or alternatively such identification may be determined by its physical coordinates on the page itself). The other portion of the code is a unique identifier of the particular page, which may be used to identify manually by a content expert whereby select print materials and particularly their associated electronic counterparts are either matched, designed and/or customized for use within their system context of the present convergent media application. It is apparent that such a system could also be usefully deployed to benefit advertisers, e.g., presenting advertisements electronically to correspond with particular printed content or matching printed ads with corresponding electronic counterparts.

This complimentary content, be it audio, video, text, or combinations thereof, including advertising conforming to user-defined conditions, is delivered through various in-home devices located in the proximity of the user.

Smart Office Application Large business centers can be very confusing places: people are often away from their desks, many different meetings are scheduled and rescheduled during a single day, people are called off to emergencies, and clients drop in for unexpected visits. The inability to coordinate people and information in such situations leads to greatly reduced efficiency.

LEIA offers a unified solution in the face of this chaos; by linking together people's schedule calendars, communications systems, contact information, and location coordinates, a system can be devised to (1) shepherd a visitor (even if unexpected) around the business center, (2) push vital contact information about the visitor to those in the company who will be visited, and (3) adaptively coordinate important meetings within the company.

When a visitor comes to the center, he will:
a) sign in at a front desk; rather than sign a book, he logs in at a terminal that signals his presence to the company LAN.
b) receive a hand-held computer that, while presenting the visitor with useful information, will emit a constant signal enabling LEIA to pinpoint his position at all times.

On the employee side, LEIA can acquire signals from:
a) active badges
b) telephones
c) beepers
d) interactions with terminals All sensors are connected directly to a LAN internal to the company. Only basic security measures need to be enacted.

Registered visitors will likely be profiled in standard contact files containing information about their own company, position, professional interests, previous interactions with the company they're visiting, and basic personal details (e.g., photograph, wife's name).

Employees of the company using this LEIA-based system will have much more information available. In addition to the standard contact information, LEIA will have access to their phone and e-mail logs, daily calendar/schedule, work group and project details, position within the company hierarchy, and work-station notes (e.g., an unexpected "out to lunch" message could be posted on-screen by the employee before they run off).

Although some higher-level intelligence is needed (e.g., for matching interest profiles between employees and visitors), the office-based system could well be run with a combination of a rule-base and optimization routine (which would be capable of coordinating conflicting schedules). Since this version of LEIA will be installed in a fairly controlled environment, the problems of location and timing will be fairly trivial, the former solved by active badges, the latter solved by smart calendar agents.

For the Visitor:
If the visit is expected (and previously scheduled), LEIA will double-check the availability of the personnel to be visited and confirm or alter the schedule as needed. If the visit is unexpected, or certain employees are unavailable, LEIA will take into account the purpose of the visit and the visitor's professional interest profile to locate those available employees who would be best suited for a meeting.

Once the visit schedule has been arranged (although it could be adaptively altered during the course of the visit), the visitor will be fed information via the hand-held computer they've been issued. This might give them a visual representation of the building's layout, along with the best route to the next office to be visited (a more advanced building might simply have computer displays in its corridors capable of flashing directional signals to the visitor as he passes them). In addition, it might give the visitor basic information about the person he's about to visit (for example, they might have interests in common, or have gone to the same university).

For the Employee to be Visited:

Whether or not the visit was previously scheduled, LEIA communicates with the employee's personal calendar agent and double-checks the employee's current location. If the employee is at a fixed location and has some free time, the visit is scheduled. Obviously, his connection to the visitor will determine what information, in addition to the standard contact data, should be pushed to his workstation.

For Multiple Employees Requiring a Meeting:

Given that multiple employees have signed up for a meeting, or that a single employee has sent out a signal indicating the need for a meeting and its priority (standard or emergency), LEIA gets to work coordinating the details. Cell phone and beeper signals give employee locations outside the office, active badges signal employees already at the office. Calendar agents are contacted for availability; a standard meeting might depend on people having time slots free, whereas an emergency meeting would be given priority status, and could bump items already scheduled (given that they have been assigned low priority).

An optimal meeting time and place (or teleconnection for remote employees) is set up, and any pre-meeting information is forwarded to the appropriate workstations.

Resolution Credentials

Section 2.2.1 of this patent discloses the use of resolution credentials for the facilitation of agent-agent interactions. Resolution credentials enrich the quality of such interactions because they certify the status claimed by individuals, allowing agents to maintain relationships of trust. On a more practical level, resolution credentials are of use for matching and introducing users to each other on the basis of common interests, for guarding access to high-level users (with the agent acting as a gate-keeper), and for flagging times at which an individual is reachable (and not tied up in meetings, or the like, as specified by the scheduling agent).

7.2 General Description

We allow a user of SDI to push some data A to the data warehouse, and make this data available to all other agents via the SDI query-execution module, and to retain local control over other data B on the client machine. In this section we discuss this and other variations, and explain how the functionality of the central SDI data warehouse can be replicated on a client machine in a client-side SDI database, to allow a user to leverage the value in local data when interacting one-on-one with another agent. For example, a consumer's shopping agent might wish to use local data about its preferences to allow an online vendor to configure its services, but without releasing the information to the vendor. We explain how this can be supported within SDI.

We allow the following variations:

1. A user can store some information on his/her local client machine, with that information provided to other agents directly, or retained for querying by other agents on the local client machine as in the system of query-execution on the central SDI database.
2. A user can use a light client machine, perhaps a mobile computing device, which is periodically configured with information stored on the central SDI database that is relevant to the current task. This information can then be used directly by other agents in interactions.
3. A client machine can be automatically configured with information about a user when the user is in its proximity, again to allow direct information exchange with a local agent.
4. The client machine can maintain all information, with virtual links from the central SDI data warehouse to the information. The system operates as before, with information provided if conditions are met, etc.

There are two basic motivations at work. One, a user might prefer to keep control over some information, even keep control away from a central SDI data warehouse, in case it is compromised in some way. We can allow a user to maintain data on a local client machine but seamlessly receive the same benefits as if the data was pushed to the central SDI data warehouse, with virtual links to the client machine. Query-execution can operate much as before, with data pulled from the client machine as necessary and charges levied. Operating overhead is incurred in such a system because data must be communicated over the Network during query execution. The client machine must also be "fat", with enough local data storage.

A different motivation occurs when a user has a very light client, for example a mobile computing device such as a Palm computing device or a cell phone. In this variation the user will perhaps like to store profile information relevant to the profile that it assumes with another agent in a one-to-one interaction, but not have space to store all profiles. The role of the central SDI data warehouse is to configure the light client dynamically.

With information on a user's client machine, then we can support local queries from other agents, for example on-line vendors might request information to allow an appropriate product to be displayed to a user, or a relevant advert. The queries can be executed in a number of interesting ways. First, the information can simply be released to the agent, and the agent can make appropriate use of the information. Second, the information can be retained on the client machine, and the agent can submit its selection function, and receive the optimal selection, for example a good advert to show the user.

One interesting implementation of such a client-side data warehouse is via smart stick technology, developed by Sony, which is a robust "data wand" that allows the storage of configurable data.

7.3 Important Data Location Variations

It is useful to identify four key modes of interaction between a pair of agents within the system of Secure Data Interchange. The agents might, for example, represent a consumer and a vendor in a B2C e-commerce application. The modes of interaction are adjusted to allow for different data locations.

7.3.1 Data in SDI Data Warehouse

In FIG. 5 we illustrate the situation where agent 1 has its personal information about the user stored in the central SDI data warehouse, and provides agent 2 with the ability to process a query on the data warehouse and access information about the agent. The query might either request information about the agent's profile, or provide a method to execute in the data warehouse, where the result of the method is an optimal action for Agent 2 to make in providing personalized information and/or services to the user with agent 1.

7.3.2 Data on the Client Machine (Client-Side SDI Database) and in SDI Data Warehouse FIG. 6 shows an alternative variation where data is stored on an agent's client machine and in the SDI data warehouse, and the client-side SDI data warehouse can respond to queries from agent 2 in the same way as the central SDI data warehouse. In particular, as we suggest later in this document, this variation allows an agent representing an on-line consumer to store very personal information on a local machine, and for example only allow other agents to benefit from the results of analysis on that information without receiving the actual information.

7.3.3 All Information Stored Client-Side.

Another variation on the basic SDI architecture, is that all information is stored only as virtual links within the SDI data warehouse, with physical storage on an agent's local client machine. Preferably, in order to leverage the value of information the client machine would be always networked with the central SDI data warehouse. A current technical solution which seems appropriate would use a Set Top Box, connected via cable TV lines to the SDI network. Many households in the US have set top boxes, and this would provide a quite convenient way to leverage the value of information but keep it secure against inappropriate access in a central data warehouse.

In this variation, to support a personalized session with another agent the data is stored locally, and can be processed using a client-side SDI data warehouse with a local query-execution module. To also support data mining by agents of a shared database, the client-side data records could useful push data types and price rules to the virtual shared database, to allow more efficient searching. This variation describes a distributed SDI data warehouse, with indexing performed over on-line client machines.

8 Distributed Query Execution

In addition to allowing distributed data location, the system of SDI allows distributed query execution, via client-side query-execution modules. The advantage with this variation is that data can be physically stored on trusted local machines close to a user of SDI, and the queries can be physically executed on the machines so that not even intermediate results are available outside of a local firewall protected system. There is no technical solution provided within SDI to prevent agents sharing information to other agents, other than to prevent agents from receiving that information in the first place. We do this using three many techniques: pseudonyms, information randomization (see Section 10), and query-execution in the SDI central server without release of raw data inputs.

We can implement safe client-side query execution with direct replication of the key functionality of the query-execution and price-module of the central SDI data warehouse on a user's client machine. A querying agent can push the same method to an agent's client machine as it would submit to the central SDI query execution module, and an agent can execute the method locally and release information consistent with his/her data release rules. The SDI client-side agent can be configured, via the profile management and data-release policies, to control the type and amount of profile information released to the central SDI data warehouse. We discuss this in some detail in Section 9, on "distributed data management". The challenge is to be careful that the results of a query do not reveal too much information, but this is solved using the same price rules as in the central SDI data warehouse. The mode of interaction supported is QUERY(PID), i.e. execute a query on a particular pseudonym ID, and the client side query execution module ensures that the vendor has a certificate from the client-side SDI agent to query the information in the local database about that pseudonym. The control over the profiles that a vendor can access, coupled with the price rules to ensure that information is perturbed as necessary and that not too much information is released, and to allow an agent to leverage the value of information. A user's agent can retain control over local information by limiting the information that can be released in response to a query. For example, although a query can be complex and access a lot of profile information on a user's client machine, we suggest an additional protection that controls the information that a vendor can receive for future use. It is possible to limit the response that the vendor receives to a fixed message size, e.g. to 10 bits for example, to provide a very strong overall control on the ability of a vendor to use information again in the future.

8.1 Example

Customized Vendor Web Pages

The method, called safe client-side query execution, has a direct application to systems for personalized information delivery, where it is not desirable to release profile information to an information provider, but preferable to allow the information provider to provide methods (e.g. queries) that are executed on a client machine, and personalize information before it is provided to the end user. A key application of this technique is in B2C on-line e-commerce where a vendor can push methods for personalization of a virtual shop front to a user, and the user's SDI enabled client machine can implement the methods (which are queries) on the client, and push the result back to the vendor's server. The server then constructs and pushes an optimized virtual shop front to be displayed on a user's local display. At present advertising networks such as DoubleClick (www.doubleclick.com) are able to track a user as he/she browses across multiple sites in the DoubleClick network because the ad server can place a "cookie" text string on the hard drive of a user's client computer which identifies that user as he/she browses. SDI is designed to be used on-line in combination with a method to block cookies, replacing them for example with "safe cookies" [Netscape 96] to still permit stateful interactions during a single session with a vendor, for example "shopping basket" style interfaces. The SDI-client side proxy agent can replace the role that cookies take in automatic user log-in and password checking, through a Janus/LPWA-style implementation [BGGMM 97; BGGMM98; GGMM98]. A user's log-in user name and password can be derived from a user's pseudonymous identity, and computed within a cryptographic framework. Janus also provides a technique to allow a user to receive e-mail pseudonymously.

A core technique in SDI is to use a unique pseudonym for each vendor, and then selectively provide vendors with profile information from across multiple pseudonyms; either anonymously within the central SDI data warehouse for data mining purposes, or alternatively via client-side personalization so that a vendor can leverage a user's wide profile data without receiving direct access to that information.

In providing profile information to a vendor during an interaction, so that the vendor can provide targeted products and servers to the user based on data mining that it has performed on aggregated user data in the central data warehouse, the user's agent must be careful to protect the identity of a user. This means that the agent must not reveal information under pseudonym P_1 and information under pseudonym P_2 to another vendor that allows the vendors to link the pseudonyms and reason that the agent represents the same user.

We describe in Section 10 the technique of random noise perturbation to release information in response to queries, and another simple technique is to carefully protect particularly sensitive information (e.g. social security numbers, etc.)

8.2 Client-Side Query Execution

As described earlier, a key variation of SDI retains a local data warehouse and query execution module that contains information specific to a single agent, on the client machine of that agent. It is then possible, via the same query execution controls as described in the central SDI data warehouse, to allow vendors to characterize and profile a user based on its local data, but without gaining explicit information about the user's local data. The vendor can push appropriate methods and targeted services. We describe a number of bottom-level applications later in the patent, including personalized web pages, ad-networks, etc.

We describe one variation in which the vendor provides generic information to the client-side device, that filters that information locally. This is relevant for example in high bandwidth information services such as digital television and satellite systems, where a user's set top box can store program information locally and make local decisions about what programs a user might like to watch and when, without providing any profile information to the head-end server. In this variation an agent can submit a query to be executed locally on a client-side SDI data proxy, that stores information submitted by the local agent. The applications of this technique are exciting, because it allows a user to maintain even more control over profile information but still benefit from personalized interactions with vendors. The client-side SDI data proxy just contains data for the local agent, and allows agents to submit 'personalization queries' of the type 'execute this profiling rule and tell me what product to show the user'. The outcome of the processing might be personalized information, for example a selection of books that a user might be particularly interested in based on its profile information and the methods passed to the agent by the agent that sends general information about the books in its catalogue. FIG. 7 illustrates the process. The SDI proxy agent maintains a set of profiles for a user, relating to transactions that the agent has performed with other agents in the system, and also other information that relates to the user associated with the agent. A vendor agent can send generic information and a method for personalization, which is executed as a query on the local profile data base, with the results allowing a vendor to decide how to target its products and services to a user. For example, a book retailer might be able to provide a selection of books that a user might be particularly interested in based on its profile information and the methods passed to the agent by the agent that sends general information about the books in its catalogue. We can provide rule templates, which are used to select the type of method that the provider of the information is requesting be applied to the generic information that is passed to the requestor agent. The provider agent only needs to provide parameters for the processing. For example, if collaborative filtering is the desired personalization technique then the providing agent provides a list of prototypical cluster centers, but does not need to specify a collaborative filtering algorithm. The interpreter takes the information and methods from the providing agent and selects the appropriate rule template to form a program that is executed as a safe query in the CPU, with the usual controls over the amount of data that a query can access.

The output from this processing is personalized information, that can then be displayed to the user, perhaps to a final test in the control module for applicability.

8.2.1 Preventing Information Leakage

The challenge is to be careful not to allow the results of a query, even those data is not explicitly revealed to an agent that submits a query, to carry sensitive information that a user would rather not reveal. We allow this by: (a) partitioning a user's local profile into a number of different identities, so that a vendor can only access data for a particular profile; (b) allowing only "safe" information to be reported; (c) allowing only "safe" data fields to be accessed. One particularly simple technique is to limit the size of a response to a query by the number of bits, because this can quite nicely prevent the release of too much information, when coupled with close control over the type of data that is accessed. For example, a user might be willing to allow queries with any amount of "less sensitive" information, with the understanding that the vendor only receives at most 10 bits of information. As described above, this profiling might also be a sequential iterative process, so that the vendor does not need to transmit a compete decision tree up-front, but request a sequence of information. Only release information to a vendor that we select, and do not allow the same vendor to access too much information over an extended period of time.

8.3 Extended Example

Managing Distributed Personalization

In this section we describe an extended application of distributed query execution, for a vendor that wants to customize its products and services to a particular user. A central application of SDI is a system where users submit profile information to the shared SDI data base, and receive personalized information and possible cash payments in return. This variation has users optionally submitting information to the central SDI database, and receiving personalized information based on statistical patterns that a vendor is able to assess from the information that is submitted by other agents. A vendor can provide a user with personalized content that reflects his/her interests based on the types of information that other agents with similar profiles like to receive.

FIG. 8 provides a top-level view of one such agent, that we refer to in this section as a personalization agent. We consider an agent that maintains an identifier and (partial) profile information for the agents that it has interacted with. Consider, for example, email addresses of customers to Amazon.com. The vendor-side SDI proxy can maintain profiles for each user that it interacts with, indexed on the basis of the log-in identity that a user users. The agent can also use a "processor" device that takes data about the profile of a user, and the rules that have been collected based on profile information in its local database and from wider SDI query execution, and computes the personalized information that n agent might be most interested to receive. The personalization agent's information database (FIG. 8) contains all information that the agent can provide to other agents, for example this would be all of today's news stories in the case of an agent representing the NewYork Times. The rules database contains methods that the agent can use to decide how to select information to present to a user based on profile information about the user. The profile information can be stored local to the personalization agent for the information that the agent has collected about other agents, other information will be stored either in a central SDI database, or client-side at the user's SDI proxy. The communication modules receives requests from information from agents, and information about agents' profiles, either from agents directly or from the central SDI server. The communication module also sends rules and profile information to other agents, requests for information to the central SDI server, etc. In FIG. 9 we look inside the personalization agent's control module, which is the module that receives requests for information from the communication module, and checks whether the agent has the type of information that the agent requests, and then recovers the profile for the requesting agent and sends that to the processor. The processor selects a rule from the rule database to use in deciding what data to send to the requesting agent, and can also select a method from the rule database to accompany the data when it is sent to a requesting agent.

The control module receives a request for information from the communications module, and checks with the information database for its capabilities to provide information. A query can also specify no particular information. The next step is to consult the profile database, and investigate whether the agent already has profile information about the user, it can used in the processor to select a rule that will decide which information to push to the agent.

The processor returns a rule, and the control module consults the information database, and recovers the required information. Finally, the control module forwards the information, and optionally a method to further process the information at the requesting agent with profile information stored locally to the requesting agent. FIG. 10 illustrates the role of the processor module in the personalization agent. The module receives the request for information from an agent, and any profile information that the personalization agent already has about that agent or that is provided with the information request. The processor consults the rule database, and selects a rule with which to decide what information to send to the agent. The processor can also decide to send a rule with the data, that will be processed on the client of the agent making the request for information based on local profile information to that agent.

The decision module within the processor (FIG. 10) selects a suitable rule, and decides what information to provide to the agent. This rule is passed to the threshold testing module. This is where a decision is taken about whether further customization should be performed local to the requesting agent, based on its local profile information. If the rule provides sufficiently well personalized information then the processor instructs the control module to process the information with the rule, and send the results back to the information gathering agent. Otherwise, for example in the case that the personalization agent does not have accurate profiling information about the requesting agent, the processor will instruct the control module to partially process the information as best as it can, and then send that processed information and an additional rule to the agent for additional processing.

9. Data Management

The invention of SDI, in its most general form, refers to the system for a privacy-protected market for data interchange between multiple parties. In this section we discuss possible methods for an agent to manage its disclosure of data to the data interchange, and to other agents in the system. We allow agents to adopt different identities, and submit different information under different identities. The idea is that a pseudonym prevents other agents from exchanging information. Given an identity management policy, the data management policy is then used to determine what data to submit to the central data server, or release to other agents, under a particular pseudonym. The agent needs to choose what data to release, and what price rules to associate with that data. We propose client-side "proxy agents" to intermediate the interactions between agents, and manage data provided to the central SDI data warehouse; and methods to manage an agent's identity in interactions with other agents, for example via pseudonymous and anonymous interactions. The proxy agents control the amount and types of information exchanged between agents. We refer to the proxy as "client-side", because it resides on the machine local to the agents that participate in the system of SDI. The client-level SDI proxy, implemented as a client program running on the user's client machine, manages all data release from the user to other agents and to the central SDI data warehouse. The proxy might usefully provide a rule-based interface to allow a user to select appropriate data management policies.

An important application of SDI is to a system for business-to-consumer (B2C) e-commerce, where SDI allows individuals to provide vendors with access to profile information that is collected client-side about an individual as he/she interacts with vendors, but retain control over the amount and level of detail that is made available and collect payment for that information. A key function of the client-level proxy is to control the ability of multiple vendors to track a user, by control of the identity of a user in its interactions and the information released. The client-side proxy agent maintains profile information about a user, but releases that information according to a user-defined policy. The system of SDI, together with these client side proxy agents, allows a user to control the amount of information that is released to vendors and other agents, and allows users to exchange information within a privacy-protected and carefully controlled market place and receive personalized products and services The proxy might usefully provide a rule-based interface to allow a user to select appropriate data management policies. Vendors can run collaborative-filtering type applications on profile data from many online consumers, and use that information to personalize products and services in the future. Vendors can continue to build collaborative filtering models and other personalization models that used extended profiles, and users can receive the benefits of personalization without releasing profile information to a vendor; e.g. by personalization within the central SDI query-execution module or by personalization on a user's client machine.

9.1 Overview

The basic assumption is that there is no technical method to prevent vendors from sharing information once they have that information, but it is possible to reduce the value of that information and the privacy implications for a user by making it very difficult to determine that two agents represent the same user in two different interactions.

The ability to interact pseudonymously with other agents, and adopt a unique (temporary or persistent) pseudonym for each agent-agent interaction, is not in itself novel. This is described in the literature, for example as early as the work of Chaum [Chaum 85], and others more recently [FR 98; Cranor 96; BGGMM 97; BGGMM 98]. What is novel is the central SDI privacy-protected marketplace, that respects metainformation that agents associate with data, to carefully control the availability of data to other agents. Also novel is the method of 'distributed query execution' (Section 8), that allows an agent to push a method to another agent, and take a decision based on private information without learning the information.

In Section 9.2 we present example identity-management policies. At one extreme, if an agent interacts with every other agent under a unique pseudonym, and never allows two agents to match its identity based on information that it releases, then the other agents have no way of combining information about the agent. In the business-to-consumer e-commerce example, vendor A cannot share information about consumer Z with vendor B unless vendor B has some way of linking its customer with the customer of vendor A. This can be done at present via cookie mechanisms and advertising networks (e.g. DoubleClick), or simply by matching identifying information (e.g. user name, e-mail address, credit card number) across sites.

In Section 9.3 we describe data-release policies, which are methods that determine what information is released for each pseudonym a user selects, and the rules associated with accessing that information. We also note that an agent can choose to introduce a level of noise-perturbation to data before its release, so that the data is still useful but cannot be used to link an agent across multiple pseudonyms via the data that it releases. Alternatively, an agent can release data with a reduced level of accuracy, for example within a range of values, and/or restrict the types of data that are released. Methods of data perturbation are discussed in more detail in Section 10. Finally, note that there are two parts to the data management policy. One relates to the data that a user releases to the central SDI data warehouse under a particular pseudonym, and another relates to the data that an agent releases to another agent in a direct agent-agent interaction. The following bullets summarize the distinction, and note the sections for more details.

[9.3: Data Management Policy] Manage the Release of Data to the Central SDI data warehouse (with either physical uploading of data, or release of links to physically distributed data); this includes the association of price-rules with data that is provided to SDI.

[9.4: Agent-Agent Data Management] Manage direct Interactions with other Agents, for example controlling the identities used in interactions, and the amount and type of information released. This is really a special-case of Sections 9.2 and 9.3 for data release to the central SDI database.

In addition to the identity and data management policies, an extension of SDI could allow statements about "fair use" of information, much as is developed in the W3C P3P project [W3C; CR 98; RC 99], that allows a user to state for example whether or not it would like to receive electronic mail in response to information, whether the data can be exchanged with other agents, whether it can be used for personalization. "Fair use" policies are typically protected by "catch and punish" mechanisms, for example with spot checks by special interest groups on business practices, and not with technical solutions. In comparison, we focus on technical solutions to allow a user to control information held by other agents; for example by careful identity management, careful data management, and careful metadata annotations to control queries in the central SDI database.

9.2 Identity-Management Policy

Identity management policies allow an agent to assume pseudonymous or anonymous identities in its interaction with other agents, for example in the context of consumer-to-business commerce preventing two vendors from exchanging information about the same agent on the basis of the agent's revealed identity. An identity-management policy defines an appropriate identity (pseudonymous or anonymous) for different agents with which an agent might interact.

A pseudonym can be unique for each agent-agent interaction pair, in which case another agent can store information about repeated interactions but cannot exchange that information with other agents on the basis of the pseudonym, because the pseudonym is unique. A stronger form of privacy is provided with an anonymous identity, that does not allow even the same agent to track the agent across multiple interactions. An anonymous identity exists only for a single session-until either party agent changes context and connects to another agent. A pseudonymous identity system can be implemented using standard cryptographic techniques known in the art. For example, the JANUS/LPWA system [BGGMM 97; BGGMM98] allows a client-side proxy to compute a new pseudonym for an agent, and also a new e-mail address and user-name and password for that pseudonym, to allow access to web-pages that require user log-in. In particular, it is possible to compute new pseudonyms for a user without a central register of pseudonyms that could compromise a user's identity, through the technique of "blinded signatures" [Chaum 85].

The identity-management policy can be configured by a user when he/she first registers with the system of SDI; for example a simple policy might classify agents according to the certificates that they can present, and select a pseudonym according to the agent's class.

Other reasonable identity-management policies include:

Absolute Privacy. At the highest level of privacy an agent interacts anonymously with every other agent so that agents cannot learn about the agent across sessions, and cannot personalize future interactions. Furthermore, information about the transaction with the agent, cannot violate a user's privacy when provided to other agents, so long as the agent does not release any identifying information during its transaction.

High Privacy. At the next level of privacy, an agent interacts with every agent under a unique persistent pseudonymous identity. This prevents another agent exchanging information about the agent with other agents, unless the agent reveals other identifying information. However, this policy does allow agents to receive personalized information over multiple sessions with the same agent, directly without the vendor using information submitted to the central SDI data warehouse, or stored on a client-side single-user database. Another agent can personalize information, but only on the basis of previous transactions with the agent. In an Internet environment this mode of interaction allows a vendor to track its customer across multiple sessions.

Medium Privacy. Use the same persistent pseudonymous profile with groups of other agents, perhaps segmented according to the type of task that an agent is performing. With this level of privacy agents still control of the ability of other agents to build portfolios of information. Examples: (a) an agent might specify one identity for whenever it is purchasing books, so that any book seller agent that it approaches can access profile information that relates to the agent's previous book purchases and queries (so long as someone will provide/exchange/sell/rent that information to the agent); (b) an agent might require that a different pseudonym is used for business-related transactions and leisure-related transactions, to allow more precise personalization; (c) consider a family that interacts with other agents through the same SDI proxy. Each member of the family might choose to use a different pseudonymous persistent identity for all of his/her on-line transactions.

Low Privacy. No attempt is made to protect the identity of an agent. This is the default privacy level provided via current Internet browsers, at least in the common usage of individuals. The system of Secure Data Interchange is useful with this level of privacy only to the extent of leveraging the value of information that has not been released to any agent. There is not technical method to prevent agents from exchanging information that relates to transactions they have performed with the same agent.

A general method to select a "medium" privacy strategy, with different pseudonyms for different agents, but some shared pseudonyms, is to suppose that agents present certificates. A certificate places an agent into a particular class, and each class is associated with a particular pseudonym. Therefore agents that can position themselves in a particular class that is shared with other agents can share profile information; while an agent that can not position itself within a shared class will receive its own unique pseudonym.

A useful default policy is to suggest that an agent adopts a unique pseudonymous identifier for each vendor that they interaction, and then explicitly link pseudonyms as they decide, via a link-command to the central SDI database. The policy is a hybrid of the core suggestions above. Initially a user selects high privacy, but the user can choose to incrementally relax this privacy decision on the basis of continued interactions with agents. A user might also sell links between profiles, to agents that can present the right characteristics and pay the right price.

Example in Consumer-Business On-line Commerce. FIG. 11 illustrates agents 1, 2 and 3; agent 1 maintains one pseudonym for vendors 1 and 2, and a different pseudonym for vendors 3 and 4; agent 2 maintains one pseudonym for vendors 3 and 6; agent 3 maintains a unique pseudonym for each of vendors 1, 3 and 5. Of course, a vendor might adjust its level of service according to the level of identification provided by an agent. For example, a vendor might provide a more complete service to a user that provides a pseudonym than a user that provides an anonymous identifier, because a pseudonym allows a vendor to collect information over an extended period of time and build a detailed profile that can enable future personalization.

9.3 Data-Release Policy

The client-side SDI proxy provides support for automatic submission of profile data, and other types of data, to the SDI central data warehouse. This includes policies for pricing queries, and policies for introducing random perturbations to data.

There are a number of human/computer interactions that are important in allowing a user to configure these options. Many of the issues were anticipated in Cranor's work [CR 98; RC 99], in which she describes methods adopted in the W3C P3P (platform for privacy preferences) project, and suggests that users can as a first step select a special interest group with which they are affiliated, use that as a base policy, and then adapt the policy as necessary. Alternative techniques include decision-tree methods that ask a user a number of questions in order to ascertain an appropriate service. There are many dimensions that a user might like to identify; for example: the type of information that can be released, the types of queries that can be performed on that data, the price that must be paid to perform the queries. For example, we might hard code different price and data-release policy codes, e.g. A B C D . . . , and allow third-parties to provide maps between data types and an appropriate policy code.

We view an agent's complete data release policy as an intersection of its data management and identity management policies. As with identity management, a simple variation will define a fixed number of data management policies, stating types of data that can be released and conditions, and a mapping from agent certificates to policies. An agent can receive whatever policy it presents a certificate for.

9.3.1 Data Validation

The SDI client-side proxy can also provide a useful service of validating data in profiles. This can be important in scenarios in which it is possible that a user can try to misstate information in the database for personal gain. For example, consider a consumer-business e-commerce system in which vendors determine user discounts for products based on their profile information. Clearly all users will attempt to adopt the profile for the cheapest price, if that is known, and if that is possible. We can allow vendors to specify that they will only follow validated information, for example if a user's profile states that he/she is very price sensitive, then it is more useful to know that if the assessment is based on validated transactions performed via the SDI system. In general terms, information is valuable within a marketplace if the information is accurate, and we can use client-side validation to achieve that goal.

Consider another business-consumer e-commerce example. In general it is useful to allow an agent to duplicate information across different identities in the SDI data warehouse, e.g. my Zip code might well be information that I am very happy to associate with all of my profiles because it is not too revealing of my identity. However, as a vendor I might like to know that when I execute a query I am not paying to receive duplicated data records for the same user. One useful way to prevent this is to allow a user to also state with some records "this is the only user profile for which I am choosing to submit this piece of information". For example, if user A purchases book X then the user might choose to associate information about that book purchase with just one of his/her profiles in the SDI data warehouse, e.g. the profile for the "book-reader". Stating this allows a vendor to specify within its query that it is only interested in receiving information associated with profiles that include this "exclusivity" claim. The SDI client-side proxy can provide a guarantee that the user only associates data with one profile, for example using a cryptographic method, e.g. signing the data record with a key to indicate that it is a unique record.

9.3.2 Data Perturbation

In addition to an agent's identity management and data-release policy an agent must be careful that it does not compromise its identity-management policy by releasing identifying information. For example, an agent must be careful not to release the same piece of information X under pseudonyms P1 and P2 if it is unlikely that the information would relate to two different agents. In the next section we discuss the concept of data perturbation in some detail. The idea is that an agent must add enough noise to any information that is released to prevent identification by another agent, unless the other agent already knows the agent's true identity. This date-perturbation module can run on top of identity and data-release methods. Without careful management of the control of information a pseudonymous identity management policy is redundant. Remember, whenever pseudonymity is compromised there is no technical method to prevent vendors and other agents from exchanging information about the agent.

Agents are careful to reveal only information that will not allow a vendor to link the identity of a user across multiple pseudonyms, defeating the identity management policy. Pseudonymity can be broken whenever an agent reveals the same piece of information, X, to multiple agents, e.g. A and B, and that information X has significant discriminative power. Agents A and B might be able to deduce with quite high probability that it is likely that the two pseudonyms refer to the same agent; and therefore combine their profile information and defeat the user's profile management policy.

Consider an extreme example in business-to-consumer e-commerce: if agent 1 reveals its social security number to vendors 1 and 3, its pseudonymity is broken. Vendors 1 and 3 can now communicate and deduce that the agent that interacts under pseudonym P1 and pseudonym P2 is the same agent, and therefore share profile information that the agent would like to isolate from each agent. The pseudonymity is broken in this case because social security numbers are unique identifiers. A slightly more subtle example is to consider an agent that provides a combination of profile information to two vendors, where the information taken together is suitably revealing that the vendors can conclude that the pseudonyms relate to the same user with high probability.

At the other extreme, we might simply provide no personal identifying information, such that in a business-consumer e-commerce application the vendor knows only the type of product that the agent is looking for, or the request for information made by the agent. In this situation we can use the methods disclosed herein to complete a transaction with pseudonymous physical mail and pseudonymous payments.

A slightly more advanced method is to classify information as identifying and non-identifying, where information is non-identifying if no amount of the information can break a user's identity; e.g. information common to many other users, perhaps the city in which a user lives, a rough salary range for a user, a user's banking institution, etc. In comparison, identifying information might include a user's street address, a user's favorite book, a user's exact salary, etc.

The data-perturbation approach is to select the information to release, via an agent's data-release policy, and then add a necessary amount of random noise to that information to protect a user's identity. We can add a small amount of random noise to data, enough to prevent identification, but not so much that the data has no value to another agent. For example, my year of birth and Zip code might be almost as valuable for customization purposes as is my full date of birth and street address.

9.3.3 Click Stream Data.

One type of data that is especially interesting in a browsing environment is click stream data, which is stored at the client machine and represents a sequence of clicks that a user has executed, possible across multiple vendors. The data can be stored on a user's local client machine and periodically released under an appropriate pseudonym to the central SDI data warehouse. The client-level proxy server that runs on a user's host machine is in a unique position of being able to monitor the user across different pseudonyms and across different vendors' sites. The client proxy might also collect information about:

The information that is displayed to a user (e.g. the text, the pictures, etc.)

Information typed at the keyboard, and profile information transferred from the client machine to a vendor.

The data is gathered by passively observing the actions of the user, and not by direct question-and-response. Possible click stream data release policies include the following data-release policies:

A. Release no information.
B. Only release data on the URLs of the most recent sites visited.
C. Release data about the URLs of the most recent sites visited, and the information displayed to the user.
D. Release data about the URLs, the information displayed, and the information entered by the user.

in combination with a suitable identity-management policy. For example, an agent might state that all click stream data should be released under the pseudonym that the agent adopts for a particular transaction, i.e. all click stream data with amazon.com should only be associated with my "buying books" pseudonym. An alternative policy might state that click stream data should be stored under a unique pseudonym, and not identified with any of a user's other pseudonyms. The agent might then allow a vendor to perform limited queries on that data, for example only query information related to particular domain names. Many variations are possible: e.g. use a unique pseudonym for each new URL domain, i.e. whenever a user skips to a new site, submit click stream data under a new pseudonym.

Click stream data can be subject to random perturbation, just like standard data—for example removing time-stamp information and adding noise to the URLs that a user clicks.

There may be other click stream data release policies worth considering outside the preferred embodiment discussed above. For example, an Intermind patent provides for the release of a user's information according to the terms and conditions of the user's own data disclosure policy.

Such an arrangement could be further enhanced by conditioning the quality of the data released by the vendor to the user on the strictness of the user's own data disclosure policy—users could then be rewarded to share more of their clickthrough data. Various levels of security could also be guaranteed to the user releasing such information—for example the data perturbation technique could be used to ensure that the vendor only receives aggregate information about his visitors.

9.4 Agent-Agent Data Management

It is important that an agent that submits data to the central SDI data warehouse also maintains careful control over the data that is directly released to other agents through one-to-one interactions. It is necessary to prevent a "black-market" in data. Furthermore, a user might simply prefer that another agent (for example representing a vendor) does not know certain pieces of information. With respect to preventing a black market in information about a user, it is important to prevent two different agents linking the identity of an agent under two different pseudonyms, based on comparing information provided by an agent under each pseudonym. We do not propose a technical solution to prevent these agents exchanging information (outside of SDI) about the agent when this type of linking is possible. Such violations can not only affect a user's privacy, but might also decrease the value of information provided to the SDI data warehouse, since information can be readily exchanged between agents outside of the constraints of SDI. Fundamentally, the policy under which an agent handles data release to another agent is no different from the policy with which data is released to the central SDI data exchange. This is a special case, in which the agent knows that it is providing explicit permission for an agent (specifically the agent with which it interacts) to receive all information that it releases. As indicate above, the pseudonym and the data release to another agent can be determined by certificates that the agent is able to present, and an agent's local data and identity management policies.

For example, suppose that the policy defines that certificate A confers the right to receive a persistent pseudonym, and also receive links to the pseudonyms in set P1. Suppose the certificate B confers the right to receive an anonymous pseudonym, and receive no links, and certificate C confers the right to receive a persistent pseudonym, and links to pseudonyms in set P2. Finally, suppose an anonymous profile is the default. Now, suppose a vendor presents certificates A and C. This vendor receives a persistent pseudonym, and links to pseudonyms in the union of sets P1 and P2; a vendor that presents A and B receives a persistent pseudonym and links to pseudonyms in set P1; and a vendor that presents no certificates receives an anonymous profile and no links to other pseudonyms.

9.5 Light Clients: Web-Centric Data Management

In this section we describe a variation that pushes data management to a centralized web-server, so that "light" mobile computing devices can achieve the same functionality as a more powerful desk-top computer. The convergence of telecommunication and computation technologies is leading to many new mobile devices, but they often have limited computational resources—processing power, memory, storage space, battery life-time. It is an interesting problem to provide these mobile devices with general computational abilities, for example leverage centralized computation to do such compute-intensive tasks as data mining and information extraction.

We explain how the functionality of the client-side proxy agent, for example in managing the identity and profile information of a user as he/she interacts with other agents in a networked environment, can be pushed to a central server in the system of Secure Data Interchange. This is useful in the case of a light client with limited data storage and information processing capabilities. This enables a user to maintain a persistent SDI profile across different client machines, for example at work and at home. The profiles and pseudonyms that an agent uses to interact with other agents can be stored in a central computational server, with remote user access. Alternative technologies, such as smart-card technologies, might allow information about an agent to be physically stored with a mobile agent, but use central servers and local compute devices to perform computation.

The first step is to support user-identification, for example via a mobile key-card [Chaum 85; Chaum 91], password and question-response, a voice-test, an iris-scan test, etc. With this, the client's proxy agent can authenticate its identity to the SDI profile management server, and request that the profile manager initialize a personalized interaction session with another agent. Consider for example a physical SDI device in a store, that requests notification whenever agents with light SDI clients are in its physical proximity. At this stage the light client and initiate an exchange of information between the SDI store agent and the SDI central servers, and receive the benefits of a personalized interaction.

FIG. 12 illustrates a sequence of steps that can allow a light client to execute a customized interaction with another agent. Suppose agent 1 is a light client. Initially agent 2 contacts agent 1, requesting profile information so that agent 2 can provide a customized service to agent 1. Agent 1 receives the request, and contacts the SDI profile management server, which implements the functionality of an agent's data management and identity management policies, and provides an identifier for the appropriate agent pseudonym to agent 2. Agent 2 can then request information about agent 1 directly from the central SDI server, and finally provide personalized information and services to agent 1.

The pending patent application "A System for Location Enhanced . . . " [patent application Ser. No. 09/314,321] describes a method to identify a user based on location, which can allow automatic detection of close SDI-enabled agents based on physical proximity. The methods taught in the LEIA patent also suggest the use of a common user identifier, which could via simple look-up act as the Unique User identifier in the central SDI database. Other biometric variations, e.g. via Iris scan technology promise to allow personalized interactions between people and other agents that they approach in the physical world, with sessions automatically configured based on identification and principles of consent. Location based filtering can be further used to allow relevant information to be delivered to a user based upon his/her physical location. It is also possible to pre-cache personalized information directly to the user's client (and server) thus overcoming the bandwidth bottleneck or wireless connections.

Web-centric profile management can be used in an environment of mobile users that interact with many different computational devices, for example ATM machines, point-of-sale terminals, etc. A simple variation of SDI allows a user to allow a machine with which he/she interacts to be automatically configured for a personal session, based on carefully controlled queries from that machine to the central SDI data warehouse. A common "user identifier" be it cards, codes or biometrics can be used to identify and personalize the local SDI client machine. The user may also be identified during off-line transaction via his/her credit or debit cards, for example on ATM machines and POS kiosks, providing promotional offers and coupons.

9.6 Smart Cookies

Current practice in web-browser based consumer-to-business electronic commerce is to use cookies, which are identifiers placed on a user's hard drive, to identify a user across an extended period of time. For example, if I access the New York Times from my home personal computer on Monday, and then again on Tuesday, the New York Times server can identify that I am the same individual and build a profile of my interests, i.e. the new stories which I choose to receive first each day. This type of information about all of the users that read the Times can allow collaborative-filtering type techniques and personalization of information in the future, such that my "front page" is different from the front page of someone else.

However, cookies have the unfortunate side effect of allowing an individual to be tracked across the web pages of different vendors, for example across the web page of the New York Times (www.newyorktimes.com) and Amazon (www.amazon.com), if the Times and Amazon both embed content from the same third party in their pages. This happens, for example, with the DoubleClick advertising network. DoubleClick (www.doubleclick.com) operate a virtual network of pages, and can track a user across any page within their network, and gather a very comprehensive user profile. Although the cookie mechanism is designed so that only vendors with the same domain name can access cookies on a user's hard drive, they can easily be used to profile users across multiple vendors, for example with a double-click style network that embeds a universal advert server within each page.

The system of SDI allows controlled personalization, such that a proxy-automated log-in session where the proxy presents a user's pseudonym to a vendor allows that vendor to track a user over time at its own web site, but a vendor cannot track a user across web sites. The SDI client-side proxy agent will disable cookies in their current form (although introducing "smart cookies" to retain the initial functionality provided by cookies in Netscape's description, that of a stateful interaction with a user). Furthermore, vendors can still perform collaborative-filtering style data-mining across different data sets from multiple vendors, but only with the explicit authorization of owners of that information, as presented by price-rules associated with that data in the main data warehouse.

Netscape, Inc. [see Netscape.com technical notes for developers] have proposed a method called "safe cookies" to retain the stateful interactions that are an essential part of a good e-commerce interaction (supporting shopping baskets, for example), but without the drawback of tracking users. Our smart cookie mechanism is similar, allowing stateful HTTP sessions without allowing a user to be profiled across multiple sessions. In its basic form HTTP is anonymous, there is no way to differentiate one request for information from another request for information. The cookie mechanism was designed to overcome this problem when it is useful to display consistent information to a user over a sequence of "clicks", for example to implement a "shopping basket" in a on-line e-commerce site. An alternative mechanism is to embed codes in the URL itself, with the "+code" mechanism.

We propose a smart cookie, that is stored on a user's hard drive and provided with every HTTP mechanism sent to a vendor, but deleted as soon as the user changes his/her current context and goes to another URL domain name. For example, the New York Times can write a smart cookie to the user's hard drive to associate that user with HTTP requests while the user does not change context and go to another web site. However, as soon as the user enters the amazon.com URL into his/her browser the cookie is permanently deleted from the user's hard drive. Essentially, the solution must allow only temporary cookies, which expire at the end of a "session", as defined by the client machine. The temporary cookies provide stateful interactions in a TCP/IP system as with cookies, but expire at the end of a session.

Cookies are also used at present to allow a user to automatically and seamlessly log-in to a web page. We can avoid any loss of convenience to a user with automatic methods for log-in to remote servers, for example via the Janus/LPWA [BGGMM97; BGGMM98; GGMM98] or W3C proposals [CR98; RC99; W3C-OPS 97]; essentially the pseudonym and an associated password that a user adopts for a vendor allows log-in to that vendor.

Also important when supporting a system that allows a user to browse pseudonymously is that the physical attributes of a network system are removed of their identifying characteristics. For example, another role of client-side data management agents is to strip the 'from' field in a HTTP/TCP message.

9.7 Implementation Details

In an Internet browser environment the client-side proxy agent that provides distributed data management for an agent might be implemented as a plug-in into the browser, that can for example be downloaded from a central SDI server. The browser is then configured to use the SDI proxy as its proxy, and the SDI proxy itself connects through a user's ISP (or other intranet gateway) to the Internet, and on to other vendors.

The user provides his/her SDI proxy with personal information, such as his/her name, mailing address, and e-mail address. The client-level proxy registers then registers the user with the central SDI server, providing the server with the name, address and e-mail address of the user. Other basic user information might include demographic information, for example a users job, marital status etc. The client proceeds to automatically generate a unique SDI user ID code, and a private key to allow future authentication of its log-in.

The client can create a unique public key/private key pair. This key pair can be generated only once for a person, and although the central SDI user ID server does not know the key pair, the server can verify that a key pair is only generated once—because a new user must present proof of identity to establish an account. The client generates a unique user identifier, UUID, for example with the methods taught in [Chaum 85; Schneier 92]. The UUID can then be blinded and signed to certify that a user is registered with SDI, using Chaum's technique of blinded signatures so that the certifying agent does not the identity of the UUID that it signs [Chaum 85, Chaum 92]. The client-level proxy can remove the blinding factor, to compute a signed UUID that it uses when it is necessary to generate new pseudonyms and request new certificates.

The client-level proxy can now sign messages with its private-key, and provide the signed to UUID, to verify that (1) the UUID represents a validated user; (2) it is the client-level proxy authorized to act for the user, because it has the private-key associated with the UUID. The client-level SDI proxy uses the private key to authenticate messages that it sends to other modules within SDI, such as Pseudonym administering servers. The unique user ID for a user does not carry any information about the user, its sole purpose is to provide a unique identity. The unique UUID can also be used to generate new pseudonyms for users that are certified one-time for a particular vendor, so that the user certifies that he/she maintains the same profile for all interactions with a vendor.

At this stage the central SDI server might verify the identity of the user, and also check that the user is not already registered with SDI. The method for verifying the identity of a user could include requesting that the user provides his/her social security number, or some other institutional solution that is used for this purpose. In the future we could envisage an electronic system for such an identity procedure, but the method might require for the user to execute this initial step in person with the presentation of a recognized photo ID. The central SDI user ID server maintains a database of all users that are registered with SDI, and checks that that the user is not already registered with the system of secure data interchange. The central SDI proxy may also provides the user with a signed certificate of some universal identifier, such as its Social Security Number, that the user can use to generate other certificates from certifying agencies, to be able to gain certificates under pseudonymous identities.

9.7.1 Initializing Identity and Data Management Policies

The client-side SDI proxy might provide a rule-based interface to allow a user to select from a menu of defaults an appropriate profile management policy, or to configure with the aid of a decision tree an appropriate profile management policy for a user. Profile management policies define how a user will interact with various classes of vendors (depending on the nature of the business that the vendor is engaged in), the kinds of uses to which the transactional information that a vendor collects can be put to, and the amount of information that a vendor which collects profile information about a user is authorized to release. The client-level proxy manages a user's interactions with vendors, to keep them within desired policies.

9.7.2 Generating a New Pseudonym

The method of blinded signatures [Chaum 85; Chaum 92] provides a useful technique to generate new pseudonyms for a user, without any centralized database that stores pseudonyms. The client-level SDI proxy can generate a new identifier, comprised of a sequence of bits, that will be unique with a high degree of probability. The identifier is "blinded" and then submitted to a trusted-third party to be authenticated for use as a pseudonymous identifier. When authenticated the blinding factor is removed, and the final signed pseudonymous ID can be used as a new identifier. The signature can allow a user to associate certificates with that identifier, and also to verify that the user has only a single pseudonymous ID with a particular vendor.

Pseudonym administering authorities (PAS) cannot build dossiers of the pseudonyms, because users submit "blinded" identifiers. The only information that a PAS has is the list of unique vendors that a particular user has registered with. The pseudonym administering server can be operated by an agent with a trusted relationship with a particular vendor.

Every SDI user has a unique identifier, a UUID, that is presented to the PAS with the new pseudonymous identifier to be validated. The PAS can verify that this is the first pseudonym for a particular vendor. Each Pseudonym administering server has a public key/private key pair (PKPAS, SKPAS) for each Vendor for which it validates new pseudonyms. A signed pseudonymous identifier, signed with the private key of PAS, verifies that the pseudonym is valid. Cryptographic techniques ensure that the signature cannot be falsified, and allow another party to verify the signature with the public key of the PAS. This enables a vendor that receives the pseudonym to validate that the pseudonym is unique for the user, to enable persistent interactions across multiple sessions.

An agent can use its pseudonymous identity to initialize transactions with a vendor, and also to encrypt messages. However, it may be more efficient to exchange future messages with a shared key pair—this is more efficient to implement that an asynchronous key pair cryptographic solution. Messages can be encrypted with the shared key, that only the user and the vendor know. This (1) validates that the message is from the sender; (2) ensures that only the intended recipient can read the message.

9.7.3 Automatic Client-Side

Profile Management When a user clicks to a new URL the SDI proxy agent must determine (a) the identity to adopt with the vendor; and (b) the profile-management policy to adopt with the vendor. The first-step can be performed by local look-up, in a stored table of the vendors that the user has interacted with. Should the vendor be a new vendor, then it is necessary to implement the identity-management policy based on certificates provided by the vendor, and then either use an existing pseudonym or alternatively adopt a new pseudonym.

With an appropriate pseudonymous identifier the proxy agent can connect to the vendor, sending the vendor its signed identifier to identify itself. The proxy server continues by sending the data privacy policy for the user with this vendor, signed with the private key for the pseudonym. This serves three main purposes: (1) it demonstrates to the vendor that the user is indeed the owner of the public key PKP, because the user has the secret key that is associated with it; (2) it informs the vendor about the data-privacy policies that the user requires; (3) whenever the vendor submits information about transactions with this user to the central SDI server it must also submit this certificate to verify that it is following the user's guidelines.

The client-side SDI proxy agent might also provide a "connection-certificate" to provide the vendor with certain abilities to access information about the user in the central SDI data warehouse, as described in the earlier section. When a user connects to a site and provides a certified public key, the first-level proxy server also provides a time-stamped certificate of connection, S((PK*V, T), SKP), where T is the current time, PK*V is the unique public key of the vendor, and SKP is the secret key of the user for the pseudonym that it uses with the vendor. This "connection certificate" is used by the vendor to request a profile-release from the central SDI server.

The proxy agent than implements the profile-management policy, as it relates to the certificates presented by the vendor. First, the agent might submit the basic profile information to the vendor, for example a user's age, nationality, state, sex-anything a user is happy for any vendor to know. This is the basic profile that is configured by the user during initial registration with SDI. Later, the vendor might request profile information, that can be provided if the vendor is authorized to receive such information.

9.7.4 Leveraging Existing Standards

The architectural framework outline above can be implemented with a number of existing technical methods. One approach is to use the Extensible Markup Language (W3C-XML) to encode information exchanged between client agents and vendor agents, for example profile information and requests for information. This has been suggested by the W3C consortium. The eXtensible Markup Language (XML) proposal of the Worldwide Web Consortium working group on SGML provides an ideal standard for representing such information. XML allows meta-content to be included with documents, machine-readable information that enables documents to be processed by client software. Augmenting web documents with structured information enables clients to respond to requests for profile information. XML can represent rich data structures, and that allows a grammar to be defined for information that allows data to be automatically verified for correctness.

EXAMPLE

An XML Representation for a Profile Request Message

A vendor might request profile information from a client-side SDI proxy agent. A vendor sends a 'Request Profile' message, and the client-side SDI proxy agent responds with a 'Profile Update' message, that contains profile information, in accordance with a user's profile management policy. The request-response mechanism can be implemented using the standard HTTP Post/Response mechanism in conjunction with XML message types. The 'Request Profile' message can be represented in XML as:

```
<?XML version = "1.0"?>
    <?xml:namespace ns = "http://www.sdi.com" prefix = "SDI"
?>
    <!doc>
    <SDI:Request> http://www.some_vendor.com </SDI:Request>
``` and the SDI proxy agent's 'Profile Response' message can be represented in XML as:

```
<?XML version = "1.0"?>
    <?xml:namespace ns = "http://www.sdi.com/clientX12345"
prefix = "SDI" ?>
    <!doc>
    <SDI:Update>
        <SDI:Profile>
            <SDI:Item> (1231, 0.453) </SDI:Item>
            <SDI:Item> (1041, 0.034) </SDI:Item>
        </SDI:Profile>
    </SDI:Update>
```

An illustrative Document Data Type (DTD) for an SDI:Profile element type is presented in the next section. The XML messages are included in the body of standard HTTP Post/Response messages. We limit the performance degradation caused by out-of-date profile information that is stored within web pages of on-line vendors by associating "out-of-date" time stamps with the profiles that are provided by the central SDI server. This mechanism is similar to the "expiration time" tag of a Netscape Cookie message. The frequency with which profile updates need to occur will depend on the speed with which profile information changes. The "out-of-date" time stamp can be included as an additional element in an SDI:Update message.

The system as outlined above can be implemented within the current HyperText Transfer Protocol (HTTP), as a sequence of challenge/response pairs between clients and servers. The HTTP Post/Response mechanism allows clients and servers to exchange data, and this data can be an instance of an XML Document Type, within the body of a HTTP message. The HTTP protocol is the underlying mechanism, with SDI messages contained in the body of the HTTP Post and HTTP Response as XML documents.

EXAMPLE

A Possible XML Representation of a User Profile

The World Wide Web Consortium (W3C) SGML working group developed XML (extensible markup language) to provide an open and extensible grammar for structured data [XML]. An XML document has an associated schema definition to enable an XML-enabled browser to validate the structure of XML data automatically. A Schema in XML is called a Document Type Definition (DTD), and defines the names of tags, their structure, and their content model. XML allows the DTD for an XML file to be identified through a Universal Resource Indicator [URI] in the header of the file (see below). XML also allows URIs for mobile code resources to be referenced, in order to enable a client to process embedded XML data. An XML document must be well formed, and in order to be well formed the tags must form a tree structure. In addition, the DTD allows the structure of an XML document (an instance) to be validated against a particular schema. Senders and receivers must only send valid SDI files. Each SDI message is a valid XML document.

We provide an example XML instance and part of a Document Type Definition for use within the system of SDI. We assume in this example that profile information is represented as a list of attribute-value pairs within an XML document. An attribute is defined by a numeric code, and the value defines the weight of the attribute. For example:

```
<?XML version = "1.0"?>
<?xml:namespace ns = "http://www.w3.org/OPS/OPS" prefix = "OPS" ?>
<?xml:namespace ns = "http://www.sdi.com" prefix = "SDI" ?>
<!doc>
<SDI:ProfileData>
    <SDI:Location>
        <SDI:Geocode> 12321561 </SDI:Geocode>
        <SDI:DigiMap> http://www.digimap/?12321561
        </SDI:DigiMap>
        <OPS:Zip> 19103 <SDI:/Zip>
    <SDI:/Location>
    <OPS:Demographic>
        <OPS:Gender> F </OPS:Gender>
        <OPS:Age> 26 </OPS:Age>
        <OPS:Income> 50000-75000 </OPS:Income>
    </OPS:Demographic>
    <SDI:ID>
        <SDI:Pseudonym> P12543 </SDI:Pseudonym>
        <SDI:PublicKey> 12453246129421 </SDI:PublicKey>
    </SDI:ID>
```

-continued

```
<SDI:Profile>
    <SDI:Profile-item> (1242, 0.546) </SDI:Profile-item>
    <SDI:Profile-item> (56, 0.045) </SDI:Profile-item>
</SDI:Profile>
</SDI:ProfileData>
```

The Document Type Definitions for this document are specified in the header, and include URIs to a DTD of the Open Profiling Proposal of the W3C, and also a DTD of the Secure Data Interchange. The OPS DTD is used to boot strap the SDI DTD, providing tags for common profile information, such as 'Gender', 'Age', 'Income', etc. The section of the SDI Document Type Definition that is used in the above XML fragment is presented below. It makes reference to tags defined in the OPS DTD, and the RDF (Resource Description Framework), a W3C proposal to standardize the structure of Digital Type Definitions for XML documents. XML Name spaces [NS] provide a method for unambiguously identifying the semantics and conventions governing the particular use of property-types by uniquely identifying the governing authority of the vocabulary, for example OPS and SDI in the example above. The URI for a schema can contain a human and machine-readable description of an XML schema.

```
<!ELEMENT SDI:ProfileData (SDI:Location?,
  OPS:Demographic?, SDI:ID?, SDI:Profile?) >
<!ELEMENT SDI:Location (SDI:Geocode?, SDI:DigiMap,
  OPS:Zip?, OPS:Address?) >
<!ELEMENT SDI:ID (OPS:Name?, SDI:PublicKey?,
  SDI:Pseudonym?) >
<!ELEMENT Profile RDF:list<SDI:Profile-item> >
<!ELEMENT SDI:Geocode #PCDATA >
<!ELEMENT SDI:Digimap #URI >
<!ELEMENT SDI:PubicKey #PCDATA >
<!ELEMENT SDI:Pseudonym #PCDATA >
<!ELEMENT SDI:Profile-item (SDI:Attribute-ID,
  SDI:Attribute-value) >
<!ELEMENT SDI:Attribute-ID #PCDATA >
<!ELEMENT SDI:Attribte-value #PCDATA >
```

The tag '#PCDATA' is used here to represent numeric or textual information, '#URI' declares that an instance of element 'SDI:Digimap' must be a valid URI pointer.

There are a number of other related W3C proposals. The W3C proposal [W3C-MCF] for a Meta Content Framework (MCF) suggests a particular structure for the description language for web pages, to enable schema to be shared and re-used. This proposal is incorporated into the W3C [W3C-RDF] Resource Description Format standard (RDF). The W3C proposal [W3C-OPS] for an Open Profiling Standard (OPS) describes a system for profile exchange between two parties, building on XML and MIME standards. The W3C proposal on privacy and profiling [W3C-Privacy] on the Web extends the vCard [Vcard] schema for electronic business cards to include profile information, and suggests that profile information can be stored and managed locally, with Client-server exchange of personal information as required (using the HTTP challenge/response mechanism). The Resource Description Framework (RDF) enables the encoding, exchange, and reuse of structured metadata. RDF is an application of XML, with additional constraints to allow for Data Type Definitions (DTDs) to be published, and interchangeability across different communities. The ability to standardize the declaration of vocabularies will encourage the reuse and extension of semantics among different information communities [Mil 98]. RDF is a W3C proposed standard for defining the architecture necessary for supporting web metadata. RDF is an application of XML that imposes structural constraints to provide unambiguous methods of expressing semantics for the consistent encoding, exchange, and machine processing of metadata. RDF additionally provides means for publishing both a human-readable and machine-readable vocabularies designed to encourage the exchange, use and extension of metadata semantics among disparate information communities 10. Methods for Data Perturbation In this section we introduce data perturbation methods to augment data values with randomized noise, to allow queries to tradeoff price and quality, and to allow a user to protect his/her identity by hiding revealing details of submitted data elements.

The randomization of data occurs in two places in SDI, first a client-side SDI agent can be programmed to add noise to data as it is submitted to SDI, to provide an absolute guarantee that no malicious party, even for example an employee of SDI with privileged access to the SDI data warehouse, can benefit from highly sensitive information. Second, the data repository in the central SDI data warehouse can be programmed via price-rules for access to data records to allow randomized information to be released in response to queries, perhaps for a cheaper price.

The method of random data perturbation allows an agent to protect the pseudonymity of profile information which is released within the system of Secure Data Interchange in response to queries executed on the central SDI data warehouse, and also with respect to information that is provided to other agents (e.g. from consumer client machines to vendors' servers in e-commerce applications) during direct interactions. Information is either adjusted slightly, through the addition of small amounts of noise, or rounded or binned in some way—to protect the identity of an agent if it is also releasing the same information under other pseudonyms. The goal in the method of data perturbation is to only adjust data by as much as necessary to protect the privacy of an agent, so that the value of data for personalization and user-profiling is retained.

As an example, suppose a user lists its last 10 compact disk purchases, their prices, and the dates of purchases to two different on-line music vendors. Suppose the agent uses different pseudonyms with each vendor. Given information about the distribution of CD purchases over the population of agents, the vendors can compute the probability that the pseudonyms relate to the same agent. If it is quite likely that it is the same agent, the vendors can now exchange information about that user, and even collude on price. Clearly, the more revealing the information (e.g. providing more information, location of purchase, last 4 digits of credit card, etc.), the greater the chance of identifying a user.

However, the system of SDI is built around the concept of gaining value from the release of information, and maintaining careful control over the particular information available to other agents. The method of random perturbation allows information to be released without losing control over the ability of another agent to link the information with other pseudonyms that an agent might use.

The main focus here is on random data perturbation, or rounding etc. as a method to prevent the identification of an agent and the linking of pseudonyms. This is critical to the successful operation of a system of pseudonymous data exchange, such as that implemented within SDI.

FIG. 13 illustrates how an agent's price rule can usefully contain an additive cost to reflect an agent's preferences to protect its protection level during query execution. For example, highly sensitive information can have a high price, while other information can have a low price. This additive cost to account for an agent's protection against the linking of its pseudonyms can be universal across all data records.

We propose a technique to allow a user to control information released and secure a certain protection level, which is an indication of the probability that its true identity can be recognized from information that it releases by an adversary with a perfect copy of the agent's true profile. The randomization method adds a level of noise to information to provide protection, based on the amount of information that is released and the information that is present in a database because of data records submitted by other agents. This is illustrated in FIG. 14, which shows qualitatively that if there are many data records then the agent needs to add less noise to achieve the same level of protection as with less data records.

The method of random data perturbation adds noise to data records to prevent an adversary with accurate information about the values of certain fields in the data record under another pseudonym from linking the pseudonyms, and reasoning that the two users are the same. Alternatively, we can round or bid data values, this has a similar effect.

Basically, we add enough random noise to make the record sufficiently indistinguishable from other data records. There are two modes of protection, that depend on the amount of information known by the adversary:

A. [Strong Protection] Assume that the adversary knows that an agent $A\_1$ with data records P submits data into a database; i.e. assume that the adversary knows for sure that one of the data records in the database relates to agent $A\_1$.

Strong protection is only possible if there are enough data records from other agents to allow agent $A\_1$ to add noise to its own data and make it sufficiently like that one of the other data records is the data of $A\_1$; in particular the other data records must also be submitted with random noise perturbation, or rounded, such that it is possible that other data records are submitted by agent $A\_1$.

B. [Weak Protection] Assume that the adversary does not know that the agent $A\_1$ with data records P has definitely submitted data into the database.

Weak protection is easier to achieve. It is only necessary to add enough random perturbation to data to make the number of possible data records over the population of possible data records that are supported with the perturbed data record large enough to prevent agent identification.

Randomized data is still useful within SDI for data mining and other applications, so long as the amount of noise which is added to records is small in comparison to the value of a record. For example, we can still perform correlation across fields with randomization so long as the randomization does not destroy any trends between fields. Randomized data is marked as such within SDI, and labeled with the degree of degradation, so that SDI can be aware of the number of records to get relevant accuracy levels, and can report accuracy to customers. There is a tradeoff between the level of privacy protection and the level of aggregation at which responses to queries become accurate. It is possible to add random noise to data but still allow data that is aggregated across multiple records to be quite accurate, so that useful data mining can be performed. Binning or rounding of data does not have the same effect. For example, assuming additive noise and additive aggregation, then randomized data from a number of agents can be aggregated to obtain an aggregate value (e.g. mean) quite accurately as the number of agents increases for noise perturbation with zero mean.

Random perturbation of individual data records can provide a cheaper and more secure alternative to cryptographic techniques, such as secure function evaluation, for providing information without compromising privacy [Schneier 92]. Randomized data is secure to computational attacks and the loss or theft of private keys-because we degrade the data, and make access to any one data item virtually useless. Cryptographic techniques known in the art provide methods to compute aggregates or other values from encrypted information without first decrypting this information. However, the general-purpose nature of these methods makes them unnecessarily cumbersome for complex problems. In particular, the communication and computation requirements of these methods when applied to the problem of aggregation result in an unacceptable overhead on the system.

Finally, all cryptographic techniques are subject to compromise by successful attacks on the cryptographic scheme or by the loss/theft of private keys. Such problems are present in all uses of cryptography. In comparison, the method of random perturbation is an information-theoretic technique, and not subject to the same problems.

10.1 Technical Details

We propose one possible method to select an appropriate amount of noise to add to data. The noise can be added in two places:

1) At the agent's client machine as data is first provided to the central SDI data warehouse
2) In the SDI data warehouse as queries are executed, with the SDI query execution engine implementing data perturbation for agents.

With numeric continuous data we can select an additive noise term, for example sampled for example from a Normal distribution. The amount of noise is computed to provide an appropriate degree of confidence that an adversary with exact information about its attributes cannot identify the individual. For example, in a Normal distribution, the standard deviation that is required depends on the number of agents that have provided similar information, and how sparse the information is in its domain. The standard deviation is "tuned" to provide the appropriate level of privacy. We do not require that all data is perturbed from the same noise distributions.

The amount of noise perturbation to add to a data record can be computed using an adversary argument, where we assume that an adversary knows the true values of an agent's data, and may also (strong) know that the agent has submitted data to the database. We allow an agent to submit or release data with a random noise perturbation, and also can provide the service in the central SDI data warehouse in combination with price rules, to control the accuracy of data released to agents in responding to queries. An agent with true data X computes perturbed data X' with additive noise computed from distribution f, and submits the distribution f and the perturbed value X'.

The problem is more difficult with discrete data, but we can instead select a new discrete element at random from a close neighborhood of the original data point [Section 10.4]. In addition, with multi-attribute data, different, independently chosen noise terms are used for each field of a record that needs to be perturbed by the addition of noise [Section 10.5].

10.1.1 Single Attribute and Strong Protection

Agent $A\_1$ has data X to submit to a shared database, e.g. the data warehouse in SDI. Alternatively, we can assume that the agent is about to send the data directly to another agent. Suppose in this example that X is a continuous real number.

Suppose that an adversary knows that agent $A\_1$ will submit data record X, and the goal of the agent is to submit data X with enough random noise perturbation to provide some protection against identification. The level of noise that the agent needs to add to the record depends on the other data records already present in the database.

The problem is to select an additive noise distribution f that will be used to perturb the value X, and compute a perturbed value X'. Let eps>0 denote the agent's desired privacy level, the probability that the value X' was submitted by agent $A\_1$ given the data in the data warehouse and that one of the data records was submitted by an agent with true value X.

For example, suppose the distribution is f=N(0,1), i.e. a Normal distribution with mean 0 and standard deviation 1 and the value X=1. Assume that the random number generated by f, noise=+0.3. Therefore the perturbed value is X'=1.3, and this is the information that the agent submits to the database. Given this, an adversary can compute that a ex post distribution for the true value, g(X)=N(1.3, 1).

Bayesian analysis can be used to compute an optimal parameterization for the random distribution, given a desired level of protection and information about the data already in the database, and the randomized perturbations that were added to that data. Assume that the database contains a set of data records submitted by agents, each with the submitted value X' and the noise distribution from which it was generated, f. With this information agent $A\_1$ can select an amount of noise perturbation.

The goal is to compute Pr(Agent=$A\_1$|true value=X), i.e. the probability that the agent that submits (perturbed value=X', noise distr.=f), is the agent with true value X. Using Bayes rule, this conditional probability is computed as Pr($A\_1$)×Pr(true value=X|$A\_1$)/Pr(true-value=X). Each of these terms can be computed as follows: Pr($A\_1$) This is the a priori probability that a random data record is submitted by agent $A\_1$, and is equal to 1/N, for N records. Pr(true-value=X|$A\_1$) This is the probability that an agent that submits (X', f) has true value X, and is computed from X'=X+f(d) as g(X)=X'−f. Pr(true-value=X) This is computed as the sum of Pr($A\_i$) x Pr(X|$A\_i$) over all data records, and represents the probability that any one of the data records was represents data with true value X.

Agent $A\_1$ can now select parameters for distribution f based on this analysis, so that the probability that it is the agent to submit the new data record is less than eps, its desired protection level.

The rule has the right behavior—the more data present in the system then the more accuracy an agent can use to submit its own information, for the same privacy level epsilon. Notice that the agent is more protected as:

1. Pr($A\_1$) decreases, i.e. with more data records in the database
2. Pr(true-value=X/X', f) decreases, i.e. with more noise perturbation f
3. Pr(true value=X) increases, i.e. there are more data points from other agents that might have true value X.

The parameters for f, for example the mean and standard deviation in the case of noise generated from a Normal distribution, can be selected to set Pr(X'|true-value=X, f)=eps for the case that X'=X, i.e. when the random noise is zero. This presents the worst-case, assuming that distribution f places the most probability on zero noise.

Finally, to compute parameters for f the agent requires aggregate information about the data in the database that has been submitted by other agents. In particular, the agent needs Pr(X), the probability that any of the current data records could correspond to data with true value X. In some cases it is important to receive this information without revealing true value X.

In a simple case, for example when a trusted intermediary such as SDI stores information provided by agents, the agent can simply poll SDI for Pr(X) before selecting a level of noise to use to perturb its information. Alternatively, when SDI is computing the level of noise perturbation to add dynamically as information is released in response to queries then the system of SDI can compute Pr(X) directly. In a more complex case, consider a problem where an agent is releasing information directly to an adversary, and the relevant set of data points are data that the adversary agent has already collected from other agents. In this case the provision of information Pr(X) must be done within a secret-protocol where the adversary does not learn the value of X in the process. A straightforward way to achieve this is for the "adversary" agent to post aggregated information about the probability that a data record in its population has true value X, for a range of different values of X, and allow an agent to use anonymous look-up in a table.

In summary, the following procedure can be used to select an appropriate level of noise to add to a data point:
  a. Choose a distribution family (e.g. Normal, Uniform, etc.), and let Par denote the parameters that define a specific distribution.
  b. Choose a level of privacy protection, eps where 0<eps<1.
  c. Request Pr(X) from the database, i.e. the current probability that a perturbed (or otherwise) data record in the database has true value X.
  d. Compute parameters for the distribution to set eps=max_{X'} Pr(A__1|X', X, f) where X' is the value generated from f.

10.1.2 Examples: Strong Protection(a) Uniform Additive Noise Perturbation Distributions Assume that every agent submits information from a uniform noise distribution, centered around its true value. The decision variable in choosing a level of data perturbation when submitting new information is the range of the uniform distribution. Suppose agent 1 submits data point $g\_1=[4, 6]$, to denote that its perturbed value is X', and the value was computed with additive uniform noise U(−1, 1). Agent 2 submits data point $g\_2=[4,6]$, agent 3 submits $g\_3=[3,5]$, agent 4 submits $g\_4=[3,6]$, and agent 5 submits $g\_5=[2,4]$.

Suppose that an adversary knows that user John has true value X=2.5, and that an agent for John has submitted a data record. In this case the adversary can be sure that 3 agent 5 represents John, because $Pr(A\_5|x=2.5)=Pr(A\_5) Pr(x=2.5|[2,4])/Pr(x=2.5)=0.2*(½) (0.2*½)=1$. In comparison, for an adversary that knows that Mary has true value X=5, then $Pr(A\_|x=5)=0.2*(½)/(0.2*½+0.2*½+0.2*⅓)=0.375$, and similarly for agent $A\_2$. The probability that agent $A\_4$ is Mary is 0.25. Now, a new user, Bill, with agent $A\_6$ wants to provide information about its data X=5, and wants 8 to be sure that an adversary cannot determine its identity with probability greater than eps=0.1. Let $d\_6$ denote the uncertainty selected by agent $A\_6$, and compute an optimal $d\_6$ as so that $Pr(A\_6|x=5)$, i.e. the probability that agent $A\_6$ has true value x=5. This is computed as $Pr(A\_6|x=5)=⅙*(1/d\_6)/(⅙*½+⅙*½+⅙*⅓+⅙*1/d\_6)=1(4/3*d\_6+1)$, and is less that eps for $d\_6>6.75$. Therefore agent $A\_6$ should generate a perturbed value with additive noise computed with uncertainty 6.75, and can then be sure that its identity is protected.

(b) Normal Additive Noise Perturbation Distributions

Now, assume a normal noise distribution, and let sd_i denote the standard deviation selected by agent A_i for its noise distribution. The analysis is slightly more complicated, because the $Pr(X|A\_i)$ is now a function of the position of X within the distribution, not just whether it is in range as with uniform distributions.

In this case an agent chooses the standard deviation for its Normal distribution by assuming that the randomized value X'=X, i.e. that the random noise distribution generates zero noise. This is the worst-case, maximizing $Pr(A\_6|X)$ because $Pr(x|A\_6)$ is maximized and the other terms in the Bayesian expansion are invariant.

10.2 Rounding and Binning of Data as an Alternative to Random Perturbation

An agent can gain the same benefits of random perturbation in a more static scheme, where data is rounded or "binned" into intervals, i.e. agents report only approximate information to other agents. This works for the same reason, mapping each released data value to more than one true value.

The problem is to select buckets for information (i.e. intervals on data) so that there are enough data records in each bucket to provide the required level of protection against adversaries aimed at uncovering the identity of agents from the information that they report.

The previous analysis extends to this case, but can be simplified. If an adversary knows that an agent has true value X, then its first task is to find the prototype value (or bucket) corresponding to the true value. The probability that an agent has the true value is the same for all agents that have posted values with the prototype value, and equal to 1/N_p where N_p is the number of agents with the prototype value.

The decision for agents about submitting information is also simplified: if (1/N_p)<eps for the prototype that the agent's value maps into and a desired level of protection eps against an adversary, then select the prototype value in the interval and report information, otherwise report no information.

In order to support agents with different levels of privacy-sensitivity the system of SDI can allow agents to select a degree of accuracy when submitting information—providing nested buckets. For example, we can allow an agent to specify that its true value can lie in one of a number of buckets, or equivalently in a single super bucket. The number of agents with true values in a particular interval is then computed as the sum of the agents that report values in an interval, and a weighted sum of the agents that state that their values are in one of a number of intervals, according to the total size of interval specified and the size of the current interval.

A useful variation on this method is to control the amount and type of information released, but only releases accurate information. The degree to which a user can be identified if it submits information X to a vendor depends on the other agents that have submitted similar information. For example, if X is very detailed (e.g. my street address), then it is probable that no other agent has submitted the same information, and I will self-identify myself with that information. On the other hand, if X is quite abstract, for example my ZIP code, then it is quite possible that a number of other agents with the same ZIP code have already submitted and released the same information. The method discussed above can be simply adapted to allow a client-side SDI proxy agent, or the SDI data warehouse, to decide how much information to release in order to protect a user's identity, based on information about the data already in a database. For example, instead of my street address my agent could choose to submit my ZIP code.

10.2.1 Example

Binning Techniques

Suppose that an agent must decide whether or not to reveal its salary on the basis of information that has been revealed by other agents. The database supports intervals: <$20000, $20000-40000, $40000-100000, >$100000. The number of agents with each prototype value is currently 10, 12, 16, 5.

Now, suppose a new agent represents a user with salary $200,000 and privacy threshold eps=0.1. The prototype values prevent an agent from stating the high value (>$100000) because there are less than 10 agents in the bucket. However, if the provider also allows agents an option, for example "my value is in bucket 40,000-100,000 or >100000", then the agent can state that information safely. In this case, the probability that the agent is an agent with salary $200,000 is computed as its weight in the top valued bucket, divided by the total weight, i.e. 0.5/5.5<0.1

This technique of binning information, or rounding information, is simpler to implement that random noise perturbation because probability distributions must neither be sent to the provider or maintained by the provider. However, the information is represented with a static accuracy which is hard to improve as the amount of data submitted increases. This occurs automatically in the standard version.

10.3 Adding Random Perturbations to Discrete Data

Adding noise to discrete values is a little more complicated, because the new value must remain feasible. For example, in randomizing the name of a CD the new name must be the name of another CD, not some "made up" name. We need to add noise to make data elements "close" to the accurate values. With discrete data, such as the name of an artist, "close" must be defined within the correct metric. The appropriate metric is such that a "close" value shares many of the same characteristics. For example, it is not appropriate to assign a close value on the basis of a shared last letter in the first name, but it is appropriate to assign a close value on the basis of an artist from the same genre of music—from a "semantic cluster".

Agents use discrete probability distributions to randomize data points.

For example, suppose that an agent wishes to reveal the name of the artist that recorded the last compact disk that a consumer purchased. An artist's name is best viewed as a point in "artist space", and therefore as a discrete value. It does not make sense to change a random set of letters, because the new "name" will not be the name of a valid artist. Instead, the concept of noise is to randomly choose a new name close to the current name, i.e. choose a new feasible location in artist space. One reasonable solution for the names of recording artists is to define a neighborhood of artists that are close to the original artist, and select a new artist from within the neighborhood with equal probability. The metric that defines how close artists must be computed using a system that is common knowledge to the provider of information and the consumer agent, because the provider of information must be able to compute the distribution over true artist name, given a randomized name and probability distribution. We can define the probability distribution with a threshold in the distance d(name1, name2) metric, and the tag 'uniform' to indicate that each artist within the neighborhood was assigned an equal probability weight. A metric for artist names can be computed using clustering techniques, where artists are clustered according to the buying habits of consumers that purchase them.

Semantic clustering that enables useful randomization of discrete field can be automated when goods are frequent purchase, high volume goods-where individuals purchase goods on multiple occasions, and more than one of the family of goods on a single occasion. However, it is possible that high price, low volume goods, should be randomized on the basis of expert analysis (for example new cars, computers . . . )—where an expert can extract key features of a purchase, and represent the purchase generically using either a single prototype good, or one of a set of approximately equivalent goods.

Another approach to discrete data is to apply the "approximation" technique and allow agents to specify a genre of music for example, or a prototype value from a semantic cluster. This is equivalent to stating a range of salaries. For example, the system of SDI can provide clusters for music, and allow a submitting agent to state the cluster of the artist for the CD that it just purchased instead of the name of the artist.

10.4 Noise with Bundles of Information.

In general agents will release more than one piece of information to other agents, in a bundle of information. Intuitively, when agents submit a bundle of information they open up more possibilities for adversaries to determine their identity, because a bundle of independent information reveals more about a user than a single piece of information.

With a couple of assumptions, we can apply the same technique of random perturbations. It is again required that an agent either has information about the distribution over data points present in the data base, or in the population at large. For example, consider an agent that has already submitted approximate information to a provider about its home ZIP code, annual salary, and model/year of car. The agent needs to decide on an appropriate level of randomization for new information about its profession.

The required level of randomization depends on the number of other agents in the system that could have the same salary, ZIP code, car, and profession, given the randomized information that they have submitted.

The problem of computing the current probability that another agent in the database might have true data B is more difficult because not all agents will submit the same bundles of information, i.e. some agents might provide more information than others.

An agent will add independent noise to each element of its data bundle so that bundles of information released under two different pseudonyms cannot allow the pseudonyms to be linked. Also, if it is important that my data not be revealing an agent might add a random term that is shared across all my data values so that for example all my salaries or all my CD purchases are aggregated, an adversary does not get an accurate picture of my preferences.

Assume that each element of a bundle of information is randomized independently. For example, if agent 1 has provides information about values $X\_a$ and $X\_b$ then it computes perturbed $X'\_a$ and $X'\_b$ from adding independent random values from distribution f. This allows the probability $Pr(X\_a, X\_b |$ Agent 1$)$ to be computed for values $X\_a, X\_b$ as the product of the two marginal random distributions.

We compute the probability of $(X\_a, X\_b)$ for an agent that has only provided one value, e.g. $X'\_a$, we can assume that the value of the other element is independent of the value of $X'\_a$ and multiply by the a priori probability of $X\_b$, over all agents that have provided information about their values for $X'b$ and therefore $X\_b$.

The appropriate noise distribution f can be computed as before by setting the worst-case probability that an adversary can identify the agent to its desired protection level.

10.4.1 Example

Here is a simple example for a problem where the data is two-dimensional, with two features. Consider feature a, 'year of birth', and feature b 'car model'. Suppose that agent 1 has submitted car model [VW Beatle, 0.1] to indicate that it selected a random car model from within a proximity threshold of 0.1; agent 2 has submitted car mode [Mercury Mistique, 0.05] and year of birth [1962 1968] to indicate that the year is somewhere in that range; and agent 3 that has submitted year of birth [1965 1975]. Now, agent Z, with true information (VW Beatle, 1972), computes a randomized data entry as agent 4, based on a privacy threshold of epsilon=0.4 for an adversary with correct information about agent Z. Assuming that the Mystique is not within a threshold of 0.05 of the Beatle, agent 2 has placed on probability on its true car model being the Beetle. Also, assume that the proximity threshold of 0.1 on the Beetle implies that agent 1 has a Beetle car with $Pr(Beetle|Agent\_1)=0.2$. Finally, the probability that an agent over the entire population has a Beetle is 0.1. Furthermore, the probability that an agent in the population was born in 1972 is $1/(7+11)=1/18$. Therefore, agent Z must place probability $P\_z$ on (Beetle, 1972) such that $P\_z/(1/18*0.2)<0.4$, i.e. $P\_z<1/225$. To support this, the agent can randomize each data point with probability $(1/225)\hat{}(1/2)=1/15$, i.e. randomize 1972 with a uniform distribution of years [−7, +7], and select a threshold on cars greater than 0.1 to give a smaller probability than the 0.2 achieved by agent 1 with a proximity of 0.1.

10.5 Bootstrapping A Data Set

Bootstrapping is an important technique for the system of strong data perturbation, in which we assume that an adversary knows that a particular agent has submitted one of the data values in a data base, and knows the true values of that agent.

A problem occurs at the start of a system, when there is little data in the database. In this case it is often possible that an agent cannot reveal any information because no other agent's data can possibly represent the agent's true value. For example, if an agent with age is deciding a level of randomization, and there is currently a handful of ages in the database: {[24, 28], [34, 38], [42, 46], [42, 44]} then the agent cannot submit a randomized value and distribution, because the range of implied true ages will always include '18', and be the only approximate information to include '18'. The agent cannot provide its age to the database.

We suggest a simple technique to bootstrap the system. The method works in the case that there are a number of different reasons to decline to provide information to another agent in response to its query. An agent provides randomized data and a privacy level eps to the database, e.g. ([16, 20], 0.2), where [16, 20] is the range of possibilities for an agent's true age, and 0.2 is the desired privacy level.

The SDI database can be configured to only release information when it can verify that it is safe to. Similarly, an automatic method on the client machine of a user can be configured to only release information when it is safe to do so. The problem that is solved here is that sometimes there is no reasonable amount of noise that can be added to a data value to protect a user's identity.

Another technique to solve the bootstrapping problem could hold all data until it is safe to release information for the majority of data points, given the state privacy requirements of users etc. The measure of "safe" is defined by the information in the database and the privacy level specified by each submitting agent. A more advanced technique could introduce data periodically as new parts of the data space become populated, so that there is never an "active" under-populated part of the space.

10.6 Verifying Noise Levels with Playback

We can use a cryptographic technique to verify the distribution of noise that is added to data—and also to enable replay. "Playback ability"—the ability to reconstruct the original record from a noisy version of that record is important for a number of purposes. An individual may want to obtain proof of a transaction for legal purposes and law enforcement agencies with appropriate warrants might want to examine original records.

The client-side SDI proxy, or the central data warehouse, must keep a record of the non-randomized data X, and a method to verify that the randomized data was computed from data X. To generate a random noise value from a distribution f the agent can use a one-way "trapdoor" function trap on the object X to generate a seed for a pseudo-random number generator. The pseudo-random number generator then generates a sequence of random numbers that are used to create the random perturbation from a well-defined algorithm. Suitable trapdoor functions known in the art include the RSA encryption-decryption function. It is not necessary for all agents to use the same private/public keys.

With this method it is possible to verify randomization and audit data release with stated levels of randomization. SDI can request that an agent provides: X, f, and the trapdoor function trap, and can use this information to validate X'. Note, that because trap is a one-way function the agent cannot fabricate different values of X that would give X' given random function f. SDI can "playback" the noise perturbation and produce the noisy record from the original record.

11. Architectural Variations

There may be commercial contexts in which an SDI service can be established where there is already in place a pre-existing trust relationship between multiple vendors and a third party. Such third parties are inherently motivated to provide services to enhance advertising and e-commerce for their existing and potential customers. These third parties may include, for example, web hosts or e-commerce service providers (ESPS) which often have hundreds or thousands of sites which they host, Web portals, information and commerce service manufacturers, advertising and affiliate network services and data analysis and business intelligence tool providers (which includes the business to business application).

A third party may wish to implement an SDI which operates separately and independently from the central SDI service. Alternatively, some of these third parties may install an SDI server on their customer information server. The server may be integrated into an existing advertising service which they operate and maintain, in which case the vendor receives an appropriate fee for data which is exchanged between his/her existing customers, and a reduced fee (which may be split with the central SDI service) for data which is exchanged by/between a member of his/her SDI service and vendors who are members of the central SDI service but not of his/her local SDI service. Unless or until the client-level proxy server becomes a standard or a large critical mass of end-users adopts the service, one of several compelling business models could be used by a vendor to encourage the visitors to his/her site to adopt the user-centric SDI service based upon the monetary incentives the user may receive for subscribing. Typically the resulting revenues are split between the user, the user-centric SDI service and the vendor (in exchange for promoting the service to their site visitors a share of resulting revenues generated may be necessary).

11.1 An Open SDI System

An ISP level proxy server can contain the user profile generation module, profile processing module, user profile interest summary generation module and target object generation module which operate in distributed manner. This enables an ISP to independently implement the core functionality of the system without the cooperation of information vendors (Web sites) or their operators (Web hosts) who opt-out of SDI. The modules in third-party SDI servers can share information with the modules in network vendor servers. This flexible architecture enables the user-centric SDI service to be implemented (by ISPs or completed independently) and when available inter-operating with the complete data sets available from the information vendors.

SDI can allow third parties to operate their own secure advertising and/or electronic commerce-based product syndication affiliate network (for all customers). In accordance with the preferred implementation of SDI, these "advertisements" are represented at the item-level and may be distributed across the (proprietary or main) SDI system network presented in the form of ads, affiliate or portal links to purchasables or sites (which may contain target objects as purchasables) and/or simply (transparently integrated) selections on an e-commerce product catalogue. The users that are also subscribed to SDI, can be given highly personalized information for each site or for the network of sites (which could involve an interface which provides site to site links as a "virtual mall"), and a menu interface to these sites which includes the 2 or 3 dimensional personalized menu features and personalized search facilities as disclosed in the parent description (a "personalized portal"). Traditionally the term "portal" was exclusively reserved for major search engine/directories such as Yahoo, Lycos, Alta Vista etc.

However, at the present time, there is a trend in which may Web-sites are becoming what are called "portals" or "community portals" serving a particular e-commerce or content niche or theme. Often highly robust content and/or extensive (usually web-wide) links to relevant information resources and web-sites are accessible from such portals in order to create a "one-stop shop" service to visitors or community members. Additionally, in order to leverage low-cost access to more robust content, a transaction-based or "click-through-based" or transaction based model is also emerging. This model fits particularly well within the current framework of SDI. In particular user profiles provided by SDI-enabled site visitors provides the platform for automatic generation of not only personalized ad banners but also content and portal links, it is reasonable for these community portals as part of their business relationships with the sites and advertisers to which they provide access to share revenues paid by these sites and advertisers with the end-users (which significantly increase the click through by virtue of personalization of information at potentially all varieties at the site resulting from revelation of the profiles from those visitors). As discussed on the parent case, these pages are pre-cached in advance onto the local server and client.

Within today's internet infrastructure as pages are typically dynamically generated, the files are first pre-cached then dynamically generated local to where they are anticipated to be used. Additionally, high-end community portals typically offer content from external sources which is sometimes syndicated from content providers which are paid by click through or transaction. In this model the user or the site may absorb these fees paid to the content provider (because the content when personalized may appeal to almost any type of user, most typically the site would subtract a certain percentage of the click through or transaction fees paid to the user). As is discussed in the parent patent application, content (e.g. links to specific syndicated items) may also be created based upon the collective user statistics those links are presented to the users for which user profile information is not available (where these page links could be generated on-the-fly based upon the user profile).

The user-centric SDI service also provides valuable information in not only generating the data model for personalizing site content but in general identifying what type of content to syndicate to the site. In a variation, it may even be possible to employ the statistical techniques used by SDI to dynamically select and generate personalized pages in a much more ad-hoc and unrestricted fashion. Using the syndication model, a vendor may agree (based upon their associated privacy policies), to enable other sites to not only syndicate their content which may be contextually relevant to that site, but also actual portions of the site or portal may be linked from other pages on the site which are contextually relevant. These pages may be linked from the portal directory or as hyperlinks which are links to contextually very similar pages (or the vendor may allow these pages to be modified as needed by the site. As a general site development technique also the user's click through patterns are useful in updating or suggesting updates to the model to improve the value of the site. Of course, some vendor's privacy policies will restrict the ability of some sites which can utilize the content.

11.2 A Closed SDI System for a Syndicated Network

The Web host (or more generally a vendor, a provider and/or operator of server functionality to a variety of information vendors), may also be interested in operating his/her own closed version of SDI. The main SDI server for the closed system can be located on the network vendor servers, or it may reside upon the information vendors servers (as it is operated by that local Web host). For example, an affiliate ad network (including a web host acting in such capacity) could upon installing SDI onto their network enable and enforce the wishes and desires of advertisers (and particularly) sites which are advertised upon with regards to what types of sites and advertisers (respectively) they allow or disallow for purposes of standard or affiliate advertising, in accordance with the methods herein disclosed. The general implementation for determining which this general application for using collective user feedback to determine relevant site links was described in the parent issued patent). In this case, end users who are subscribed to SDI would receive personalized affiliate links (including product level recommendations for on-site purchases) which have been pooled and profiled at the main SDI server from all SDI vendors (in distributed fashion) and matched with the user. Alternatively, such approach may also be used for ISPs who wish to operate their own closed user-centric SDI.

11.3 Interoperability Between Local SDI Services

With interoperable (local) SDI services, we can also facilitate the secure enforcement of data sharing policies and transfer of transaction fees between these local SDI services E.g., by/between aggregations of ad networks, syndication networks e-commerce site, portals and Web hosts operating virtual portals and advertising/syndication networks with personalization as its primary capability.

In each of these primary example domains, the server operator is financially motivated to sell the SDI services to his/her sites because the transaction based model is used, and the server operator receives the commission on each transaction (or click through) occurring within his/her network of sites. However, if the server operator also integrates his/her local SDI service into the main SDI service (to share user lists and impressions and/or space to advertise to these target users), s/he can receive a commission (in conjunction with each vendor transacted with) for each advertisement placement or syndicated transaction to or from his/her network.

We can also allow the local server operator to split the transaction fee (normally received from the main SDI service), thus "referral fee" for both the referred customer and the referral of customers (through the placement of outside ads or products on one of his/her sites) or other means of targeting his/her site's existing customers.

Reduced overhead resulting from economies of scale which may likely result in incentives to the local operation, e.g., free installation and operation of his/her local main SDI server by the main SDI service, i.e., as the operational overhead would be cost justified by the shared transaction fees of customer referrals and advertising space coming back to the main SDI service.

This architecture also may be useful and is ideally suited for cross vendor product advertising as through an ad network or product syndication network using affiliate links. In addition to the user profile generation module, a target object profile generation module should also reside across the network vendor servers such that it is possible to generate target object profiles for target objects on network vendor servers. Alternatively, user profiles and target object profiles are downloaded to the client level proxy which performs collaborative filtering tasks as the user browses from site to site.

In both of these cases, the main SDI server can receive user profile data generated from the user profile generation module located on the ISP-level proxy, and target object profiles generated from the target-object profile generation modules located on the various multiple information vendor servers.

12. Ancillary Systems

12.1 Support for Pseudonymous electronic mail

The ISP-level proxy server is positioned just behind the firewall of the user's local dial-up network (ISP or Intranet). The proxy provides protection for users operating under pseudonyms from point-to-point attacks and HTTP header-tracking by stripping HTTP header-information and forwarding HTTP packets on to their destination with no information other than their source at the ISP-level proxy server. The ISP-level proxy also supports pseudonymous e-mail, between users, and between users and vendors.

FIG. 2 shows a couple of users connected to clients, that are in turn connected to the Internet through a local intranet, such as the network of an Internet Service Provider (ISP).

The proxy "washes" outgoing messages of any information that would compromise a user's pseudonymity, for example the "referral" field that contains the previous URL of a user in a HTTP message. HTTP messages also leak other information, for example browser software on a user's client machine, the operating system and a user's IP address.

A user can receive electronic mail through the PID and associated IP address of the ISP-level proxy server.

The preferred implementation of this system allows the user to periodically check for new mail. The client-level proxy gains access to the mail box that is associated with a pseudonym by providing a correct response (signature) to an ISP-generated challenge. Notice that with this solution, the ISP-level proxy has no way to connect the pseudonyms of a user, so long as the user's client is not identified in its messages to the ISP-level proxy server other than by the PID that the proxy makes a request for.

We can extend this mechanism using a technique taught in the Lucent Personalized Web Assistant (LPWA). The LPWA [BGGMM 97; BGGMM98] provides for a sequential access mechanism to the mailboxes that belong to a user through a one-way function that takes the user's SDI log-in name and password, and an integer from 1 to N, and computes the mailbox location. The mail server does not need to maintain a list of pseudonyms for each user, because the user is able to efficiently access all of its mailboxes sequentially as a function of other information.

Another variation, that relies on the user placing trust in the ISP-level proxy server, provides the ISP-level proxy with the e-mail address for each pseudonym. This push method is more efficient, because the ISP proxy and the client proxy communicate only when new messages arrive, but provides the ISP proxy with information to compute all the pseudonyms for a single user-probably undesirable.

12.2 Support for Pseudonymous Physical Mail

12.2.1 Vendor to User

A vendor must hold a "physical mail certificate" to be able to send mail (packages, letters) to a user under a pseudonym. The certificate is similar to the "electronic mail certificate", in that it is signed by the private key of the user's pseudonym, and indicates that the vendor with public key $P*V$ can send mail to the user (under the pseudonym).

Each user has a trusted physical address authority, just as it has a trusted electronic mail authority (the second-level proxy server), that maintains the physical mailing address for each pseudonym. When a vendor has a letter X to mail to user with public key PKP, the vendor generates a unique ID for the package, IDX, and sends the ID code and the physical mail certificate to the trusted physical address authority of the user.

The physical address authority receives the certificate, $S((PKP, PK*V, SEND\_MAIL), SKP)$, that indicates that the vendor is authorized to send mail to the pseudonym, and the packages identify code, signed by the vendor to certify that the vendor holds the secret key that matches the public key in the physical mail certificate.

The vendor then passes the letter X and the signed ID code to a trusted mailer, that supports pseudonymous mailing, and has been certified by the central SDI server as such. The trusted mailer then provides the signed ID code to the physical address authority, signed with the private key of the trusted mailer. The physical address authority verifies that the trusted mailer is a valid service, and releases the real address of the user to the mailer. The mailer now has the letter X that the vendor wants to send to the user with pseudonym P, and the physical mailing address of the user—and the package can be mailed. At not time did the vendor determine the true mailing address of the user, unless it works in collusion with the trusted mailer, but the trusted mailer is certified by SDI, and also audited by the chosen physical address authority of the user. The address authority will only release addresses to reputable pseudonymous physical mail agents.

We can operate physical mailing lists in the same way, and gain additional security by never releasing the pseudonyms or the mailing addresses to the vendor that has requested the targeted solicitations. We can use a technique that is similar to the technique that we used for virtual mailing lists. The vendor describes its solicitation to the central Secure Data Interchange, which leverages as much data as possible (without violating the privacy policies of any of the users or vendors that are represented within the data). The central SDI server generates a list of suitable pseudonyms, and then provides a series of unique codes to the vendor, that the vendor can supply to its chosen pseudonymous mailer with the material that is to be mailed. The central SDI server also provides the appropriate address authorities with authorization to release the physical mail addresses to the mailer when presented with the IDs. Notice that at no stage did the vendor have the pseudonyms or the mailing addresses. The parties all have only as much information as is necessary—the vendor needs someway to identify its packages to the pseudonymous mailer. The mailer needs an identifier to present to the address authority, and receives the addresses. The address authority just needs to know what addresses to release and to which third party.

12.2.2 User to Vendor Mail

The Secure Data Interchange system also provides a mechanism for users to send physical mail to vendors that are registered with SDI with pseudonymous return addresses. In particular, when a user sends mail to a vendor, the first-level proxy server provides a tool that: (1) Computes/Looks-up the appropriate pseudonym for the user with this vendor. (2) Generates a unique ID, and submits a signed message to the central SDI-server, where the message relates the pseudonym, the vendor, and the ID. (3) Provides the unique ID to the user.

The user writes the unique ID on the envelope, and mails it to the vendor. Should the vendor wish to reply to the user, then the vendor can take the envelope to a pseudonymous mailer, and request that the envelope be mailed appropriately. The pseudonymous mailer verifies the identity of the vendor, and then submits the ID, together with the vendor's signature, and its own signature, to the physical address authority that is maintained by SDI. SDI releases the address to the mailer that can then return the mail.

12.3 Pseudonymous Payment Mechanisms

The Secure Data Interchange architecture must be able to support all the standard electronic commerce functions that we take for granted, but while maintaining pseudonymity for users and following privacy policies. There are various different solutions to this problem.

12.3.1 Anonymous Credit Card Payment [LMP 94]

The second-level proxy server can maintain information on the user's credit card information, and perform the following transaction. Whenever a user makes a purchase from a vendor, the user provides the vendor with authorization to bill $x to his/her credit card account, but anonymously—through the Secure Data Interchange as a middleman. The user generates a unique number, Y, and signs a "right to payment" message, M=($x, PKP, PKV, Y), that gives the vendor the right to make a claim for payment of $x from the Secure Data Interchange. The first-level proxy server registers the unique number Y with the second-level proxy server to ensure that the vendor does not spend the money twice, and provides the proxy server with authorization to charge $x to his/her credit card when the request for payment is presented.

When the vendor submits its "right to payment" and proof of identity to the second-level proxy server the proxy server first runs the charge through the user's credit card, and if that clears, runs the charge from the vendor through the account of SDI (which could also be a credit card, or could be operated as electronic cash or some other mechanism for payment).

This "anonymous credit card" payment method has the following properties:

The user's credit card pays $x, but does not know who receives the money except that it is going to the Secure Data Interchange.

The vendor receives payment for $x, but does not know the user's credit card information, or the user's identity.

The Secure Data Interchange incurs no financial risk because it receives payment from the user before making payment to the vendor, although there could still be problems if the user complains about the quality of the good for example.

This protocol is simpler than full cryptographic anonymous credit card mechanisms because the SDI acts as a trusted third party to both the user and the vendor.

12.3.2 Electronic Cash

[Chaum 85; Chaum 92]

Electronic cash is anonymous, just like physical cash. The user purchases electronic cash from an electronic bank, presenting blinded notes, so that the bank has no record of the note numbers that it issues to the user. For example, the user generates a new note number, X, and has the bank sign a blinded copy with its $10 signature, S(B(X), SKBANK$10). Then the user, or the first-level proxy for the user, removes the blinding factor, and can use the electronic cash as tender. Whenever the note changes hands the recipient needs to check with the bank that it has not yet been spent, because notes are easily copied, but not forged.

Electronic cash has the same useful properties as anonymous credit cards, although it is perhaps a little more exotic. In particular, notice that the bank does not know to whom, or for what, payment has been made. and the vendor does not know which user made the payment—it just receives the payment. We have minimized the amount of information exchange that takes place between the various parties in the system.

12.4 Client-Side SDI Proxy

The client-level SDI proxy, implemented as a client program running on the user's client machine, manages all data transfer between the client machine (and the user), and other vendors and the central SDI data warehouse. A key function of the client-level proxy is to implement profile management for a user, to control the ability of agents to track a user as he/she interacts with multiple vendors. The client-level proxy also controls release of profile information: the addition of demographic and other personal information to profiles, and the control of random perturbation to fields to prevent linking across user profiles.

The client-level proxy maintains profile information for a user's collection of pseudonyms, and allows the user to view and challenge profile information. The proxy also provides a rule-based interface to allow a user to select appropriate privacy/personalization policies.

The primary mechanism that protects the identity of a user across multiple vendors and service providers is the ability to interact pseudonymously with vendors. The user can choose a unique pseudonym for each third party with which he/she interacts, and be absolutely certain that he/she is the only party that knows his/her true identity. There is no way that a vendor can know anything about the transactions that a user has had with other vendors under alternate pseudonyms unless the user chooses to disclose the equivalence of pseudonyms, or use the same pseudonym across multiple vendors.

13. Modes of use of SDI

It is useful to distinguish three key modes of use of the Secure Data Interchange system:

Static data-mining. Query execution with no dynamic requests for new information from information providing agents.

Interactive data-mining. Query execution that includes dynamic attempts to request additional information from information providing agents.

Client-side data-mining. Query execution that is performed on the local client machine of an agent, based on data stored exclusively on that machine.

All three modes may use distributed information, i.e. it is possible that the information is stored in the central SDI database, or on distributed client-side information servers, or in third-party servers. The first 'static' case and the second 'interactive' case are distinguished from the third 'client-side' case in that the query execution is performed centrally in the SDI data warehouse in the former, and on an agent's client machine itself in the latter. Client-side data mining has particular application to privacy-protected customization of information and services in on-line business-to-consumer applications.

1. Static Data Mining

In static data mining queries are executed on the information that is currently present in the SDI data warehouse, and there is no opportunity to contact agents and request more information. Applications of this type of static data mining include all types of "standard" database queries, where it is assumed that the data set is static. Queries may be open-ended, i.e. "find me all data records of this type, and perform the following operations." or closed, i.e. "perform the following query on the data record for agent with pseudonym P1". Queries may also have side-effects, i.e. "find all records that satisfy this constraint, and then take action A".

2. Interactive Data Mining

In interactive data mining multiple agents may be contacted by the system of Secure Data Interchange in the process of executing a query, to request new information from agents, or push information to agents. A central application of this mode of data mining is matchmaking, which is a process where information flows between agents if and only if both the profiles of both agents are mutually compatible. In interactive data mining the querying agent does not need to know the identities of agents that are contacted by SDI, this is all transparent, and hidden from the querying agent.

3. Client-Side Data Mining

In client-side data mining the querying agent executes a query with the information associated with a specific agent, and the information remains located on that agent's client machine throughout the query. The query is executed by providing the query method to the client machine, processing the method with local information, and then returning a response or taking an appropriate action (e.g. displaying product X for price Y). A central application of client-side data mining is to privacy-protected customization, where a vendor wishes to customize its products and services for a particular agent that is registered with SDI, and take advantage of personal information relating to that agent that is not generally available. As another application, we describe a client-side advertising auction, where advertisers compete for the right to display a banner advert to a user, based on local information about the user's preferences.

4. Applications: Very Brief Overview

In the next section of the SDI description we describe some specific variations and systems that can be implemented within the general architecture. In overview, we describe the following key applications:

Safe user profiling and personalization. This allows on-line users to receive personalized information and services without providing personal information to vendors, so that users retain control over their personal information. Users can interact with vendors under different pseudonyms, and provide information to the central SDI data warehouse to allow data mining. Finally, users can allow specific vendors to execute queries, where the result of the query is information that allows that vendor to customize its service.

Client-side user profiling. The client-side SDI proxy can monitor the browsing behavior of a user, and submit data periodically to the central SDI data warehouse with appropriate meta information to provide the user with guarantees about the type of information that can be released to vendors during query execution.

Static Data mining applications. Agents can submit queries to the data warehouse query-execution module and perform data mining and collaborative filtering on aggregated and anonymous information provided by data submitted to the warehouse by agents.

Interactive data mining applications. Agents can request actions from the SDI system if certain conditions are found to exist in information, for example SDI can send information to other agents about services or products, if good matches are found. Another example is a request that a certain number of agents with particular properties be contacted and asked to take a particular action, we give an example within a transportation domain.

Pro-active data mining. The system of SDI might itself pro-actively execute data mining queries, and index and classify certain types of data to allow more efficient future query execution, and to also suggest useful information to its client agents. The answers to popular queries can be priced and cached, so that providing agents receive value whenever an answer is sold to another agent. The system of SDI might advertise a set of queries to allow vendors to select pre-computed results.

Matchmaking applications. We described in the top-level description of SDI a technique to implement "persistent queries", which reside on the central data warehouse's query execution module, and are triggered whenever the correct conditions exist in the data base. One typical use of such a query is to say "introduce me to other users with property P", such that the system introduces user A_1 with user A_2 if A_1 has the property required by A_2 and also A_2 has the property required by A_1. This is equivalent to "introduction by mutual consent", and is possible within SDI without information leakage, because the only agents that are informed of a match are the agents with the correct properties. Applications exist to finding a business partner, funding a new start-up (incubator Co.), forming an interest group, n-way negotiation, introducer system (by mutual consent).

13.1. Static Data Mining Applications

This section describes specific applications of SDI-based static data mining. A central example is collaborative filtering and personalization applications in electronic commerce, where consumers and vendors provide information to SDI, and the information can be queried within the price and data-access rules placed with the data by owners of the information. We refer to the variation of SDI with consumer profile information as the "iamworthit" system, because users can place profile information in a shared database and receive payments in return for queries performed by vendors. Vendors can use the profile information to build better customization models, and provide customized products to customers based on their profiles and what has worked with other customers with a similar profile.

We limit our attention in this section to "static" datamining, which as defined in the mid-level SDI description allows agents to query the data, but without contacting the agents to request more information. All queries are performed on the basis of the information already submitted to the database, and the rules associated with that information. Within the set of static queries, we do allow a vendor to identify a specific agent within a query command, so that if a user provides an identifier to a vendor then the vendor can query the database with its collaborative filtering model and determine an appropriate action to take. It is possible to request an action as the result of a query, for example "send message X to all users with profile information Y", so long as this message is not contingent on as yet unknown information about the user. We describe specific examples, for example to a smartbrowsing system, an education portal, and an advertising network. One of the core purposes of SDI is to provide a common location and format for information that has been gathered from a wide variety of sources and that might require different sorts of analysis. Since its framework is designed to handle different types of data and algorithms, SDI can be used as a platform to explore and exploit the rich connections that potentially exist within and across the databases of different vendors and customers. The system is designed to allow vendors to execute queries over profile information provided by multiple agents, and ensure that all queries are consistent with the policies outline by agents as information is first submitted. The central SDI server can also support cross-vendor and single-vendor personalization tools, such as multi-attribute collaborative filtering techniques. The queries can be executed to enhance a vendor's model, without providing the raw data to a vendor. A vendor's model can be enhanced without explicitly revealing any information about user profiles. The SDI server ensures the integrity of data, and prevents data being used for unauthorized purposes. A query will receive access to data as permitted by certificates presented by the querying agent, and to the extent that the querying agent is willing to make payments defined in the price-access rules associated with the data. As discussed in the top-level SDI description, the query-execution module implements an internal market with the data, and executes an agent (i.e. a vendor's) query as cheaply and efficiently as possible.

13.1.1 Statistical Techniques for Multi-dataset Collaborative Filtering

This section describes a statistical method for cross vendor and cross data-set collaborative filtering. The example considers particular types of data and analytical methods and suggests forms of validation that can be made available within SDI.

In describing this system, we show how the Secure Data Interchange architecture can integrate the architecture issued U.S. Pat. No. 5,754,939 "System for Customized Identification of Desirable Objects" into a system for secure data exchange between multiple parties. The aforementioned patent teaches a method for profiling objects and users over a bi-directional distributed network, such as: an ISP, multiple ISP networks, a Web hosting network, or server software (such as data mining or recommender software) that is linked to a coalition of sites (such as a portal or Internet mall).

The current invention, the system of Secure Data Interchange, allows correlations to be identified between vendor's data sets, that allows accurate profiling through the application of statistical methods, without providing vendors with explicit access to the profiles of users—because profiles are provided in anonymized and randomized forms. There are less efficient methods that can be used to identify correlations, for example using customer demographics, and vendor categories, to suggest which vendors might be well placed to form dynamic syndication relationships. With SDI it is possible to leverage as many data sources as are available, about users and the target objects with which they interact. In fact the degree of the measure of improvement in predicting user behavior (or increasing click through) is approximately in direct proportion to the square root of the number of user profiles and target profile interest summaries which are known. The emphasis in the aforementioned patent is on the bilateral relationships between vendors and users, and the architecture is not designed to support secure and privacy-protected data interchange and analysis across the user bases of different vendors.

In the system for SDI we push control of the profile for each user to the client software that runs on the machine local to the user, and provide for personalization through dynamic processing of information on the user's client machine. Similarly, we enable vendors to exchange data sets only to the degree that is mandated by users, and provide technical solutions to enable significant leverage of data while maintaining user privacy.

The supporting architecture as stated in the above referenced patent also allows for profiling statistics to be collected and processed in a distributed manner. In the present invention the profile generation capabilities can be implemented at various levels, depending on where profile information is physically located. As described earlier, the central SDI data warehouse can be nothing more than a "virtual" database, with multiple links to data that physically resides on client machines that belong to users and vendors.

To enable useful cross-vendor profiling, vendors can submit web pages that are tagged with profiles of target objects, user quality ratings based upon overall quality as well as other criteria (e.g., value, price, entertaining, informative graphic/visual appeal, etc.), location data (for target objects representing physical or geographical items), etc. User information, in addition to profiles, can include data mining and trend analysis statistics, and user provided ratings for target objects.

As previously described in this patent, various conditions can be placed on the way in which a set of data may be used (i.e., can the user make a personal copy of the dataset?), as well as on the privacy controls put in place. It might well be that a vendor or a user is willing to share only a portion of his database, or that he will release only randomized data in accordance with the level of privacy he has guaranteed his customers. Although such restrictions could impact the content of the data analyzed by a vendor, as long as it is kept in an SDI-compliant format it can be analyzed by SDI's suite of tools.

The data that is stored in the central SDI server has tight usage restrictions. For example, the user will have specified (via a price-policy) that data can only be used by querying agents that are able to present certain types of certificates, only anonymously, etc. The central data warehouse maximizes the value of data by analyzing conditions and supporting queries with the cheapest possible price rules.

The information that is stored in the central SDI data warehouse can be provided by users, via their SDI client-level proxy agents, and relating to their own individual purchasing and buying habits. Alternatively, the data might be provided by vendors, and relate to what information that vendor decides to release about its customer base—and in agreement with stated practices that the vendor follows about the information that it collects on its customers.

It is not necessary for data records to physically reside on the central SDI data warehouse. A vendor may provide links to data, and use a locally secured query-execution module to carefully control queries of the data. For our current purposes we assume a uniform data access model, where although both data and algorithms might reside either at vendors' home locations or within the SDI system itself, the general analysis works transparently across these boundaries.

For security reasons, the contents of databases may be injected with a small amount of noise. This prevents database users from surreptitiously connecting database records to individual customers, yet maintains the quality of inferences made about the database in general. This is described earlier, as noise-perturbed data release. Although such "noisy" records don't pose too much of a problem for those methods that make generalized inferences, it should be noted that recommendations made for individual customer vectors that have undergone such randomization will be less useful, since predictions are being made for a noisy target.

A final consideration is the reduction of the data vectors' dimensionality (which can be extremely high), since it is harder to make clean inferences about sparse data. There are many standard methods that can be used to achieve this, such as Principal Components Analysis. Another approach is to adjust the granularity of the data, if at all possible. In a music store analysis, for example, there might be many more album titles that artists (since each artist can produce multiple albums). In such a case, purchases could be recorded by artist rather than by album, greatly reducing the dimension of the customer vectors' purchase space.

13.1.1.1 Data Structure

In this application there are many types of information which can characterize both users and items. SDI is intended to function as the intermediary between a vast web of vendors, on the one hand, and individual consumers, on the other hand. Major sources of data include:

1) Demographic. Such data will most likely be elicited by SDI from vendors and consumers when they initially register for the service, and details very general characteristics about them. It will consist of numbers and categorical values (age, zip code, sex, level of education, etc.).
2) Commercial. This is the kind of data any that vendor collects in the course of doing business (especially e-commerce); generally, it links customer codes to purchase items, dates, quantities, and prices. Depending on the nature of the business, this data could be fairly complex, and might well include text. For example, one could imagine that a bookstore, in addition to keeping track of its sales history, collects book reviews, author profiles, and plot summaries.
3) Behavioral (vis-à-vis the Internet). A user's client-side SDI proxy can monitor his/her browsing behavior on the World Wide Web, monitoring the pages a user hits, the click stream and content requested, etc. Click stream information can be useful, for example, because it can indicate a user's interest in the information that it is presented with.

We assume that vendors and/or a third-party annotate web pages with tags, that provide a commentary of a web page and allow meaning to derived from a user's browsing behavior.

The mere presence of such tags allows for correlations to be drawn between different web pages (e.g., a common Extensible Meta Language (XML) tag used by travel-related sites), because it implies similarity. Furthermore, it is conceivable that such tags could encode more refined measures of a web page's content, such as browsers' evaluations of its value. For example, a web page of interest to scale modelers, in addition to having images and text related to model trains, might have an XML tag that shows that other scale modelers have given the web site a "five-star" rating. This page should therefore be given a greater weight when SDI is used to create correlations of interest to model hobbyists.

In what follows, we assume that SDI contains data of the following types:

1) Numerical (e.g. an age, price, or period of time).
2) Categorical (e.g. a color or musical genre).
3) Text.

We describe a mathematical model for computing useful collaborative filtering queries across heterogeneous data records, such as the data stored within the central SDI data warehouse. Throughout, we present only the basic mathematical model. In implementation the query would be formulated in a general-purpose language, for example Java, and executed in the central SDI data warehouse subject to the conditions on access to data as expressing users price-access rules.

13.1.1.2 Computing Correlations Between Data Points

A common task for SDI is to compare and correlate different customers, which might well be represented by mixed collections of numbers, categories, and blocks of text. This is handled by treating each customer c; as a vector in a space whose coordinates correspond to the fields of data available. In the following description we refer to a customer, but when a user interacts with a vendor under a pseudonym, the profile information will only relate to information provided to the central SDI server for that pseudonym.

If there are m numerical pieces of data available, there will be n corresponding $$\sum_{i=1}^{n} n_i$$

coordinates in the data space, $(x_1, \ldots, x_m)$.

For each category i, there will be a corresponding number of values, $n_i$. Hence, for a color category {red, white, blue}, $n_{color}=3$. Since each value is assigned its own coordinate, category i is represented as an $n_i$ dimensional vector, $y_i$. Hence, the total number of dimensions used to describe the full set of n categories $(y_1, \ldots, y_n)$ is Note that sparse methods are especially useful here, since a categorical vector $y_i$ will typically consist of mostly zeroes, with a single non-zero coordinate representing the categories' value (i.e., we encode the color red, using the previous example, as (1,0,0)). Note also that category vectors with different values are treated as orthogonal by the system.

A final issue is the representation of text. As described in previous related patents, all relevant blocks of text in the database are converted into a dictionary that maps unique strings to the number of times they appear in the database. An appropriate TF/IDF weighting function is chosen and calculated for each of the p words that appear in the dictionary. The full set of text connected to a single customer can thus be represented as the vector $(z_1, \ldots z_p)$, where each zi equals the number of times the word i appears in text related to the particular customer multiplied by the TF/IDF score assigned to word i.

In summary, when a database describes its customers using a combination of numerical values, categories, and text, customer i can be represented by the vector $c_i=(x_1, \ldots, x_n, y_1, \ldots, y_m, z_1, \ldots, z_p)$.

13.1.1.3 An Example Profile Vector

Suppose we have a database containing information on customers' ages, their musical preferences (i.e. an answer to a survey asking: "Which do you prefer, Mozart or the Beatles?"), and the contents of the emails they've written. Furthermore, suppose the only salient variables in all the emails written consist of the words $$TF/IDF(x) = 1/\sqrt{n_x}$$

"Beatles", "Mozart", and "practice", and that we are using the function

Where nx represents the number of times word x appears in the dictionary. We now want to represent one of the customers in the database; he's a 10-year-old boy who prefers Mozart to the Beatles, and who wrote an email to his friend that mostly describes his attempts at practicing Mozart, but in passing mentions his sister's new Beatles CD. Suppose he uses the word Mozart 2 times (although it appears 456 times in the full database of all customers' emails), the word Beatles 1 time (appears 217 times in database), and the word practice 3 times (appears 77 times in database).

We define the following coordinates:

$x_1$=age=10

$y_1$={Mozart, Beatles}=(1,0)

$z_1$=# of times customer uses word "Beatles"×TF/IDF("Beatles")=1*0.067=0.067

$z_2$=# of times customer uses word "Mozart"×TF/IDF ("Mozart")=2*0.047=0.094

$z_3$=# of times customer uses word "practice"×TF/IDF("practice")=3*0.114=0.342

In our example, then, we might encode this boy as customer 1: $c_1=(x_1, y_1, z_1, z_2, z_3)=(10, 1, 0, 0.067, 0.094, 0.342)$ 13.1.1.4 Choosing an Appropriate Level of Data Granularity We define the term granularity to denote the level of detail available within a given set of data, which is often structured hierarchically. Suppose a grocery store database contains records for a box of flavored gelatin powder. This could be categorized in a variety of ways; moving from the most specific to the most general, we might treat this data point as "12.5 ounce, strawberry flavor, Jello-brand gelatin dessert" (which would be entirely different from "12.5 ounce, banana flavor, Jello-brand gelatin dessert"), or as "12.5 ounce Jello gelatin" (a categorization which would treat as identical the strawberry and banana Jellos), or as "flavored gelatin", or as "dessert", or as "food", or as "grocery".

When analysis is performed on such data, the level of granularity chosen will have a strong effect on the outcome of the analysis. If the level of granularity is too fine-grained, the data will be too sparse, although it could be potentially aggregated to the next highest level of granularity. If the granularity is too coarse, the results of the analysis might be overly general (e.g., a customer would find a collaborative filter useless if the only recommendation it makes for a dessert choice is "go to the grocery section of the store").

Since the level of granularity will have a salient effect on the outcome of an analysis, it should be chosen very carefully, and might well play a factor in pricing when a vendor chooses to sell its data.

13.1.1.5 Statistical Methods for Data Analysis

In order to perform a wide range of analytical tasks, SDI needs to make use of a variety of computational approaches. These are described below, starting with the simplest methods first.

(1) Standard Database Searches

Since most of the data will be stored in centralized databases, simple searches, queries, and data filters can be implemented by means of standard SQL commands. Typically, data will be collected or sorted using efficient database calls before being fed through analysis routines; once complete, the results can be fed back out to the database environment for further efficient manipulation.

(2) Metrics—Measuring the Similarity Between Profile Vectors

Given two customer (or vendor) profiles, $c_i$ and $c_j$, it is frequently desirable to know how similar they are. For this purpose, we define the similarity metric $M(c_i, c_j)$ to be a function that takes as input two customer vectors and returns as output a numerical value in the range [0,1]. When two customers $c_i$ and $c_j$ are identical, $M(c_i, c_j)=1$; when they're completely different, $M(c_i, c_j)=0$.

The problem is somewhat simplified by the fact that we treat all customers as vectors.

$$M(A, B) = \cos\theta = \frac{A \cdot B}{\|A\| \cdot \|B\|}$$

Given two customer vectors, we can use the correlation between them to serve as our metric:

Note that θ here represents the angle between the vectors A and B, and that we expect all coordinates of the vectors to be positive (in order for M(A,B) to keep its output in the range [0,1]).

In more complicated cases, however, a customer vector might contain multiple fields with varying ranges of values. For example, we might have customer vectors of the form $c_i=(age_i, income_i)$, in which the maximum age is 80, but the maximum income is 300,000. In such cases, the coordinates with larger values will dominate the similarity metric, overwhelming any influence that smaller fields might have.

This requires a normalization of the customer vectors, which can be done in several different ways. One approach would be to scale every coordinate by the maximum observed value, forcing all coordinates to lie between 0 and 1 (again, enforcing the rule that all coordinates must be positive).

$$c_i = \left( \frac{age_i}{\max(age)}, \frac{income_i}{\max(income)} \right)$$

The only problem with this is that if a coordinate's maximum value is an outlier (being vastly bigger than the typical value), most of the coordinates' values will seem unusually small once they are scaled by the maximum. In such cases, it might be better to scale the values with a "squashing" function such as the sigmoid, which deadens the impact of extreme values; one such configuration would be the following:

$$\overline{age_i} = \frac{age_i - \text{mean}(age)}{\sigma_{age}}$$

$$\overline{income_i} = \frac{income_i - \text{mean}(income)}{\sigma_{income}}$$

$$c_i = \left( \frac{e^{\overline{age_i}}}{1 + e^{\overline{age_i}}}, \frac{e^{\overline{income_i}}}{1 + e^{\overline{income_i}}} \right)$$

Note that the mean and variance of the data points are used to fully normalize them, such that the sigmoid function will spread the values somewhat more evenly between zero and one.

The previous approaches are especially useful for single numerical fields, which might well overwhelm each other if some sort of normalization isn't performed.

A different problem arises for text or large categorical fields, since they can potentially consist of hundreds of coordinates capable of overwhelming the influence of single numerical fields. Suppose we believe the age of a customer is as important as the text of articles read. In such a situation, the thousands of coordinates devoted to the text field would dominate the metric's behavior, negating any influence that age would have on our measure of similarity—clearly not a good situation.

A solution to this would be to find the correlations among the fields taken separately, then average the result. That is, if each customer $c_i = (age_i, text_i)$, where $text_i$ is a vector with a very high number of dimensions, we could define the metric:

$$M(c_i, c_j) = \left( \frac{\text{corr}(age_i, age_j) + \text{corr}(text_i, text_j)}{2} \right)$$

Where $$\text{corr}(c_i, c_j) = \frac{c_i \cdot c_j}{\|c_i\| \cdot \|c_j\|}$$

The result is a metric that gives equal influence to each field.

(3) Forming Vectors Into Groups

The process of classification is essential to collaborative filtering, as it allows different vectors to be formed into groups based on some measure of similarity. If we are able to create groups of customer vectors, for example, we can then give individual customers recommendations based on the patterns of their group-mates, who presumably have similar tastes.

K-means Clustering and Nearest Neighbor algorithms are extremely useful for grouping purposes: previous iReactor patents give a full and detailed description of our customized versions. This section gives a brief overview of these methods.

(3.1) Clustering

K-means Clustering is an algorithm used to partition a coordinate space such that all vectors in a given partition are more similar to that partition's vector average (the centroid), than to the centroids of any other partition. It is a process that iterates over the following steps:

0. "Seed" the coordinate space with the initial centroids, which are vectors used to describe the centers of the clusters, in the sense that they are the average of all the vectors currently assigned to the partition. This can be done randomly (assigning centroids random coordinates) if no other information is available, or it can be guided by pre-existing information. For example, if we wish to cluster vectors of music customers, we can use information about musical genres to create initial partitions that correspond to pop, gospel, classical, etc. This will locate the centroids in well-spaced intervals across the coordinate space.

1. Assign vectors to the most similar centroids. This is done for each vector by scanning across all centroids and calculating similarity $M(\text{vector}, \text{centroid}_i)$; once finished, the vector is assigned to the cluster whose centroid has the greatest similarity. In this stage, vectors may switch their allegiance from one centroid to another, if the relative distances to the vector have changed sufficiently since the previous iteration. If no vectors change their allegiance, the iteration process is complete, and the algorithm stops.

2. If the iteration is not complete, recalculate the centroids by setting them equal to the average of those vectors that have been assigned to them. Go back to step 1.

Once the algorithm converges, the vectors are grouped into clusters. The centroids' coordinates as well as the identity of cluster members is useful information that can be passed on to subsequent stages of analysis.

(3.2) Nearest Neighbor

The nearest neighbor algorithm, simply stated, creates a list of those vectors in a database that most resemble a particular target vector. This is accomplished by comparing the target vector, in turn, to every other vector in the database; the similarity between them is recorded, and once the comparison loop is complete the list of similarities is sorted. The top k members of this list are returned as representing those k vectors which most resemble the target.

(4) Generalizing Across Databases

One of the most useful aspects of SDI is that it allows for inferences to be drawn across different databases through underlying connections in membership or content. An especially strong link can be made between commercial databases if they have customers in common. However, for reasons of privacy, individual customers may choose to use different pseudonyms when dealing with different vendors. This might be preferred by the individuals, but it weakens the inferences that can be made between fields occurring in different databases.

The techniques chosen to infer correlations across different databases will depend on how many pseudonyms are shared in common. At one end of the spectrum, every customer uses a single pseudonym for all transactions, and makes an appearance in every database. At the opposite end of the spectrum, every customer uses a different pseudonym with every vendor, and may appear in only a single database.

Case 1: All customers use a single pseudonym, and appear in all databases considered.

This is the simplest situation to handle. Since all customers appear in all the databases, the customer vectors' fields are essentially scattered across several locations, but can be easily reconstructed. For each customer, we define a new data vector that concatenates that customer's representation from across the different databases.

Hence, if we are considering databases A, B, . . . , Z, and customer i appears in each one, we define a new vector $c_i = (c_{Ai}, c_{Bi}, \ldots, c_{Zi})$, where $c_{Ai}$ is customer i's vector in database A. We then proceed as usual, making inferences with these augmented customer vectors.

Case 2: Most customers use a unique pseudonym, and frequently appear in different databases.

In this situation, although we see some connections between the databases, many pseudonyms appear in only a single location. Using Bayesian techniques, however, we can still make predictions for customer vectors across databases.

Suppose we have a set of databases, A, B, ..., Z. Taking each database in turn, we cluster it using all available data. Thus, using every record in database A, we group A's customers into clusters $A_1, A_2, \ldots, A_n$. Taking database B, we create clusters using all of B's information, creating customer clusters $B_1, B2, \ldots, B_m$, and so forth.

Now, scan both databases for common pseudonyms (representing those customers who have interacted with both vendors under the same pseudonym) and create count variables $w_{ij}$ to represent the number of pseudonyms that appear jointly in $A_i$ and $B_j$.

We can now produce the probability that a pseudonym appearing in $A_i$ will appear in $B_j$:

$$P(B_j \mid A_i) = \frac{P(B_j \wedge A_i)}{P(A_i)} = \frac{w_{ij}/\text{total}}{\sum_{j=1}^{m} w_{ij}/\text{total}}$$

$$\text{total} = \sum_{i=1}^{n} \sum_{j=1}^{m} w_{ij}$$

For example, if we have a database of airline ticket purchases and a database of restaurant visits, we can create clusters, in the first case, of customers who travel to similar destinations, and in the second case, of customers who eat at similar restaurants. Given that a particular customer belongs to a cluster of people who frequent Caribbean restaurants, we can infer which travel packages would most appeal to him based on the linking probabilities, as defined above.

Multivariate Extensions:

If we have a third database C, and there are a large number of pseudonyms common to A, B, C, the above probabilities can easily be extended. For example, knowing that a customer appears in $A_i$ and $B_j$, we can calculate the linking probabilities to any $C_k$:

$$P(C_k \mid A_i \wedge B_j) = \frac{P(A_i \wedge B_j \wedge C_k)}{P(A_i \wedge B_j)} = \frac{w_{ijk}/\text{total}}{\sum_{k=1}^{p} w_{ijk}/\text{total}}$$

$$\text{total} = \sum_{k=1}^{p} \sum_{i=1}^{n} \sum_{j=1}^{m} w_{ij}$$

Or, if there aren't many pseudonyms that span all three databases, the probability of $C_k$ given that a pseudonym exists in $A_i$ and $B_j$ could be approximated by:

$$P(C_k|A_i \char`\^ B_j) = P(C_k|A_i) \cdot P(C_k|B_j)$$

Case 3: All customers use several pseudonyms, and none appear in different databases In this situation, there are no common customer codes that can be used to create links across the databases. However, the mere fact that several databases have been brought together for analysis should imply that there are semantic commonalities in the data.

Although each database contains different fields, it may be the case that those fields deal with related subjects. A human expert, knowledgeable in the content of the databases, the subtleties of the domain, and the overall goal of the analysis (e.g. the creation of recommendations), will be in a position to create a "common-information profile" that spans the databases. In essence, the common-information profile defines a format that allows vectors from different databases to share a common coordinate space.

The idea is this: the expert designs a high-level vector format that embodies the content deemed important for the project goals. Next, for each database he develops a mapping that encodes the database's elements into the generic format. Finally, the desired analysis is performed on the full set of common-information profiles.

Although the expert will have to create completely new fields for the common-information profile, certain types of data will map directly to the common-information format. In particular, if every database contains text (catalogued and counted, for TF/IDF purposes, by accompanying dictionaries), the union of the words will define the text coordinates of the new common-information profile. When word counts are being mapped from their original databases to the new vector, the original TF/IDF weightings may be used, or new TF/IDF weightings may be created (using a dictionary constructed from all the databases' text taken together).

Once analysis has been performed, certain common-information profiles will be grouped together by their shared similarities, although the pseudonyms they represent may have been originally drawn from different databases. Such groups will represent links between different databases, and may be used for predictive purposes (see end of example).

13.1.1.6 Example of Cross-database Analysis

In this example, suppose that the central SDI data warehouse contains data submitted by the following vendors:

A. A travel agency keeps track of tickets sold, and vacation web pages browsed.

B. A bookstore keeps track of books sold, and stores an electronic version of the New York Times Review of Books.

C. A sporting-goods and clothing shop, keeps track of purchase items sold (which includes magazines, for which electronic text exists).

A certain airline wants to promote various vacation packages it has available, which include both European and Caribbean vacations, as well as singles and family packages. Although it has leased rights to databases A, B, and C, it turns out that no customer pseudonyms appear in more than one database at a time—in other words, there are no shared records.

A vacation expert is hired to create a common-information profile. He creates the following information vector: (list of tropical countries, list of European countries, family score, list of sports, text)

Note that the family score is a numerical value ranging from 1 (young singles) to 10 (many small children), and indicates what kind of person the customer is (a party-oriented student vs. a sedate father of three).

The expert then creates the following mappings:
- A. Travel Agency. Link destinations of tickets sold to country fields (i.e., the number of trips to Germany by a customer would be placed in the Germany field of the common-information profile). Link sales of children's tickets, or requests for children's meals, to family score. Put web-page data into text field.
- B. Bookstore. Link travel books' text to country lists. For all books purchased by a customer, map text from book reviews into text field.
- C. Sporting-Goods store. Map warm-weather clothing (and swim gear) to tropical countries, ski gear to countries with skiing areas. Map sales of toys or children's clothing to high-value family scores, map revealing-bikini and student-discount sales to low-value family scores. Map text from magazines purchased by a customer to text field.

These mappings are then applied to each database, generating a full set of common information profiles. These are then clustered, forming groups that share commonalities.

The expert can now do several things with the results. First of all, he identifies the general "flavor" of each cluster (e.g., families with small children that enjoy winter, Europe, and skiing); the pseudonyms contained within each cluster can then be targeted for vacation packages suitable to their tastes. Secondly, the fact that pseudonyms from different databases have been clustered together allows the expert to plan cross-category marketing. If certain travel-book-buying parents have been grouped together with parents who bought their children swimsuits and scuba toys, it may be that they share a preference for family activities that take place in warm places or by the seashore. Hence, the book-users might be advertised various ocean-related sports goods appropriate for young families, and likewise the swimsuit-users might enjoy getting recommendations for travel books that describe tropical destinations that are especially fun for children. That is, if the goal is to cross-market items from A to customers in C, the most logical source of recommendations would be the people in A who have been grouped with the people in C.

13.1.1.7 Methods for Validation

To a large degree, the overall success of an SDI analysis is the relevance of the connections that are inferred from the data. It is often the case that a certain amount of validation is required to determine which analytical approaches are the most successful, given that the analyst has had to choose a particular combination from a wide range of algorithms, data sets, levels of granularity, and parameter settings. The process of validation measures the relative success of a given project, and is used to guide the analyst through further iterations of tuning and adjustment so as to optimize the final results of the analysis.

There are two general approaches, not necessarily mutually exclusive, to validation: the first is fairly quantitative, the second relies more on human expertise and intuition.

(1a) Quantitative Approaches—Test Against a Validation Set

Suggest the use of a human to infer the most relevant attributes influencing a particular output and the role of experimental design (as suggested) as a way of holding out part of the input data in order to validate the key relevancy of particular attributes. Principal components analysis is also implied in the last paragraph of 1-1.

The goal of validation, in this context, is to measure how successfully SDI makes a prediction, most commonly a recommendation. Before a recommendation system can be used commercially (when it is exposed to actual customers), it is important to make sure that it is using the best possible combination of algorithms, input data, and parameter settings (e.g. TF/IDF tuning). If several different combinations are under consideration, there is a need to gauge the relative predictive accuracy of one approach over another. This can be accomplished by holding out part of the data set, training the recommendation system on the remainder, then evaluating the strength of the recommendations made for the hold-out set.

Suppose we are testing two possible settings for a system that recommends music. We make a copy of the customer purchase records and remove a single purchase at random from each customer—this slightly reduced copy will serve as our training set. We then allow the two rival systems to recommend musical albums for each customer, based on the information in the training set alone. Typically, these recommendations will take the form of a list of items with corresponding numbers that indicate the strength of each recommendation. The relative performance of a set of recommendations can then be gauged by looping across each customer, noting whether or not the system recommended the item that had been held out, and if so adding it to a running total. The system with the highest total can thus be judged the most effective, since it most strongly recommended items that the customers did, in fact, end up purchasing.

Because the result of this type of validation is a quantitative score, it is possible to automate the model selection process. Given a set of analytical approaches (each with its own array of parameter settings), it is possible to loop through the full parameter space (using a grid of evenly spaced numerical values, if needed, to reduce dimensionality), computing a validation score at each iteration. Those combinations of algorithms and parameter settings that demonstrate the best performance could be chosen as the top candidates for the final system configuration, since they do the best job at predicting customer behaviors.

(1b) Quantitative Approaches—Dynamic Method

The problem with the hold-out approach to validation is that it isn't dynamic, since it doesn't reflect the impact that the recommendation system has on the customers once it is implemented, and may be based on data that doesn't contain current trends. After all, it is better to predict what the customer will buy rather than what the customer has bought in the past.

A better approach is to run a controlled experiment against the actual customer base. First, the pool of customers is split at random into different segments. Next, each approach under consideration is used exclusively to make predictions for a given segment. Once the trial period is over, each system is given a score based on how valuable its recommendations turned out to be (this could be measured by total sales generated, for example, or by the number of times a customer made use of a recommendation).

(2) Human Expert in the Loop

Although quantitative methods can automate the validation process to some degree, at the beginning of many projects there is so much raw input data available and so many decisions that have to be made about the analytical approach that an automated process would have to test a prohibitive number of combinations of data, algorithms, and parameter settings to get optimal results. In such cases, it is useful to employ a human expert who understands the psychology and nature of the particular domain being analyzed.

Such a person will have intuition about what is and isn't relevant for his domain. For example, a movie expert might be called in to work on a movie-recommendation system, for which an immense amount of input data is available. In choosing relevant fields for analysis, the expert's understanding of cinema would lead him to include the director's name and numbers of Oscars awarded, whereas the exact length (in minutes) of the movie would be, in his estimation, irrelevant and therefore excluded.

Once the analysis is complete and recommendations have been made, the expert's opinion (based on a qualitative understanding of the domain) can be used to guide which particular combination of settings, chosen from a list of candidates with detailed test outputs, should be used for the recommendation system.

(3) Combined Human/Quantitative Method

There is certainly no reason why both approaches couldn't be used in combination. Many data sets include fields that are extremely noisy or simply irrelevant to a given problem; a human expert can be employed to pare the data set down to a reasonable size and dimensionality, using his domain expertise to create a data model reasonable for the proposed analysis. Next, automated methods can be used to fine-tune the parameter settings and to choose which subsets of the input data are the most useful. Finally, the human analysts called back to qualitatively evaluate the results of the fine-tuning, making the decision to either start a new iteration of the analysis, or to certify that the process is complete and ready for commercial application.

13.1.2 The Iamworthit System

Iamworthit is an application of Secure Data Interchange to business-to-consumer (B2C) e-commerce, where individuals perform transactions on-line through interactions with the server machines of on-line vendors. Individuals interface with the servers of vendors via local user client machines, networked at present over the Internet, although this is not a necessary infrastructure for the invention.

Iamworthit allows individuals to receive payments for the information that is collected by an SDI client proxy and stored in the central SDI data warehouse, for data mining purposes. Iamworthit also allows individuals to receive payments in one-to-one interactions with vendors in return for providing vendors with information that allows them to make an appropriate offer. Secure data interchange supports the useful exchange of information between agents without allowing vendors to collect and distribute information about users without the knowledge or permission of users, as is possible now via the system of cookies and affiliate networks, such as that operated by www.doubleclick.com. In the system of Iamworthit vendors benefit through well-targeted advertising (both push and pull), the ability to customize information and services (even to first-time customers), and access to a large database of information about buyer purchasing habits. Individuals still release profile information to the central SDI database for the purposes of controlled access by vendors, and also provide vendors with profile information during interactions and allow vendors to execute queries on information and receive the benefits of personalization without directly accessing the information. Users can maintain multiple pseudonyms and profiles, but within SDI vendors can still access information across pseudonyms and use cross-web (broad) and single-vendor (deep) information to build robust models of buyer behavior. Buyers benefit through personalization with privacy, and financial rewards in return for releasing profile information.

Within B2C e-commerce, secure data interchange can also support a system of time-of-purchase competition, which allows an individual to use the profile management capability of SDI to provide vendors with information about a user at the time of purchase, and allow competing vendors to offer the same product at a better price, or a better product (for the user) at a good price. With time of purchase small entrants to the marketplace can make counteroffers to users that are about to purchase a product or service from another vendor, and can compete in small parts of the marketplace without investing heavily in advertising and brand awareness. Time-of-purchase requests can be made by user clients to iamworthit, to request that iamworthit cascades purchase requests onto other vendors, collects responses, and then return them to user clients. This extension of SDI is discussed in Section 2.1.

As a commercial strategy, one might make it a necessary condition of belonging to Iamworthit that client machines submit profile information to the SDI central data warehouse, so that vendors can perform useful data mining and then provide customized products and information to users, for example based on models of collaborative filtering.

13.1.3.1 System Overview

Client machines in Iamworthit implement an SDI proxy on-top of a user's regular web browser. The role of the proxy is:

a) Profile and identity management as the individual interacts with server computers of on-line vendors.
b) Collect and manage profile information, with information periodically submitted to the central SDI data warehouse.
c) Release profile information to vendors according to profile management policies.

In Iamworthit the client-side SDI proxy is configured by users to periodically push information collected about the user to the central SDI data server, i.e. click stream data, profile information, purchases made, information requested, etc. Profile information is associated with price-rules, as in the top-level description of SDI, and can also be adjusted with random perturbations to protect the identity of a user under multiple pseudonyms. The client periodically sends update messages to the database, for example with information about new activity (e.g. web browsing, purchases, adverts not selected, etc.) SDI allows the information to be used by vendors to build models that enable good personalization of products, services and adverts.

Users might choose to randomize profile information to protect sensitive information and to prevent vendors linking users across different pseudonyms. Clients submit perturbed data points and the distribution that was used to generate the noise (see the section on random noise perturbation).

13.1.3.2 Privacy-Protected Data Mining

Vendors can gain access to profile information in the central SDI data warehouse, as long as they meet the criteria of the agents that submit information on behalf of users, and pay the price of data access. The profile information can allow vendors to build complex models for personalization, negotiation, and advertising, based on information about purchases made by different types of users.

Users submit profile information to a central database that can be used for profiling, without revealing their identities. Client-side SDI proxies track user activity on-line, across multiple sites, and submits data, randomized if necessary, and only according to a user's preferences to the central SDI data server. The data is useful for building models of buyers, for example purchasing patterns, for the purposes of personalization of information and adverts. Agents that submit information retain ownership of the data. Simple data mining queries include:

(a) Compute the average income level of people purchasing camcorders. Suppose that a vendor has pseudonymous identities of its recent customers, and wants to compute their average salary. It does not know the salary of any of the customers, and individual customers will not release their salary to the vendor. However, if some of those customers have provided information about their salary to the central SDI data warehouse then the vendor can compute the result to its query. Agents might associate price rules with information about their salary that allow a vendor to query that information so long as the identity of the agent is not revealed, i.e. so long as the salary is provided anonymously. We described earlier in the patent description how price rules can define different prices for different types of information access.

(b) Compute the total donation to a fund for bone cancer research. Individuals do not wish to release information about their specific charitable donations, but might be happy to release that information anonymously. Again, a query to compute an average donation can be formulated and executed in the central SDI data warehouse.

(c) Perform collaborative filtering across multiple fields. This is explained in more detail below, and is possible within SDI because a general query can be performed so long as the querying agent makes payments for data access in accordance with the price rules of agents which submit information to the shared database. Note also that randomly perturbed data does not prevent the computation of correlations between fields, so long as the random perturbation is "small" with respect to the value of the data record.

13.1.3.3 Importing Off-Line Data into the Data Warehouse

The central SDI server can associate off-line information about a user with a user's on line pseudonymous profile, even though the central server does not know the user's pseudonym IDs. This can only be done with the user's consent, and may also involve appropriate compensation. Within the system of iamworthit we can credit users for both off-line and on-line information.

Merging a marketing database with SDI user profiles can be useful both to initialize the database, for example when asking a user questions to generate an accurate user profile rapidly and efficiently. Off-line data can also add useful richness to on-line profiling information, which may be largely contextual and low on details/factual information. For example, off-line data can include information such as whether a user owns a car, rents an apartment, has house insurance, life insurance etc. SDI can also extrapolate correlations to other user profiles, on the basis of common SDI-profiles, for example using statistical techniques.

It is often the case that individual customers appear in some databases, but not in others. Under normal circumstances, an analyst working across different databases would be faced with a large number of incomplete customer records, each with gaps corresponding to the fields of the databases to which they don't belong. A solution to this problem is offered by SDI, which is capable of drawing correlations between different databases—this information can be used to generate predictions to fill in the gaps of incomplete customer records.

The result is a full set of customer records that can be meaningfully sorted or filtered by any of the combined fields, and which can now be handled as a unified set of data, suitable for use by standard database analysis systems.

In a typical example, SDI might be used to combine a demographic database, such as the one offered by the Econometrics Corporation, with a commercial database, such as the one offered by Claritas. The Econometrics database consists of 180 million different customer records, but at a fairly coarse-grained level of detail, consisting of such information as age, gender, family status, location (at the state, city, or zip code level), and personal income. In comparison, Claritas offers a smaller base of customers, but includes information of arguably higher quality, since it breaks customers down to the geocode (sub-neighborhood) level, and includes much more detailed information on personal spending habits across hundreds of different purchase categories. A logical reason to combine these databases would be to supplement information about customers in the vastly broader demographics dataset with particular predictions about their personal preferences and likely commercial spending habits. One could imagine using this augmented data set to support a web site that instantly customizes itself to new visitors' preferences. Since the number of records in the Econometrics database is equivalent to roughly 72% of the population of the United States, it is likely that most first-time visitors to the site will already have a "thumbnail sketch" in the system, and can thus be greeted with an page appropriately configured to their personal tastes.

The technical details of the combination process (which have been described elsewhere in the patent) to a large degree depend on the amount of overlap between the databases, that is, the number of customer records which are shared in common. Suppose the demographic databases' fields are coded $(x1, \ldots, xn)$, and the commercial databases' fields are coded $(y1, \ldots, yn)$. Suppose further that customers in set A appear only in the demographic database, customers in set B appear only in the commercial database, and customers in set C appear in both.

The process of supplementing the fields of customers A depends completely on the derivation of the distribution $f(y1, \ldots, yn|x1, \ldots, xn)$, which describes the correlation of fields in the commercial database on fields in the demographic database. As previously discussed in the patent, different techniques may be used to create this distribution, depending on the size and variety of C.

As a concrete example, one could imagine that set C includes customers from rural areas. The demographic database would reveal that, although their incomes aren't huge relative to the national average, they tend to spend a lot of it (i.e. are active consumers), have large families, and purchase large vehicles. The commercial database might show that they enjoying hunting magazines and Ford trucks. If they live inland, they buy hunting equipment, if they live near the ocean, fishing equipment.

If these trends are dominant in set C, they will impact the distribution function. Thus, when a browser from a small town in Texas with a typical income pattern visits the automated website, he could be greeted with discounts on truck accessories and a small sidebar with news on the hunting season. On the other hand, a visitor from a small town in Maine might be given the same truck discounts, but would have news on the fishing season. Although the demographic dataset is arguably the weaker of the two in terms of content, the fact that it contains even a small amount of information on most people in America makes it very valuable for handling first-time visitors, since most of them will appear in it. By using SDI to leverage the more detailed information in the commercial database, we are able to supplement the rough demographic data with predicted commercial preferences. This allows us to construct more detailed thumbnail sketches for each customer, allowing our reception of first-time visitors to be much more appropriate (since knowing personal hobbies or interests tells us much more about a person than general income level).

13.1.3.4 Static Query Execution

Central Applications Some Key applications of SDI are

Assessing the Value of Data. Plug together sets of data, and measure predictive accuracy.

Matching Data Across Vendors. Find patterns in common pseudonyms, denoting common areas of interest; use catalogues of order codes and item description to find similarities across data sets.

Targeted Recommendations; e.g. match customers to their nearest neighbors in a data set and generate recommendations for users, collaborative-filtering style application.

Leveraging Portal Data. Use data from portal to leverage data needs for ISP

Analyzing Affinities. Suppose a vendor has a list of customers, and knows to some degree what web pages they visited after leaving vendor site. A large collection of customers taken from an ISP will contain their web-surfing behavior. Cluster web sites and cluster customers, finding cluster-to-cluster interactions. Use this information to classify vendor's customers; gives vendor an edge in knowing customers' tastes.

There are a number of search-based applications, where SDI searches for appropriate profiles and then requests that SDI makes contact with the users pseudonymously, i.e. without the vendor receiving any useful information about a user's identity. The contact, interaction, and business relationship with the vendor occurs under terms of complete buyer pseudonymity. The pseudonymous communication may be either email, real-time text communications, voice (such as the pseudonymous telephony or Internet telephony). In the case of pseudonymous telephony, instead of a one-time or persistent pseudonymous buyer address, pseudonymous buyer telephone numbers may be used for the third party to reach the buyer under his/her terms. Example applications include:

(i) Financial Advice and Financial Planning Services. Often buyers are quite sensitive about the confidentiality of the release of this type of information related to personal financial matters and particularly with certain matters (and perhaps in general) prefer that their financial advisors were unaware of their true identities. Similarly, investment advice or sales communications by stock brokers are another application where similar buyer information is typically disclosed.

(ii) Insurance Agents & Brokers. For many types of insurance, (e.g. health, life, casualty) personally sensitive information is disclosed by buyers to their agents and brokers. Initially, before insurance services are purchased, it is possible that useful detailed quotes and/or insurance advice could be provided to a buyer pseudonymously.

(iii) Legal advisors. There are a variety of legal disciplines in which the associated legal services delve into highly sensitive personal information (e.g., bankruptcy law, divorce law, criminal law, etc.) Many lawyers also offer to first-time prospective clients a free consult in which such a privacy-enhanced communications system could be initially beneficial to the parties.

(iv) Family Counseling and Psychological Counseling. The parent patent application also suggests these applications which often involve the exchange of highly confidential personal information.

v) Medical Consultations Involving Drug Prescriptions. In this variation, although medical consultation may be conducted anonymously, in order for a physician to prescribe medication, the identity of the patient must be known (within the current regulatory legal requirements).

(vi) Advertising network (where the clustering or nearest neighbor algorithm interact with the ad server). Ads on that ad server's database, e.g., on the sites most frequently visited by the user are periodically uploaded to SDI such that the ad(s) of highest predicted interest to the user is presented upon the user visiting that site. Preferably the target object profiles of all the ads on the ad server database, as well as the profiling algorithm, which is used by the ad server is properly integrated with that of SDI so that it is possible to convert the usage statistics of the data model used by the ad network (which may include ad server data for users collected across the ad networks) into useful statistics for SDI.

(vii) Content sites, e.g., for personalizing news articles (which are again uploaded to the SDI server each news day if those articles would not otherwise be available on that web site. If they are, as with any web content format which is universally accessible, the content may be frequently profiled following retrieval, e.g., by a simple web crawler script.

(viii) Portal Sites—As detailed in the parent case, the user profile may be presented to the information vendor server containing the portal site. The selection and prioritization of the most relevant personalized content categories may be automatically determined at the client level proxy, which is conveyed to the information vendor server in order to personalize every aspect of the portal interface. It should be noted that without the vendor's cooperation (with SDI) the interfaces of portal sites and content sites could be automatically modified at the client-level proxy in order to provide the personalization of selections to the user (from the user's perception as if the personalization was dynamically generated on the site itself). However, ad servers/ad networks could not be personalized as easily without privileged access to the ad database (unless the ads from that site were recorded and stored in the ISP-level proxy from other users visiting that site).

(ix) Rating Sites. The ISP level proxy may also contain metadata relating to specific sites, products or informational content (as an alternative to the metadata residing on the HTML pages, which they describe through cooperation with the vendor). Such metadata includes annotations, average user ratings, according to a variety of attributes, as well as the ability to browse Web pages with associated annotations and/or user ratings provided from those users who are identified by either: a user-selected cluster, or the user's profile or high or low ratings according to site selected. Endorsements (and ratings by a variety of relevant criteria) by a variety of types of organizations may be available as well, and browsing and searching may be performed with these organizational endorsements/ratings as a criteria to bias or filter searches or filter the sites accessible via browsing interface (the same may be also performed for user based ratings as well).

(x) Cache Engines—As an alternative to the profile generation and processing modules running on the network vendor (ISP) servers, it may operate instead, or in combination as a distributed process upon the caching server in accordance with the method taught by "Broadcast System for Reduced Memory Devices and Asymmetric Networks". (check exact title of this patent) As taught in this patent (in accordance with the current applications) the pages predicted to be accessed by the user on the following day are precached in advance.

Typically sites which tend to be visited most frequently are assessed for selections which are personally relevant but have never been previously accessed. These would be presented as recommendations to the user if/when he/she visits that site (which is also probabilistically determined). The fact that the recommendation (whether generated by the site itself or modified at the client level proxy), the user's behavior is positively being reinforced by the fact that the ranking of personal recommendations is prioritized in direct relation with the prioritization scheme for precaching, i.e. personalized recommendations and precached pages are substantially identical and as a result of precaching to the server, or even the client, can be accessed by the user with little or no latency (thus in the ideal embodiment it may even be advantageous to highlight the links which have been precached).

In a preferred commercial model, the techniques which are above described, that meta data containing profile information on the pages are encrypted such that a cache engine that is used to precache cannot be decrypted and read by certain caching engines which do not possess a desired business relationship with iamworthit. In another implementation, other competitive intermediary services to iamworthit may not be able to decrypt and read these web page profiles in order to present personalized information to the user (even if the competing protocol were pursued, the accuracy of the iamworthit version would be substantially more accurate due to its ability to leverage vendor centric SDI data from the host level proxy.

(xi) Auto Insurance Application

Co-pending patent application entitled "Applications for a Location Enhanced Information Architecture" describes a location-enhanced framework by which statistical methods are used in order to very efficiently and confidently extrapolate the most relevant attributes in predicting automobile accidents (or the avoidance thereof). The correlations from some of the existing metrics used may be refined using this technique e.g. LEIA is able to accurately determine the number of miles a buyer drives per week while the buyer will often lie about this, thus the basic model may be refined and more accurate information may be provided on a per-buyer basis. The scheme also enables completely new metrics to also be identified and utilized as well which may correlate the attributes location with time. It is conceivable that if a buyer provides access to this location-enhanced information by an insurer, that the insurer could in turn offer premiums, discounts or deliver credit to the buyer which could be added to monetary credit the buyer receives for personal information from iamworthit, for example, an iamworthit implementation which uses LEIA to profile and target buyers with ads by their location (e.g. while riding in an automobile).

(xii) Hospital Example.

In one data application of the client level proxy server, the user profile includes medical data which is obtained from medical records. (such as from hospitals or physician's medical records or potentially that of a health insurer). Typically, various physician's offices and hospitals which a patient (hereinafter "user") has visited over the years contains separate portions of a user's overall medical history, thus these various sources may be combined upon the user's request by downloading this data to the client-level proxy (or preferably, the user enters into a contract with those organizations in which all medical data and updates thereof are downloaded by the organization and/or an "agent" to the organization which transmits a request which is digitally signed by the user at the client-level proxy server. The origin of the request (the user) is authenticated and may be processed by a human or another agent located at the organization's host computer. Because of the highly sensitive nature of medical data, there are potential user privacy advantages in using randomized aggregates. For example, a user's age, medical history of specific relatives (particulars of which could be more generalized) genetic data, numeric values associated with various medical tests, results for which are a numeric value. This data may be of relevance to pharmaceutical companies, alternative medicine vendor and clinics insurance companies hospitals physicians, clinics and home health care providers, the latter three of which may wish to advertise to patient prospects and extend their medical practices. The privacy architecture herein provided is a critical component for enabling access to user data by these commercial entities and is perhaps critical to the extent that users must explicitly authorize the transfer of medical records from either the physical copying or electronic duplication of an associated transfer of such information to an intermediary (SDI) which is trusted by the user.

(xiii) Medical information, such as medical conditions, medical history, active prescriptions, drug reactions, family history, possibly even genetic pre-dispositions (from a genetic profile). Medical insurance information may also be potentially useful for a prospective qualified accessory to be able to readily access in case of an emergency.

(xiv) Physical location information-Users or advertisers could, for example: a) Query a pseudonymous user database to access profiles that are in close physical proximity and match certain criteria, e.g. live in a certain geographical region, had recently attended a meeting or event (or is planning to attend a particular event) had recently communicated with a friend or associate. In another variation, a user could for example, submit a query pertaining to every user in a particular physical space, e.g., a room, hotel or convention center, e.g., identify all users present here who attended Internet World, 1995.

13.1.3.5 Buyer Informediary

The central SDI data warehouse can be used by vendors that provide services of buyer infomediaries, for example providing buyers in B2C e-commerce applications with historical information about previous purchases of users. At present companies such as www.priceline.com make profits because many individuals post take-it-or-leave-it buy offers for goods that are above the reservation price that vendors are prepared to accept for a service. An information infomediary, based around information submitted by users about previous successful or unsuccessful bids would provide for a more efficient marketplace. A buyer infomediary system can be built as an application of SDI to providing bid prices for agents in electronic marketplaces which are agent-mediated and allow dynamic pricing, for example the nascent marketplaces of on-line auctions, www.ebay.com and on-line reverse auctions, www.priceline.com.

13.1.3.4 Seller Infomediary

On the flip-side, the system of SDI can also be used to support third-party infomediaries for sellers, that make their business by performing data mining on the information in the shared data warehouse, and can sell that information onto other vendors. It is possible to identify useful pricing models, based on historic purchase information from many different individuals.

The system of SDI can also be used as a confidential database for the purposes of generating statistics from sensitive data. For example, as a trusted system, manufacturers might be willing to provide information about their productivity, margins, retainment rates, production efficiencies, yields etc. The central SDI server could generate statistics, globally for the manufacturing sector, and then individually for each manufacturer—as it relates to the information provided by other companies. Similarly, it would be possible to use such a system to compare salaries across different universities. While an individual university might be reluctant to reveal information about its pay-scales to other universities, in the aggregate this information is not sensitive—and a survey on salary can be useful to both employers and job candidates. SDI is used to securely calculate statistics, without revealing any information that might compromise the privacy of a single employer.

13.1.3.5 Personalization Application

Personalizing information on-the-fly requires that a vendor has a data model, for example that clusters its current user-base according to what they are likely to be interested in. We can allow vendors to execute queries, for example clustering algorithms on profile information, that use all the information submitted to the data base by users without violating privacy policies of the owners of that information. This can be done by returning a classifier, that will place new profiles into relevant clusters, and provide information about the likely interests of a particular user. Given this classifier, we describe in Section 3, "client-side data mining", a method that allows the vendor to compute the results of a personalization algorithm on the profile of an agent without receiving that profile. Simpler methods might either run such a personalization query in the central SDI data server, or release some profile information to the vendor.

Vendors are assured that all enabled users (who are subscribed to iamworthit) will receive highly personalized recommendations for their products, services and advertising access from their site. (and because many sites are migrating towards providing also a full-blown niche portal with content, chat and forums,—personalization of this information is enabled as well). In addition to leveraging click-through navigations and transactions captured from their own customers during present and previous visits to their site, iamworthit provides the unique advantage of being able to utilize the user's web-wide profile consisting of a variety of attribute types upon accessing the site in order to leverage statistical correlations captured by the integration of the statistical models of the vendor, with that of Iamworthit. If stored on the SDI main server, the iamworthit data captured at the client level or ISP-level proxies is typically concatenated with the data sets of the vendor captured from the host-level proxy (maintained at the vendor's host server or if SDI enabled at the SDI main server) This is particularly important for first-time visitors to the vendors site and particularly within vendor domains in which content-based merchandise (e.g. books, magazines and news subscriptions) are sold. Assuming the number of iamworthit subscribers is substantial enough and assuming that the present business model involves a "relationship" between iamworthit and a vendor of recommender systems and/or (at an arms length) the vendor-centric SDI service, this advantage alone could impose significant pressure upon the vendor to deploy a recommender system(s) which interoperates with iamworthit (or subscriber to SDI). Content sites, news sites, and web portals, etc. can provide personalized information to users by subscription to the system of SDI, which provides access to customer profile information.

13.1.3.6 Example

Customized Web Pages

Analyze customers for broad preferences in choice of web pages visited (corporate, Star Trek fan, etc.). This defines the initial look and feel for the page that greets them at their portal (a teen might enjoy lots of bright colors and sound clips, an investor would prefer a more staid design); different "skins" could be created to match the major categories of customers, and would designate both the graphical design and modules available on the page (e.g., a working stock-ticker for an investor, a real-time weather map for a jogger). The web pages and information most frequently accessed by a customer would be given priority, and a hierarchy of usage could be developed. Since stock prices are of the highest importance to an investor, a ticker reflecting his portfolio value would stream across the top of the page. However, although he enjoys spending his profits on vacations and automobiles, these are only of secondary interest to him (as revealed by his on-line behavior), and so are relegated to a sub-menu on his web-page. As his usage changes, the priority level assigned to the modules would change as well, so that when a jogger purchases a treadmill for indoor running, his weather reports won't dominate the top-level screen.

Small children could have simplified browsers, with extra-big buttons and access to pages pre-screened by a "web-nanny" service.

SDI would be used in the initial phases to group customers into general categories based on their patterns of their web surfing, and would be used in later phases to adjust the content and style of their portal home-pages (based on what similar customers seem to be enjoying). SDI can improve upon this rule engine-based model by giving far more information about the users who tend to perform certain actions on their sites. Moreover a second (outside) vendor which is syndicating products or advertising on the vendor's site could (upon further approval of the hosting vendor) use data mining of the hosting vendor's site and based upon explicit actions of users on his/her site and/or the user's profile ascribe rules for more explicit criteria for targeting these remote prospects. Of course, response of users provides a means for iteratively refusing these rules explicitly (or alternatively implicitly).

The Secure Data Interchange clearly offers significant potential value to a vendor licensing rules engine in many ways. As an additional example, many vendors also use a site traffic reporting tool in order to analyze traffic patterns through their sites. It is very helpful for vendors to analyze, for example, how often certain pages become clicked-on or transactions occur or conversions occur, how moving the link may affect (typically improve) these patterns and how certain rules (which may dynamically create links or move links) affects these patterns. Of course, observing the movement patterns of users throughout the site helps the vendor better understand user's perception of the relatedness and natural progression of page accesses throughout the site. This is particularly so if different rules are experimented with such that optimal click-through or transactions occur particularly for key pages or purchasables. Adding to this statistical data SDI user profile information is able to reveal (via data mining) much more robust relationships between pages as these relationships change with user profile features. Accordingly appropriate rules may be provided for individuals based upon this general user profile information which is gleaned from interests and behavior before visiting the site, i.e., either from the user-centric or vendor-centric SDI (while the user visits the vendor's site or alternatively accesses an affiliate site).

In another variation of SDI we can highlight content on web pages with information that might be relevant to a user, even when the source of the web page is not personalized. This can be done via collaborative filtering techniques, which might bring in feedback and comments from other similar users within SDI that are stored in the central SDI database. The iamworthit (user side) SDI database in cooperation with the vendor centric SDI service can sell to the vendor centric SDI service or other industry or market research organizations strategic information about the comprehensive behavior activities and user profiles of visitors and customers of these vendors (as is suggested earlier in the spec). Additionally, targeted survey questions may be presented on behalf of these entities in order to extract further information which may be correlated with certain features and attributes of these users. One such method may be called rapid profiling.

Vendors can utilize SDI's data mining interface to observe content and product consumption affinities based on user profiles describing Web wide behavior. This interface may also enable vendors to observe comparative click through and/or transaction rates of their competitors, how these criteria are affected by user profile attributes including geographic criteria (if relevant to that vendor) as well as how these criteria, (including even individual multivendor customers) are affected by various types of recommender and rule based engines and further the particular rules and weighted feature correlations used in generating these recommendations (again as described above, these rules and feature relationships may be derived automatically through a core sample of users, who are iamworthit subscribers). A vendor can use statistical data to tune certain features and implement certain rules, either directly or with the help of a user centric SDI analyst. Moreover, direct real time response feed back may be collected on these manipulations to the data model in iterative fashion.

13.1.3.7 Example

Ad Networks

The system of SDI provides a method for an advertising network which allows users to receive personalized adverts that are relevant to their lives, and also allows vendors to boost profits by placing one-to-one adverts instead of the traditional broadcast nature of advertising in media such as television and newspapers. Each user can receive adverts that are tuned to his/her profile, but without losing control over the information in that profile. In fact, a user can configure price-rules to receive payment for receiving a well-targeted advert. The trusted secure data interchange can operate as an "ad network", allowing for the placement of well-focused banner ads to market goods that are relevant to users of a particular content site. Electronic banner ads provide the potential for one-to-one marketing, when the advertising agency has information about the user that has just hit a site, together with information about what the user is doing local to a site. For example a car manufacturer is able to place a focused advertisement to a user that has just performed a search for new cars in a search engine, to a user that is known to have a large family and a high disposable income.

Ads can be targeted to iamworthit users based upon their user profiles. Ad networks can use the profile information in SDI to target ads and reach their target customers. Ads can be targeted with statistical data across multiple vendors that are subscribed to SDI. Statistical data can also be used to determine estimated revenues for a vendor if she/he were to interoperate with iamworthit and subscribe to SDI.

SDI might develop a decision tree to decide how to assign adverts to users with a particular profile. Within SDI we can track users across multiple domains, to allow fine level control over ads that the user sees.

There are two possible business models. Firstly, an Internet content provider could purchase access to information placed by vendors and users within the Secure Data Interchange database. This information may be "rented" for a period of time, and then whenever a user visits the site of the content provider (possibly through the pseudonymous proxy server), the provider can query the data interchange for information about the user. The Internet content provider sells well-directed advertisements to vendors. Secondly, the data interchange could sell or rent data to an advertising agency directly, providing information in real-time to enable the advertising agency to provide more focus in its banner ads for its clients. "Per-transaction" pricing is a very powerful pricing model that is enabled with on-line banner ads. It is simple to monitor the number of click-through that are received at a particular banner, in response to an advertisement. In the off-line world pricing must be based on the number of impressions, or worst still, the number of mailings sent and it is more critical to understand the expected value of a campaign up front.

The proxy server could also act as an "ad network" itself, and sell focused advertisements for vendors, and purchase ad-space on the sites of content providers. The on-line domain provides this unique opportunity for quick experimentation with advertising strategies in order to get feedback on the likely utility of untested approaches. The system can use a hierarchical cluster tree to identify the most revealing items in a dynamically responsive fashion such that the profiles of all of the selections can be generated with the most minimal amount of interactions with the user (see "Rapid Profiling" section in issued patent entitled "System & Method for Customized Electronic Identification of Desirable Objects). Thus a more robust statistical model across multiple vendors is established as a result of the user's click through response of these intelligently selected virtual banners as well as other pages which are subsequently navigated through once the remote site is accessed via the banner.

In the preferred approach rapid profiling not only dynamically identifies and presents items which are most revealing of the other items in the collection, it also selects the users whose profiles suggest the greatest familiarity with these items (i.e., potentially correlated items). Furthermore, if the system's objective is to find new users or users who may be interested in the present vendor's other products, products for which little is known, then it will match users who are least familiar with exemplar items. The idea is to reveal the most significant data about the user profile with respect to the present collection of items of interest. Finally, rapid profiling can use direct explicit queries to determine interest on an item(s) or to collect demographic data on a user.

The target object profiles of advertisements on the ad server are matched against the user profile in order to automatically present the most relevant recommendation(s). Typically, the client-side proxy requires the host-level proxy to disclose the target object profiles of the products/services sold by the vendor. This data is stored as meta-tags in XML form and is encrypted. This data can be very useful to the user in navigation, filtering and search activities in the future or in a variation the ISP—level proxy a party (a neutral server) could store these target object profiles and selectively disclose relevant pieces of them (e.g. genre cross-correlations) to vendors, which are considered according to the disclosing vendor's data disclosure policy acceptable to receive this data. These profiles are not accessible to the client-level proxy but may be disclosed only if there are restrictions within the vendor's data disclosure policy.

In another variation, if the data to be disclosed to the vendor is acceptable to the original vendor but she/he is untrusting of the vendor, the data is received by the host-level proxy (another neutral third party) instead of the vendor, thus providing the disclosing vendor with an additional level of security, assurance about the use of his/her data while enabling the users of such a site to access all of the merchandise or content in a completely personalized fashion. Thus these XML tags are stored in association with, but on a separate server from the actual HTML pages stored on the vendor's site. Additionally, these profiles are constantly updated by user profile data conveyed to the host-level server which operates in distributed fashion.

Advertisers may also stipulate additional rules relating to the delivery of ads to buyers in conjunction with performance of certain explicit actions e.g. submission of certain search terms, visitation of pages with certain key words (as a general tendency or on a per-page basis), visitation of certain specific pages or sites, performance of certain location specific behavior the delivery of which could be performed in accordance with the real-time behavior by the user if desired (e.g. visitation to a competitor's retail outlet or traveling within the proximity of the vendor's own store), otherwise the presently suggested algorithms may automate most of these manual functions by virtue of its recommendation capability e.g. matching ads to the most appropriate list of buyers or matching ads to metrically similar Web sites which may appear whenever the buyer visits that site(s).

Ads may also take the form of digital coupons [KRJM 98] which are priced by vendors according to behavioral information which the buyer is willing to disclose to this vendor. Because many buyers are adverse to viewing additional advertising which is "imposed" in the preferred embodiment, any inserted ads delivered by iamworthit can be "turned off" by the buyer voluntarily unless the in kind value which the buyer receives in exchange for the advertising mandates a certain minimum ad impression delivery. Also in light of the above buyer concerns in the preferred embodiment, there are no additional impressions added to the buyer's web browsing experience.

Ad blocking technology can be deployed to block existing banners and replace them with iamworthit ads. Ad blocking is commonly available, and the techniques used are well known in the art. The HTML source for the ad banners may be either called-up from the remote server (such as with an ad network) or alternatively from an ad server (typically purchased by the vendor) on the vendor's own host server. In either case, the ad blocking software typically recognize the HTML source which originates from the ad server. A directory of the HTML source for the various ad servers is maintained with the ad blocking software (and presumably updated e.g. if new servers are added or change their IP addresses). The location/physical dimensions of the portion of the page occupied by the HTML source which the software removes (its "footprint"), may be readily replaced by another replacement banner (by iamworthit) from wherever the proxy server resides (typically on the client but potentially on the network). As a result of a potential difficulty in which the ad server deliberately changes its IP address to avoid recognition, which occurs constantly and dynamically, it may be possible to recognize portions of the page which contain image "features" of ad banners, which are inserted from another HTML source where that HTML source is linked to known vendor sites (which are also linked similarly from other site's ad servers and/or are known via their HTML sources to have previously utilized ad server technology and a "new" HTML source appears instead, etc.

This model may be extended to other media domains e.g. replacing digital TV commercials instead with targeted ads delivered and precached via iamworthit for insertion at appropriate times i.e. during commercial breaks during standard video programming. Another variation could be tailored to pre-loading iamworthit advertising to automobiles for insertion in place of traditional radio commercials. In accordance with the parent patent application, (and as suggested above), email may be a useful targeted ad delivery medium as well. Per the patent case, the system is able to classify email (according to its source and content using implicit or explicit actions of the buyer). Based upon certain desirable confidence threshold settings, the system may automatically delete "span" and replace it with targeted messages provided by iamworthit which the buyer is paid to receive pseudonymous physical mail is yet another potential source of targeted mail for which the buyer may be paid in conjunction with the user's voluntary removal from direct mail marketing services which iamworthit could provide in conjunction. iamworthit's buyer compensated targeted advertising model could be extended to a pseudonymous telemarketing service (as suggested above) using one-time call session pseudonymous telephone numbers for telemarketers to reach desired buyers. Finally, human sales persons could be the "ad delivery medium" for iamworthit.

13.1.3.8 Example

Dynamic Personalization of Links Within a Web Site

Wide user profile data can also enable the dynamic personalization of links within a web site, to create a virtual shop floor to match the predicted preferences of each user. For a new user, that has never before visited the site, it is very advantageous for the site to already know about the preferences of that user in order to personalize the goods and services that it offers. The information provided at the secure data interchange, and gathered from the transactions of a user with another vendor, is vital for this type of personalization to first-time users. For return customers, an Internet site can also leverage its is information that it has collected from previous interactions with the user, information that is collected locally to the site.

13.1.3.9 Personalized Search Engines

The present state of the art for search systems involves the use of an extremely static interface, which is not personalized for a user. Some search systems identify features of a user and anticipate areas of content likely to be of interest. A personalized portal interface can then allow a user to view categories that are presorted in terms of expected value to a user, based around more than the search term just entered For example, if AltaVista knows that I am a research student, then the search engine can bias results in the direction of information that is likely to be appropriate to my interests, and away from other items. The personalization and filtering can be done based on results that I have accessed in the past, and also on the basis of information that is stored about a user in the shared SDI data warehouse. It is possible to greatly increase the relevance of the search results through eliminating and prioritizing the potential range of results from the query.

Within the system of SDI, where more information is readily available about a user, we might now also look at what a user is currently doing, his/her professional expertise, skills, proficiencies, etc., the reason for the user asking the question, for what purpose was the question asked, for what purpose will the results be applied (if relevant), what is the geographic and/or time period content of the query, what type of content does a user prefer, e.g. humorous, wisdom/council, scientific, political, business oriented.

In this way we can begin to incorporate contextual content into search. We might also allow users to contact other users who are determined to be experts in particular areas browsed, with this information dynamically discovered by queries into the SDI data warehouse.

Collaborative filtering can help to identify individuals with a close affinity to a particular site/vendor, and community of interest or interest domain such, so that they can be informed of opportunities to act as experts and receive referrals on demand. This added ability to bring new content more efficiently and timely could be very valuable.

Another simple extension is to provide personalization to the results from a standard search-engine. For example, we could use a user's profile to perform additional filtering of the results of the search to refine the pages returned on the basis of their profiles and the user's profile, i.e. using collaborative-filtering/clustering style techniques.

13.1.3.10 Smart Browsing

Personalized Annotations, Filtered Information

We can also introduce personalized annotations to pages that are displayed to a user, with annotations selected to reflect the interests of the user, for example as provided by special-interest groups sharing affiliated profiles, or as provided by other users. A couple of definitions for this section: exemplar—the profile of target object or (as pertinent to following description), user profile which is "most like" the profile of the cluster to which it belongs, perhaps a median metric.

The Platform for Privacy Preferences (P3P) [CR 98; RC 99] provides for the ability to utilize XML meta-tags to annotate Web pages, and within a system such as SDI we can allow comments from previous visitors to a page to add annotations. Users can receive annotations from the SDI data warehouse that are associated with annotations provided by other users with similar profiles. One of the divisional applications of the parent case "System for Customized Electronic Identification of Desirable Objects" [Herz 98b] relating to the automatic creation of virtual communities suggests that users may be automatically assigned to particular communities (e.g. chat groups, forums, etc.) for this purpose.

We might allow users to rate the annotations in the pages, allow SDI to learn how useful annotations provided by certain users are to new users, and classify users as "experts" that receive priority in the position of their current and future comments. Future comments from users with a poor rating history for a particular content cluster may be deleted. A persistent interface feature on the tool bar or side bar can provide for annotations to also be accessed by users selecting certain profile features of users as they browse from page to page; for example a user could identify the comments of a news article about abortion by users who are self identified as advocates of the Women's Rights Movement, ultra conservative senior citizens, teen women or those with a strong interest in alternative medicine or the Catholic Church.

The parent case [Herz 98b] further suggests that users may actively provide ratings in a completely privacy protected manner according to various criteria of pages they browse. Profile-based clustering of these ratings and annotations can allow a user to submit as a query a user profile, to receive a page that rates or annotates a page, and a listing of highly relevant pages to a particular type of user. This could also be used in a "reverse engineering" sense, for example requesting the exemplar user profiles for users that visited and gave high ratings to a particular site, and then using those profiles to find similar sites of interest, or finding the user features that are in the exemplar profile to understand something about the content of a web page. The browser interface may automatically display the related links that are determined dynamically to be most relevant to a user, again statistically estimated via the data in SDI of users' browsing habits, and/or via active page recommendations or as book marks by those users as being of particular relevance or similarity to the present page.

Browsing methods may include search-based browsing, and also browsing via a hierarchical navigation menu system, with users classified according to their behavior patterns and/or ratings which have been actively submitted. The parent case [Herz 98b] also suggests the use of hierarchical clustering for products, to help in a smart shopping system. Similar products can be presented together where the feature criteria for creation of the hierarchical cluster tree could be price or other criteria. In addition to allowing users to view item selections according to desired selection criteria, a comparison shopping function can also allow a user to view the attributes of buyers that tend to buy certain items to help to add confidence to a user that he/she is getting the right product.

The above description also describes the use of a hierarchical menu through which groups of users may be identified by their profile features (wherein a profile feature could even be a rating criteria itself of for example, an opinion via a site survey). These features could be used to either selectively filter-out content which falls outside of that criteria as the user navigates the information or identify if/when pages encountered where these user rating features are present, thus displaying this user statistical information in conjunction with the ratings statistics and/or associated annotations if desired.

We can allow the user to use one or more organizations to provide features and annotations to help in a search and information interpretation process, to add appropriate filter and bias to information presentation as a user browses the Web. Similarly, a user might adopt the endorsements of a friend for annotations, and editorial content about particular pages.

The availability of feature information about individuals that provide high ratings for particular Web pages can also be useful for vendors that wish to find appropriate locations for their advertisements. For example, given an "ideal profile" of a consumer for a particular product, a web page/type of information can be determined that will be useful to find appropriate customers. This is an alternative method to providing adverts to particular individuals, instead choosing to provide adverts to limited information domains that attract appropriate users. Vendors may request additional information, such as site-specific page view correlations (including time spent viewing each page) in accordance with user features. Exemplar user profiles and attributes of those users are certainly of interest to vendors to which those sites belong as well as affiliate sites on which their advertisements and/or syndicated products are advertised and sold remotely.

We can also profile users with context information, for example based on their assumed goals (social, business, personal, etc.), information which can be determined by the nature of their current activities.

In an interesting extension we can allow users to contact other users that are browsing similar material with similar profiles in real time, allowing ad-hoc virtual work group formation. Of course, all of this is done within the carefully managed profile and privacy managed systems of SDI. The location of a user could play into decisions about physical meetings. Typically some users may wish to enter into a present (or future) dialogue, which can be scheduled via calendar agents, which perform automatically scheduled compatibility meeting/introduction functions.

It is also reasonable to provide the technique of collaborative filtering to identify users whose profiles are particularly similar to the material which is being viewed, e.g., those users who are determined to have a high proficiency level with regards to that particular material. Because the requesting user may be seeking to query the expert or seek edification on that material, typically same consideration is conveyed in exchange for that information. In a variation, data exchange may be provided if collaborative filtering identifies fairly similar users to the presently viewed material which also demonstrate, via their profiles, considerable complementarily in the particular knowledge which they are likely to possess. Vendors may also facilitate this type of information exchange on their sited between these complementary, (yet metrically similar) customers.

In a consumer-vendor commerce application of this form of interactive browsing we can allow users to enter into dialogues with vendors based on their profiles, and share experiences with vendors, regarding their experiences. This can be done in real-time, or statically within an iamworthit style system architecture, where a user receives financial incentives for providing information that is useful to vendors.

The parent case [Herz 98b] suggests that organizations (e.g. vendors, etc) may be rated by multiple users across and according to a variety of relevant attributes. One useful extension is to group descriptive opinions of users according to their profiles, certainly users with a particular type of profile are likely to have affinities towards certain sites and certain content. It can be useful to example how the assessment of user's varies according on their profile information.

Another variation is to suggest a three-dimensional interface, to allow useful diagrammatic representations of the information and meta-information that a user is presented with. The parent case [Herz 98b] describes a method to reduce the multidimensional characteristics of feature and annotation information to only 3 dimensions, and present that information graphically, via a technique of principle-component analysis. The profiles of the target objects associated with a user's preferences are represented as points in 3-D space within a navigational interface. Nodes may also be displayed according to category and sub-category. Views may also be restricted to user's with the same goals, i.e. business users, social users, etc. this mind-set can be inferred by the sites that a user is visiting, for example.

13.1.3.11 Smart Interface to On-Line Discussions

The present description provides a methodology by which it is possible to apply techniques of statistical NLP for purposes of enabling users of live discussion groups and bulletin boards to dynamically visualize concept (via automatically generated labels short summaries or even visual representations of the concepts). The parent patent [Herz 98b] describes a browsing implementation in which it is possible for a user to view an on-line 3-D layout of a "virtual mall" in which the multi-dimensional space of the object profiles of the items are collapsed into three dimensions. Further, the display may be customized to the user's profile by using as the vantage point the position of the user's profile within the space.

We can use information retrieval, pattern matching, and collaborative filtering techniques to refine information based upon the particular relevance feedback from those particular individual engaged in a discussion. The novel interface enables the extraction of text segments from all previous discussions. These (multi-discussion) segments are essentially grouped into clusters and the clusters are representative of "concepts". The statistical framework is further used to determine what clusters (concepts) tend to follow in sequence what other clusters. Because conceptual flow in human language is quite complex and perhaps somewhat relative to the individual, it is useful to provide different interface settings, e.g., for example one which is tailored to the individual (i.e., the layout of the conceptual flow based upon statistics taken from all individuals which are generally similar to the interest profile of the present user what it would be for certain types of user profiles as explicitly indicated or what it would be for the collection of user profiles of those individuals within the present discussion groups (or if two individuals, the user profiles).

The large statistical information stored in SDI may be useful for the purpose of guiding discussions in a chat or forum context. Individuals may use the system in order to guide the flow of their own thoughts (where it is tuned to their own personal profiles) or that of what a particular individual with which they are corresponding at that moment (or in this case ideally both of their profiles) or (to appeal to the overall discussion forum or chat room) the collection of user profiles in that discussion forum. Again, in a variation, the system may be tailored to give additional weight to the particular historical experiences of the individual or group, thus if implemented in this way to the individual, the system may act in a similar capacity to a remembrance agent.

13.1.3.12 Example

Vacation Package System

A vacation package organizer decides to begin a large-scale marketing campaign to target those people who would be the most interested in joining a new Caribbean Cruise. Although the vendor has a database of current customers, it is interested both in increasing the number and suitability of its potential leads.

Interfacing with the secure data interchange with which it is a member, the organizer identifies several possible sources of supplemental data: a LEIA-based travel discussion group, an on-line bookstore, and a Caribbean restaurant. These are found both by browsing through the interchange's internal list of members, and by using SDI-based data analysis tools, used within the interchange to automatically identify entities sharing common characteristics.

The package organizer then contacts each of these entities through the interchange, and negotiates different data-sharing deals: the travel discussion group is willing to exchange full information for a large travel discount, the on-line book store is willing to reveal the pseudonyms of users who have bought travel books in exchange for a per-sale commission, and the restaurant is willing to sell its entire database for a flat fee (and will provide an aggregated data set as a sample).

The vacation package organizer now chooses fairly basic data-mining algorithms to identify the individuals with the greatest potential interest in a Caribbean vacation; however, the organizer does splurge on a new neural network approach developed by a small software company. On a per-sale commission, the Software Company is willing to loan the vacation package organizer use of its data mining code.

First, the organizer decides which data sets to use. The initial results on the restaurant's aggregated data aren't so good (its customers turn out to not be very affluent), so the organizer declines the purchase of the full data set. However, it does agree to the conditions asked by the travel discussion group and the on-line bookstore.

The data provided by the discussion group and on-line bookstore, being in a common format, are moved in a secure fashion to the interchange's processing area, and are acted upon by the data mining tools, which are also in a compatible format. As per the agreement, the interchange forwards discounted Caribbean cruise offers to the members of the discussion group, and forwards standard promotions to targeted individuals in the book store's customer list. A few of these individuals respond favorably; these electronic transfers of money and passed back through the interchange, which slices off a commission for the book store before passing the accepted offers back to the tour organizer, who learns the identities of the customers and can now count them as part of its database.

This protocol specification could even be digitally signed by the "owner" of the data as proof of ownership of the data and its associated restrictions by the owner, i.e., effectively a "digital deed" which is both legal and untamperable by any other party and thus acts as a legally binding proof of ownership and terms/conditions dictating how that data can be used.

13.1.3.13 Example

A Forum for Political Views and Discussion

The information within SDI can represent user's political views, and be used as a very advanced political polling system that respects the privacy concerns of users. For example, a user can state that information is released anonymously and that no identifying information is ever released. That said, within the iamworthit system an individual with a current and complete political profile could receive a steady income stream from semi-automated focus group queries.

Taken one step further, it could then also be possible to identify for a user candidates which are believed to be a close match with a user's political profile. Expert opinions could be used to determine the individual issues and relative weightings (indicating relative priority which those issues assume within the politicians political priority scheme) as well as levels of extremism in views to political issues. In the preferred implementation a listing of different politicians is presented in conjunction with a percentage which reflects the degree of similarity among the views of the user and those of each politician as listed in descending order or similarity. The user could drill down and observe a redistribution of the percentage based on particular desired political issues, or the user could observe the distribution under a variety of different user profiles. The system may also take aggregate statistics from other, various types of individuals and or organizations. That is to say each individual can, on a voluntary basis, disclose as much personal information, be it explicit or implicit disclosure (form his/her user profile data base), in order to create a more robust and comprehensive set of statistical relationships.

The system could also ask the users presently to indicate which actual candidates they selected; thus collaborative filtering recommendations can indicate, for example, which candidates users with certain political issues-related profiles tend to vote for (even what other individuals, exactly like the present individuals, tend to do in this regard), or conversely, what political issues voters of certain particular candidates tend to claim to subscribe to. The system may also identify what characteristics (political or other wise) are most prevalent or alternatively most unique to individuals which share an affinity for a particular candidate or a particular issue, or the system may recommend candidates based on existing candidate affinities.

The techniques of the parent patent [Herz 98b] may also allow a synchronous and asynchronous discussion with other individuals containing certain profiles (or identical profile characteristics). Again the pseudonymous server may be useful in this regard. The present system may also enable rating of candidates, in which various types of individuals (in aggregate) rate the candidate according to different criteria, characterizing the candidates on issues such as strengths or weaknesses. This is a useful polling example, the ratings may be revealed according to various types of individuals.

13.1.3.14 Example

A "Virtual" Jury

The judicial process attempts to be as fair and equitable a possible by allowing a jury of "peers" to be entrusted with the responsibility of evaluating the guilt or innocence of a particular individual as well as to determine the degree of liability, the penalty and degree of financial compensation which justified in light of the circumstances. The information within the system of SDI could be used to store information about users, explicit and/or implicit information based on their browsing habits, and offer a service, e.g. in civil cases for jury selection based on characteristics of individuals. In a criminal case the "virtual jury" may be used in addition to a real jury, to provide additional feedback on a case. The virtual jury may be paid by the plaintiff to participate, e.g., in the case. The feedback from the virtual jury may be presented to the judge and/or an actual jury before its own deliberations and verdict. In a novel variation the virtual jury may even hedge bets upon its conclusions such that if they contradict the conclusions of the actual jury but are later determined to be correct the members receive compensation. The advent of live streaming video greatly facilitates the feasibility of the current methodology.

In a variation, it may be possible to apply the techniques of collaborative filtering towards automating the selection instead of those individuals which are representative of the most diverse possible groups and clusters of individuals a cross a wide range of criteria (including such criteria as psychographics, ethnicity, intelligence, social status, etc.) In fact, subject to some changes in the law, this approach would be a more efficient means of selecting a standard jury than the process of random selection.

In one variation, the virtual jury is selected based upon similarity to the plaintiff. In another, it may consist of individuals which are individually similar to both plaintiff and dependent on more effectively a combination of individuals who are similar individually to the plaintiff and the defendant respectively. It is believed, in addition to guilt innocence, a more equitable assessment of the monetary compensation which is provided to the plaintiff by defendant, it such a equal mixture of empathizers from both sides constitute a virtual jury.

13.1.3.16 Example

Group Therapy

There is a very useful and appropriate application for SDI to the automatic matching of individuals for purposes of group therapy. Individuals with commonality across many criteria can be selected, and multiple long-term groups adopted. In an application of this system, it may be possible to broadly extend the present scheme to the general public (where privacy is secured via the proxy server) and individuals may identify a group(s) which best fits their own unique emotional needs. It may also be useful to archive the sessions, index enabling the sessions and segments thereof to be searchable by keyword, e.g., via speech to text techniques and/or browsable by topical segment (which may be automatically segmented and labeled). The present system may also provide an ideal framework by which psychologists may identify patients of other psychologists that similar pseudonymous complements of psychological characteristics and symptoms, to allow targeted clinician interactions and robust and useful information from therapeutic approaches and/or drug treatment regimens.

In a variation, the present system methodology also enables a means by which much more specialized group session topics may be created which focus upon a very specific type of disorder, conflict or aspect of the patient's psyche. In this way, it may be possible for "identical" patients to, as group, focus upon different aspects of their ideal therapeutic regimen which collectively create a comprehensive customized treatment program. It is worth noting that the specialization possibly associated with particular focused sessions (and even types of individuals) provides a framework by which clinicians can become extremely specialized and expert within certain specific sub-domains of the field.

It is certainly possible to adapt the above described technique for "smart interface" to provide useful ideas and suggestions for patients engaging in either psychotherapy or group therapy thus leveraging the information and personal experiences within the therapeutic processes of the collection of patients precoding them within similar topical sessions which shared very similar psychological and pathological patent profiles.

It is certainly reasonable and appropriate to adopt the present application framework to several fields of medicine. Likewise patients could instantly access the physician or physicians which have or had experienced the most similar clinical situations that and the present situation of the patient in order to seek a second opinion.

13.1.3.17 Example

A Personalized Educational Portal

Another interesting application is to develop and deploy a personalized on-line informational portal containing everything from helpful links, illustrative content, text book information, quiz questions etc. The Personalized Educational Portal (PEP) typically is designed specifically for a particular class and includes several key features which are optimally applied as part of a comprehensive intelligent educational system. These features include the following:

The ability to dynamically customize all forms of relevant information from the educational portal. The criteria for this customization however is based not upon the preferences of the user (unless for example the user receives credit for studies or projects or research on topics which s/he may select, rather it is based upon a predicted profile of the user reflecting his/her strengths and in understanding the relevant content. In particular the techniques of the issued U.S. Pat. No. 6,029,195, entitled "System for Customized Electronic Identification of Desirable Objects," describes a variation of user profiling in which users are able to achieve a proficiency profile within certain domains of informational content where these informational domain(s) are determined in accordance with user's ability to answer a certain question(s) intelligently, discuss the answer to a certain question or about a certain topic or provide a useful reference or URL based upon the level of satisfaction of the requester. This technique in itself could be usefully applied within the present application framework, For example, users may be students, and "experts" fielding questions could be other students (like tutors of sorts) and the payment they receive may be monetary compensation or even school, credit where other student's satisfaction ratings both qualify them for future opportunities to submit future responses within that particular knowledge domain as well as means of verification, and measurements of his/her proficiency over that particular material.

Using the techniques of the parent patent application it is possible to also customize content delivery (including quantity, depth, and difficulty level) which reflects the user's strengths/weaknesses within the various relevant knowledge domains. It is possible to even statistically correlate the user's correct/incorrect responses to certain questions or types thereof as correlated with each other by common terms in the question answer part concurring in similar textual segments. These questions may be found in on-line exams or quiz questions associated with the actual content).

It is possible to statistically correlate which content tends to best remedy certain deficiencies (as determined by incorrect responses to certain questions) by the user importance in being able to readily correctly answer those types of questions following reading the pages.

It may also be useful to apply the above technique towards determining which exam questions or combination thereof most commonly are revealing (if the student answers them correctly) of a student's proficiency within a particular small yet well definable sub-domain of knowledge. i.e. in which statistics show that If the student answers that sub-group correctly, s/he will likely answer the others in that sub domain correctly as well.

A sub-set of each of these exemplary questions from each knowledge sub-domain may be allocated as questions provided at the end of each relevant section of reading content (which may be on-line, off-line or only the responses may be entered on-line, exclusively and if a wrong response is submitted, the system may recommend reading certain content which has (as above suggested) been statistically demonstrated to improve the student's proficiency in that sub-domain. It may also be possible to gauge in advance the students' predicted level and rate of advancement by knowledge domain via on-line psychological testing. Statistical correlations between these test questions and the student's learning abilities (by knowledge domain) can be usefully developed.

The system could even be constructed hierarchically by graduation of skill levels i.e. initial mix of questions of varying difficulty levels in order to gauge what level of content to recommend. The questions which follow are one level higher as is the next set of recommended content unless improvement is not observed.

It may be possible to a decision tree which automatically select which questions most effectively test the students, command of the materials (in this way a shorter exam may actually be better than for longer exams those questions which are more exemplary of such knowledge may carry greater weight). We could also effectively try to create a summary e.g. by topics/headings or even using text summarization techniques submit the areas of deficiency in one student to another student who is particularly proficient in that area for virtual tutorial. For this the tutor can receive monetary and/or also scholastic credit. The ideal scenario is actually creating virtual study sessions in which students are matched together which have the most different complement of proficiencies/deficiencies as possible and where these areas of potential mutual exchange benefit are maximized and are revealed to both students initially. Other forms of virtual study groups could be achieved by grouping students by similar proficiency areas and levels and creating a "virtual tour" with questions and content presented synchronously to a group of correspondence enabled students. In this way, if virtual tutoring or study groups occurs on-line exclusively, it may be performed pseudonymously as desired. We can even take a defined study group and assign it to group projects which can (again) relate to content to which the group is (collectively) deficient. (as group oriented problem solving has been proven to be extremely effective in remedying such deficiencies.

In a very novel application, it may be possible to even statistically using historical data to analyze the relative proficiency profiles of students by knowledge domain (perhaps) even further by, learning ability in those domains by teacher. Thus a virtual class could be constructed using live streaming video which are truly customized to each student's particular needs and abilities, i.e. the idea would be before the semester to identify which teacher(s) were most successful in eliciting the highest levels of achievement among students which have an identical profile to that of the student (such statistics used in this profile may include but are not limited to the proficiencies/grades of the student in all other previous classes, psychological testing and/or (selective) knowledge domain proficiency questions (as above described). Certainly depending upon such investor's personal preference, it is reasonable for each to agree within their personal data disclosure policies to disclose to SDI data regarding the types of investments, amounts and under what conditions (including those conditions stated by other investors such as the example above). The conditions for this disclosure, however, would be that no individual data be disclosed to another investor, i.e., that it be used only for SDI to be able to reveal aggregate statistics and predictions how the investment community, in aggregate, interacts with investment opportunities, and under what conditions, and in exchange for this disclosure, each investor earns the right to access this aggregate data. The individual investor or SDI, acting on behalf of that investor, may then suggest the best terms and conditions with which to negotiate with other investors, in order to optimally achieve their own desired objectives, part of the condition statement to SDI could also include the amount of money to invest in each synergistic investment opportunity which SDI typically would suggest to the investor based upon the relative distribution of its presently invested funds, size of the available non-invested funds as well as the relative risk/benefit proposition of the company to that investor (as estimated by SDI's use of company data as disclosed to that investor). SDI can even recommend or act as a proxy, in negotiating with the individual companies (who themselves could use an SDI negotiating agent representing their own interests). E.g., SDI, acting for the investor, could leverage considerable information about not only, the present investment opportunity, but literally all other investment opportunities which had been submitted to SDI for consideration by SDI affiliated investors. Based upon the total benefit which the investor stands to gain which is based, in turn, upon the SDI recommended comprehensive investment strategy) and the relative downside (relative risks compared to other alternative prospects within the total pool of investment opportunities) may be used to determine basic parameters in which the investor or its SDI proxy would be willing to deal, e.g., the amount of funding, the associated amount of equity as well as other more subjective factors such as amount and nature of control, the use of the funds (e.g. will they be used for a particular technology product or service which, if developed, offers the primary degree of benefit to the investor's existing company(s). It is also worth noting that SDI may identify those prospective investors whose collective cooperation would result in an economically optimal scenario for that investor. SDI, acting on behalf of the collective group of investors, may recommend data disclosure terms to each individual investor (or its SDI proxy) which will optimize the probability that the coalition resulting from the cooperation of all or most of the recommended participating investors will optimize the economic benefit to that individual investor. This data could be no more than predicted value (including marginal value) that particular investor would achieve the desired coalition were to be formed. Based on this data the investors or their SDI proxies could negotiate with one another in order for each investor to strive towards its own individuals best interest while attempting to assure that the global objectives of the coalition are ultimately achieved. E.g., that not only the best investment opportunities within this optimal global plan are funded but also the least desirable as well (of course this information would be concealed from the companies at least until the negotiations are concluded). Accordingly, the relevant investors may wish to compete with one another for the best investment opportunities within this global plan or SDI with their unanimous cooperation again acting in their collective best interests may as a coalition assign investment opportunities to each investor assuring them each equitable treatment and, of course, . . . no competitive bidding for a given investment opportunity (which, of course, would result in ultimately more favorable terms to the collective group.

In this preferred application (of non-competitive bidding) the SDI agent for the collective group achieves a commitment from each prospective investor in the group that within a range of prospective terms, each investor would be willing to commit its participation in the proposed investment opportunity. Accordingly, each company (assuming there are more than one) also agrees to a predetermined range of terms with which it would be willing to accept from the collective group of investors. Both sets of information (typically recommended by the SDI representation each associated party) are disclosed to the main (party neutral) SDI entity. If overlap exists in the range of terms or the ranges are close to one another, the introduction and negotiation between the parties becomes initiated (through the company(s) are not made aware of whether the overlap exists or is merely "within the general proximity").

13.1.3.18 Example

A "Group-Think" Ideas Market

In the consumer driven market place there is a significant unrecognized opportunity in being able to harness the intellectual capital of the consumer market. Historically, (in a non-networked environment) leveraging of such knowledge has been impractical and virtually infeasible due to the inability to identify and measure this resource of human skills (and thus match this skill with in the appropriate matching problem) with the particular types of problems which companies may be in need of new ideas and solutions as well as the lack of a trusted intermediary which can validate on an impartial including basis the authentic contributions of the provider of the information (as not having been claimed by the recipient after the fact as having been previously conceived before). Of course, there are remaining obstacles such as the fact that important problems are sometimes maintained confidential within a company (not even disclosed to some its own internal staff).

With the emerging of extranets a certain amount of inter-organizational knowledge leveraging is becoming more readily achievable. A secondary advantage over an extranet is because of its ability to act as a trusted intermediary. It can validate the fact that that the individual is only dealing with one commercial entity and not its competitors (at least formally). Thus unlike extranet based knowledge leveraging it is conceivable a trust relationship enabling a certain amount of privileged information disclosure is at least theoretically possible.

In the preferred embodiment, SDI retains a record as to the particular problem/solution sets that were successfully or unsuccessfully provided by users in the past in order to improve predictions as to their abilities to successfully address the same types of problems/needs in the future as well as to more accurately determine the "similarity" of different and (perhaps often apparently) disparate problems from the standpoint of the user's ability to solve problems based upon knowledge of their ability to successfully (or unsuccessfully) solve others SDI is entrusted with the knowledge of particular needs of organizations (it may, for example, cooperate with Think Task companies). These needs are commonly oriented ideas (though not exclusively so), for example, suggestions or ideas for product development, marketing, a business model or concept (such as a new business direction), content creation, technology or even potential commercial customers or strategic partners. In lieu of identifying particular problems to which an organization may be desiring a solution, users may instead provide their own ideas and/or solutions to needs or problems which they perceive SDI vis-a-vie its in-depth knowledge of the internal needs and problems of numerous entities is thus able to determine the relevance of the suggested solutions or ideas or alternatively identify a particular organization which is likely to possess matching need which is relevant.

13.1.3.19 Experimental Validation of New Models

A Test-Market

The system of Secure Data Interchange can be used for a test market application, where the effect of a vendor's new collaborative-filtering based targeting model, or new pricing model, or advertising campaign, can be tested by simulation and "hold-out" testing.

A small sample of users can be targeted, and the results measured and reported to a vendor, before a vendor commits to an extensive campaign. This may provide a cheap method to test market conditions for a product, and run tests on sample groups selected on the basis of similarity to other products for which buyer response is known. Random sampling of buyers may be initially performed using data mining as applied for marketing research. Based upon this initial response vendors may identify key features of respondents which are typical buyers, non-buyers, proponents, non-proponents, etc. Accordingly, rapid profiling (as similarly) may enable the automated or semi-automated selection of disclosed segments of users (containing particular attributes) which are likely to have relevant properties. The user selection process may be iterative based upon responses from users as they are selected.

We can demonstrate this value experimentally, for example we can offer a vendor a free-trial and present personalized information/advertisements to one group of SDI users (both on the site and if desired also across the network), and regular advertisements etc. to another group without the aid of SDI. The increase in vendor revenue can be estimated from client-level monitoring of the change in purchase volume achieved with well-focused solicitations on the vendor's own business. Other prospective ads and syndicated purchasables could likewise be virtually overlaid on the vendor's site. Thus degree of increased click through rates, transaction rates and syndication revenues could be tabulated for that vendor in advance of his/her subscribing (or even being solicited) to SDI. Portals are also potential beneficiaries of this service in light of their need to better target their partner's ads.

The ability to the tailor a targeted marketing strategy to users knowing these correlations could be extremely beneficial in both on-line as well as off-line commercial environments. In the process of selecting the target user profiles significant value may be achieved from data collected from that vendor's own on-line presence, and a portion can be sold to other similar vendors; as discussed in the main description of SDI, this now forms a cached query which can be used by other vendors.

We might also demonstrate value to vendors with SDI by monitoring the performance of vendors with SDI technology, and providing metrics for new vendors to allow them to select suitable models of user targeting and personalization. Vendors that subscribe to SDI (the vendor centric version) can provide more attractive offers/products to users, based on information about the wider activities/interests of a user, on other vendor pages, and in the physical world (of course, only to the extent that this information is authorized by the user). Vendors can use information in the central SDI data warehouse for users' cross vendor and within vendor browsing and purchasing habits, and also with respect to profiling information about a user.

One key application is first-time personalization, so that information and products can be targeted to a user when he/she first hits a web page, based on profile information that the user is willing to release. Vendors and users may also sell this information to other vendors. For example, information that a user likes a particular type of music is very valuable for vendors that sell content-based products, for example books, and CDs. Vendors can personalize their service, for example with collaborative-filtering based recommender systems.

13.1.3.20 Example

An Efficient Product Delivery System

Collaborative filtering may be applied to the strategic optimization of a vendor's business, for example to allow a vendor to select an optimal location for an inventory warehouse based on projected consumer purchasing patterns; using the aggregate purchase history of users at that site compared with the other purchase selections at other sites for similar users. The model can also be used to predict demand for new items, and optimal locations for inventory given warehouse locations.

Now, within SDI the vendor can have control over two things:
1) the vendor has access to profile information about users
2) the vendor has a method to personalize and annotate on a dynamic basis the presentation of products to a user.

In common with the smart caching application of SDI to making communication networks more efficient, we can suggest an application to a product delivery system. At any moment a seller can have a good idea of the products that are available, and even the products that are in trucks etc., close to a prospective customer. This information allows the vendor to selectively present items that are close to the user, with labels such as "this is within 30 minutes of your door, NOW". Messages like this allow a vendor to manage its delivery process, because predictions can be made about likely purchase patterns, and then stock that is brought close to user locations can be explicitly advertised to those users. Essentially, we attempt to predict transaction volume on a per item basis, and then positioning geographically physical inventory storage facility locations where inventory can be stocked so that items which a user is predicted to request are already located within the immediate physical proximity of that user.

As the trend to disintermediation continues (whereby we have informational middlemen, but not middlemen that physically hold products) we can allow vendors to notify portal intermediaries of product location within SDI, so that the portals can then pass this information onto customers.

The key role of the SDI system in this application is to allow users to receive personalized recommendations of products, and also product locations, based on their profile information—but without the vendors receiving that profile information. In addition, the shared information about user profiles in the data warehouse allows vendors to build good models for inventory location. Finally, SDI can act as a trusted intermediary between different competing vendors: for example suppose Amazon users bookstore A and bookstore B to provide books, and A and B do not wish to tell each other where their products are. The stores tell SDI where the books are, and SDI presents that information to users on a per-book basis, as books as browsed within the purchasing system.

There are numerous useful applications to improving quality, speed and cost of delivery to a user. In one example, it may be possible to provide same day delivery for on-line purchases. We could also restock a truck on the basis of what a local population of users are likely to purchase; with items presented to a user along with a particular anticipated delivery period, with the Global Positioning System (OPS) or more location-based information on the vehicle providing up-to-date information about a truck's location and anticipated delivery time.

We might also suggest that a user can physically travel to some location close to his/her base, based on information within SDI about the user's travel patterns, etc. Purchasable items can then be located in locations that are convenient for users, or shipped dynamically to those locations (i.e. intermediate warehousing systems). Users can be provided with real-time directions to the location of such a pick-up point via personal digital assistants (PDA) and navigational devices, etc.

13.1.4 Push-based Advertising/Solicitation

Another form of information that a user can submit to the central SDI database via his/her client is the advertising acceptance functions, which state the explicit preferences of a user for adverts, and required payments. The level of compensation that a user requires to receive an advertisement will depend on the relevance of an advert.

An application of SDI is that vendors can use the centrally stored information to request that as a result of a query the query-execution module in the central SDI data warehouse sends advertising solicitations to appropriate users, i.e. users that are willing to receive adverts as specified within their acceptance functions, and willing to release profile information to enable useful advertising as specified in their price rules for regular data.

FIG. 15 illustrates the system for push-based advertising. A vendor requests the right to advertise to users by sending a special type of query to the central SDI data base, where the query states the vendors preferences for user profiles and requests that adverts be sent to users. The vendor never receives the contact information for user's directly. The server also receives payments from vendors and credits users' accounts.

Suppose Vendor V wants to advertise a new product to relevant users. Vendor V can use the SDI database to select users with a high predicted hit rate for the advert, and then compute the value of a bid that it is prepared to pay users for the right to provide them with its advert. The vendor makes a request for bids to appropriate users by formulating this as a query with an associated action, and submits to the central SDI data warehouse where it is handled by the query-execution module. Part of the query is a bid function, indicating the maximum amount that a vendor will pay to display an advert.

The query-execution module evaluates the request with respect to the profiles of each user, the rules that agents submit for allowing access to profile information, and the advert acceptance functions. If successful the vendor pays the minimum value necessary to have its ad accepted by the user, again simulating a Vickrey auction as for the dynamic competition for banner ads described earlier.

For example, suppose a vendor has an advert Ad to push to users, and is willing to pay up to $1 to place the advert with users that have a predicted hit rate of greater than 30% on the advert. The vendor can formulate a query that will first identify users with a predicted hit rate that is greater than 30%, and then determine which users will accept the adverts at the bid price. If successful, the adverts are pushed to the users via the SDI central data warehouse, and the payment required by each user is submitted, less than $1 in all cases. In a simple variation, the vendor might also state a fixed budget, so that it does not send advertisements to more users than it can afford.

We can use the same profile information that provides focused/personalized service to users that hit a site that they have not visited before to form well-targeted mailing lists for vendors. The Secure Data Interchange can form mailing lists in a number of different ways. First, consider a vendor that wishes to send targeted mail to some of its own user-base.

When users connect to a site they indicate whether or not they are willing to receive electronic mail, and provide a "mail certificate" to a vendor if they are happy to receive mail. The Secure Data Interchange can proceed as follows:

(a) Perform analysis for the vendor to determine an appropriate set of users to receive the solicitation, based on the information that the vendor provides about what it intends to market, and provide the list of pseudonyms to the vendor for mailing;

(b) Perform the same analysis, but also forward the communication to the users directly.

Now, consider a vendor that wishes to target new users, represented with different pseudonyms. Users indicate whether the information that a vendor submits about his/her transactions may be used for solicitations, and furthermore vendors indicate the set of business interests that can receive the benefit of information that is submitted to the central SDI server. The SDI server can continue by performing analysis on the relevant subset of the permitted class of data records that pertains to the product or service that the vendor wishes to model, and generate a list of appropriate pseudonyms. Finally, the SDI server can sell the pseudonyms to the vendor outright, together with a certificate that the vendor can send mail to the pseudonyms, or the SDI server can retain control by sending the mail on behalf of the vendor.

Provide vendors with virtual mailing lists that can be mailed to via the proxy server only. i.e. these customers should be solicited based on our analysis. (could even give summary info., without revealing details about users). Furthermore, do not even reveal data that corresponds to a pseudonym to a vendor because the vendor then has that information about me when I am on his site.

A central data warehouse also enables vendors to identify new potential customers. This process is broken down into a number of steps:

(i) The vendor assesses the value of the information present in the secure data interchange. This computation is performed securely either by revealing randomized aggregates to the vendor to enable its own local analysis, or by allowing the vendor to check data and algorithms into the secure data interchange site for analysis.

(ii) The vendor selects criteria for mailing unsolicited advertisements, and agrees on a pricing model. In this case per-impression pricing is the most obvious pricing model, as it is difficult to monitor when a user responds to unsolicited mail per-transaction pricing is difficult. The user could be motivated to do this should the Secure Data Interchange promise future returns for recording a successful solicitation with the database.

(iii) Either the data list is released to the vendor for its use, if this is within the selling vendor's data policy, or the data interchange sends mailings on behalf of the purchasing vendor.

13.1.5 Community Dollars and Business Models

The primary objective of the iamworthit model is to create a market for information about buyers, with agents that submit profile and other personal information to the database able to collect payment in return for queries executed by vendors. In an important extension, we can allow this payment to be made in terms of community dollars, which can only be spent with particular vendors. Community dollars allow a user that provides profile information to the system of SDI to receive payments that are dedicated for a particular type of purchase, these payments are called "community dollars". One central example is to allow a vendor that signs a user into the SDI system to be able to lock a proportion of payments accrued by that user to the vendor's own product/service domain. This is important, because vendors now have incentives to bring new users into the system. A vendor can offer a user community dollars on its (and its affiliates) web site, in exchange for receiving user data via the SDI data exchange.

We allow vendors to pay in "community dollars" for adverts, dollars that can only be spent at that vendor (with the host site of the advert receiving a share of the profits). This provides vendors with the ability to gain long-term customers. Furthermore, so long as the buyer agrees to receive advertising from his/her iamworthit subscription offer, community dollars can be replenished at the rate at which advertisers are willing to pay for impressions. This provides buyers with an incentive to spend at the vendor's site, because the vendor can monitor (pseudonymously) the buyer's that are sensitive to discounts and other special offers (that are delivered as community dollars). With community dollars a vendor can compensate buyers for information that they access, but tie that information to certain vendors (e.g. the vendors that first signed the user into the system). The system has the following useful properties:

(1) buyers are incentivized to provide information that allows vendors to push relevant advertisements/products;

(2) buyers will also be more likely to make purchases at a site or a coalition of sites for which they can receive discounts via community dollars;

(3) providing buyers with community dollars will increase the number of hits to a site.

We allow buyers to receive compensation for providing personal data to vendors, information that has value to vendors because it allows information to be focused (for example relevant ads can be displayed to a buyer, based on his/her profile). The system of iamworthit credits buyers for information, and provides buyers with direct incentives to reveal profile information to vendors.

A vendor can sign up with iamworthit.com and agree to provide only the most restrictive type of community dollars, that can be spent at that vendors site. Community dollars are the currency that vendors provide in return for the right to provide focused information to buyers. Dollars can be general (e.g. for a network of vendors), or very tightly focused (e.g. for a particular product, at a particular time). The buyer-centric infomediary acts as a broker, matching buyers and vendors. Another key role of the infomediary (e.g. the portal) is to protect the buyer from information saturation by controlling the flow of solicitations. (i.e. restrict the number of ads. that a buyer sees)

Community dollars extend the methods in Secure Data Interchange that allow a user agent to sell controlled access to information to other agents, introducing in addition a method which can control the ability of a user to spend received payments. For example, a vendor might be happy to pay a user for the right to display a targeted advertisement if the payment represents a discount that can only be used against products offered by that vendor. Community dollars provide this functionality, allowing dollar payments to be limited to reimbursement in particular "communities" of vendors and/or other agents.

Community dollars instead are more configurable than traditional currencies, which by their very nature are transferable to any agent. In particular community dollars can be restricted to spending at certain vendors, can also have non-linear values to encourage loyalty from buyers.

The novelty in our description of community dollars in comparison to current methods known in the art for electronic cash is that we allow e-cash to be targeted so that it can be spent in particular ways, to be smart so that it can accrue value in non-linear ways, and to be transferable only between the pseudonyms that belong to the same agent.

13.1.5.1 Simple Business Models

A vendor that allows community dollars to be spent does not need to implement a special community dollars/discounts program. The buyer can also be issued a special debit account dedicated to community dollars, that permits pseudonymous transactions without revealing a buyer's portfolio of pseudonyms.

A portal site that hosts advertisers and buyers that subscribe to iamworthit can mandate that all community dollars are to be spent at sites that advertise on the portal site, and also only when the sites are accessed via the portal site. This technique will increase portal traffic. Portals can be expected to compete in terms of: (a) the fraction of advertising revenue that is turned over to buyers, in return for receiving profile information from buyers; (b) the level of advertising that buyers are exposed to; © the nature of the community dollars "package", i.e. what vendors can the dollars be used at etc. This can be useful to attract niche customers, that have common outlooks, interests, and business needs. The primary goal of the portal is to drive traffic through the portal.

The main mode of the community dollars advertising model allows vendors to advertise for free, but provide community dollars to buyers, that can be spent at some later time. The cost of advertising can be linked to the success of advertising. Moreover, the vendor can direct offers and adverts to particular user profiles. The hosting web page receives a share of the vendor's revenue that comes from transactions involving community dollars. The dollars can represent "stored value", such as bonus points, that can be applied to special discounts for offers which are delivered via digital coupons and/or as "straight value" which could be converted directly to purchases thus are equivalent to real dollars at the point of transaction.

The community dollars can be "credits" that can be redeemed as real cash, credits towards discounts, and can be spent across a suite of sites, or limited to one site. The co-pending patent application entitled "System for the Automatic Determination of Customized Prices and Promotions" [U.S. patent application Ser. No. 10/262,123] describes a comprehensive scheme which may be implemented in either on-line or off-line commerce environments. The system enables vendors to deliver a digital message in the form of a promise to a buyer (typically on encrypted form for purposes of targeting a buyer specifically). This promise is typically a discount for a product, set of products (or all products in stock) or may even include entitlement to special privileges for that buyer, thus it is termed a "digital coupon". The community dollars can represent special discounts for a buyer.

The buyer receives a financial incentive for receiving well-targeted solicitations, while preserving buyer privacy within the SDI system. The vendors support the community dollars through advertising revenues and increased sales volume. We can also provide the vendor through which the buyer first subscribes a special "first screen" right that allows the vendor to provide a buyer with his/her first impression as soon as s/he logs on.

Of course many variations of the community dollars scheme are conceivable and the current description is in no way intended to limit the scope of the claimed invention. For example, the ad revenues generated may instead be apportioned between direct payment which the buyer receives, in real cash, community dollars which the vendor (or ISP) credits the buyer and/or direct payment which the vendor (or ISP) receives as well as iamworthit or any combination of the above such as exclusively direct payment which is apportioned between the buyer and the vendor (in the absence of the community dollars scheme).

In one variation all community dollars collected by a buyer must be spent back at the vendor site at which they originally subscribed (and also the site that hosts the adverts of other vendors). A buyer can spend the dollars with any vendors that are site partners of the original site. This provides the vendor an incentive to accept and promote the community dollars concept.

The value of providing a buyer with targeted solicitations is estimated at approximately $300 to $500 per year (based upon $120 per 1000 targeted impressions at approximately 25 impressions per day). Given these significant benefits, a vendor can provide a buyer with a significant discount (in the form of community dollars). Vendors benefit from increased sales volumes. When the price of items is less than the value of dollars, the vendor can limit the amount of discount that is available on any single product, or only allow community dollars to be applied towards customer discounts (which may nevertheless be quite substantial).

13.1.5.2 Implementation Details

We can use meta-tags to restrict the way that community dollars can be spent. The tag associates the dollar, but the dollar is released within the system of blinded signatures [Chaum 85; Chaum 92] so that a buyer that collects dollars over many transactions with different vendors can spend the dollars without compromising his/her private information about pseudonyms. Dollars can be restricted to a number of vendors, and also restricted in additional ways—i.e. they can only be sent if the buyer visits the site through a particular portal, cannot be redeemed at a competitor, are worth a bonus if redeemed with certain vendors, etc.

The technology used to implement community dollars is based on cryptographic techniques known in the art, for example within a digital signature scheme for electronic-cash as described in the work of Chaum [Chaum 85, Chaum 92]. The core functionality which must be supported by any system for community dollars within SDI is:

a) An agent can receive community dollars under multiple pseudonyms but spend the dollars under the same pseudonym. The dollars must not allow an adversary to link the pseudonyms and break a user's identity.
 b) Community dollars can be restricted to be spent with certain vendors and for particular products/services.
 c) Community dollars can accrue (and lose) value in non-linear ways.

The function of (b) can be supported within a system of electronic coupons, based on cryptography, as disclosed by Tygar et. al. [Tygar 98]. Alternatively, we can extend Chaum's [Chaum 85; Chaum 92] technique of blinded signatures to allow dollars to be signed with the private key of a certifying agency, where the key is the private pair of a public key which indicates the ways in which the dollars can be spent.

The use of blinded signatures ensures that at the point of validation of cash, where a stream of random bits is signed by the "bank" to validate its value and restrict its use, the bank is blinded as to the identity of the bits, so that no-one other than the agent that creates the bit stream can trace the cash. This allows community dollars to be transferred between multiple pseudonyms of the same agent without being used to break an agent's identity. A vendor will accept community dollars as part-payment so long as the digital signatures indicate that the dollars are valid for the purchase. An extension to the scheme presents duplication, with real-time verification of tokens. The vendor can finally exchange the dollars for "regular" cash via an electronic bank that accepts community dollars (debiting an associated account).

We suggest an electronic wallet application to allow users to store tokens locally, and then transfer them securely between pseudonyms. The electronic wallet can be implemented in a client-side SDI proxy, or within the central SDI data warehouse, within the eBank module. The invention draws on techniques described in D. Chaum [Chaum 88; Chaum 92], where the use of a secure chip in "smart card" technology prevents the tampering and duplication of e-cash.

The solution proposed is that all e-cash must be signed not only with the private key of a vendor, but also with the private key that corresponds to a particular pseudonym within SDI. This is illustrated in FIG. 16.

Effectively cash becomes a one-to-one mechanism for payment, tied to future transactions between a user under a particular pseudonym and a particular vendor, for a particular purpose. The eBank allows a user to transfer cash across pseudonyms via the client-side SDI proxy which maintains the user's profile identifiers.

We support a dollar transfer command, of the form TRANSFER (PID_1, PID_2, amount) where PID_1 and PID_2 are the public keys to identify two pseudonyms owned by the same agent. Before executing such a transaction the eBank requires that the requestor answers challenges for both identities, for example signing random messages with the corresponding private keys. This proves that the requesting agent has authority for both pseudonyms. Finally, we need to be sure that the pseudonyms belong to the same subscriber to SDI, which is possible via the one-way identity look-up functionality of the central SDI data warehouse. The eBank can query the look-up table, and check that both PIDs correspond to the same UUID.

For example, an amount of dollars below a certain threshold can be programmed to have no value, but additional dollars can have increasing marginal value. This provide a non-linear incentive for a user to stay with the same vendor in a market with low switching costs, or a non-linear incentive for a user to receive adverts from the same advertising agent. The advantages to vendors and advertisers are repeat purchases, consumer lock-in, and also improved profiling from interacting with the same agent over extended periods of time.

The functionality is embedded into the community dollars. The framework expands the idea presented in Chaum [Chaum 85; Chaum 92] where the public key of a public key /private key pair indicates the dollar value of a community dollar. In this case, we allow any number of public-key/private-key pairs, and use the public key as an index into a table maintained within the eBank to provide additional criteria about how the cash can be redeemed, for example it has more value if used in combination with other community dollars, it decays over time from data YY/YY/YY, etc. . . . We do not intend to limit the variations possible, but provide this as a framework for ways in which constraints and conditions on community dollars can be extended. For example, community dollars can also be programmed to lose value over time. This can increase the number of repeat purchases In the preferred implementation we use an "electronic cash" infrastructure for the community dollar system. A buyer's SDI-enabled client-level proxy stores dollars that the buyer receives securely. Dollars are anonymous and non-traceable, so that the buyer can maintain a single "bank" of dollars, and aggregate dollars collected across pseudonyms for a single purchase, so long as the purchase satisfies the constraints on the dollars. Each dollar is created using Chaum's blinded signature technique, and also signed with the conditions on its use.

This scheme allows vendors to monitor the offers that buyers respond to, because when a buyer presents a community dollar—the dollar can be validated to indicate the type of discount that it is, even if the identity of the dollar (i.e. the serial number) is untraceable. SDI provides vendors with guarantees that buyers have once-in-a-lifetime pseudonyms, so a voucher of a particular type that is redeemable only at vendor V and was issued by vendor V allows vendor V to be sure that the voucher was issued under the same pseudonym, and has not been transferred to another of the buyer's pseudonyms.

In an alternative architecture, the ISP-level SDI proxy, or the web-host for the advertising service, can maintain community dollar "debit" accounts for each buyer. This is more limited, because it does not allow buyers to transfer dollars between pseudonyms without compromising privacy (revealing a portfolio of pseudonyms). However, in a scheme where advertisers require that agents have once-in-a-lifetime pseudonyms, and only release community dollars to be redeemed at their own site, this is not limiting. Both of these approaches are useful for "community dollar-enabling" numerous or all sites.

13.1.5.3 Example Community Dollar Applications

On-line Gaming Site.

Consider an on-line gaming site that has a network of affiliated vendors, that do not pay to advertise, but provide community dollars that can be spent either at the vendors—or at the casino. When buyers lose money at the casino the casino receives real dollars from vendors. The casino is one possible outlet for spending dollars—and a vendor only pays the casino (the host of its ads) if a buyer chooses to gamble on the site, and loses its dollars. The gaming site becomes a portal, with links to partner vendors. Each vendor offers the buyer community dollars, that can only be spent back at that site or at the casino. However, the number of dollars which can be spent at the store is substantially less than the number of community dollars which can be spent at the casino. IF the buyer accepts the credits, whenever the buyer accesses the URL to the store he/she is either automatically routed first to the casino portal or to the vendor site whereby a prominent banner is displayed which is displayed to that particular buyer from which the buyer can conveniently engage in a casino gaming session.

If the buyer loses a substantial amount of community dollars he/she may regain the lost credits by spending a specified amount (in real dollars) at a partner vendor. This provides a safety-net for buyers. The cost to the vendor is the cost of the dollars that the buyer lost at the casino, and the cost of replenishing the buyer's community dollars (which can be used for further gambling). However, the vendor makes a sale—so the vendor is happy so long as the dollar value is a reasonable discount for the sale. Clearly, the casino gains substantially through the redemption of these community dollars. The vendors can make an agreement with the casino where they only compensate a fraction of community dollars. A percentage of a buyer's profits at a casino are paid in community dollars, another percentage can be paid in real dollars. Perhaps the casino can also provide vendors with a revenue share.

We allow for community dollars that are restricted to particular products, and customized for an individual buyer.

The dollar-object can contain two parts: the first part is readable to the buyer, and indicates the nature and the amount of the discounts to which the credits can be applied. The second part of the message is encrypted, and accessible only to the vendor, and is signed by the vendor to prevent any form of alteration. The information can contain the dollar credit to the buyer, the terms and conditions of the community dollars, a dollar amount, the pseudonym ID of the buyer, an expiration date, the terms and conditions of discounts and special offers to which community dollars may be applied in combination with a partial cash transaction.

The vendor must check that it has not previously redeemed any piece of community currency with the same identifier; the identity of the buyer is correct; the date; the terms and conditions. Some vendors may allow redemption of the community dollars at other vendors' sites.

Web-Hosting Application.

One of the commercial applications of which community dollars may be used is in offering web sites free web development services and/or free web hosting services. In the former case a Web development tool provider could share in the community dollars revenue stream from iamworthit ad revenues, and accordingly cover the costs of the tool suite. Whenever new upgrades including new development modules are added, the costs could be covered by an incremental increase in the percentage of advertiser transactions. There is considerable economic pressure on web tool providers to provide competitive solutions which are not only rapidly deployable but also extremely robust (typically bundling some form of personalization technology), thus as a result of economic pressure to drive advertising and e-commerce transactions through the site (often through the use of a revenue sharing model which can reduce upfront costs to the vendor substantially). iamworthit through its customer loyalty enhancement capability provided by community dollars can significantly improve the effectiveness of personalization at the site (perhaps more significantly than cookies which often are blocked and all typically not implemented so as to be recognizable across the collection of sites which the tool provider supplies or the web host services).

It is believed that the revenue sharing model may be structured to cover both the cost of the tools, web development services as well as web hosting (thus unless he himself offers a complete turn key suite of solutions and services a tool provider which integrated the community dollars concept could be in an extremely competitively advantageous position in attracting strategic relationships with Web developers and Web hosts. The tool provider may for example sell an ad server module or could "automatically subscribe" the user with an opt-out option. The very fact that all of the tool, Web development or hosting provider's sites are exempt from ad blocking/ad replacement technology (barring iamworthit competitors) would be a significant motivating factor in incentivizing sites to utilize their services (e.g. through promotional programs). An emerging large market for Web development is providing these services to individual end-users. Completely free services in this regard would likely mobilize what activity in what is now a dormant, albeit enormous commercial market. For example, tools for developing elaborate Web-wide community portals could have customized community links which are matched to the user's personal profile. Visitors to the site (subscribed to iamworthit) could experience an additional layer of personalization based upon their own user profiles.

Web hosts may also use an additional feature (optionally to significantly drive increased traffic through potentially all sites on their network. This optional feature is a set of links (e.g. along the side of the user's screen). These links are used to point the user to other relevant pages issuing aggregate site usage statistics of their visitors (as described in the parent patent application) iamworthit, user referral links may additionally personalized based upon their user profiles.

13.1.5.4 Vendor Coalitions

Vendors may choose to form coalitions, to allow buyers to spend community dollars at any "partner" site. Vendors that have similar buyer bases can be automatically identified using collaborative filtering. (i.e. determining similarity with the present vendor, from the aggregate vendor preferences of a given vendor's subscribers). Also, these resulting metrics could incorporate predicted online spending by each buyer at each site. This could help to narrow the selection of sites the vendor wishes to partner with and/or the selection of these partner sites could be determined and presented to the buyer to even further narrow the selection for each buyer. All vendors in a coalition advertise, and provide cross-links and up-links to other vendors.

The coalition model is good for buyers that are more likely to find products that they want. Vendors can share the risk of advertising, since dollars provided to one buyer by a particular vendor can be redeemed at another vendor. Advertising and community dollars increases sales volume at all vendors in the coalition. Furthermore, studies on on-line buying behavior suggest that on-line shoppers tend to make purchases across a variety of categories of e-commerce products, thus it is likely that they would also prefer the freedom and flexibility which is associated and can be provided in this way only by deploying a multi-site community dollars scheme. Iamworthit usage statistics are very effective in identifying prospective vendor coalitions which consist of complementary (non-competitive) vendors. Alternatively, personalized coalitions which can be created in ad-hoc fashion for each buyer can further serve the buyer's interests by increasing the freedom and flexibility which the buyer often strongly desires. Though practically this can only occur for those (perhaps smaller less commercially significant) vendors which have not been a major coalition consisting of vendors which many buyers tend to use which collectively serve a substantial percentage of the overall user base.

Thus if the vendors have not established firm partnerships with other vendors, we can even allow vendors to form dynamic and virtual coalitions within SDI, with a potentially unique coalition of vendors for each buyer. The coalition may consist of an optimal pool of vendors, as determined by SDI collaborative filtering techniques. The goal in this model is to provide buyers with a particular "brand" of community dollars.

Multi-Vendor Community Dollar Portal

We can allow each vendor to retain an exclusive right to advertise to each buyer; and also develop a portal for the coalition—that gives advertising prominence to coalition members. Portals will be expected to aggressively promote community dollars. Buyers that collect community dollars become loyal return visitors to the portal and its associated vendors. In the case the vendors do not generate the same value we can provide community dollars in proportion to the value that a vendor contributes to a coalition.

We can also provide targeted advertisements for the vendors at the portal, using the user profile to focus ads. The categories and links at a portal (that might include a search engine) can be re-prioritized (highlighted and/or re-ranked) in accordance with the buyer's preferences (as described above), and to favor subscribing vendors. In commercial practice, the motivation for vendors to become coalition members is largely driven by customer partnerships with providers of e-commerce tools and solutions. There are many emerging trends by which these intermediary tool providers could conceivably integrate community dollars. Consider loyalty points (e.g. www.mypoints.com) or loyalty bonuses programs (e.g. www.clickrewards.com). These points or bonuses could be substantially subsidized by the advertising and deeper benefits passed onto the consumer. Other simpler technology which would compel these vendors to cooperate include shopping basket technology, the emerging standard, ECML, common Web tool and/or tool development solutions, common hosting solutions, common ad delivery systems.

Vendors pay the portal site to advertise, and the portal provides community dollars to buyers in return for privacy-protected profile information. This model does not provide incentives for the portal to provide well-targeted adverts, because there is no direct link between a portal's revenue stream and the vendors' sales volumes.

A portal with community dollars that can only be spent under a single pseudonym at its partner sites also provides an incentive to buyers to interact under a single pseudonym—which in turn allows a portal to profile buyers across its complete vendor partner network. Buyers will access many sites with the same pseudonym. The system of SDI allows vendors to leverage the shared profile information as buyers browse web pages and products.

We can also lock buyers into a single portal—and a single coalition of vendors—with community dollars that "decay" over time, and must be continually replenished. In this way a buyer cannot pick and choose different portals, and different community dollars, but can benefit mainly from high web-browsing volume through a single portal. The value to vendors in terms of consumer lock-in can be considerable.

Affiliate Network. A coalition of vendors can join to allow a buyer unlimited access over all affiliate vendors. The program can be sold through the existing marketing channels of each vendor, as well as through a portal directory of sites for those vendors. Vendors that join can be required to promote the program through their own marketing channels. Additionally, perhaps vendors are selected to cover exclusive physical regions (e.g. in the case of a set of ski resorts), or exclusive product categories (e.g. in the case of on-line vendors). Vendors can provide a community dollar-for-real dollar exchange, in return for becoming part of a vendor network. Alternatively, perhaps vendors provide an up-front fee, that can be recovered via dollars spent by buyers at their own site. Each vendor is obligated to sell the partner network community dollars, but is not necessarily required to promote the other community dollar vendors.

An affiliate program could be developed by partnering with the affiliate network's advertising. Typically each advertiser provides a purchasable(s) which affiliate sites offer for sale on their sites in exchange for a percentage of the resulting sales. In the community dollars variation, each vendor agrees to tailor an offer for their products/services on the affiliate network which is subsidized by community dollars which the user collects after subscribing to iamworthit. An example solicitation could be "receive $100.00 free credit toward future purchases at booksamillion.com plus $50.00 cash.

Creation of an iamworthit online multi-store retail site. Establish a retail presence in a (or potentially multiple) retail niches. The primary business model would be to leverage existing large iamworthit subscriber base (involving the other various types of commercial partners) in order to dedicate a certain percentage of the community dollars (e.g. thirty percent or approximately one hundred fifty dollars per customer) which could only be redeemed at that multi-store retail site (and/or the value of these dollars could be worth more at the retail site). In addition, in this model, the independent advertising initiative of iamworthit would be geared towards community dollar credit of that retail site. It should be noted that, because if other outside competition occurs to the basic iamworthit scheme to a substantial degree there will not be a compelling incentive for buyers to adopt a more restricted form of valve (as retail credits at a particular site), versus accepting the credit from a competitor in the form of cash. Thus this model could provide a viable means for attaining a leading position in one or more on-line retail markets if this competition does not substantially exist.

Marketing Network. Iamworthit sites which offer a community dollars promotion could, upon the buyers subscribing to iamworthit, additionally offer the buyer with a down-loadable client based software which provides a small promotion in conjunction with a link to iamworthit. Each time a recipient of the email subscribes to iamworthit, a percentage of the value of that customer is credited back to the buyer in the form of community dollars. Each subscriber resulting from the current subscriber's email (though reduced) provides an additional credit to the original subscriber in accordance with the marketing network business model. If the site originally delivering the promotion is not an e-commerce site, a percentage of advertising revenues resulting from the subscriber (and potentially all resulting subscribers) could be used. It could be applied in the form of iamworthit advertising (or exchanged) for advertising in an ad server.

Free Web hosting. A portion of community dollars may be allocated in a revenue sharing arrangement between the buyer and the web-site from which subscriptions to the service are provided, thus enabling Web hosts to offer free hosting services while also receiving full payment which is iamworthit advertising supported. Iamworthit could also easily use its vast statistical data collected form each site in the hosting network in order to predict which sites tend to be most commonly linked to from the present site (and/or share "similar content"). This technique is described in the parent patent application by establishing these links users can better access relevant information. In one preferred variation, all non-customer's sites are not included in the referral links. This level of targeting is likely to drive significant traffic through the Web hosts' network (and even more so if iamworthit user profiles are transferred to the site upon visitation of an iamworthit subscriber as these similar cross-links can also be personalized to the user.

13.1.5.5 Transaction-Based Revenue-Sharing

In transaction-based revenue sharing, the only time that advertisers pay to provide an impression to a user is when a sale results, in this case the hosting site receives a cut of the final transaction price. The vendors provide buyers with community dollars directly. The dollars, which are stored at the portal site, allow buyer-spending to be tracked. This allows the portal to monitor when a sale occurs, not just a hit on a banner ad. With transaction-based revenue of this kind, personalization is critical. In this model the portal with give prominence to adverts from successful sites. A portal site may forgo payment from a vendor in exchange for the increased click-through from a strong network of community-dollar enabled vendors. Value is credited directly to buyers for future redemption at that particular vendor's site. The community dollars provided to a buyer can be restricted, such that a buyer can only redeem dollars if s/he maintains enough visits to the portal site.

Vendors can offer discounts on their own products directly, instead of providing the portal with money for advertising. The vendor only pays to the extent that its advertisements are well-targeted. The vendor could also request special ad priority. A vendor that presents advertisements to a buyer offers the buyer discounted promotional offers for products offered by partner vendors, in exchange for subscribing to iamworthit and receiving targeted impressions. These offers are in lieu of community dollars, and can be provided by partner vendors—maybe in exchange for a right to a number of ad deliveries for the vendor's own advertising purposes.

We can also require that buyers are automatically routed through a portal when accessing any partner vendor directly. The portal (and therefore the coalition of vendors) then receives exposure each time the buyer clicks on an ad (or link) to that vendor. The portal may also provide benefits (e.g. additional advertising prominence) for sites which are responsible for driving traffic through the portal. Community dollars can be provided whenever the buyer accesses a site from the portal. Portals can offer free advertising to e-commerce sites (forgoing advertising fees). The portal provides discounts to buyers that purchase a product following a link provided at the portal.

A buyer receives the discount by validating a purchase with the portal, and the site agrees to provide the portal with a share of revenue whenever the buyer cashes in community dollars in this way (we do not rely on HTTP refer mechanism because that can be blocked and falsified. Furthermore, we do not rely on URL+extension correspondences, also not secure-instead rely on providing buyer's with incentives, and monitoring buyers that have earned community dollars.)

13.1.5.6 Delivering Per-Impression Dollars

We can deliver community dollars on a per-impression basis, with vendors competing to offer buyers high values for being able to present an advert. The existing collaborative-filtering engine at a buyer's SDI client-level proxy can filter ads, and select appropriate offers, using community dollars as just another measure of the usefulness of a message. This is an alternative to providing dollars on a one-off (or even yearly) basis, for consumption via the vendor's site that the buyer subscribes to the service.

A hosting site can take a fraction of any dollars provided to a buyer. Alternatively, a site can convert the value into the community dollars to provide to the buyer, possibly at a preferable basis. The portal might also wish to convert its commission to credits for the buyer at any one of its partner vendors, with the stipulation that the buyer must access those sites via the portal in order to be able to redeem the credits.

13.1.5.7 Providing Loyalty Bonuses

We can use the client-side SDI proxy to provide vendors with "loyalty guarantees", that are credentials to verify that the buyer has executed no transactions with any competitor, under any of its pseudonyms. The client-side SDI proxy is in a unique position to be able to implement this monitoring, because no other system knows a buyer's portfolio of pseudonyms. The buyer can present its digital credential when visiting a vendor's site.

A vendor may wish to provide loyalty dollar credit; for example, it would be possible for vendors to offer buyer's credits if the buyer is a 100% loyal customer i.e. that she/he did not (over a specified period) do his/her purchases at the site of any competitor. For example, certain types of high value customers could be given considerable value in the form of credits or discounts as a result of demonstrated vendor loyalty. The credential can be time-stamped, to prove loyalty. It does not reveal any information about the buyer's other pseudonyms to a vendor, because many pseudonyms will exist that have not made any purchases from a competitor. Upon accessing the vendor's site, this credential may be presented to the vendor. One criteria for the above benefits could be that the buyer may visit a competitor site, and engage in interactions; however s/he should not transact with that vendor.

113.1.6 Alternative Business Models

Offer discounted or free services in return for the right to access profile information.

Examples: Free or discounted retail products with "niche" partners in each category; Free dial-up ISP (as an independent ISP or a service to jointly promote free access with ISPs); Free Cable and ISP service, Free pay-per-view (note that viewing patterns and the associated content could provide additional valuable user profile information); Free phone service (e.g. advertise subscription service on screen phones or audio ads from pay phones); Free prepaid calling card; Free print media subscriptions (magazines, newspapers); Free book clubs; Offer any combination of the above with "deep discounts" for each (this can involve $350 community dollars per buyer or it may simply involve certain purchasing limitations per customer). Each vertical niche partner in exchange gets exclusivity within their own respective niches to target advertise to those buyers (e.g. retailers); Free access to sporting events; Free credit for casinos; Free lottery tickets; Free charity donations; Discounted hotel lodging; Monetary credit to a credit or debit card (either an iamworthit branded card or provided as a partnership with the card companies; Monetary credit to a diner's club; Free subscriptions plus credit to retail buyer's clubs (on-line or off-line); Credit or discounts for book clubs; Free musical concerts, or theater presentations, movies or access to arcade entertainment; Free access to amusement parts or theme parks; Free golf season passes; Free commission fees for stock trading; Free commission fees for travel booking (if implemented for on-line buyers would be less compelled to search for travel information on-line though go off-line to make their bookings).

Allow the ISP to promote free Internet access through personalized advertising on iamworthit.

The ad server can even recognize through the associated domain names, the buyers which are coming from a competitor ISP. So long as that ISP is not a partner of iamworthit, the associated buyer would be selectively targeted with an offer of this sort "free Internet access" by subscribing to iamworthit". Smaller ISP's would be particularly compelled by such offers to their direct target prospects. This is because they are operating on a "thin margin". Furthermore, both they and their small regional counterparts would be particularly vulnerable to this type of advertising by regional competitors from the same geographical area, during specified period of months of initial usage of the service, the share of profit due iamworthit could instead be committed to purchase additional advertising for the Internet service provider (or the balance of this profit traded-out in the form of additional advertising through the ad server partner).

The ad server partner could further become an exclusive partner of iamworthit on the following commercial venture: Relationships as established with on-line merchants and other e-commerce sites. The vendor actively promote an offer to their customers through both off-line media (using a URL unique to that vendor) and on-line advertising through the ad delivery partner. The offer may say (as an example), "receive three hundred dollars in purchasing credit at Books a Million in exchange for subscribing to iamworthit (or receive five hundred dollars worth of discount credits at Books a Million. In addition, as a further benefit to the vendor iamworthit could trade its own advertising impressions with impressions on the ad server for the current offer (in order to reach a different base of buyers which are not currently subscribed). A particularly compelling industry for this application is on line travel inasmuch as a plaguing problem to this industry is the fact that many buyers use travel sites as an informational resource on available travel deals and packages, but ultimately book their trips directly through a travel agent (thus cutting out the travel site). A three hundred dollar a year travel credit would be a compelling incentive to many buyers to modify their current travel booking habits. Affiliate networks are also an ideal channel for these types of promotions because affiliate sites agree to participate (typically) purely based upon the degree of the profit sharing opportunity (which would be significantly larger than most types of transaction—based affiliate advertising).

Alternatively, it would be possible to offer websites the ability to become Internet service providers where the interface to the ISP home page would essentially be heavily branded to that site or portal. Companies like GTE already offer a "Virtual ISP" service in which the content to the ISP home page is unique to the ISP while the network is provided by the virtual ISP service. This model would be particularly compelling for sites which are largely community oriented and have a potentially loyal customer base. Moreover, interestingly, many of these community sites are offering many of the services and capabilities that a full-blown ISP would offer from its home-page, e.g., a portal interface, links to high-quality content, chat/forums, e-commerce, commerce affiliate links, etc.

Free Community-based Content.

Create premium content which is free to iamworthit subscribers, subsidized by revenue from profile information. Each iamworthit buyer would be granted free access privileges to the premium content on all sites which are part of the program. Some content may be purchased and/or reusable, other may be entirely site-specific and novel. This model would be particularly appropriate for community sites which are largely member-based (or for example ISP-member-based communities) where much of their value to members is based upon information and other content which it can provide. It is conceivable that all iamworthit-enabled community sites would enable free access to their content by all other iamworthit customers (though it is possible that they may be mutually restricted if members of competitor communities as desired by the community site). If an ISP service is not already provided, a virtual ISP service could additionally be offered at a substantially reduced price or possible free. One could imagine further extending this present network of free content to free content iamworthit subscribers for free access to fee-based television programming or VOD services. In as much as community sites and television channels are becoming different media for delivery of the same information as the number of channels increases, VOD becomes technically enabled, and, most imminently, full motion video can be delivered upon demand over the Web.

Free Access to Subscription and Fee-for-use Information of the Web.

In addition to the aforementioned free community site content, it would be possible to further provide free and automatic access to fee-based information on the Web. These costs may be able to be covered by the model across all or most sites depending upon the usage characteristics of its buyers (e.g. assuming advertiser/community dollars payment to the sites are averaged across buyers in accordance with the consumption patterns of the average iamworthit buyer). The identity (pseudonymous) of the buyer would have to either be disclosed to the site via the proxy or a unique pass code (as required by the site) provided to the buyer could be automatically entered upon the buyer accessing the fee for use area requiring the code. A directory (portal) of these fee-based sites would be a useful adjunct to subscribers.

Bundling iamworthit links with hardware with a PC manufacturer.

Many PC manufacturers are now recognizing e-commerce as a very important sales channel. The present model would involve the P.C. manufacturer bundling a link along with a promotion for iamworthit. The promotion would offer the buyer cash credit for the buyer. The PC manufacturer would also receive exclusive advertising rights to target buyers whose browsing behavior profile qualifies them as a future sales prospect. E.g., instead of cash credit as the profile is identified, the offer could then become modified to offer free hardware or credit to their purchase. Because PCs are highly portable, the advertising targeting techniques described in LEIA could add substantial additional value to advertisers. A similar model could be used for manufacturers of PDAs.

Allow matchmaking of buyers based on profiles across a network of iamworthit/community-dollar sites.

A menu of different forums and chats can be displayed on each iamworthit member site. (the underlying methodology for which is described in co-pending patent application "Virtual Community Service for System for Customized Electronic Identification of Desirable Objects"). In accordance with this specification, a variation of the service involves the process for identifying individuals who most closely match a given category or target object. For example in the context of the present implementation a category or content, merchandise or a purchasable being specially promoted may be the focal point of a discussion forum or chat room, which is automatically organized by the Virtual Community agent. Accordingly, a portal (or in accordance with the present trend) a site with which a portal interface is integrated utilize the present techniques for generating virtual communities for each category or sub-category of content on the portal or for direct access into a forum or chat room which was automatically created around that particular site (as the target object used as the matching criterion). As described, the user may navigate a hierarchical menu of virtual communities which may be constructed automatically according to the methods described which involves communities assigned to category, sub-category, and association with corresponding sites. Ideally in this scheme the portal is actually a "virtual portal" which may be utilized in providing access to the communities across numerous sites (and/or ISP homepages). Users may also be navigated (at the individual user level) which along with their pseudonymous user profile data is subject to their data release policies. In a variation of the above schemes, if there is geographical information which is associated and which is released in accordance with the above individuals and/pr communities (e.g., as may be occurring or scheduled to occur in physical space), LEIA may be employed as a primary (or additional) selection criteria for navigating the present information accordingly.

Advertising in Exchange for Equity.

A potentially attractive optional form of value, which could be provided to iamworthit customers involves equity shares in companies which advertise to the buyer (in lieu of community dollar credit or cash). This scheme is an ideal application for iamworthit in as much as iamworthit customers can be highly targeted and because many Internet-based start-ups are highly niche community oriented (thus iamworthit customers who are interested in the sites can be efficiently identified and targeted). Moreover advertising is typically very expensive which in the absence of accurate targeting may be of questionable value. It should be noted, however, that because the primary objective is to both find viable prospects and to engender an element of loyalty (which the equity model does). This scheme would be the preferred approach to advertising for sites which do not sell on-line where community dollars would be the preferred loyalty engendering scheme. In order for this model to substantially provide its desired advantages of increased advertising exposure to fledgling web based companies, the iamworthit subscriber base would have to be quite substantial.

Loyalty credits for off line retailers.

Deliver through the back of sales receipts, kiosks or direct mail or on-line substantial purchase credit to retailers (e.g. grocers') customers, using the aforementioned technique of utilizing a unique URL to identify the vendor and/or promotion from which an iamworthit subscriber originally accessed the iamworthit subscription site (thus identifying for both buyer and vendor the appropriate denomination and/or terms of community dollars issued to the buyer). In the preferred implementation, a loyalty card is used to identify the buyer thus enabling the community dollars value to be provided to the customer at check-out as straight credit or possibly an enhancement to loyalty credit. The buyer may also be identified via credit card or alternatively a voucher (or coupon) could be printed from the buyer's computer or from a kiosk which is typically situated near the entrance to the store and which could be activated upon insertion of a loyalty card credit card (or associated authorization code) and could also be used to disclose the buyer's community credit balance. A unique identifier for that voucher or coupon is provided and non-tamperability measures are provided such that the buyer's community dollars account can be appropriately debited upon redemption. Preferably, a pre-determined value is specified on each voucher (which could be predetermined by the service or the buyer) or alternatively, the total community dollars balance could be specified on the voucher along with the buyer's name/address and redeemable only upon presentation of valid buyer ID.

0 Free ASP Services—Web-centric applications are becoming an increasing central part of the e-business infrastructure. iamworthit could potentially enable organizations to gain free access to these Web-centric applications in exchange for iamworthit enabling their employees and customers (e.g. which may use some of these applications as well).

Credit to a User's Credit Card—Many credit cards are tailoring promotions to enhance not only acquisition of market share but also loyalty of its users. The user-centric SDI provides an enhanced (e.g. rebates for expenditures) platform which could provide more efficacious loyalty enhancement marketing strategies for card issuers. For example, a credit card user could be given certain credit towards the card (e.g. via a promotional offer) for becoming an iamworthit subscriber (which is largely ad revenue supported). An additional novel application could involve providing an offer for an additional benefit which could be provided if the user performs all of his/her on-line transactions using the present credit and (i.e. wherever the card is accepted).

An iamworthit pseudonymous credit card [e.g. LMP 94] could be provided whereby users collect credit for advertising (e.g., on billing statements for the ad) which the user receives as well as the advertising delivered via iamworthit's on-line (Web or targeted email) as well as pseudonymous physical mail, telemarketing calls using user profile pseudonyms and one all time or pseudonymous phone numbers. This user profile data consists in part of off-line data and on-line data.

Free Personal Portal for Individuals.

It is reasonable to offer individuals completely free, Web design/development and hosting services which are offered and mass marketed. At the time this patent was written, Web developers were offering such free services in exchange for revenue sharing for advertising product syndication or e-commerce offering on the individual's site. Iamworthit could conceivably be deployed in conjunction with this commercial model whereby either a portion of the user's own iamworthit profiles are used to subsidize (or subsidize in part) the portal and the developer and/or revenues shared from profits from iamworthit subscribers who subscribed from the portal are utilized also (or instead). As such, it is also reasonable for such a developer to provide links on affiliate sites (e.g. access an affiliate network) which offers free individual portals in exchange for subscribing to iamworthit (and perhaps agreeing to offer a similar iamworthit expectation from that portal as well from which the user can also share in a portion of the revenue stream. Such a program could even be structured in its revenue distribution to the subscribers as a multi-level marketing network.

Multi-level Marketing Network.

This economic model for distribution of shared revenues from iamworthit may be implemented several ways. For example, as above suggested, the user's Web portal offering solicitations for iamworthit (as a standard offering or in combination with a free personal portal), could be implemented in a number of different ways, such as a). The solicitation is presented upon the user's Web portal. b). The solicitation is made through the traditional sales channel of direct one-o-one correspondence with friends or associates. c). The solicitation is attached to any email messages of the user such solicitation provides a link to enable the user to subscribe.

13.1.6.1 Agent-Mediated Value Exchange in the Supply-Chain

The information in the SDI data warehouse can allow vendors to identify business relationships between other vendors, for example between vendors and their suppliers, and between vendors and their customers. With this information a vendor might attempt to exert pressure on another vendor by making direct offers and incentives to their suppliers and/or their customers. Of course, in all cases information is only available subject to price and disclosure policies, but with there being at least two parties in any deal no vendor can unilaterally prevent this kind of information from reaching the SDI enabled data market place.

Information may include the benefits/disincentives associated with particular actions, and help to identify actionable events. Agents might offer other vendors a share in some future profits that result from taking a particular action, so that little up-front collateral is required. The information in the data market can be used to estimate the value of this share, for example, based on information about expected trade volumes from projected market share.

In a variation, SDI may also assume the task of negotiating on behalf of each entity involved. This is useful when information is sensitive and/or confidential, SDI can allow negotiation without identification until a deal is struck. In this section we describe an application of SDI to an agent-based economic infrastructure in which value exchange is used to create "efficient supply chains and contracts".

It is critical within this system that agents can specify quite elaborate privacy policies, so that they can submit sensitive information to the SDI data warehouse but be sure that the information will not be revealed to competitors. One consequence is that SDI will compute efficient supply-chain structures based on the information provided by agents, but be able to report a good set of contracts without providing complete rationale (e.g. plans, strategies and or future technologies) for the basis of the identified solution. An agent may be asked to apply economic pressure within a supply chain without understanding why it will receive personal (and perhaps long-term) benefits. In another variation, if SDI is able to keep track of an entity's competitors and cooperating partners, then certain amounts of information can be carefully released to justify decisions.

SDI must retain a considerable amount of autonomy, to apply its knowledge to act in the best interest of these entities which it represents without being able to disclose the rationale for their contract recommendation. There is a very significant amount of trusted information regarding all of the commercial activities, internal operations, marketing, strategic business and product development strategies, etc. which must be disclosed to SDI for an accurate assessment regarding the present and predicted commercial impact of new supply-chain contracts.

Furthermore, we must prevent a vendor from exaggerating its value of certain outcomes, to achieve a good solution. Given this incentive-compatibility problem, and the potential problem of vendors entrusting so much extraordinarily delicate information to a single entity, we could instead allow SDI to assume many of the roles of a consulting firm. In this case SDI controls the reporting of information to SDI, and can verify its accuracy.

The mechanism for providing value to the recipient (in exchange for providing the desired action) is flexible and may include (as suggested above) "upside" value, direct compensation (or direct "redeemable value"), or an exchange of actions between agents (I will do X if you will do Y). Part of a deal may be that the provider of a requested action guarantees exclusivity and that it will not provide a similar action for competitors.

A vendor might identify and propose deals to the customers of another vendor, to apply economic pressure through threatened boycott and compel the vendor to perform a desired action. This "indirect" economic leverage may be applied at the consumer (lowest) level in the supply chain, and passed upward. In addition to boycott, a vendor could promise please note, shouldn't consumers be termed customers of the vendor since consumers cannot be threatened with boycott) consumers credit in return for taking a particular action. SDI can mediate the entire electronic control, transfer, fulfillment and negotiation processes (typically XML-based) individually on behalf of each entity within this multi-step negotiation process. In the above applications SDI can represent each entity in the negotiation process, and also have a role in providing information and statistics, expert opinions, etc. which clearly elucidate the value and potential value opportunities available to the entity(s).

The current model allows different supply chains to compete for the loyalty of the consumer, e.g., through providing indirect economic value to the consumer as in kind products/services and/or upside in the benefiting entity.

Economic alliances can be created between vendors, suppliers and consumers within the same supply chain. SDI can act on behalf of different supply chains and establish a competing market between different chains for the business and ultimate loyalty of purchasers. End purchasers have a large economic leverage on a supply-chain. The decision of an end purchaser will depend on:

1) The type, selection and quality of personalized products/services
2) The economic value which a given supply chain is willing to provide a user in exchange for complying with particular requests (i.e., favors). This factor may ideally translate to price or loyalty credit.

A part of a consumer's decision may be based on which vendors are likely to use personal data effectively in the future, to provide for example highly customized products/services for the individual. Supply chains which can deliver products and services which are most closely aligned to the needs/preferences of the customer should ultimately win out by capturing the customer's loyalty. A consumer's personal data can be quite valuable to a supply-chain, especially if a consumer provides one supply-chain with the exclusive right to its personal data. In application to the virtual sales person scheme, customers can receive incentives to solicit other customers as introduced dynamically via SDI and LEIA customers that match desirable user profiles. The payment that a customer receives for committing to a supply-chain can be received from all members of the supply-chain that can gain value from the customer, with "considerations" passed down the chain which are eventually provided in some form of loyalty credit to the customer by the vendor at the end of the chain. Some of the value conveyed back to the user can, of course, be in the form of community credit, e.g. subsidizing a portion of the customer's needs from vendors within a supply chain.

In this model we can also allow an employee to receive benefits to reflect the value that s/he provides within the supply chain. Again, a vendor's supplier might even provide a benefit to encourage the employee to perform well. Valuable employees may receive more "value bonuses" the longer they stay with the organization, to encourage them to stay with an organization which needs them, and without the ability to leave a company once the value of share options has been realized.

With interwoven supply-chains, for example, with the same supplier connected to multiple vendors, and vendors with competing suppliers, this method of passing value along the supply chain becomes more tricky. When a consumer applies economic pressure on a vendor that it deals with in the supply chain, that vendor may inform other suppliers of the pressure and block service to the user. A bartering system can provide additional benefits, to allow vendors to exchange bonuses, discounts, etc. with favors offered to vendors in other value chains. In general it is quite likely that a favor will not substantially benefit a user in another supply chain. We can also include a method to prevent a vendor that does not itself offer favors in the supply chain from taking advantage of favors offered by other vendors. This can support cooperation within the supply chain, and allow effective competition with other supply chains.

Each vendor in the supply chain can benefit in two ways:

1) They receive a "commission" on the transactions in which they convey the favor to their customer (which again may be "upside" in the ultimate beneficiary of the favor and/or product/service loyalty credit with their own supplier).
2) (Most importantly), they receive customer loyalty advantages via the community credit they provide such customers.

For reasons of this latter benefit they are likely to compete with other competitive vendors for the privilege of exclusively delivering the incentive to evoke the favor to the next level up the supply chain. In this way each vendor below the supplier requesting stands to gain via customer loyalty benefits by competing with another supply chain.

A consumer can provide value to a supply chain by exclusive provision of personal data, to allow a supply chain to create specially customized and targeted products and services. However, it is not necessary for a customer to have an exclusive contract with a supply chain (although this might bring greater loyalty benefits and payments).

A variety of different techniques and methods should be integrated and deployed to implement this agent-mediated supply chain value exchange system:

1) Digital contracts to define and enforce particular transactions and long term business relationships.
2) An SDI infrastructure to suggest particular opportunities for a vendor, based on the benefits to the complete supply chain. SDI can utilize as much information as the vendor is willing to entrust in SDI, to try to identify present and predictive future benefits resulting from actions on the part of other vendors.
3) A means for enabling customers and/or vendors to form coalitions, to strengthen their ability to provide pressures on other vendors.
4) A mechanism with useful incentives for these customers and vendors guarantee direct benefit even if the desired action ultimately does not result in new value, e.g., an insurance scheme.
5) A method to exchange terms and conditions between members in a supply chain, by being passed up the supply chain from the lowest level (consumer), and a mechanism to provide "fair compensation" for this process.
6) A method to integrate loyalty benefits and long-term purchasing contracts, etc. into an electronic cash protocol, so that buyers are aware of all contractual constraints during negotiations with agents.
7) Methods within SDI to advise a customer about an appropriate bidding strategy, based on estimated values of different contracts and supply chains, to help the customer to make a good decision.
8) Methods within SDI to recommend information to reveal to a supply chain, to maximize the value of a loyalty bonus offered and ultimately received by an agent. Of course, information cannot be falsified, but some information can be withheld.

Applications of "bribing" the consumers of a vendor:

A commercial entity is sustaining bad publicity from an article published in newspaper X. The company could offer the customer base of the publication (identified via SDI) an incentive to temporarily disrupt or boycott the publication until corrections/changes are made to the article. The company could also offer discounted products or services to the consumers, based on information (from SDI) about their consumption patterns. A more indirect discount could be provided via other vendors further up the supply chain, via multi-vendor exchange.

Company A is a high tech start up selling software products and services to established vendor B. Vendor B identifies the substantial value proposition of the products and services provided by the start up, and decides that it should provide the services for itself "in-house". Start up company A can go to the consumers of vendor B (information from SDI) and offer a percentage upside, e.g. percentage equity in the start up, if they will apply a threat to boycott the vendor unless the vendor agrees to do business with the startup. Company A might even identify consumers or suppliers further down the supply chain, and apply indirect pressure to B.

Company A is developing a new commercial initiative which may be competitive to that of another smaller company B, and might harm B's market share. Assume that consumers prefer B's products to the future products of A, and that B can make more profits than A. Company B could convince the customers of company A of these facts, offering them a percentage of potential upside and/or discounted or value credit towards products. The customer profiles of company As customers also reveal the vendors from which they most frequently purchase, and company B could also offer equity or otherwise some potential upside to these vendors in exchange for offering discounts or credits to their customers (which are customer A's customers as well).

In place of monetary compensation, we might provide a value payment to an agent in the form of a long-term compensation, based on the long-term value achieved by an agent further up the supply chain.

SDI can identify the paths in the supply chain between companies, to allow a sequential transfer of benefits down a chain. Ideally, each entity providing the benefit is doing business with another next lowest in the supply chain, so that value can be exchanged.

SDI might "bribe" each party within a value chain to enter into a contractual relation which benefits that party (directly or indirectly).

SDI can determine what companies along this chain would have the greatest future potential to benefit one another, i.e., where the supplier can generate compelling long term benefit to each of his subsequent buyers at each level down the chain.

SDI can use available information regarding a vendor's internal and external activities and goals, to identify optimal multi-vendor supply chain models, in terms of maximizing the sum value to all members in the supply chain, and the value of each individual company.

SDI must also consider the willingness of each vendor to establish the necessary contractual relationships for the new supply chain. Vendors might provide SDI with "relationship policies" and "contract policies", to allow this to be factored into an SDI recommendation.

SDI models, in detail, the economic value which each scenario provides to the collective vendors and to each individual vendor. SDI can inform each individual vendors of its own predicted value, while withholding information about other vendors.

SDI can seek coalitions of vendors with similar interests to combine their bargaining power, and attempt to compel vendors to enter particular preferred value chain scenarios.

SDI is privy to most or all of the information relating to all of the companies in a supply chain, and can be trusted with the task of creating strategic plans between different companies, potentially making the supply-chain more efficient and benefiting all vendors. The strategic plan might suggest:

1) New business relationships between the most synergistic entities
2) Contracts for existing commercial relationships which embody and enforce specific terms of those relationships within the framework of this optimal supply chain system.

SDI might also create a detailed system for accounting for the effect of a contract on the rest of the supply chain (individually and collectively), and predict short and long-term effects of contracts in advance. This information can be used to encourage the desired contractual activities on the part of vendors in a chain. There may also be cases in which the direct/indirect economic impact of a contract upon a vendor results from an additional secondary economic advantage to that vendor besides the trickle down economic effect; for example because of strategic commercial benefits. These factors can also be considered in an economic benefit model.

Given models to compute the comparative economic value of proposed contracts to vendors in a supply chain we can demonstrate a "trickle down" economic value chain in which the success of company A is directly related to the success of company B. This information can be presented to company A and each intervening supplier. SDI can then establish long term contracts between each entity in the chain to insure that each company receives the benefits of products and services from its other suppliers which are of greater value than without the contract. This trickle-down benefit can be used to entice a company to enter into a recommended contract, for its own benefit and the benefit to company B.

The benefits which each vendor is predicted to receive in a proposed value chain can be pooled together and used to "bribe" each vendor within the value chain to enter into the preferred contract. While some value chains may actually be willing to provide greater compensation to a vendor, the goal is to link a vendor's decision to the value of the complete value chain, both future and present.

Of course, vendors may face risks in committing to long-term contracts, particularly when many vendors in the chain must prosper for the value to be realized. SDI might introduce a number of decommitment clauses to allow a vendor to back out of a plan, perhaps reverting to a "plan B" which protects the interests of harmed vendors while retaining as much value to other vendors, i.e. allowing all vendors to contribute to the cost of failed contracts. Alternatively, we might create a futures market in which the risk of the future value can be traded in real options, within a public market—providing a financial instrument to share risk. In this case, if some measurable form of economic benefit such as sales value (for e.g., the particular relevant product line), possibly stock values, profits, etc. falls below a target level the vendor may be compensated for its initial risk, i.e., secure a worse-case outcome.

It may be important in high-growth markets such as technology, with high risk companies, to allow insurance for contractual non-performance of suppliers.

SDI can leverage available data to compute the most beneficial economic scenario for all associated vendors collectively, and also to compute optimal scenarios for each individual entity. SDI can disclose the complete picture to each agent, and then allow individual vendors to optimize their local plans in a global plan. To effect a new scenario though, agent agreement is required. Another mechanism could have SDI report the optimal global scenario, and the optimal scenario for each individual agent. Then we could allow agents to negotiate, to find a multi-agent compromise outcome that is more efficient than the current solution but possibly not as good as the globally optimal new supply chain. The decision of an individual agent to enter into a proposed contract will be determined by the cumulative value, short term and/or long term, to that entity, consisting of the predicted value of taking an action (e.g. breaking a contract, initializing a new contract) both in terms of immediate bonus to a vendor, long-term individual benefit, and trickle-down benefit because of global supply chain improvements.

Each vendor must provide SDI with as much information as possible about the particular conditions under which it will perform new contracts, such as its preference between short term and long term predicted benefits, etc. SDI looks for outcomes that are favorable to individuals and to the overall system. Value can be realized in short-term payments and long-term bonuses.

Additional Examples Include:
Company A may threaten to file a lawsuit against company B (which could be very damaging to company B). In a similar barter exchange, company B can barter its own value (in the form of upside or products/services) as offered to the customers (or vendors of the customers) of company A, targeted to only those customers that reside within the same supply chain. Thus, by limiting the value proposition to only these entities, and not to those which reside within the supply chain of a competitor, the value of the potential upside is worth more because it is partially predicated upon their own direct success. Again, it is also possible to use an indirect strategy, bribing entities or individuals of influence within a given company from which a particular action is desired.
In another novel application there are certain activities among certain individuals which are considered to be mutually and collectively advantageous or disadvantageous to all members of a certain vendor community. We can have all members contribute money into a fund. The desired actions would be rewarded appropriately while these not desirable are punished. If/when an undesirable action is performed all vendors can threaten to boycott that action (creating a significant disincentive to the user). The individuals may also be subject to boycott by other entities which the present individuals rely upon economically (as buyers or sellers).

Company B is a large entity discussing a major partnership deal with company C which involves a large development initiative to supply company C with technology. SDI is confidentially apprised of the negotiation via company C and, in accordance with its privacy policy, allows SDI to notify and apprise company A of this developing prospective deal. Company A (a smaller company) initiates a counteroffer to company C, and is willing to share a portion of its upside (resulting from the deal directly or from its own equity) to customers of C if they can convince company C to deal with company A. SDI may finally suggest a boycott or reduction in business unless company A is selected.

A high tech start up is in the process of seeking new or additional funding. SDI can identify a potential customer base and collection of strategic partners, and also likely indirect beneficiaries of the technology, products and services in the supply chain. These entities and their consumers can then be incentivized to place economic pressure on the necessary financing institutions. The commercial entities themselves may also be incentivized, for example potential direct suppliers or customers can be informed that investment will provide an opportunity for new guaranteed business or value concessions. These entities might also apply direct pressure on their own financing institutions. The scheme extends to existing suppliers and customers.

An entrepreneur with a new start up venture can find companies (e.g. suppliers, etc.) that will benefit from the new company, and seek funding from those entities, in return for providing a long-term share in the company. SDI can contract all the relevant strategic partners before a funding commitment, to provide more information and reduce risk. Other equity shares could flow from marketing agreements, e.g. a co-branded affiliation of all further products/services. The new company might also guarantee an exclusive contract with another entity. An entrepreneur might also be willing to sell a company to the more established entity, e.g., within a year or two, this can be contracted at the outset. The present framework allows value from long-term strategic alliances to be released.

Within SDI we can adapt a user's personalized portal browser to favor the vendors providing such value opportunities to the consumer. A vendor could achieve additional market share by complying with requests of another vendor. The value proposition as presented to the user can leverage the personalized browser user interface to prioritize a vendor's offers in the future.

Example Commercial Application.

An investor has invested in a very high risk venture relating to highly speculative stem-cell research. After years and millions of dollars, the venture finally goes out of business (or becomes acquired on the verge of bankruptcy) the investor loses all of her investment, however terms in the original investment contract (which involved at the time the approval of a variety of medical organizations most likely to benefit from the eventual medical science benefits of the research) now enable the investor to acquire in kind benefits (which may include anything from equity in these various medical organizations to goods/services provided by them). A portion of the value may even include a sizable amount of value provided by the original company and/or indirectly vis-a-vie the remaining medical entities, a substantial amount of value within the barter exchange for favors.

With time, stem cell medical applications proliferate thus, the "upside benefit" increases in proportion over time. However, if this "up-side benefit" (of the original collection of contracts from the various relevant companies in the field to which the original research activities pertained) was insured through the futures market the investor can benefit from the value and growth. Investors can include researchers whose contribution of time and effort and dedicated focus on the problem had been estimated. This can allow valuable talent to receive the incentives to join the initiative from the outset in a way which would be very difficult to achieve with other standard recruiting approaches. It is important in this scenario, however not to over incentivize the managers and executives such that they may lose incentive to make the company succeed. In this scenario that the company does not go bankrupt, proper incentives could be provided to further encourage similar scientific and innovative entrepreneurial initiatives in the future, thus a portion (perhaps a fraction of the upside in these other entities could be provided even in the event of success (and irrespective of the level of risk associated with the original venture). Certainly the field of stem cell research is only one example of many speculative new technology fields with potential for enormous overall impact upon all aspects of the economy and society. Another example cited elucidates other potential features and variations of the present novel scheme. The field of nano technology is believed by many to become perhaps the most important and pervasive technology paradigm of the twenty-first century impacting almost every industrial sector. As such, many different critical problems will need to be solved, each with potentially enormous associated economic opportunity. There is, however, considerable risk associated with the probability for industry and research institutions to realize these significant returns on investment for any given industrial sector or application domain (however, by no means is this true for the overall field of nanotech). Also breakthroughs in any one application domain will substantially advance the state of the art for potentially all other application domains. It is reasonable for SDI to create a futures market in which it predicts certain long term but very realistic goals for each application domain of nanotech. Through cooperation with industry and the investment community it may further pre-contract with various present and potentially future entities which are most likely to be direct beneficiaries of the technology which is spawned from the initial extremely high risk commercial ventures pioneering the basic technology. As in the stem cell commercial example percentages in the various longer term beneficiaries can be used as a strong inducement to present prospective investors in the pioneering commercial entities. As suggested, this percentage may be inversely related to the degree of success of the initial venture and if desired, the risk may be further reduced through the use of a futures market which essentially assures the predicted economic marks of these various prospective commercial endeavors. The wise investor in the futures market will seek diversification of investment across many different technological sectors of nanotech (thus assuring the large upside which is certainly to occur universally but not necessarily for any one given application commercial domain. SDI could further mediate the long-term opportunities to the original investor by mediating, for example, technology transfer and licensing intellectual property to present or prospective commercial entities which have thus agreed to operate under the terms as provided by SDI. In exchange, SDI could also (as above suggested) provide a resource and technology sharing service and associated partnership brokering service (between potential multiple companies containing potential commercial synergies). In addition it may work with the investment (particularly incubator community) by which it may, without disclosure, of commercial strategies and technologies which are presently or prospectively planned across the entire nanotech industry of disclosed suggestions for particular commercial and technological opportunities which would appropriately complement and benefit the global strategy or nanotech which is known exclusively buy SDI. This approach in addition to emulating the same united focus and integration of multifaceted technological and R and D initiatives can also ensure the proper distribution of efforts within each technical application domain, the appropriate sharing of information whenever potential for technological complementarity, but not commercial competition exists (which SDI) strives to achieve on an industry wide basis) and the assurance that companies and departments do not duplicate their efforts if at all possible. The investment community through SDI could certainly stimulate conditions as above which band aid the adherence to these terms as a condition to investing. SDI, through incubators could additionally disclose particular commercial and technologic opportunities which are both synergistic to the global SDI strategy as well as predetermine (visa vie SDI's extensive in depth research on the industry to possess significant commercial opportunity. Based upon some existing companies technical proficiency and commercial strategies, some of these emerging opportunities could be disclosed as potential (suggested extension of existing departments or divisions based upon their individual areas of expertise and particular skill sets of its employees.

The present system methodology (of business to business and business to consumer) may also be extended to include other variations including consumer to business or consumer to consumer. An example of the former could be an employee who is slated for lay-off or firing within a large organization. The indirect effect of the lay-off could result in a negative impact upon the individual's financial welfare and indirectly upon the professional contributions of that employee's children. The likely potential beneficiaries (corporations) may identify potential lost revenue streams and effectively bribe the present organization with "value" to avoid the lay off. It is also noteworthy to mention that the justification for accepting the offer for the second organization is more compelling if there exists a "trickle down" economic impact, ultimately upon the first organization (and certainly SDI, within the present framework, would factor such small economic negative factors into the optimization model for the most efficient supply chain of vendor relationships).

Within the scope of the present example, it is possible to create a form of insurance in which SDI identifies extremely similar circumstances where similarity is measured primarily by the nature and scope of the opportunity and its associated risks as well as the entity whose critical action is necessary to bring about the desired objective. In this case, the individuals (or entities) benefiting from the desired action are able to effectively conceive to contribute a certain level of value to the collective group to effectively insure the desirable outcome on behalf of all of the members of that group, such that, if the desirable action on behalf of the other entity (in this case the large organization contemplating substantial layoffs) does not concede to the desired action for one or more of the individuals, this value contributed from the group is used to apply still greater economic pressure upon the entity to perform the desired action. If this does not facilitate the action, the value is instead applied in another (albeit less optimal) form to compensate at least a portion of negative economic impact upon that individuals/entity of course, the level of risk may influence the amount of insurance each individual/entity is willing to contribute within a given group.

1. There are numerous other extensions and potentially practical applications of the present novel methodology, particularly those applied primarily at the consumer level, and where consumers are provided with an infomediary such as SDI to represent the most individually beneficial actions within the present agent mediated contract negotiation framework. One of the significant technical advances of SDI is the ability to not only represent the particular best interests of an individual (or other entity but also provide; (1) knowledgeable experts (or "knowledge proxies") who within the information rich economic and political universe is able to off load the task of acquiring constantly updated and changing and expanding expert knowledge within each domain and sector of the economic and political systems. In this regard SDI may, as a service to consumers, represent consumers according to which overall economic scenario which best represents their socioeconomic interests which may factor in both long term or short term monetary benefits and/or socio-economic benefits and/or (if they differ in any way from above) personal or political views or objectives. The use of collaborative filtering may provide a useful tool for assuring that proper recommendations for political views reflects economic political and socio-political information available about the user, such economic data of which is typically gleaned passively and may be confirmed by active confirmation of the user along with political views and positions on political issues which may prompt the user in order to collect rapid profiling information about the user is overall political objectives. Thus SDI can effectively in practical terms provide a "continual" personal advisor to guide all consumer activities (via contracts) as political decision making policies, and even these consumer actions to indirectly (via the supply chain) apply political pressure upon organizations in order to achieve certain desired economic, or even politically advantageous objectives, at an individual level. Accordingly, once they are certified on an individual level, SDI could-provide synergistic benefit to the ultimate political objectives of each person individually by creating a "global political support strategy" for each group of individuals sharing the same political objectives. SDI may develop information models based on relevant historical data of what political and economic impacts resulted from politicians and political camps and combinations thereof within political and economic conditions which are similar. Within the framework of this methodology an extremely valuable technical advantage of SDI is its capability to monitor huge volumes of information from not only organizations but also news feeds, legal cases, government regulation over industry and profession (which may indirectly affect quality of life of individuals), and/or monetary status of individuals. Case in point, within the health care industry there is a significant amount of covert, however, aggregious attempts by both government and private sector HMO's to limit the quality, scope and depth of health care services which can be provided to the consumer. In accordance with the present SDI framework, an SDI agent acting on behalf of each individual could effectively create an economic and political coalition with the collective economic ability to boycott the most aggregious violators of their monetary and health care benefits, apply political pressure through believable, perhaps even irrefutable, threats (through individual contractual obligations with SDI) to mandate changes to those particular policies (be it at the governmental, regulatory or legal levels) so as to bring about the desired results at the consequence of voting the relevant decision makers out of office (directly or vis-a-vie their political appointees). SDI, in accordance with its functional objectives could also certainly supply valuable information to users supporting its internal rationale for structuring such coalitions by estimating and presenting to the user such data as the predicted degree of reduction in the quality of health care (from physicians and hospital for that user and her family based upon the negative impact which the present system has upon these entities. In addition, it may be advantageous for the most aggregious abusers to be boycotted by individuals collectively. Based upon the knowledge available to SDI, it may be advantageous to pre-commit or provide a polling-based solution for the individuals constituting these coalitions as to their responses to the desirable actions prescribed if the user rejects the recommendation, SDI may further query the user and/or suggest an alternate strategy (suggest one to SDI). This data about the political issue strategy(s) which the user support may then be used in order to provide direct feedback to politicians with sufficient notice with which to pre-formulate their political strategies at both the micro and macro levels with which to best comply with the adopted or otherwise recommended political and/or economic edicts according to SDI. Or, if it is determined that such pre-knowledge could be abused in such a way as to politically manipulate campaigns, large employers, etc. undermine the political support for these edicts, SDI may determine that it is advantageous to not disclose such information in advance to the target political groups (this, however, is a very subjective and complex analytical process). Thus SDI, representing each common group, must determine and predict which politicians are most likely to ultimately support the issues which are most important to their political objectives for which advanced disclosure of their own political support strategy is likely to advance the strategic knowledge of that politician while assuring that none of their positions on none of the political issues are likely to be ultimately abused by that politician by him/her ultimately changing his/her position on that issue in order to improve his/her chances of election. For this reason, it is also of interest to each group to attempt to predict the ultimate position that each other group is likely to assure for each political issue in order to determine whether or not pooling their collective influence on that particular issue (including free disclosure to those "trusted" candidates) would be advantageous or information which would be potentially harmful to pre-release to a potential adversary on that issue (which it may ultimately disclose to a candidate opposing that issue and/or modify its own political strategy in a manner which is ultimately antagonistic to the interests of the welfare of that issue or theoretically even issues which that group may wish to disclose in the interest of providing further support for the global political strategy through this form of coalition creation). It is worth noting that within the scope of the present framework it is likely that the availability of such detailed information, both predictively and at an individual level, regarding the ultimate political and economic effects which certain voting in other political support actions via SDI are likely to imply, it is extremely likely that members of each group may be reluctant to provide information, regarding the groups political strategy to public polls.

Thus it is a primary objective within the scope of the present system's formation of common political support strategy groups to ascertain each individuals user's ultimate political objectives based upon the analysis which provides analysis and prediction of the present and likely future effects, both politically and economically from the standpoint of that individual (which may include social, professional and predicted individual investor oriented direct and indirect consequences at a detailed level as it relates to that individual. And secondly, to formulate a global political strategy based upon these objectives which are represented by an SDI agent and which is able to recommend actions and, as such, act as a coalition on behalf of the constituent individuals, and including negotiations for further coalition formation on various portions this global strategy in order to further enhances the collective power wherever common interests can be safely identified and shared to both groups' mutual best interest.

The effects on commercial industry, even specific businesses in which certain actions are likely to result, may be modeled and presented to the user as well as the effects upon the user in light of the investment portfolio of the user. If a particular political position were to be taken, the system could even recommend something which is most compatible with a particular political position.

Continuation to Supply Chain Section

It is also possible to utilize the extensive information in SDI to instruct each political support group's most advantageous supply chain structure in order to be able to recommend certain strategically advantageous cases of tax dollars which facilitate the construction of such supply chains in accordance with the above methods above described. It should be noted that a "political group" may be further subdivided into groups based upon purchase affinities (which themselves suggest different group divisions) which in turn may bribe or boycott commercial entities as needed to achieve their most advantageous strategy as consumers or simply individual users (as economic entities). Each subgroup (via SDI) may further augment their economic leverage with their political leverage (over tax allocation decisions). E.g., if candidate X supports this particular supply chain strategy and if he is elected then it is most optimally advantageous to also utilize consumer leverage in supporting transactions with certain vendors and boycotting others in order to support or complement the politically (tax) funded strategy.

As suggested, SDI may be used to facilitate the matching and strategic formation of coalitions of groups which are most likely to benefit one another on particular political issues or formation of strategic contractual relationships between commercial entities (SDI is able to determine if/when certain information is helpful or harmful to disclose to another particular entity). Each group may exert particular leverage over politicians. I.e., not only could the politicians receive feedback as to the political issues and economic (commercial) alliances which are most advantageous but also the groups could upon the advice and direction of SDI make their votes conditional upon the politician supporting certain issues or economic actions. SDI could provide real-time feedback right up until the election as to the numbers and percentages of users who had supported the candidate and the candidates response to them. There are other instances in which the leverage could be used to incentivize commercial entities to support certain political concerns e.g., if company X donates percentage of its revenues to the United Negro College Fund group Z will support the facilitation or an alliance between company and a major manufacturing firm (e.g., by putting consumer pressure upon those retailers which are the manufacturers' customers to in turn threaten temporary boycott of the firm unless the stipulations are met or if they are not consumers to instead offer consumer loyalty (e.g. through dedicated currency).

A variety of applications of the present scheme are conceivable such as local politics such as commissioners office and board members delegated for purposes of masterplaning and use applications and allowing or disallowing certain real-estate and highway development projects. Certain commercial projects, for example, could be of substantial benefit to certain commercial entities which could provide considerable direct long term economic benefit to citizens in the local community even directly to the individuals in the communities (who elect those officials) as well as contribute indirectly via the available tax base. Or certain commercial entities could, for example, directly or indirectly provide economic benefit to certain individuals, e.g., if they are employees, investors or commercial entity which is in some way commercially dependent upon that company, e.g., for commercial business if it is a customer or alternatively a supplier and the impact of its resulting success in general (or even local presence) would again provide trickle-down economic benefits to that entity. In accordance with the present application it may even be possible to estimate values for such factors as, for example, the economic impact 20 years in the future upon commercial business and industries in the local region (as well as nationally) if local schools are provided with a 10% vs. a 7½% share of the local tax base. With these predictive models, the associated prospectively affected commercial entities could, effectively encourage SDI acting on behalf of the local citizens to form a coalition which makes their voting of the relevant elected official(s) contingent upon the increased tax allocation for local schools (the specific preferred users could be predefined as well). SDI acting on behalf of the interests of the prospectively affected commercial entities could bribe the citizens with either (preferably) such benefits as in kind, goods/services which could in turn be leveraged through the supply chain or through a barter exchange system or employment benefits or wage increases (which again could be effectively treated as a barterable commodity subject to the above conditions of avoiding interactions with competitive entities. Such modelling could be extended to many other situations, e.g., allocation of funds to police, fire and EMS services, approving and providing highway improvement again may provide the above benefits etc. providing safety and preserving the health, welfare and life (in addition to educational quality) of a certain number of individuals (each with a certain predictively modeled) local economic impact. The cost versus impact affecting each citizen could be presented to them by SDI accordingly in order to elucidate their decision making processes.

For example, consider a student who is determined to be capable towards achieving substantial real-world success. In one instance the student cannot afford tuition for graduate school. In another instance, the student cannot afford to continue his/her studies due to depleted financial resources. The present system may model and predict likely beneficiaries commercial or even individuals who are likely to benefit and accordingly "insure" certain long-term monetary benefits (if a commercial entities) or even personal or social benefits (if an individual).

Internet piracy of copyrighted information is costing authors billions of dollars per year. Technical experts (e.g., within SDI or outside "domain experts" which SDI had identified and presented the problem) identify a technical solution consisting of a ground breaking technology which could greatly reduce total piracy from occurring, however, such solution would require cooperation from all of the Internet server manufacturers. There is, of course, the small risk that in the relatively short-term the technology will partially or completely fail (e.g., copyright pirates find a way around the solution) before a sufficient amount of revenues are realized by the copyright owners to off-set the cost, and justify the expenses to the server manufacturers, of integrating the technology into their services.

In addition, if copyright owners receive their rightful share of royalties, more Web servers will be sold in general to host such content. (Insert 2 from page 3) SDI can be a facilitator to enabling a beneficial solution to the industry in the following ways:

1 Present estimated industry-wide revenue losses compared to other things, the industry-wide the server manufacturers as a group sustain (based upon sales data each one individually and secretly submits to SDI).
2 Also present the increased sales the industry would sustain if the copy-wright owners received their rightful royalties to the extent which the solution is able to provide.
3 Provide insurance or create a future market to insure investors who would invest in the commercial opportunity for a share of the anticipated monetary benefits to the industry (such investors could include members of the industry).
4 Negotiate a deal with investors and/or an insurer (the latter of which could also be SDI representing the industry). A SDI again, of course, may also represent the investors.

Information which is enclosed may, for example, contain in addition to the identity of the prospective investors, the complete discussion of the economic benefits which each individual investor could potentially sustain, however, this information is disclosed only to the SDI representing the collective interests of the prospective investor coalition (a primary directive of which is to never compromise the data disclosure policies of any individual investment entity, even if such disclosure to one or more of members of the group may ostensibly benefit the collective group). It is thus the objective of this collective SDI agent to make individual date disclosure recommendations for each prospective investor that will optimize the probability that the basic framework of the collective cooperative group is successfully created while enabling the individual entities to withheld sufficient strategic information from the group in order to optimize its own negotiating position with the other entities. For example, it would be particularly advantageous to disclose credentialed information regarding the benefits which the investor could provide to the collective group of investors (based upon the existing investor information disclosed by the associated companies) and information regarding the existing relationships which that investor has with existing companies which could, in turn, provide positive benefits to the companies constituting the global investment strategy of the group and (in the case of negotiating with each given individual investor prospect) the benefit to companies which that investor has a relationship with and made available to the present investor prospect. These companies may also include those which SDI has recommended to that investor as part of the global investment strategy for that group.

User's reactions to various events and stimulate the video programming can be captured, aggregated and accessed by present viewers such video in real-time or asynchronously for future viewers of non-live content by user profile (or content profile) or by similar users to that of the profile of the user. Observing reactions/responses to political or ethnic jokes by that group which is targeted or other groups may be interesting to users to observe as a simple example. Reactions/responses to news or political events by different groups or those most effected thereby may be of interest to users.

13.1.7 Off-Line Variations

We can allow the community dollar/iamworthit model to extend to physical transactions, for example via smart card technology. A buyer can carry a smart card with community dollars, that are loaded from the user's computer device, or from some third-party operated kiosk.

For vendors who offer the integration of community dollars into their discount programs (e.g. may be members of a vendor coalition) the buyer may at any vendor terminal, kiosk or his/her PC upload targeted-vendor promotions such as digital coupons which are tailored to the users profile. This profile is downloaded to the vendor and which consists in part of the recent purchases s/he had recently made at the various vendor stores.

In another variation, the community dollars may be coded into a form which is bar code reader enabled and distributed to the buyer electronically or potentially if used in conjunction with a traditional loyalty points program, additionally printed for the buyer at the vendor's physical location (such as point of sale or kiosk), applied in conjunction with purchases at the vendors physical location. At which point typically a new coupon is reprinted containing the updated secure information pertaining to the buyer's community dollar and/or loyalty points account.

In another variation, a promotion for a yearly allowance of community dollars could be printed as an advertising offer on a magazine coupon, newspaper insertion or direct mail piece which could contain a unique URL (typically the actual URL for the iamworthit community dollars subscription site with a unique post script as the character string ("code") identifying that particular vendor and/or that promotion) from which the buyer could subscribe to iamworthit, wherein the unique URL acts as an identifier for that particular vendor's promotional piece from which the buyer originally received the offer for his/her own community dollars promotion.

Within SDI we could send physical solicitations to buyers, and allow buyers to access promotions pseudonymously. SDI can target a selected audience for each vendor.

Example: An iamworthit card in accordance with the pseudonymous payment methods described above, such a card could be a direct extension of SDI into the off line environment. Buyers could use this card as an identifier such that when they travel physically from vendor to vendor, their profile data can be readily identified where data pertaining to their own behavior and policy (depending on their data release potentially part of the vendor's user profile data) is retrieved.

If a smart card is used this user profile data may not have to be remotely retrieved but may be stored on local memory on the card itself along with the client-based pseudonym proxy server. In one novel variation, a card is done away with completely by virtue of revolutionary technological breakthroughs in being able to instantly and positively identify buyers biometrically using iris scanning techniques (which may in a variation be further combined with facial recognition techniques). Many vendors will wish to utilize user profile data in order to deliver promotions targeted discounts and promotions (see pending patent "System for Customized Prices and Promotions")

13.1.7.1 Location Enhanced SDI System

The co-pending application entitled "Location Enhanced Information Architecture" (LEIA) describes an integrated advertising delivery platform which selectively targets buyer personalized advertising based upon both the buyer's personal profile and the present location of the buyer which may suggest appropriate ads from vendors which are local to the buyer, wherein user identifiers (UID's) which could include any of the above identification media provide the essential elements for this buyer targeting platform. With LEIA information providers can utilize location information, in addition to static and dynamic profiling information. The method customizes the information that is displayed on a private or public information device to the real audience in the vicinity of the device, instead of a predicted audience. LEIA collects an extremely detailed and comprehensive information set about the daily activities of a user, enabling enhancement of the user profile with location information and temporal activity patterns. The co-pending LEIA patent suggests appropriate application environments, for example in a smart home, an office, on a mobile shopping device, and in an automobile. A LEIA-based system stores personal information on users.

We can extend LEIA by incorporation with the Secure Data Interchange system that we teach in this patent. SDI enables the user to receive the benefits of powerful and well-directed information, but within a system that respects his/her privacy requirements. The interchange acts as a secure data warehouse for users and information providers, enabling information providers to target users without revealing private information to the providers directly. As described in LEIA, the privacy architectures provided for in LEIA and SDI are all the more critical as components of an SDI enhanced LEIA system architecture given the extreme sensitivity of personal location data which must be securely protected in both real-time and within an asynchronous context.

LEIA customizes information that is displayed to an information recipient based on object profiles and physical location of users. Presents the information most relevant to the REAL audience, not a predicted audience per se. Because of LEIA's ability to combine user's preference information with information about their current physical locations and deliver advertising which is both of personal and location contextual relevance to the user, LEIA provides a valuable enhancement to the targeted advertising services provided by iamworthit. For example, instead of advertisers being limited to accessing desired preference attributes of users in the pseudonymous user database exclusively they may additionally access prospective target recipients by present (or anticipated future) location parameters of users connected to mobile and even terrestrial communications networks.

In accordance with the iamworthit targeted advertising platform either advertisers select user profile attributes which they are interested in or the system matches their ads automatically to the most relevant users. The former application may be performed either within the context of the pseudonymous user database which the vendor queries or targeting rules which s/he provides which control the advertising and pages which are dynamically generated for each user based upon his/her user profile. Whether the user's location is detected on a mobile network or a terrestrial network including telephone or cable TV, LEIA's location features are able to provide additional useful features regarding users to the vendor's rules interface or to the pseudonymous user database controlling dynamic page generation at his/her site.

For example, at a bookstore, we can recommend isles and particular books; at a supermarket, can play music preferences; smart-radio, play appropriate channels in a cab based on target object profiles (as meta-data). As suggested in issued patent "System for Broadcast of and access to Video and Other Data Using Customer Profiles" appearance of relevant selections can be continuously scanned for, dynamically selected and presented to the buyer in the form of "Virtual radio station". Such a system can also be linked to a service for making an instant purchase, or linked to a database (in conjunction with LEIA) to recommend where a buyer should physically go to make a purchase. For example, music selections that the buyer is presently listening to may be ordered.

Also, it is possible to provide advertising which is targeted to a buyer by automatically recognizing pre-existing commercials and replacing them with targeted counterparts. This can be done through the identification of previously played commercials for example, commercials that have been manually identified and classified. Upon recognition, targeted commercials (including those which are targeted by buyer location in accordance with LEIA) may be inserted into these spots, and delivered and/or pre-cached through cellular, satellite or radio communications.

At a public phone we can identify a buyer with his/her calling card, and deliver targeted advertisements, via the public telephone readout or delivering the targeted ads as audio messages in which server software at the phone switch (an ISP level proxy) recognizes if/when the buyer is put on hold and delivers audio and/or audio/video advertising to the buyer accordingly.

Targeted discounts and advertisements can be delivered at kiosks, for example using a credit card/smart card/other ID method (e.g. biometric . . . ) Similarly, we can use credit cards to deliver targeted print advertisements on the backs of purchase receipts, e.g., supermarkets or fueling pumps or, alternatively, on a sheet dedicated for a advertising purposes conjunction with public copiers or printers or in another variation, on the cover sheet of incoming faxes which are sent to the buyer's fax machine or in which the buyer is otherwise identified automatically from the recipient's name field on the cover sheet.

One application includes "Smart Home Intelligence", where methods are disclosed by which users' real-time behavior may be profiled through their movement throughout their home, and specific interactions with the various network enabled appliances throughout the home. Other inputs may include the user's speech patterns (using voice recognition in combination with text analysis). It could for example, note the user's speech content patterns in real-time. Such information provides invaluable clues as to the user's present activities, mood and interest state and may be processed by the presently described algorithms tuned with location/time features typically using the assistance of human data analyst to identify the key features and correlations. (This information may also provide enhanced information pertinent to the user's general, static preferences as well).

Other extensions of this scheme are also considered e.g. within the context of the user's office, or automobile and pedestrian activities. This application may thus extended the usefulness of the iamworthit model to advertisers in being able to target users through the presently anticipated on-line media as well as networked appliances and in either case, based upon the relevant context of users' present activities and behavior (and from this potentially their inferred moods or mental states) within their homes and elsewhere. Additionally (perhaps most importantly), LEIA provides a highly beneficial value to vendors whose customers purchase primarily from the vendor's bricks and mortal store presence. SDI can identify multiple vendors which share a common physical location. Additionally, LEIA can also identify the physical location of buyers on mobile and terrestrial networks and suggest the sharing of off-line prospects for these off-line retailers on the basis of not only interest but physical location.

13.1.7.2 Digital Set Top Box Methods

Similarly, we can deliver targeted advertising and other information through cable TV systems, as described in the issued parent patent application entitled "System and Method for Scheduling Broadcast of and Access to Video Programs and Other Data Using Customer Profiles" U.S. Pat. No. 5,758,257, and co-pending application entitled "Broadcast & System for reduced memory terminals broadly address the use of cable systems as an interactive medium (in a bi-directional network architecture) for purposes of delivering targeted advertising targeted advertising and other information to the consumer based on user profiles".

In this system customer behavioral data is collected at the digital set top and the upstream channel enables these profiles to be processed at the lead end server. These detailed profiles may then be subsequently transmitted down and stored at the level of the individual set top. The cable environment is a two way interactive medium. The bandwidth allocation is inherently asymmetric. Separate channels can push parallel adverts, which are selected at the set-top-box according to a buyer's profile. Each channel can have associated meta-data to allow matching at the set-top-box. As an alternative variation, full motion advertisements may be down loaded in the form of applets to the digital set top box and displayed to the buyer in similar fashion as described above. Or full-size commercials or infomercials could even be downloaded and inserted in place of existing commercials on the video stream. Digital tags used for queuing for ad insertion technology enable this capability. The preferred commercial implementation of the system is used within the context iamworthit (the buyer infomediary service in which the viewer receives value for advertising received). This method is preferred (in as much as in the following alternative, the cable operator does not need to be in the loop). With that said, in an alternative embodiment, however, requiring the cooperation of the cable operator various commercials could be broadcast in parallel during commercial breaks. The user profile at the set-top is deployed to select the most appropriate commercial accordingly.

User profiles regarding viewing behavior can be collected with relatively minor up-stream transmission, e.g., to infer whether a buyer is viewing a program the set-top may transmit the viewers current viewing selection, e.g., two minutes after the beginning of each half hour and two minutes before the end of the half hour (and possibly at additional intervals during the viewing segment as well). In the point-to-point access and delivery of personal information as well as the passive monitoring of viewing behavior (for profile generation at the head-end and subsequent user profile delivery for the set-top) because of strict buyer privacy regulations in the cable/satellite industries the use of the pseudonym proxy server architecture (as described in the parent case and integrated into the above referenced case) is extremely important.

Once interactive television is enabled by access to very large amounts of bandwidth, it will be very feasible from a bandwidth utilization standpoint to transmit more interactive content. Predictive caching is still extremely advantageous in as much as advertising (unlike interactive video real-time on demand video content) tends to be controlled by targeting rules of the advertiser rather than the user who receives value in exchange. Of course, radio or music content may also be delivered in conjunction with preloaded audio commercials.

And any of the above content is deliverable over the same networks to other appliances such as the P.C.

13.1.7.3 Optical-Based System Extension

Iamworthit in a future version of the system could incorporate a novel optically based medium for delivery of the advertising. The protocol would enable the delivery of user targeted advertising in a non-electronic environment directly to the user from a static source in visible contact of the user. The system incorporates the following aspects: The user wears glasses or contact lenses which contain a Polaroid film in which the optical medium is polarized for only certain very narrow and specific wavelengths. Advertisements (or other messages) may be presented from signboards which display from the same surface ads appropriate for every different user profile segment for which a unique message is appropriate. The Polaroid film for each user is unique to the user segment to which they belong. Each user segment's optical film filters out all of the particular wavelengths of all other messages except that which is appropriate to the user segment to which that user belongs. Alternatively, the current application may also be relevant to virtual tags as users may provide instead optical messages specifically targeted by a user to other users characterized by their profile features which establishes the entire criteria for the user segment they fall into for which an appropriate message may be targeted.

13.2. Interactive Data Mining Applications

In this section we describe interactive data mining applications, which involve dynamic two- or multi-way communication between agents. For example, within the context of a vendor-consumer interaction, the key difference is that information flow is not one-directional. An important example is time-of-purchase, in which the consumer's agent initiates a request for a response (with a counter bid) from a number of vendors. The vendors can access profile information about that consumer, and then make personalized responses. In general, this bid-response processes can iterate, with vendors/consumers exchanging information over multiple rounds. The exchange of information may occur within SDI in initial stages, with the system acting as a trusted intermediary until the agents are ready for an introduction.

We describe time-of-purchase competition, and then move on to general match-making applications, which allow interested parties to exchange information by mutual consent (as indicated in SDI rules), with initial information exchange autonomous. There are a number of interesting match-making applications, for example within a system for sensitive negotiation, introductions. The system of SDI can play the role of a trusted intermediary, so that only suitable introductions are made. A vendor can place a request for a certain type of meeting without its competitors knowing that it has made such a request. Finally, we describe a "real-time experts market", in which experts can respond for payment to questions placed by other agents. The system of SDI allows a useful matching of agents and experts, and also allows data mining to check on the feedback a particular expert has received from previous clients. We also suggest an application of interactive SDI-based data-mining to resale markets, and to a decentralized transportation management system.

13.2.1 Time of Purchase Competition

One application of the system of Secure Data Interchange is in "time of purchase" competition, where by a networked system of vendors can subscribe and receive the opportunity to place counteroffers to users that are about to make a purchase. This application is enabled within SDI because the user agent can remain anonymous while receiving counteroffers, but still use the system of SDI to provide profile information that can allow vendors to make attractive personalized offers. The client-side SDI proxy notifies a central SDI "time of purchase" server, which can:

- Determine appropriate vendors to prompt with an opportunity to make a counteroffer.
- Create a one-time anonymous identifier for the user, linked to an appropriate set of profile information, and allow vendors to execute queries under that profile.
- Collect counteroffers, and pass them to the user's client machine.

We also describe how to generate coalitions dynamically, based on the privileged position of the time-of-purchase server in the marketplace. The time-of-purchase server can transparently bundle purchases from disparate end-users, and negotiate quantity discounts with vendors. Buyer Coalition formation can significantly improve negotiating leverage as the collective buying power of numerous individuals using the time-of-purchase competition feature, and be made completely transparent to users.

Time-of-purchase allows a user to elicit dynamic market competition between vendors. For example, when a user browses a book at Amazon.com if she/he chooses to activate the time-of-purchase competition feature from the browser, a notification will be sent-out in real-time to all competing book stores which also offer that product section. The notification contains the product code and price quoted to that user at Amazon. The electronic agent at the vendor's site has an opportunity to counter Amazon's offer to the user (typically on the basis of price, however, other parameters may be used as well). The user may then select the offer which is most competitive or attractive, including the original offer.

Integration into a standard shop-bot interface e.g. with comparative features of the products associated with the various offers across a variety of product criteria, or at the least price can be used to provide the user within simple recommendations.

Another extension is to propose a special interest-bearing bank account which we set-up for the user which is tied into a wallet or debit/credit card for off-line transactions. We can allow a user agent to bundle its own purchases over time, and use the system of SDI to guarantee future payment to on-line vendors in return to a good current offer. This is novel, because it is like participating in a "discount scheme" without purchasing the right to future discounts up front. A user can still invest money that is earmarked for future purchases with a vendor.

13.2.1.2 Description

FIG. 17 illustrates the overall architecture of this on-line B2C e-commerce application of the methods of SDI. The agent represents a user with an SDI-enabled client machine, the vendor a server computer, also SDI-enabled. Agents interact with vendors both directly and via the central SDI server, and other components. We illustrate the time-of-purchase server, which receives requests from user's client machines as purchases are about to be made, and forwards those requests via the SDI central data warehouse to vendors. Client-side proxy agents monitor the interaction between a user agent a vendor, and can be configured to automatically notify other vendors when a purchase is about to take place. The key problem that we address to implement a system for time-of-purchase competition is how to identify the type of purchase that a user is about to make, automatically. This makes the operation of time-of-purchase seamless to a user, the system simply requires that the user waits for a period of time while competitive bids are collected from other vendors.

We propose two variations:

a) The vendor with which the user is about to make a purchase subscribes to SDI and provides information to the client-side proxy about the user's interaction.

b) The vendor is un-cooperative, and the client-side SDI proxy needs to use other techniques to classify the type of product or service that a user is requesting from a vendor.

The central SDI data warehouse maintains a searchable index of vendors that provide certain products and services, and sending buyer-profile and purchase information to appropriate vendors just before a purchase is made. Vendors can register with SDI to receive time-of-purchase competition opportunities, and can also register to allow time-of-purchase competition with purchases on their web pages (case a, above). Of course, it is unlikely that a vendor would do this without incentive, perhaps one incentive could be a discounted price for registering to receive opportunities for time-of-purchase competition.

In fact, this problem of client-side identification of transactions is a key problem that must be addressed in a description of client-side user profiling and the submission of information to SDI. The system of SDI requires a method to know what the user is doing. Click streams, typed query information, provided profile information etc.

A vendor that registers to receive time-of-purchase competition opportunities agrees on a standard classification system for products and services, and to state what types of products and services it wishes to enable for time-of-purchase competition. The classification system encodes the product or service that a user requests, at an appropriate level of detail to allow other vendors to make reasonable counteroffers.

The iamworthit central server maintains a database of vendor interest sets, so that it can determine from a classification code which vendors will be interested to provide counteroffers.

For example, if the product is "flights to the UK" then the code might encode the dates that the user wants to travel, and his/her preferred departure and arrival airports. Take case (a), where we assume that a vendor is cooperative and provides the SDI proxy agent that implements time-of-purchase for the user with a final product/service code and price. The system works as follows:

1. User enters into a dialogue with vendor.
2. Vendor makes "final offer" to a user, and the user is about to make a purchase. The vendor has also informed the user of the product/service classification code that encodes relevant information about the type of product the user wants to purchase.
3. User clicks on 'ime of purchase competition option' on its local SDI-enabled client.
4. Client sends message to the SDI time-of-purchase competition server with (User profile information/identifier, one-time time-of-purchase ID, product/service classification code)
5. Time-of-purchase competition server looks up the product code, and sends the user profile identifiers and a time-of-purchase ID to relevant vendors.
6. Vendors can construct competitive offers based on profile information accessed in the central SDI data warehouse, and information about the existing offer.
7. Vendors send the counteroffers to the time-of-purchase server, which forwards the offers to the user's client-side SDI proxy.
8. The user is presented with a set of alternatives, and can make a final purchase decision.
9. The final purchase is completed with the appropriate vendor.

We allow other vendors to access profile information about a user based on the profile information that the user provides to time-of-purchase, i.e. based on the profile which it wishes to use for the purposes of having appropriate counteroffers constructed. At this stage the client-side SDI proxy agent might also send additional profile information to be stored within the SDI data warehouse.

It is useful for vendors to access profile information about a user (anonymously or pseudonymously, as defined by the user's proxy agent) because products and services can be configurable goods or services, and a vendor can compete on more than price alone, but also in other dimensions.

The one-time time-of-purchase ID is constructed client-side in step (4) to act as a temporary identifier for the purposes of soliciting competitive responses from vendors. Vendors can be prevented from making direct offers to users, all counteroffers must be forwarded though the time-of-purchase server.

FIG. 18 shows the offer process in time-of-purchase competition, with an offer from a vendor that a user interacts with via an SDI-enabled client triggering a set of new requests for counteroffers from other vendors. The 'offer' message from Vendor 1 includes a code about what type of product or service the user is requesting, and is passed to the other vendors. The 'request counteroffer' from the client to the iamworthit server contains information from the user to enable the other vendors to make personalized responses, based on profile information stored in the central SDI data warehouse. After the 'request for offers' are made, the vendors compute responses and (optionally) access profile information. Finally, vendors make responses which are collected by the time-of-purchase competition server and forwarded to the user client.

We can also allow vendors to pop up competitive offers to other offers the user sees on another competitor's site or ad banner in real time, even if the user is not about to purchase the product. For example, if a user is shown "get this CD for $15, then a competing offer of no, get the CD for $14 can pop-up". A simple extension simply has the user also receiving a pop-up banner with a competing price if they are viewing a competitors offers in the virtual store of that competitor. We might also report to a vendor if, when, and to what degree a customer is becoming disloyal to a particular vendor and taking alternate offers.

13.2.1.3 Applications

There are numerous example commercial applications in which the time of purchase competition features can be utilized to provide significant benefit to the user. Some the less obvious commercial domains include:

1). Travel Packages and Flight and Hotel Rates—Features, amenities, class, activities, entertainment, excursions, etc.

2). Financial Services (e.g., Loans and Mortgages)—Terms, amortization, interest rates, service fees, etc.

3). Automobiles—Luxury and safety features, warrantees, auto club membership, terms of purchase, etc.

4). B2B Commerce—Numerous commercial applications including standard Web-based environments for B2B e-commerce including buyer-side and seller-side e-commerce applications, vertical B2B portals and trading floors.

5). Job Positions—Employers posting job positions may be notified by the service of competing job offers which employment candidates are browsing (and ultimately accept if this information is indicated by the candidate). Resumes and, if desired, other profile information is provided to all competitors. Depending upon the profile of the candidate and/or competitive employment opportunities which a particular candidate is observing (or has recently observed), employers may wish to customize offers dynamically on an individual basis.

13.2.1.4 Integration into a Shopbot Interface

We also suggest the integration of time-of-purchase competition into a standard shop-bot interface e.g. with comparative features of the products associated with the various offers across a variety of product criteria, or at the least price can be used to provide the user within simple recommendations. With this, even without a time-of-purchase offer the user can at least compare its offer with fixed-price deals in the wider market place. We might also provide a user with historical information about previous (low) price offers, within a Yahoo-like portal for e-commerce; to provide a user within information about a reasonable price for each individual purchasable; i.e. the very lowest price that each given item had been offered to a customer previously using time of purchase competition. This site could also act as a stand alone proxy server (like anonymizer) which inserts this information by overlaying it on Web pages as the user browses the web.

The time of purchase competition feature is designed to be accessible to a user within the context of or most any information access mode relating to browsing on the Internet e.g. Web or portal browsing, receiving email or "push" content, submitting queries (e.g. specific names, categories and/or desired features (or combinations of the above) of products which the user identified as being or present interest.

During any of the above information access modes when a buyer specifies time-of-purchase competition at her SDI client proxy, SDI can automatically provide competitors with information about a buyer's product or service requirements, and a buyer's profile, as well as on particular vendor specific offers the buyer is observing or contemplating before a buyer makes a purchase. This can facilitate competition between vendors, and can lead to better prices and offers for buyers. The system of time-of-purchase competition can also help to reduce the costs of entry into a market, because name-recognition becomes less important. New vendors can simply register with time-of-purchase referral system, and cherry pick a small set of purchases.

This is a next-generation e-commerce service. Current shop-bots, for example "Junglee" at Amazon.com and www-.shoptheweb.amazon.com provide a static comparison shopping service. A buyer can specify a product, and receive price information about the product from different suppliers. There is no dynamic competition between vendors on price or features. The buyer driven service for flights offered by www-.priceline.com is more dynamic, in that a seller is found to match the price that a buyer bids, but does not necessarily promote competition between sellers for a user's purchase. In fact the sellers can make excess profits from the pricing errors made by buyers, because once a buyer states his/her reservation price, that is the price he/she must pay. Surplus goes to the market operator, e.g. priceline, but not to the user. The system is also different to our proposed system in that:

a) Time-of-purchase competition is disintermediated and decentralized, implemented dynamically over a virtual network of competing vendors.

b) Time-of-purchase also allows a vendor to access anonymous profile information about a buyer, to enable a careful tailoring of an offer to the preferences of a user.

We can use profile information, and historical transaction information for similar transactions, together with the customer price/promotion algorithm disclosed in co-pending patent "System for the Automatic Determination of Customized Prices and Promotions" to negotiate on a deal with a vendor that will optimize the value to the buyer. Profiling of vendors, and buyer transactions, can allow buyers to avoid making bids that are too high and losing value (airlines in priceline.com can profit from inaccurate buyer bids).

Time-of-purchase enables vendors with competing products or services to receive automatic notification when a buyer is about to purchase a relevant product or service. A vendor can also receive information on the profile of a buyer, and the offers made by other vendors; and submit counter-offers to a buyer via the buyer's SDI-enabled client. The buyer can then be presented with a final set of offers, before making a purchase decision.

A buyer can also configure its profile management rules within time-of-purchase to provide profile information relating to the buyer's sensitivity to discount offers, customer loyalty with other vendors, value responsiveness (bargain driven), responsiveness to high quantity discounts (for only those categories which the buyer makes frequent or large purchases), etc. This information can be certified by the buyer's client-side SDI proxy, as a fair representation of the purchasing habits of a buyer, and can be aggregated across product types to protect a buyer's privacy.

The SDI time-of-purchase server can identify vendors with similar products or services, either using a static index which maintains vendors in particular product domains, or through dynamic profile matches between the target object profile of the web site that the buyer is currently browsing and target object profiles of the web sites of other SDI-enabled vendors. Alternatively, perhaps classification and clustering techniques can be deployed to identify similarity between vendors at the level of target objects, i.e. the products that a vendor offers; as indicated by virtual tags provided by a vendor that profile its products and services.

The time-of-purchase competition system may also draw in static "listed" offers on a vendor's web site, to prevent a vendor over-charging a user. In addition, SDI might track purchases and via clustering techniques request prices on similar or competing products to the product that a user is about to purchase. These products and/or services may also be released to a user. When presenting a choice of products and/or purchases to a user we can allow many features to be summarized, for example features which relate to the location of a vendor, terms of shipment and insurance, and user ratings.

Vendors are notified, and provided with the ability to access the profile of the buyer (as the buyer deems appropriate), either with client-level processing or through the release of an anonymous profile to the vendor. Vendors typically will wish to construct offers through a rule-based engine, data-mining techniques, or automatic collaborative filtering techniques, as disclosed in co-pending patent application "System for Automatic Determination of Customized Prices and Promotions" and U.S. Pat. No. 5,754,939, "System for Generation of User profiles for a System for Customized Electronic Identification of Desirable Objects" as such techniques may be deployed by the vendor directly or via the Secure Data Interchange representing the interests of the vendors.

Choosing an Offer to Make

User profile information may include a temporal profile of the buyer's present activities, including search terms, recent page navigations, what pages is the buyer observing presently (and the profile of this page) or even his/her present physical location as well as the general user profile. Any portion of the above particularly the latter two may of course be withheld from the vendor). Or the buyer may be more generous in providing this information about the various static or dynamic features.

Vendors can target buyers on the basis of their preferences and interests, and also within the temporal context of when they are most likely to be receptive to offers (thus providing also a benefit/service to the buyer as well as enabling the competing vendors to increase the price point at which their competition begins, knowing that the buyer is in an optimally receptive condition to accept offers for that item). For example, a user might release to a vendor the current context of a user's purchase, such as the click stream over the past 5 minutes.

In the preferred implementation, vendors are also provided with a (client or web-based) rules interface which enables the vendors to input pre-stated rules with which the system may solicit and respond to competitive offers automatically. In this way data mining may be performed in order for the vendor to determine what a user (or all users) by attribute, tend to best respond to by product, product feature, features or services of the vendor, price, etc. If pre-stated rules are used to automatically respond to a notification with a competitive offer, the nature and degree of discount is typically determined in accordance with the nature and degree of the original or previous offer and/or the user profile as disclosed by the client-level proxy/server to that vendor. In lieu of manually entered rules, co-pending patent application entitled "System for the Automatic Determination of Customized Prices and Promotions" another similar algorithmic methodology may be used as an aid by the vendor in order to automatically determine a competitive offer (or subsequent responses thereto) as well as an aid to the vendor in selecting optimal rules.

These techniques can also be used such that predictive metrics as to selection, price and promotional type, may be optimally determined in relation to the individual buyer or specific relevant user profile attributes, for example, in accordance with a data analysis expert of the vendor (or representing the vendor via SDI) analyzing randomized versions of user profiles and randomized aggregate statistics. These metrics may be linked with actual behavioral statistics of the buyers on the vendors' web site. In order to further drive competition between vendors, the time-of-purchase system can provide each competitor details of the final transaction which the buyer chose to accept. Accordingly, in an attempt to better improve their competitive advantage in the competitive bidding process a vendor may also wish to analyze a user's purchases and adjust its future offers to similar users.

Choosing a Profile to Release

From the buyer's perspective, there is an elaborate methodology for the automatic determination of the particular buyer information which, if released, will elicit the most optimal offers from vendors which can be determined by utilizing that same type of pricing model which the vendor is likely to use (for example that same method deployed in co-pending patent entitled "System for the Automatic Determination of Customized Prices and Promotions" an instead be tailored to determine which metrics in the user's profile decrease the overall price point and/or increase overall value over an "average" user (with no profile disclosure).

It is even conceivable that vendors could (upon user permission) be allowed to directly identify plus enter into a live discussion with the user during the time-of-purchase competition process. A variation of the system was even is further disclosed in the above co-pending application which was intended (according to the above referenced co-pending specification) as an electronic assistant to tele-marketers and other sales persons to determine offers and counter-offers which are automatically generated in response to (for example) rejections of the previous offer as well as counter offers by the buyer. This dynamic system was originally designed for salespersons to optimize the expected profit from each customer (in view of the general user profile and the offer buyer responses up to that point in the negotiation). As such, this technique could be readily extended to the current application in which the previous offers up to that point may instead originate from other vendors (instead of a single one), thus the system responses may be affected by the user profile as well as the offer response pairs up to that point in the negotiation process.

It is likely that vendors will not compete on price alone, but rather through added-value services such as offering loyalty bonuses, cross-sells, and two-for-one offer and added features as well as service advantages such as fast delivery, guaranteed service/maintenance, warrantees etc. Vendors will choose this mode of selling to prevent simple price-comparison at the client. Conversely, in some instances vendors may attempt to eliminate the features in order to create the perception of a better deal through marginal price reductions, then possibly add these features as counter offers to other vendors in which the same price may be maintained.

Accordingly the above referenced algorithm as provided by the customized prices and promotions scheme, may offer valuable competitive insights to the vendor in being able to assemble more appealing cross-sells/up-sells and more complex offers (including multiple items which are adjusted by the system to be extremely desirable to the buyer) more effectively than the competition. Therefore the client will receive offers from multiple vendors, and after initial filtering of the large collection of offers, present a choice set to the buyer.

SDI can also present a buyer with ratings or annotations for items across multiple competing products, for example, within the context of buyers whose attributes (which may be important pricing features) are similar to that of the buyer. SDI might also monitor previous offers made by vendors, so that if a better offer was made in the past a buyer can request the lower price, and try to bargain with the vendor. Typically the resulting purchase recommendations are presented as suggestions on the user interface to help the user's assessment of valuing the offer as a "good deal" as well as to accurately represent his/her own preferences. Some users may, however, use this feature as part of a fully automated (agent mediated) buying process which is performed in asynchronous fashion (as described below, this typically is only necessary if the time-of-purchase system is deployed in order to create buyer-coalitions prior to negotiating with the vendors. Of course the time of purchase competition enabled buyer will distribute the offers in order to elicit vendor competition. SDI can also present a buyer with previous time of purchase vendor competition negotiations e.g. offers made in the past by vendors for similar products as those provided by that prospective advertiser (even from the same vendor) which are at least as competitive as offers made to that user or "similar" users. Because of the competitive nature of this environment, vendors will wish to leverage all of this information and using their own pricing algorithms and data mining tools, craft optimal offers through the pseudonymous buyer database.

If the buyer so desires, the client-level proxy can also automatically notify these vendors if/when a particular offer is about to be accepted by the buyer. For example, a time delay response in the client-level proxy actually processing the order requests could allow vendors a final opportunity to present another competitive offer to the buyer. In another less optimal variation, vendors are notified only upon the buyer agreeing to accept an initial offer received. A secure function within the buyers client residing within the Secure Sockets Layer (SSL) is able to authenticate to the vendor's receiving the notification that the offer is true and untampered by the buyer through the transmission of a secure encrypted message. As an additional service to buyers the SDI-level proxy server can perform analysis on the offers that a buyer receives, through comparison with offers that have been received by other buyers with the best offer that has been received by any buyer for the same product, and with the typical offer received by a buyer with a similar profile to the buyer. This can be useful to a buyer because it will allow the buyer to reject all offers if they are non-competitive. The SDI-level proxy could also automatically identify for buyers the profile attributes that promote good offers, and the profile attributes that promote bad offers, as an informational service to enable buyers to gain better offers in the future, either through revealing certain information or changing behavior to attain favorable profiles.

If iamworthit detects that discrepancies in the pricing for a given vendor's item occurs in correlation with certain identifiable user profile information (not arbitrarily), it will in the future initially disclose that data of any other which is determined from past buyer interactions to be advantageous for the buyer. Should the vendor exhibit price or offer discrimination (i.e. by having provided more favorable items to other previous buyers, the buyer may demand the lowest price. If the vendor ignores the request and the user has not received (or does not wish to accept) another vendor's offer for a lower price and the iamworthit infomediary service may apply pressure upon the vendor such as creating a buyer coalition and/or making a believable threat (as described below) which has the ability to deny future business to that vendor. If the vendor is able to present an exceptionally attractive offer the buyer may instead wish to stipulate that the offer is valid only if the time of purchase competition feature is not used by the user. iamworthit's statistics based price prediction scheme can then predict if this decision would serve the user's best interests or not based upon the user's purchasing objectives.

Furthermore, we can allow vendors to offer payment to a client in return for displaying an offer to the buyer, and vendors can also bid for space on the buyer's web portal which is often represented as a profile associated with a pseudonym in conjunction with a description of the ad space. The purchasing decisions of the buyer may be performed by an electronic representative of the buyer's wishes (as "buyer agent") implementing the techniques of pricing/promotion selection algorithms completely autonomously on behalf of the buyer. However, the best offer can only be presented to a buyer to the extent that the SDI client level software understands a buyer's model of "value", and can make appropriate tradeoffs between product features and price (as implicitly inferred by the system through the above suggested techniques or explicitly stated by the buyer in advance). Nonetheless, this is a hard problem, and we expect that the buyer will often need to make a final product choice decision which could be a default in which the system would defer judgment to the buyer if it's statistical confidence as to the buyer wishes below a certain threshold.

The collaborative filtering techniques described in pending patent "System for Automatic Determination of Customized Prices and Promotions", can allow a buyer's client-level proxy server, termed the buyer agent in this section, to automatically analyze offers. The system can also be used to send initial offers to vendors, on the basis of historical information about the transactions that have been performed between other buyers (which include the benefit of his/her complete user profile data) and the vendor. Offers can (of course) be sent to a vendor and its competitors. Finally, after offers that are received from vendors are pre-screened, they can be automatically ranked for value-using a combined quality and price metric (again judged within a collaborative filtering framework). Buyer feedback e.g. average ratings and annotations from previous buyers may form an additional criteria. The goal is to leverage the database of other offers that have been accepted by buyers in the past, and form a model of vendors, to determine whether or not a buyer has received good offers (i.e. we can exchange information within the system of Secure Data Interchange, and making more information available increases the efficiency of the market). Offers can be filtered and presented to a buyer in rank order.

13.2.1.5 Time-of-Purchase with Non-cooperative Vendors

We suggest a simple technique to allow a client-side SDI proxy to automatically detect that a purchase is about to be authorized, and the details of the purchase. The model is that SDI, or a third-party SDI client, provides a banking service for a user. The advantage of such a service is that in making a purchase, we can require that the vendor provides information to the bank about the purchase that is about to be made, as a condition for validating payment. The system works as follows:

1. User interacts with vendor, and decides to make a purchase.
2. User provides payment method, for example an SDI bank account number.
3. The SDI bank account server demands information about the product which is about to be purchased before authorizing payment for the service.
4. The vendor provides the SDI bank with information about the purchase.
5. The SDI time-of-purchase system can now step into the transaction, and solicit competitive offers from other vendors.
6. The user is presented with the opportunity to select an alternative offer.
7. The SDI proxy-agent reports the user's final purchase decision to the appropriate vendor, and denies purchase to the initial vendor if the user accepts an alternative offer.
8. The final transaction is executed.

13.2.1.6 Automatic Buyer Coalition Generation

The time of purchase competition system can also be used to allow the automatic formation of user coalitions. Coalitions can be generated dynamically based on the privileged position of the time-of-purchase server in the marketplace. The time-of-purchase server can transparently bundle purchases from disparate end-users, and negotiate quantity discounts with vendors. Buyer coalition formation can significantly improve negotiating leverage as the collective buying power of numerous individuals using the time-of-purchase competition feature, and be made completely transparent to users. The ability to offer a single vendor a number of sales allows significant negotiation leverage, and can be used to get special discounts.

Although the coalition formation problem is very difficult in general, because individuals may not have the same goals and the computation of an optimal outcome with self-interested agents is hard (for example, how should the profits from a coalition be divided, how can we assess the value of each agent for the coalition, etc.)

The time-of-purchase server has information about the current and pending purchase requests from users in the system, and can make one-shot coalition formation decisions, with profits divided equally between agents. Agents provide a one-time bid for a service, as the offer that they are about to accept from a vendor. This is a guaranteed offer, as the purchase is about to be made. Therefore, it is a simple matter to aggregate bids from a number of agents as a bundle bid for a set of items, and negotiate a good price from a single vendor. This solution to coalition formation is simple, because it is not negotiated over many steps between agents, but performed one-time with agents tied into an ad-hoc coalition.

For example, suppose that at any time, in the period of 10 seconds, 100 SDI agents are about to purchase compact discs, varying in price between $5.99 and $15.99. The time-of-purchase competition agent has this information, and can perform the following steps:
1. Collect time-of-purchase requests over a short period of time (e.g. 10 seconds).
2. Identify purchases with a common type (e.g. compact discs).
3. Aggregate the sum value of agent's buy prices for the purchases (e.g. sum the price that each agent is about to pay for a compact disk).
4. Choose a discount on the TOTAL price, e.g. 10%. Make an aggregated buy offer to appropriate vendors on behalf of all clients (e.g. buy all 100 compact disks for a total 10% discount).
5. If successful, divide the final discount over all clients, e.g. subtract 10% from every CD purchase. Perhaps take a share of the surplus as profit for the brokering role performed.

The time-of-competition server can also take a position in the market, identifying bundled purchases over time, essentially aggregating demand and making offers of a guaranteed stream of purchases over a period of time based on historical information, again for a discount that can be seamlessly passed onto future purchasers. If the server is successful in taking a position in the market for some good that its user base seem to be interested in purchasing, then in addition to returning offers from vendors in the system, the time-of-purchase system can provide good prices to its clients.

Buyers might also form coalitions on the basis of automatically detected synergies between their requests and predicted similarities between them. This can give buyers more leverage in negotiation with a vendor. In the automatic evaluation of how "good" an offer is (how competitively it matches the market demand for that coalition's needs) in iamworthit's historical user information, it must also utilize information about the effect that size of the coalition has upon the market's responsiveness. Within the context of the present framework, the simplest version of the system involves creating the coalition around a particular item and, however, it also conceivable that it could be formed at the vendor level in which the coalition members are interested in any item(s) provided by the vendor and vendor competition is elicited by the coalition across all products which its members demonstrate interest in and which are provided by the competitive vendors. Given a sufficiently large subscriber base, buyer coalitions may be automatically created in real-time and in ad-hoc fashion (i.e. from the iamworthit buyers who are interested in a particular type of item at that particular time).

Buyer coalitions typically are able to exert significantly greater pressure upon vendors the larger they are (this fact applies as well to multiple company b to b buyer coalitions). As such iamworthit may also notify other members which in accordance with their user profiles are likely to have an interest in a particular item (or items) in which a coalition of members have demonstrated interest in order to increase the size of the coalition. Similarly, the aggregate user profile of all members of the coalition may be used in conjunction with collaborative filtering in order to recommend those items which collectively best match the preferences of the coalition collectively and thus are able to provide the best deal for the most items possible to that particular coalition. Thus the coalition model is extended to placing competitive pressure upon vendors across multiple items. iamworthit must also utilize the above modeling techniques in order to establish pricing models based on the value of these different items in light of the total monetary value which the coalition represents to the vendor collectively. In addition to inferring buyer interest entirely passively, it is possible for buyers to manually edit their profile, e.g. by modifying or actively selecting categories of purchasables of interest which she/he would like to be notified of (e.g. via pager) if/when a buyer coalition for a purchasable of that type is being established. It is further possible to increase the size of buyer coalitions by allowing a certain amount of time for buyer's to respond to offers to join that particular coalition (e.g. 24 hours). Typically a couple of days is all the time that is required to achieve a substantially maximum buyer response. Also, because some vendors may wish to be (automatically) informed if/when substantially large coalitions approach the vendor, there may be an additional marginal price advantage by providing an additional period for vendors to reply.

The buyer may wish to allow the iamworthit time of purchase vendor competition system to operate in fully automatic mode whereby certain "acceptance parameters" are provided to enable the buyer agent to act fully or autonomously on behalf of the buyer's stated (or approved) parameters. This technique is likely to provide a central function particularly in most business-to-business iamworthit commercial applications. The business-to-business commercial domain may exemplify a couple of other novel features (which are not exclusively limited to business-to-business). For example, because replenishment of products or supplies suggest much greater repetition and thus predictability, it is sometimes useful to buyers to also leverage as part of the negotiating process an advanced commitment of buyer loyalty over an extended period of time. In the unlikely event of the buyer changing his/her vendor loyalty after considerable value has been provided to the buyer, the vendor may control the right to acquire certain assets of the buyer (e.g. corporate stock) as pre-agreed collateral for the vendor. Also, in the business-to-business domain iamworthit acts essentially as (or in conjunction with) a buyer-side portal to a web-wide vendor resource, though it could also be integrated as part of a seller side-portal interface tool as well.

As an additional service to vendors SDI can provide enhanced profile information, aggregated from other vendors, to enable vendors to provide better focused offers than can be provided on the basis of the profile information directly associated with the pseudonym of a buyer. Certain portions of the user profile data that is unavailable for direct collection by the vendor (such as information that is collected on other sites including, in particular, competitive vendor sites) may reveal important information which enables the vendor to better target that buyer. As such the secure data interchange representing the collective buyers may aggregate, analyze and sell this data to the vendor so long as the release of such information does not negatively affect the predicted pricing or value levels for that buyer as performed by the above type of pricing algorithm.

An interesting variation of this example involves the situation in which multiple entities represented by SDI users may be negotiating with the same other entity (or individual). It may be for the same purchasable. Alternatively, it may involve different purchasables or the represented group may even be a combination of users and sellers who happen to be presently dealing with the same entity. Accordingly it is important for SDI to achieve an understanding as to the individual negotiating parameters as well as an assessment of a market demand model which characterizes the needs and objectives of that entity with regards to the particular prospective transactions being negotiated which SDI is mediating on behalf of each party which is captured through the main SDI server. As such it is often possible to thus attempt to predict the minimal acceptable terms of an offer which would meet those conditions. The negotiating leverage from all parties is based upon terms which affect multiple (or perhaps all) of the deals collectively. SDI thus has the power to significantly strengthen the negotiating leverage based upon a market demand model which characterizes that entity thus benefiting the entrusted parties on the whole. The statistical data used for market demand models from the user-centric or vendor-centric SDI is collected about the other parties which the parties are negotiating with. One useful source for estimating this predicted market demand curve which they represent. For example it is possible for end-users as a coalition of users to be automatically formed for this purpose.

A user-centric SDI is then assigned to the coalition in order to (a) ascertain from user profile information (in addition to subsequent active query or recommended offer feed back/ approval information about terms which the coalition would likely wish to receive from the vendor (subject to negotiation) (b) ascertain from vendor behavior relating to past users and coalitions terms which would be reasonable to expect from the vendor in order to anticipate reasonable offers/counter offers to present to the vendor.

The user-centric SDI may even detect from the user profiles the possibility (followed-up by a confirmation query to the users) that the users may be willing to commit in advance for a specified period of time to certain customer performance criteria e.g. in exchange for not only guaranteed discounts but also an equity stake in the company which may increase over time and where continued ownership of which is contingent upon its sustained user performance as agreed upon in advance for the specified period of time. Assuming sufficient willingness, the coalition as directed by the user centric SDI will submit the recommended offer to the vendor along with its competitors using time of purchase competition. The coalition may even incorporate a believable threat (upon approval of its members) (e.g., that it will not deal with the vendor in the future if the terms of its request (such as long-term discount privileges or conversely promise to give the vendor certain competitive advantages in future user coalition negotiations which may include future SDI coalitions.

SDI's predictive tool suite can be used to predict the most likely prospects for a given coalition, i.e., matching users who have explicitly indicated an interest or have engaged in negotiations or past dealings with a given vendor. As indicated the recommended users may be targeted either with the same items or completely different items, the latter case in which SDI will try to negotiate a lower price based upon the aggregate sales form the coalition, not the volume of sales for one particular item per se, as in the first instance. In the present application, however, because negotiating pressure is being applied by a collection of entities upon (typically) one entity (or possibly alliance of entities), an SDI (which may typically be spawned from the main SDI service) representing the coalition is created in ad-hoc fashion. The other entity may accordingly wish to acquire its own SDI to also represent its commercial interests. Each SDI may represent multiple parties. No SDI must of course ever represent an entity which is negotiating with another entity which it represents.

Coalitions are typically arranged automatically by SDI based upon observed synergies in user and seller activities which SDI observes. In fact the predictive capabilities of SDI could be used to model (1) the anticipated number of cooperating entities which are predicted to join the coalition and (2) from that information, the predicted terms and price which could be anticipated for the user coalition or (for the seller coalition). The anticipated price and volume of sales which could be anticipated if the entity were to accept SDI's invitation to participate in the coalition based upon the terms and conditions thereof as predicted to be most advantageous (collectively) according to SDI.

13.2.1.7.1 Leveraging Control Over a Vendor's Suppliers

One of the roles of the iamworthit infomediary service could be extended to helping users not only identify vendors with whom they are most likely to do business with (vis-a-vie identifying the most desirable products/services for each user individually as the basis of the formation of the coalition), but also identifying of the other companies which do business with the user recommended vendors which companies in particular may present a potential investment opportunity to the user. Or alternatively to determine which suppliers are potential candidates to do business with a company (or preferably multiple companies) which sell products which are of interest to the user. This SDI application is one of several conceivable applications by which the user is able through the intelligence gathering capability of SDI to identify potential opportunities which could potentially benefit the user which are also within control of the vendor wherein commercial pressure may be exerted upon the vendor via the coalitions.

In this particular application, assuming that the supplier company is viable, an additional qualification as an investment opportunity to the user is how early is the development stage at that time. Additionally, vendors may be selected on the basis of their ability to provide products/services which match the customer's preferences and currently do business with suppliers which are prime candidates for investment (i.e., are early stage, preferably in need of capital investment and importantly are doing business with as many other vendors as possible which sell products/services of interest to the user. In our implementation, if the vendor is early stage (i.e., represents a reasonable investment opportunity for the (coalition members), the coalition may guarantee the vendor of certain customer loyalty commitments which are guaranteed (upon forfeiture if the terms of loyalty are not lived up to), certain shares of stock in the vendor's company.

One criteria for the selection of this vendor includes the particular suppliers which he/she is currently doing business with or would be willing to switch to in exchange for the coalition's business which is typically a long-term commitment. In conjunction the selection of vendors which the coalition approaches is based upon the willingness of other competitive vendors to conform to the wishes of the coalition with regards to the vendors' selection of suppliers typically. Several multivendor (supplier) relationships currently exist. And the objective of iamworthit is to identify suppliers which are well qualified to satisfy the needs of the vendors which are candidates for their businesses and which similarly provide significant growth potential, if these vendors switch over to these suppliers. If the coalition's offer is successful, it will invest in the supplier(s), prior to its public announcement of having obtained the vendor(s) as a customer(s). If the supplier is in substantial need of investment (e.g. a private placement), it is even conceivable that the coalition may be compensated by the supplier in the form of monetary compensation or preferably free or discounted product from the vendor for which they provide their product/services. This may further assure user loyalty from the coalition and is typically limited to an initial period needed to entice the coalition members that the investment in the supplier is worth while in light of the rather high risk in such an early stage company.

Other more elaborate applications are also conceivable, for example, more general requests for knowledge and influence over particular executive decisions which are not highly confidential which may provide benefits to the members of the coalition e.g. in addition other types of partnering decisions with other vendors also potentially to strategic product development directions and revisions which provide the coalition optimal personal satisfaction and value for their purchasing commitments. It is even conceivable that through the aid of vendor credentials (for identification purposes) user coalitions could bargain with vendors using "restricted currency" which stipulates its use must be for particular uses. (or its value for any other users is diminished) (such as vendors in which the coalition has an investment state).

In a variation, these restrictions could "encourage" subsequent transacting parties of the currency (e.g. the employees of the company) to buy from particular vendors which the coalition support (e.g. in conjunction with or equity stake), perhaps thus encouraging the employees join the coalition as well. Data mining (performed by SDI) will also indicate existing vendor relationship opportunities for investment between/within (respectively) different vendors as well as the flow of currency through sequences of transactions in which these complex vendor synergies exist even indirectly via one (or multiple) removed vendor-vendor and user-vendor relationships.

13.2.1.7.2 Coalitions Created for Purposes of Eliciting Change on the Part of Vendors In addition to applying market pressures, one other example in which entities may be automatically introduced into coalitions using SDI may involve SDI automatically identifying certain situations or complaints from users or entities in which there may be common ground for these parties to collectively apply political or legal pressure upon another entity from which the problem arises, or in one example to apply legal tactics for purposes of reclaiming damages from the infringing party. For example, members of SDI could be asked to disclose particular instances of these types of legal infractions even if they are relatively minor (e.g. simply a short fall in acceptable quality of misrepresentations through misleading advertising etc. may be relatively minor inconveniences and/or a site may be provided as well for non-SDI members (e.g. www.class.action.com.

A similar application tailored specifically to the Federal Government could also be provided (e.g., www.governmentindustries.com. In one example, SDI's ability to provide annotations excluding complaints and ratings pertaining to particular organizations and individuals is complemented by the current scheme by introducing the ability of users to apply pressure to the organization or individual as a coalition in order to more effectively motivate the desired change accordingly. To this end other tactics may be used, for example, a threat to collectively sponsor negative advertising or editorials. In fact, the above technique for presenting a believable threat could be utilized in this case and backed up by an insurance policy which provides in addition to the guaranties that the threatened action will be carried out, for example, by X date unless a particular condition is met, also provides sufficient funds to follow-through accordingly and in one variation further instill the motivation on behalf of the parties by actually insuring the outcome of the litigation (where the threatened (and guaranteed) consequence is sufficiently great that the entity is much rather proved to settle thus reducing exposure significantly.

Within the present system SDI provides the framework by which appropriate users and sellers may be matched together. It also enables a methodology by which the user interests are protected through the use of matching of sellers offers to competitive vendors (using iamworthit).

13.2.1.8 Single-User Time-Aggregated Purchases

Another extension is to propose a special interest-bearing bank account which we set-up for the user which is tied into a wallet or debit/credit card for off-line transactions. We can allow a user agent to bundle its own purchases over time, and use the system of SDI to guarantee future payment to on-line vendors in return to a good current offer. This is novel, because it is like participating in a "discount scheme" without purchasing the right to future discounts up front. A user can still invest money that is earmarked for future purchases with a vendor.

We describe a wallet application for this purpose, that allows a user of SDI to commit currency to vendors for future purchases. The time-of-purchase competition system can allow vendors to see the pseudonymous purchasing profiles of users (e.g., over the past 12 or 18 months) which are relevant to their respective commercial venues and competitively bid for the opportunity to acquire from that user a "pre-commitment" for similar spending amounts within the same time period going forward (provided that that vendor offers the same/similar categories from which the user had purchased that amount in the past from another vendor(s).

The "committed currency" in the user's account is not actually spent and thus remains interest-bearing for the user, and because the dollars are exclusively and irreversibly earmarked, the actual debit could even occur substantially after the actual purchases ultimately occurs with that vendor. Vendors marketing the service may be able to exclude competitive offers (as is the case with the standard time-of-purchase competition application).

13.2.1.9 Special Vendor Treatment in a Community Dollar Scheme

There is a variation of community dollars in which some of the competitive features of the time of purchase competition system can be utilized by vendors to provide a competitive advantage over other vendors.

Each vendor is given exclusive rights to information about offers which users who subscribed through their site or portal are currently considering. All other competitive vendors are denied access to time-of-purchase competition for that user. The vendor may request profile data from the user which s/he may wish to optimize the selection/features of the particular product offering as well as the value of the offer, and use SDI or its own price engine as before.

If the user has also subscribed to full time-of-purchase competition, he/she may be willing to give the vendor the right to provide the first counter offer. If the user does not accept the counter offer, the system can default to the standard multi-vendor competitive scheme.

Vendors signed up with the community dollars scheme may also be provided with special privileges for advertising to a user as the user browses the Internet. This can be used to encourage more vendors to sign into the SDI/community-dollars scheme, to be exempted from ad replacement technology and receive other preferential treatment. The present time-of-purchase competition scheme can also be adapted for the application to television commercials. In a preferred commercial mode a relationship is created between iamworthit and one of the providers of commercial insertion technology (at the head end). All cable providers not utilizing the particular commercial insertion technology provided by that particular partner provider would be subject to the use of the commercial replacement technology which iamworthit provides by delivering typically (but not exclusively) digital set top terminals streaming (HTML based) video commercials or the same preloaded onto the set top for subsequent display. The system is able to recognize if/when commercial breaks occur during the course of standard video programming through tags which are typically digitally encoded or (in the case of analog TV) transmitted within the vertical blanking interval.

The system could also allow a vendor to deliver (again by predefined rules) certain criteria for undercutting, in real time, any offer which the user browses (or even receives via e-mail). As in the case of time of purchase competition, these dynamic counteroffers can be delivered to the user via either the advert replacement system or a pop-up window/javascript window.

Vendors might even compete to "buy" the rights to exclusively deliver competitive offers to any offer which the user may happen to view and which is competitive to another product/service which the vendor provides. The terms of the rights which the vendor actually purchases may include the number of competitive offers which the vendor can provide in the future, the degree of the conditional "value" which the vendor would provide through the competing offer, the category(s)/domain(s) which the vendor purchases the right to compete, the degree of exclusivity/non-exclusivity. A vendor may also wish to constrain the ability of potential competitors to submit counter bids.

Vendors in all other product categories can retain the ability to compete for any offer which the user receives. It is possible that vendors with exclusive rights may also try to lock a user into future purchases. Again, this ability to lock users into future purchase commitments may be auctioned to competitive vendors. The dedicated currency auction web site (e.g., www.creditauction.com) is architecturally very similar to the time-of-purchase competition variation of the service with the exception that it is a market place in which many users may submit their profiles with request for offers from vendors across any or all categories relevant to their profile as requested or agreed to by the user. A variation of this dedicated currency involves a scheme for time shifting into the future the transfer of funds from the users account to the vendor's (thus allowing the users money to accrue interest during that period). Thus dedicated currency whether it proceeds or preceeds actual purchase events guarantees the vendor sales which can be used to plan capital improvements, attract credit or investment funding while providing benefits and/or interest on money spent to consumers.

This reverse auctions for time-shifted purchases may also encourage vendors to form virtual retailer communities, to accept a common currency and offer a full range of products and services to a user. Any offers involving the user dedicating any form of "value" for the user for future purchases of products/services is applicable towards purchases at any of these vendors in the community. SDI can be used to identify optimal combinations of vendors, to best satisfy the customer's needs. Unlike prior art multi-vendor loyalty point systems, in which the selection of vendors is static across all users, this allows the dynamic creation of loyalty schemes. This is possible because of the consumer preferences which can be made available via SDI. In cases where vendors offer some common products it may be possible to redeem value at either vendor's site, or to restrict a purchase to products at only one of vendors. From a data analysis perspective a primary criteria for matching vendors is to identify those which have products predicted to be interesting to the user are metrically close to each other within user (cluster) space (are predicted to be preferred by many of the same customers) AND have a minimal number of products which overlap, thus minimizing collaboration among competitors.

The actual debiting of a user's account can occur substantially after a commitment to spend money with a vendor, allowing a user to continue to accrue interest. In this multi-vendor mini market the money can be earmarked for that vendor exclusively at the moment of purchase.

13.2.1.10 LEIA Enhanced Time-of-Purchase

One application of LEIA involves the integration of the time of purchase competition architecture. In particular, purchasables which a user is browsing with an associated offer price may be either purchasable on-line or off-line. Based upon his/her present physical location, if the user so desires s/he may identify not only other similar items but also that subset of these items sold by bricks and mortar vendors which are physically proximal to the user's current location (thus available for immediate purchase). By introducing location enhanced information to users about their relative similar proximities to off-line purchasables the time of purchase vendor competition model is further enhanced by placing additional competitive pressure upon those vendors selling similar goods exclusively on-line (which are not immediately available to the user). In this environment if an off-line product offer is ultimately accepted by the user, a digital certificate could be securely conveyed to the user or authentication of his/her identity could be established at time the offer was accepted and upon redemption.

The Location Enhanced Information Architecture (LEIA) enables vendors in the vicinity of where a user is traveling to deliver a targeted ad or particular personalized offer. Or a user may search or navigate directories on the Web or browse a particular (competitive) item. Regardless of the mode of access, the system filters or identifies purchasables by their direct physical proximity to the user (or the user's intended travel path). If the time of purchase competition system uses location proximity of an item as a parameter for vendors to compete with one another (i.e. providing an additional speed/convenience factor for on-line items with an off-line sales presence) the particular vendor's price which is finally agreed upon and accepted by the user can be securely enforced at the point of sale using a digital coupon which is non-transferable and non-reusable may be down-loaded to the user's device, printed or simply securely transmitted to him/her as a unique code redeemable with user identification at the physical point of sale. These techniques are fully disclosed in co-pending patent application entitled "System for the automatic Determination of Customized Prices and Promotions".

13.2.1.11 Extended Example

Medical Insurance Application

Problem statement:

Increasingly, insurance companies are denying claims for medical services. Hospitalized patients frequently have in-patient days denied, in part or totally, and associated services and studies may also be denied. Days of partial or total denial are especially important for non-DRG (Diagnosis Related Group, Non-Medicare) insurance subscribers. Also in-patient and out-patient testing and services are frequently denied at the discretion of insurance administrators. These denials persist despite consistent efforts by hospitals and hospital personnel to properly document the appropriate protocols to alleviate patients' illnesses. Similarly, out-patient medical care in doctors' offices is not infrequently denied, and to the extent of prohibiting effective diagnosis and treatment. At times, hospitals as well as out-patient office personnel do not have the necessary information to know, prior to treatment, which services are eligible for reimbursement, partially because of the multitude of coverage patterns. The providers must frequently appeal non-payments retrospectively, by letters, further documentation and repeated telephone calls, all of which may or may not be effective, apparently depending on the capriciousness and the judgment of the particular clerk or medical personnel in the carrier's office. These situations have produced enormous pressures to improve communications by extracting detailed data from providers pertaining to carriers failing to support appropriate and necessary health care delivery and documentation of how these insurance issues have caused definitive health problems. This data will be used to exert pressure on insurance carriers. In view of these major economic pressures, hospitals and other providers of medical services will definitely be most cooperative in providing detailed billing and clinical information with appropriate release consents, or alternatively through deployment and utilization of the proprietary techniques for privatizing patients' records using a pseudonymous proxy server. This information will be provided by the billing and medical records departments of the hospital and also, in the case of hospital employees, from the Human Resources Department of the hospital for reimbursement for medical services for hospital personnel. The minimal information should include the billing record for those in-hospital days or the specific services/tests denied and the discharge summary of that hospitalization. Based on reviews of this material, further portions of the in-hospital clinical record may be requested. (Additionally, the iamworthit service provides for the utilization of the above mentioned proxy server for collecting and maintaining pseudonymous patient data whereby advertising revenues from industry advertisers accessing/targeting desired user profiles may be shared with the hospital and potentially also the patient, thus further insisting the hospital to provide this needed patient data).

A compounding problem is the lack of information provided prospectively by insurance companies to hospitals, physicians and other providers. Subscribers and providers have the right to know, in detail, the number and kinds of services covered, and the depth of the insurance coverage including the length of stay. This information is legally accessible and can be made available not only to the patient, but also to his/her physician. On exemplary commercial need for the present service by employers who wish to reinsure their employees with quality coverage.

Solution:

In order to protect the consumer, a solution proposed to address a timely and overwhelming need on the part of consumers to establish a control data bank, accessible to the consumer, which reveals general and specific instances of miscarriages by health insurance carriers of their fiduciary obligations to provide timely payment for essential health care services. Based upon data regarding the insurance company's stated policy and statistical analysis of the ultimately approved or disapproved coverage, performance criteria may be determined pertaining to the percentage likelihood of the insurance company covering certain services and length of hospital stays for future services to patients. In order to provide a robust and comprehensive statistical analysis, it is also required that a certain core sample of non-coverage denied service be collected in order to determine a variety of correlation criteria which affect the probability of coverage in addition to the identity of the carrier, also the type of prescribed medical care for associated illness wherein coverage for hospital stay or treatment is denied. Other correlations are possible, e.g., the medical history of the patient, the family history, etc. Of additional importance, statistics may also be provided which indicate the degree of adherence (integrity) of an insurer to provide coverage and to provide it with the level of depth of coverage which was purported by the insurer according to its standard claims policy. The iamworthit insurance service is accordingly designed with two primary case objectives:

1) Provide detailed statistics based on robust historical data regarding realistic expectations which the patient can anticipate regarding acceptance, denial and quality on the basis of various types of coverage given the context of the insurance needs and requirements of the buyer and based upon the specific services and depth of coverage purported by the insurer and any associated medical information regarding the buyer. The service could even anticipate, by review of the collective medical statistics the most likely type of coverage the buyer may need, based on his/her medical record specifically within the context of the associated determined probability of coverage and quality thereof for each insurer in view of this medical history of the buyer. In addition, iamworthit may provide a general informational resource where buyers can access such statistical information by carrier. Data mining tools may enable the buyer to extrapolate the desired statistical correlations as to his/her type of profile of medical or specific features of his/her medical condition or specific type of coverage and thus in light of this robust data better equipping the buyer to determine which insurance provider and associated policy is most appropriate for his/her specific health care coverage needs;

2) This information may be accessed in real time by the buyer (or for e.g. buyers, employer) while browsing specific insurers' sites, receiving specific offers by insurers (typically requiring certain medical information) or browsing an insurance retail portal. Typically, buyers of the present service will combine their use of the present browsing-based information with the Time-of-Purchase Vendor Competition Services (described below). Additionally, a rating feature may also be provided which enables the buyer to rate (and subsequent buyers to observe the averaged ratings) the various vendors by various types of criteria relevant to the buyer's experience in receiving acceptance, quality and depth of coverage (as well as how well the insurer adhered to promises for coverage as stated in its standard policy for coverage), of course, this feature could be used if for insurance products on-line for later purchase off-line.

Iamworthit's time-of-purchase vendor competition application to medical insurance (as applies similarly to numerous other e-commerce commercial domains) involves the following protocol:

The iamworthit enabled consumer provides specific needs or requirements as to what types of medical insurance products or areas of coverage are desired. These requests may be submitted either to a portal (or "mall") which connects the buyer to an extensive resource of medical insurance providers, or, alternatively, these requests may be submitted to iamworthit which provides its own default portal to these resources (which likely exists and is marketed as an independent marketplace for insurance purchasers on its own behalf). Upon submitting these buyer requests, iamworthit is able to provide numerous competitive insurance providers offering similar insurance products which in this application may be accompanied by certain credentials (such as the buyer's age and many other clinical parameters).

Additionally, the pseudonymized digital medical records of the buyer (which may also be requested by an insurer, typically in addition or instead of submitting a questionnaire regarding the buyer's health such as certain pre-existing medical conditions). Typically, patient medical records are a prerequisite to submitting an offer. The insurers may then provide specific offers for their respective products. Additionally, the buyer may browse various insurer's sites, providing pseudonymous medical data to the extent (and type) that it is requested and, specifically, to which providers the buyer desires. As offers from insurance providers are collected (in response to requests and/or browsing interactions), the time of purchase vendor competition is elicited whereby each insurance provider is automatically notified as to the most valuable offer(s) provided by a competitor(s) and are given the opportunity to submit counter offers accordingly. It should be noted that the determination of the value may be in accordance with certain buyer prescribed specifications such as price or certain expert determined criteria which consider either the price in combination with completeness and depth of coverage and, if relevant, the level of satisfaction of the buyer's request criteria.

Additionally, iamworthit provides the ability for buyers to share the information of offers they have received in accordance with the associated medical profile and/or response to health related questionnaire information, in order to determine if an offer which is submitted by an insurer inappropriately discriminates against the current buyer in terms of price or depth/comprehensiveness of coverage, or where such discrimination occurs in conjunction with buyer medical data which is prohibited by insurance regulatory guidelines as a valid criteria for such discrimination. Iamworthit's insurer coverage statistics (which the buyer may typically wish to observe in conjunction with the present time of purchase vendor competition functionality) are an additional important value determination factor (which may be factored in as an additional weighting criteria as numerically prescribed by the service (or by the buyer) and/or accordingly for purposes of setting a threshold by which insurers become disqualified as candidates for the buyer's business. In a variation, as is provided by the current model, buyers may instead first receive the historical offer information from other "similar" medically profiled buyers in order to submit a bid to that carrier which offered the most relevant and beneficial offer as well as all of the other competitive insurers. As is also provided according to the current scheme, the present iamworthit time of purchase vendor competition facilities may operate fully autonomously on behalf of the buyer (incorporating, if desired, specific request criteria).

Thus, optimal offers are provided to the buyer by a "buyer agent". Additionally, the present service may with some modification be provided to buyers dialing into an 800 number. Typically, in this case, however, (as is also the case in the on-line implementation), if the buyer does not have access to his/her pseudonymous medical records, he/she would typically answer a questionnaire for each provider (which would typically consist of an aggregate questionnaire satisfying the requests of all relevant carriers which could then be submitted automatically, or an agent could be programmed to automatically complete the questionnaire as needed.

Commercial Alliances with Regional or National Health Care Organizations

Because of the tremendous restrictions in providing insurance coverage to organizations which provide health care services, it will be greatly to their advantage for patients and physicians to be able to benefit from more fair and competitive insurance coverage by using time of purchase competition and the associated coverage probability service (providing full disclosure of non-coverage and inequities in delivery of coverage). The primary joint marketing entities which will benefit most significantly from this service and thus will be the strongest commercial allies, include independent physicians, medical clinics, large physician groups, pharmacies and perhaps even pharmaceutical companies, providers of medical supplies, hospitals and home health providers. Of the above entities listed, physician groups, clinics, and hospitals do a tremendous amount of advertising directly to consumers (and this is becoming increasingly true via the internet for physicians in private practice), particularly through the direct advertising medium of the internet (e.g., advertising on their web sites as well as email). These organizations, in light of their direct marketing exposure to the consumer which they provide, would likely become powerful allies in assisting the promotion and exposure of the competitive insurance with full disclosure of claim information service to their consumers.

Secondly, health care organizations which market to health care professionals, such as physicians and nurses, including pharmaceutical companies, pharmacies, and home health care providers may indirectly benefit by informing their target customers about the above consumer oriented service.

Quality Ratings of Medical Suppliers iamworthit's insurance application provides a natural entry into a second commercial application of the service. In a fashion similar to that of Time-of-Purchase Vendor Competition Scheme, for purchasers of insurance products, another useful commercial application of the present service is facilitating the time of purchase vendor competition between medical suppliers and equipment providers. The synergy by which this second commercial application is enhanced is as follows: physicians and hospitals will likely be cooperative allies to the service in providing patient information substantially as required as well as promoting (along with home health care providers) particularly the iamworthit insurer coverage probability service to their consumers. They will also likely utilize such a resource for internal uses and if/when HMO service liability legislation becomes enacted, for legal purposes as well.

To the buyer's advantage, it is possible (as in the insurance application, albeit less likely) that unfair or arbitrary price discrimination may be detected and counteracted by iamworthit's data sharing feature. Common buyers in this environment include hospitals, physician clinics, home health care providers and to a lesser extent HMOs and end-buyers, the nature/types of supplies and equipment which tend to be purchased by each of the above categories of buyers are provided in further detail below. As suggested earlier in this description (and in issued patent "Pseudonymous Server for System for Customized Electronic Identification for Desirable Objects"), a vertical portal as the one described, may be personalized based upon the user profile as disclosed upon accessing that portal in general, at the item level as within a category (or in conjunction with search results). Additionally, vendors may be equipped with price discrimination tools and are in fact highly motivated to form a coalition by entrusting their data and counter offer responses to incoming time of purchase vendor competition offers and bids to SDI (or at least an industry specific counterpart of SDI) for medical suppliers in order to provide limits or "price ceilings" for any given buyer and associated profile and condition relating to competitive offers or bids.

As in the case of almost any category of purchaser, particularly the larger entities, such as, unions, hospital systems and large physician organizations, additional bargaining leverage can be applied to suppliers because of the volume of supplies which can be purchased. The iamworthit model is particularly also likely to facilitate the buyer's leverage when negotiating long-term contracts with suppliers through the buyer-buyer data sharing and real time competition/bidding facilities which iamworthit provides.

Finally, it is worthy to note that as in the insurance application, a rating feature may also be provided which enables the buyer to rate (and subsequent buyers to observe the averaged ratings) the various vendors by various types of criteria such as quality of products, promptness of delivery, quality of service (or as in medical equipment, quality and promptness of technical assistance/repairs), availability of desired inventory etc.

There are a variety of types of health care organizations which could directly benefit from the time of purchase competition and quality rating service of medical suppliers which are described below:

(a). Physicians Clinics and Large Physicians Groups—Typical types of medical supplies and equipment which these organizations will purchase using the iamworthit medical supplies application include: equipment such as X-ray equipment, ultrasound units, EKG units, EEG units, computer and other office hardware, chemical analyzer units, clinical supplies, office furnishings, pharmaceuticals, etc.

(b). Hospitals and Hospital Systems—Typical medical supplies and equipment which hospitals will accordingly purchase include: MRI units, Cat Scan Units, X-ray units (including units for special studies and mammograms), radiation therapy units, stress-testing equipment, hematological and chemical testing equipment, surgical supplies, prosthetic supplies, patient-care supplies for medical and surgical floors, IV solutions and pharmaceuticals, physical plant operational and replacement equipment and supplies, etc.

c). HMOs—Currently, a certain percentage of patient health plans include coverage for pharmaceutical products. These products are typically provided through contract with centralized pharmaceutical suppliers. It is accordingly reasonable to suspect that many of these HMOs will invite the opportunity to provide these supplies through a more open dynamic marketplace environment as is provided by the iamworthit service.

(d). Union Directed Health Care Organizations—Union clinics typically purchase equipment and supplies, similar to private clinics or large physicians offices, as described above. Union private health care organizations would be compelled to incorporate the iamworthit medical supplies application as it similarly could apply to all of the above entities.

(e). Home Health Care Market—Equipment and supplies which are, in part, similar to large physicians clinics as well as some hospital—type supplies, used to provide out-patient care and maintenance services.

Patient Medical Records

The secure data interchange provides a secure and privacy protected storage and retrieval architecture in which buyers (in this case patients) are able to control the use of their personal profiles (in this case medical record information). Herein, we propose an alternative model which is based upon the assumption and belief that purveyors of this medical information, including hospitals, physician's offices/clinics, labor unions, (to some extent) HMOs are legally permitted to disclose and use their information for advertising purposes so long as a method is provided which insures that their information will not be associated with any identifying information about the patient (name, address, social security number, etc.). If regulatory constraints and/or the purveyor of this information prohibits the use of this information for the above purpose, patient permission could be acquired by patient signature on all appropriate consent forms at the time of admission and directly on the admission form.

In one variation, software may be provided to the organization which enables the organization to operate their own pseudonymous proxy server, thus enabling access by advertisers to the pseudonymized patient records. Email and/or telephony-based pseudonymous communications could be readily provided. For direct mail, the address information maintained by the hospital would mandate the hospital to provide direct mail advertising to the patients or to entrust this operation to a pseudonymous physical mail service such as SDI. In the (much) preferred variation, a trusted pseudonymous proxy server operator maintains the patient information on an external database (this would perhaps be SDI or an SDI-like service) in which all of the above pseudonymous communication media could be provided along with pseudonymous direct mail services. For the SDI data entrusted variation, the preferred business model to provide incentives to these organizations to cooperatively provide this data would involve SDI's privacy policy enforcement capabilities in combination with a revenue sharing model in which revenues from advertisers such as pharmaceutical companies, pharmacies, clinics, HMOs, hospitals (where the purveyor of the data is not a provider of the same competitive services). In the case in which HMOs are the advertisers, the HMO would identify patients who are currently subscribed to competing HMOs and (typically) have a medical history indicative of a good risk to the HMO. The iamworthit insurance competition scheme, as above described, could be implemented within the context of this current solicitation scheme in order to elicit time of purchase competition among HMOs upon the submission of an offer by the original HMO to the pseudonymous patient.

Advertising purposes so long as a method is provided which insures that their information will not be associated with any identifying information about the patient (name, address, social security number, etc.). If regulatory constraints and/or the purveyor of this information prohibits the use of this information for the above purpose, patient permission could be acquired by patient signature on all appropriate consent forms at the time of admission and directly on the admission form.

In one variation, software may be provided to the organization which enables the organization to operate their own pseudonymous proxy server, thus enabling access by advertisers to the pseudonymized patient records. Email and/or telephony-based pseudonymous communications could be readily provided. For direct mail, the address information maintained by the hospital would mandate the hospital to provide direct mail advertising to the patients or to entrust this operation to a pseudonymous physical mail service such as SDI. In the (much) preferred variation, a trusted pseudonymous proxy server operator maintains the patient information on an external database (this would perhaps be SDI or an SDI-like service) in which all of the above pseudonymous communication media could be provided along with pseudonymous direct mail services. For the SDI data entrusted variation, the preferred business model to provide incentives to these organizations to cooperatively provide this data would involve SDI's privacy policy enforcement capabilities in combination with a revenue sharing model in which revenues from advertisers such as pharmaceutical companies, pharmacies, clinics, HMOs, hospitals (where the purveyor of the data is not a provider of the same competitive services). In the case in which HMOs are the advertisers, the HMO would identify patients who are currently subscribed to competing HMOs and (typically) have a medical history indicative of a good risk to the HMO.

The iamworthit insurance competition scheme, as above described, could be implemented within the context of this current solicitation scheme in order to elicit time of purchase competition among HMOs upon the submission of an offer by the original HMO to the pseudonymous patient.

13.2.2 Matchmaking

The user-centric SDI model allows users to provide personal information on a carefully controlled basis to vendors and other users. Furthermore, vendors can implement rules that personalize the information, products, and service provided to users-n the basis of personal information that they receive from users directly, or have acquired about users. The key property of "matchmaking" applications is that information exchange is bi-directional, i.e. a match is not computed on the basis of static information within the system, but may involve additional information exchange between agents, and/or special actions by one or more agents.

Client-level SDI proxies can act as autonomous agents in an architectural variation of SDI, where the "client-level proxy" is co-located with a (physically) mobile user, for example on a palm-held computer or head-up display. In a "match-making" application the goal of these SDI proxy agents is to find other agents with desired profiles/synergies, with the view to taking an action or exchanging a particular type of information. We describe many applications, for example: to matching buyers with a virtual sales force, to a market for expert opinion, to groupware systems for virtual team working, and to an investment system.

We can allow agents to communicate anonymously, without revealing (even pseudonymous) identities. In addition, we can prevent one agent receiving profile information about another agent unless authorization is provided within the rules of data release associated with the agent's profile. Implicit authorization occurs when a requestor can present certificates to verify that it has required attributes to access particular information. Explicit authorization occurs when a requestee provides direct authorization to a particular part of a user's pseudonym.

Essentially there is bi-directional information filtering: the requestor agent will only present certain information to the user, information that is relevant; and the requestee will only provide information when a request is judged to be legitimate. Information exchange between agents occurs as part of a multi-step negotiation, until both parties can agree on terms for either a physical meeting (or execution of a deal), or further pseudonymous exchange of information or cooperation.

In match-making applications the role of the central SDI query execution engine is to search continuously for "matches" between agents, based on agent profiles. When a match occurs additional information exchange may occur automatically between agents, until finally an introduction is made or an action executed by one (or both) of the agents. Decisions about what information to exchange are made on the basis of both static and dynamic profile attributes, e.g. standard (historic) profile information, current behavior, current location, and recent activity. Also mode of behavior e.g., social, business, leisure as detected by the user's calendar, time, content in recent conversations, type of users recently interacted with, etc. LEIA style-behavior attributes can be used to automatically decide on the relevance of new virtual tag information. A requestee might also demand certain credentials to indicate the lack of negative reputation marks, for example that an interaction with the user has never received a bad rating (see Section 2.2.3). Perhaps a third-party could be used to determine whether the user's know each other (e.g. www.sixdegrees.com). When a requestee denies a request for information, it may instead provide criteria for data releases. A requester can respond with a different information request, or a subset of required credentials. Finally, the agents might agree on terms of negotiation and conditions can be anonymously fixed.

There are (at least 5 levels) of information disclosure: indicate to another user interest; release profile information; disclose communication; start a correspondence session; schedule a meeting/strike a deal, take some other action, etc. The end-result of information exchange could be an agreement to calendar a meeting for some future time and place; and absolute, or pseudonymous revelation of identity.

An initial implementation of the data-release policies might allow only manual definitions. However, after an initial "beta testing" phase, a data mining suite could be used to cluster users and generate exemplar data release and data request policies. A system can provide default settings for users, and recommend setting based on users with similar profiles. The user can further fine-tune the rules. Automatic feedback techniques can be useful to adjust rules, for example—when a user is especially receptive to particular type of introduction then make such introductions more likely in the future. An intelligent interface system might also suggest refinements to the rules, to automatically cover "patches" where the user currently controls interactions. For example, some rules may be based upon a certain confidence threshold, which the system suggests or refines. The user may accept or adjust the threshold as desired. S/he may wish to provide settings as to which types of autonomous actions the user wishes to authorize updates to (based upon his/her own behavior or as a default users who are very similar) and the user wishes to authorize the recommended action, or allow the system to fully automate the activation of the recommended actions (or do so only if the confidence threshold is above a certain level). Or for example bypass user authorization of a recommended action if it falls within a certain margin of confidence below the normal confidence threshold for activating full automation if the user is performing another important task, e.g., in a meeting, engaged in an important phone conversation 13.2.2.1 Resolution Credentials Resolution credentials from third parties can play an important role in agent-agent interactions. We can prove the absence of a quality attribute or behavior (which is often of a negative nature) relating to an individual and is submitted by a third party and typically must be issued on a periodic basis in order to maintain currency. A few simple examples of resolution credentials which may be of interest to users (credentials which users may commonly request as a precondition to requesting or accepting requests to be introduced or initiate communication with an outside unknown third party) include:
1) For business associations: are in good business standing, e.g., have not attempted to defraud other users in the course of common business practices. Or maintain sufficient funds in one's account to perform business activities (as represented by the user).
2) For business interactions or social interactions: are in good standing with the law.
3) For social interactions: have not been accused by other individuals of inappropriate or antisocial behavior.

Some standard credentials which may be of interest to many users, and which may (as with resolution credentials) be incorporated with the standard settings of the user's data request policy as herein described. A few examples are cited (among countless potential others): profession, awards, honors, alma mater, e.g., Harvard graduate, doctorate degree, etc. In accordance with the parent issued U.S. Pat. No. 5,754,938, various credential issuers are provided for issuing standard and resolution credentials to individuals. Thus certain entities may be entrusted with "legitimate authority" to validate and submit credentials which are issued to the appropriate individuals. If a resolution credential is not issued (or not renewed) an adjudicating third party is provided which has access rights to both of the parties is provided to resolve resulting disputes (from the subject user). The present invention describes how credentials can be issued to users pseudonymously.

There are a variety of rules which a user's data disclosure policy and data request policy may contain, to control what if any attributes are released, and what credentials are required. A data request policy may state a rule for explicitly notifying the user if a particular resolution credential (e.g., indicative of a serious problem or concern) cannot be presented in response to the user's disclosure request. We allow initial information exchange to be anonymous, such that information that is released as preconditions for release of further information is not useful. Similarly, so long as initial encounters are anonymous there is no need to withhold information about them from the user.

Some users may not wish to disclose specific information about themselves via these standard credentials but instead certain "extracted" more general information may be provided about themselves. For example, instead of a "Harvard grad or Ph.D." there may be, for example, credentials indicating "intellectual" or "prominent intellectual". Or instead of indicating an individual's wealth or value of assets, the credential may indicate "wealthy" or "very wealthy" (typically, depending upon user's wishes this latter credential should also be withheld during initial introductions or subject to some fairly stringent conditional criteria from the other party) and instead replaced with an even more general credential e.g., "prominent" or "influential citizen"). Similarly, an individual's exact profession or scope of work may not be fully disclosed initially but rather a more general definition of his/her profession or perhaps the general field initially in which the user works or his/her particular views on certain social or political issues may instead be substituted with (for example) "socially conscious", "philanthropic", or "moderately liberal".

Another example of a credential of potential interest may include the profiles of users which a certain individual associates with or is acquainted with. The ability of a third party to gain access to this information, however, is conditional upon the data release policy of that associate's or acquaintance's data (e.g. it could be affected by what is the profile of the common acquaintance to whom that user would be disclosed as an associate as well as, importantly, the profile of the prospective disclose.) In one variation, the system may simply identify the fact that there are common associates and acquaintances between the two individuals. Again that associate's or acquaintance's data release policy may further control even detection of this fact. It may instead also notify one of the parties of this fact, but request that it not be disclosed to the other party.

In accordance with the parent patent application, rules may be learned regarding certain things that a user does (as in ascribing these rules for which messages to send to whom or what user profiles and under what circumstances/events surrounding the target user). Thus, his/her agent may begin to suggest certain future actions which could be performed in the future upon user approval or even automatically. If the user has had no previous interaction at all with the system, it may identify which other users of the system the present user is most similar, and recommend initial rules. Additional textual attributes can also be leveraged to provide extra criteria, and data mining techniques used to generate more appropriate rules.

Another category of user credentials include features that may be inferred implicitly by location/time data captured by LEIA. Such information may reveal a user's likely behavior and activities. These inferences, however, are unavoidably somewhat speculative and inconclusive, thus cannot be substantiated on a valid basis for issuing credentials. The data may be useful in suggesting the present context and circumstances surrounding a user.

Additionally, the communications which the user may be presently involved in i.e., the content profile of his/her spoken dialogue and/or other "on line communications" may be used and combined with location/time patterns in order to further infer the circumstances, behavior, and present temporal interest of a user and/or third party for purposes of employing the user's data disclosure and data request policies.

Credentials can allow users to identify other users that may pose a threat. This identification may be provided vis-a-vie resolution credentials and/or rating (by third parties). e.g. a user has not engaged in any serious criminal activity, physically harmed another person, or interacted with other individuals who are unable to produce these resolution credentials. Other credentials may specify the nature of an infringement, and its context and severity (e.g. what was the context of a physical assault? Was it performed during a bar brawl, against a friend, a boss, an elderly person, a child, a family member—or at work? In this case, the user agent may, for example, bring to the attention of a prospective employer that the user could not present a credential indicating that they had not previously harmed or threatened a former employer. Was it minor or severe? Also, if such individuals (lacking, for example, resolution credential proving the absence of having committed armed robbery) are (or come) within a certain proximity of a user, the user may wish to program his/her user agent to notify the user. The same would, of course, apply to a store clerk regarding customers of this sort or to baggage security personnel at an airport. Or, highway patrollers may be interested (e.g., on certain stretches of highway) in being made aware of vehicles and their locations whose agents are unable to provide a resolution credential proving the absence of a drug conviction.

In another application (in accordance with the auto insurance risk determination methods described in co-pending patent application entitled "Applications for Location Enhanced Information Architecture" [U.S. patent application Ser. No. 09/314,321]), an on-board computing device within a user's automobile could identify another automobile lacking, for example, a resolution credential for safe driving. i.e. the on-board user agent continuously polls agents in other cars for a "safe driving" credential, and if it fails to receive such a credential it issues a warning to the user. As an extension, this location data could be converted into a dynamic 2-D rendering upon the user's windshield (using heads up display technology) in order to thus superimpose a persistent flagging or highlighting of that particular automobile from the driver's visual perspective. Pedestrians or low enforcement officials (for example) could also receive instant notification. As is described in LEIA, a roaming cellular connection, or GPS, is not essential for providing a user identifier. For example, optically-based biometric identification techniques such as iris scanning or combined iris/facial identification techniques may be used among other potential inputs as well. Users will be reluctant to release location/time data, even anonymously, when suspicious behavior can be inferred—probably subjectively.

In the case of suspicious behavior we can provide access to law enforcement officials, through seizure of the decryption key for that data (which includes his/her physical location information) and any additional profile data which is considered of immediate critical relevance to the suspect (or prospective) infraction. Such cryptographic techniques for key seizure from a key escrow are well covered in the literature. There may also be certain circumstances in which key seizure may be required after the fact (at some time in the future). For example, if/when certain even moderately "suspicious" behavior patterns are detected, it may be possible for the SDI data warehouse to preserve a comprehensive record of that information (and perhaps the record of that user which precedes and follows that period of interest). Thus preserving evidence which may later prove useful in contributing evidence towards a conviction, acquittal, e.g., proving that a user was not at a particular location/time. A record containing more detailed segments of a user with a proven negative or questionable history may be preserved and general location/time features may be abstracted for the remaining portions of the record (thus compressing the record substantially). This may be performed for regular individuals as well, thus retaining key relevant features while discarding the majority of the record which is irrelevant or redundant.

Within a location enhanced context, unless the prescribed range of "proximity" to the user is quite large, securely protecting the user's identity from malicious third party collusion (for purposes of combining unique pseudonyms and/or exchanging data that has been released and entrusted to them) is a harder problem. The system could (most obviously) assume data exchange between the parties will occur and limit the combined disclosure to only that of the most data restricted user in a given location/time domain. The system could alternatively, perhaps "space apart" the number of users within a given location/time context who can access more "restricted" user data (of course the problem goes away if all the discloses have similar disclosure restrictions by that user). The use of resolution credentials within the context of a location enhanced (physical) environment will be hard to implement practically until there are powerful and miniature mobile devices. Automobiles may be an exception, as may be technology which enforces the disclosure of the physical presence of a user agent (resident in a device) to other user agents within the networked environment.

Continuation of the Addition to Autonomous Information Disclosure to Third Parties The above description suggests the use of a statistical model which can take implicit passive data about the complete set of variables surrounding a particular instance in order to determine whether, and if so, what particular data the user is most likely to wish to disclose, such as the identity of the individual, the profile of the individual (e.g., what other users s/he is most similar to that have also interacted with the user), the time, location, inferred activities and content based attention focus (which may utilize the above variables in addition to passive monitoring of spoken content and facts surrounding conversations). A few concrete examples may be worthwhile suggesting. The system, for example, determines that a physical introduction between two individuals may be of potential interest to them and compatible with their schedules. In fact, they are able to briefly connect (perhaps pseudonymously initially). Mr. A suggests to Mr. B that a lunch meeting may be a potential interest (assume that at least one of their calendering agents does not have them committed to a fixed schedule prior to lunch time and one of these individuals is Mr. B). Mr. B replies also indicating a potential interest, however, that he has recently dropped in at a friend's house and wishes to stay at least 20 minutes longer. Based upon the schedule of Mr. A, SDI receives data from the navigational agents of Mr. A and Mr. B which take into account the distances, drive time (based upon the preferred routes, the average speeds which Mr. A and Mr. B tend to travel for similar types of interests, and the café or restaurant which is closest to the point at which they rather are likely to cross. Mr. B, may state the constraint to his agent, i.e., the 20 minute minimum period prior to departure. Or the agent may interpret the accurate interpretation of this fact from his/her conversation with Mr. A. Or if the meaning or the words are unclear, it could even automatically reiterate its interpretation. The system may tell user Mr. B that in order to meet up with Mr. A (based on Mr. A's schedule) he must leave his friend's house in 10 minutes and forego the regular stop at the convenience store. Mr. C may be another potentially interesting individual for lunch, however, Mr. B's agent doesn't know all of the facts about how Mr. B may be willing to conform his schedule to meet Mr. C with regards to changing or rearranging a certain portion of his schedule, and/or replacing this portion of the schedule with another activity or engagement (an original activity which may now be in conflict due to the drive home and physical direction to visit Mr. C. Mr. B's agent thus identifies and conveys to Mr. B the salient changes to his schedule and the travel route within this possible alternative plan to meet Mr. C instead. Thus before Mr. A commits to Mr. B about lunch he has details about all of his feasible options for a lunch engagement. Mr. B may even state to his agent that that stop at the convenience store is a relatively fixed constraint (that it is important) and given that constraint what are the available options for a lunch meeting as such.

Note (as suggested) that at any time the system identifies within a certain probability threshold for that user that there may be a certain engagement (or other activity) which could be scheduled (or replace another schedule activity) the system:

1). Determines the predicted interest-level of that potential engagement or activity (or if it may involve replacing more than one activity/engagement, determine that the predicted interest of the combination thereof and/or it may enable other activities/engagements to be scheduled which may be replacements for others (estimate the predicted interest of the activities/engagements collectively comparing one scenario to the other). There may be other factors affecting user interest in one scenario versus the other, e.g. the distance or travel time with which it is associated. The system may also be uncertain regarding certain important determining variables, e.g. the profile of the user or even the present mood or activity or contents focus is not adequately determined, or the nature of the proposed activity or engagement is not sufficiently constructed (or robust) within the user's profile. In such cases, the user's agent can also ask the user direct questions in this regard using a national language speech interface and (ideally) at the opportune moments in which the determination of certain facts as these within the user's present user profile would provide the ability to identify or dismiss for the user certain opportunities as they occur.

In light of the present context of the situation and potential opportunities, the questions may be selectively presented in order of priority and are typically related to the attributes characterizing present opportunities/individuals which are either of predicted interest or of unknown predicted interest/relevance but may possibly also include potentially predicted relevant questions about the present frame of mind of the user, such as what the user's present activities are (i.e., including work, leisure, etc.) mood, present focus on what kind(s) of content, etc.

In the above example, of course, Mr. A and Mr. B could instead be established friends or colleagues in which case keeping secret their present physical locations may be considerably less important but not necessarily so. Revealing informational details about location, action, attention focus to another third party while completely leveraging this information to provide optimal scheduling efficiency is all possible with SDI and many individuals may wish to not disclose it in this way (as a default) even if the disclosees are relatively trustworthy.

Complete robust functionality coupled with complete user privacy as provided above through the user's agent provides a compelling motivation for users to maintain much of the information, regarding their present and general location and activity related data, private in the majority of cases of user interaction and associated schedule coordination. If Mr. B were to pose different relevant queries to Mr. A's agent while determining whether he could be interested in meeting, for example, where/when their paths may cross based upon different times and/or points of departure, the specific location and travel information regarding Mr. A. may still be fuzzed as the meeting time at the associated place of rendezvous does not disclose to the other party when the other will arrive, only that time when both will be there at the same time (for those rare cases where even this information may disclose likely specific location and intended time of departure, we can apply randomization techniques in order to assure privacy with relatively minor negative impact upon scheduling efficiency. Nevertheless, how much privacy versus efficiency is desired is entirely within the control of the user.

In another application of the system, the individual may wish to allow another user (or entity) to be able to arrive at certain levels of deductions or conclusions about the user which may concern them without explicitly revealing any facts or details used to arrive at those conclusions. Or in a variation, even allow a continuous persistent revelation of information regarding these certain conclusions such that if a certain conclusion(s) occurs (or ceases to occur) notify the requester of such facts. A statistics and/or manual rules-based approach could be used in this instance. A statistical interface provided to SDIs central data warehouse could enable an expert to establish correlations and confidence thresholds appropriate for deducing certain conclusions. For more novel or complex rules which haven't been seen before SDI could receive disclosure from users regarding their actions and a request as to desired types of conclusions. The industry could further trigger an anonymous action (and/or notification) on behalf of the user or depending on the privacy policy (consent of the other party) an action could even be triggered based upon such conclusion in the absence of disclosure of the conclusion and/or even the autonomous action taken.

E.G. notify the subject user of interest in message (or suggestion or warning) another relevant, noting third party, etc. In such cases, it may however be acceptable for the user to be able to receive fuzzed aggregate statistics regarding such data as a user's past behavior patterns (or more confidentially) other users who share similarities to the user regarding his/her user profile and/or perhaps context of similar activities and circumstances. User profile could be more general characteristics of the user than the detailed user profile as suggested herein, e.g., the user's corporate department peers, class, demographics, psychographics, travel venue or combination thereof. This process may be performed in either a pull or even push mode. Many associated applications are conceivable, for example, a spouse (the requester) may desire to have his/her agent persistently issued a resolution credential indicating that all of the activities of the user while on a business trip are consistent with behavior which is appropriate for a married individual, e.g., that the associations with business associates/colleagues are maintained at a professional level (per that mutual physical locations and perhaps even directly or transmitted spoken or written communications) or that user doesn't engage in late night carousing at questionable venues, or, for example, that the individual on his way to work, to a meeting worked diligently on an important proposal or on his/her way home from work without revealing any further details which his/her agent has explicit knowledge of with which it deduces these facts with confidence. Another example might involve the use of LEIA via small cellular transmitters (with or without GPS) affixed to small children or the elderly whereby location and activity related information is maintained private, unless an inappropriate action is performed (e.g., motion and/or acoustic detectors in the elderly person's home suggest s/he may have fallen, that the child has wandered away from parents or is conversing with an inappropriate stranger. In such cases, notify the guardian or assistant in charge or allow a highly trusted party who happens to be in the immediate vicinity of the party to be notified to come to his/her aid. In the latter case (of the child) perhaps there is suspicion that the child has just disappeared and the parent(s) authorizing the agent of the child is able to send out an immediate description of the child to all certified "trustworthy" parties who are in the immediate vicinity, e.g., after the initial description has been sent out, one of the parties indicates the child was speaking or walking with an apparent stranger of X description which is also, in turn, transmitted to these trusted local parties (and at that point to the police). In a variation of the above example, a crime could have just been committed and the assailant has just been described in detail by the victims with information regarding location and direction last headed which is again transmitted to other parties:

Thus, more immediate, complete and up to date information of importance for police to make a more immediate apprehension of the suspect is made available to police.

Location determination via LEIA could be either through user's LEIA-enabled devices or the coordinates of the user(s) as identified verbally by the user, e.g., to a 911 server. Other examples of the present system could apply to immediately locating trained medical, EMS trained or rescue personnel in proximity of a urgent medical emergency or accident Such personnel could even be off-duty. Depending upon the particular nature of a medical emergency, particular specialists appropriate to the circumstances could be identified, their comparative physical proximities compared with other potential qualified individuals and based upon qualification appropriateness, physical distance and perhaps willingness, a most appropriate match made. In another application, likely witnesses to an accident (including automobile accident), theft abduction based upon their location and time relation to the event of interest could be notified to provide helpful clues in assisting investigators in obtaining a suspect or legal professionals a conviction or acquittal. In the case of abductions timing in acquisition of such information could be extremely critical and the ability of such notification to be distributed instantly to all "trusted" individuals in the immediate vicinity at the very outset of when a person (e.g., child) is even suspected of being lost could prove to be invaluable in not only rapid recovery but also in thwarting of those few instances in which a kidnapping has actually occurred. Some users may wish to be available and willingly notified to help in certain dire circumstances (the nature of which the user ultimately has control over) but may wish to remain anonymous to authorities and legal professional after the fact (or for example in cases of providing witness testimony (as via a subpoena) to more trivial or non-life threatening cases. A market model may also be created in which compensation schemes which are just appropriate to compel typical individuals to provide desired assistance may be provided. Finally, the present methodology could be readily extended to a taxi dispatching service in which a taxi's most local to a given user can be dispatched accordingly. Another example includes employees within a large organization. The statistical techniques as described in the parent patent application could be trained such that examples can be identified or explicitly stated rules provided by employers of what is considered to be actions and behaviors which are inappropriate and irrelevant to the type of work related activities of that employee's job description (ideally trained across previous "similar" employees). The system can take into account browsing, communications, (including spoken communications), even location (LEIA) data into the model (e.g., for tele-commuters) and flag suspicious behavior. SDI can even upon agreement by the employee) allow the employer to access more detailed information on the specific behavior once the suspicion threshold has been exceeded.

In another application, the user may wish to provide predefined rule (which could be suggested by the system initially in (similar fashions as suggested above).s which can be used to notify a certain individual(s) if certain explicit (or agent) inferred events occur, for example, that the user is in town, has just received certain important news of a promotion or change to a new position, internal company news which relates to that individual and may have professional relevance on the other individual (the latter two examples which may be relevant to say the professional profile of that individual, etc.). In addition, the individual(s) may be made aware of the event disclosure policies set forth by the user relating to them specifically (if desired) and this individual(s) can further provide filtering rules which allow all or a portion of that information to actually reach the user. In another example, the user may have met or known the individual at some time previously and the venue and context of the meeting circumstances and relevant user profile information to that context are known and disclosed by both parties. The user then wishes to re-establish contact perhaps defining the reason for the request and the individual can have predefined rules or acceptance or rejection of the request directly.

In a final example, virtual tags are provided containing comments and annotations regarding a certain physical object (which could be anything from a tourist attraction to the physical site of a recent hot news event to a useful annotation critiquing a bricks and mortar vendor). An individual whose profile suggests s/he is knowledgeable (or had provided the relevant annotation of interest) about that object would allow this relevant information to be conveyed to other individuals who have perhaps an interest in that information (generally or at that moment).

The relevant individual (if s/he is also willing) may be contacted and solicited to meet if their calendaring agents can appropriately coordinate the meeting. It may be either context specific, e.g., both individuals are physically local (or plan to be local to each other) and the physical object or site of interest or simply (generally) local to each other.

It is perhaps worthy to note that the present methodology could certainly be extended to include the application to rules dictating reachability conditions of users by other users via standard telephone. The application to cellular telephony is of particular interest in its ability to communicate to the user in a variety of modalities (voice, notification, instant messaging, Web content). In addition, similar rules may be adapted in this scenario with perhaps minor modifications. For example, under what conditions may the user be reached by another user. E.g., what is the nature of the relationship between those individuals? If it is not known, inferences from the context of previous conversations may be determined. Does the user typically accept calls (or other communications) from the other user under similar circumstances and/or times. If this data is not available are they accepted by other users similar to that user according to a key attribute(s) or does the other user accept communications from the user under similar circumstances as they present communication attempt (as this may suggest similar reciprocal acceptable reachability conditions as that of the other user. Again, LEIA suggesting location movements and associated measurable behaviors as sequential patterns and as formation of time may be important. This detailed statistical model of the user could be useful in learning the context of performing certain autonomous actions for the benefit and convenience of the user and in the reachability of the user by other users, e.g., in what communications mode is the user interested in communicating, e.g., speech to text-based instant messaging or standard telephony, does the user mind being interrupted with phone ringers, (or vibration mode) or ringer-off mode). Previous similar communications contexts may be useful in determining inferred rules which may be presently appropriate (e.g., was the spoken content of the previous communication indicative of acceptance or annoyance of the communication with the other user within a similar associated context. Eg., this may suggest whether and in what contextual conditions of both accessor and accessee the accessor's call may be patched through (or re-forwarded if initially accessing another number or telephone of another likely venue where the user may be believed to be present.

Exemplifications of The Underlying Statistical and Rule-Based Intelligence Used in Autonomous and Semi-Autonomous Release of Personal Data Release, Matching and Reachability by Other Users The above section "Location Enhanced SDI System relating to Smart Home and Office techniques provides a relevant platform for integrating intelligence into a multi-device environment. Mobile user intelligence is a sub-component of this broader multi-device (or "ubiquitous computing") application-level intelligence platform. In view of the present application framework, it is a very intriguing and challenging problem to provide a statistical framework which is able to allow the user agent to make appropriate inferences regarding users who generally, though imprecisely, fit a certain profile which may suggest the activation of a rule (i.e., a "fuzzy rule") such as requesting further information disclosure from that user, identifying that individual to the present user or more sensitive types of actions such as if the requested information from the other user requires some sort of a fee or the other user, in turn, requests certain information disclosure from the current user (which may be considered at least moderately sensitive). It is clearly extremely advantageous to entirely automate as many of these types of information exchange and notification related actions as possible in order to enable the system to function seamlessly and intuitively to the user's present wants and needs. In a general sense, it is reasonable to suggest that the key to minimizing active user approval of rule based recommendations is the ability to accurately infer present user actions and behavior, thus allowing the system to more accurately infer the present user mind set, activity related focus, perhaps even the mood which the user is presently experiencing unless the nature of the disclosure is extremely sensitive or otherwise extremely important to the user. Many of these types of actions could be performed without active user approval and authorization. There are a couple of approaches which can be applied which may be able to limit the uncertainly of the system, possibly alleviating before hand, inappropriate or unwanted actions or failure to perform certain desired actions. For example, it might be possible to perform data analysis on very large data sets of users who share very similar profiles and to perform very similar actions and behaviors in all aspects of their physical interactions with the real world. The recommended actions provided by the system may also be used to provide the user with a natural language interface which identifies to the user those types of circumstances and conditions in which there is an inherent lack of adequate statistics from previous user experience to prove beyond a reasonable level of confidence the action desired by the user. Or the system is unable to identify with a high statistical confidence level a most appropriate action based on the collective statistics of other similar users and conditions (the system may helpfully suggest those which are possibly the most prevalent. However, in other cases the actions (or combinations thereof) of the user are unique enough that the system lacks sufficient statistical data, the likely appropriate actions are sharply divided between or among different possible actions or (similarly) there are no strong statistical correlations which can be established (perhaps because the key factors with which the desired actions are most influenced cannot be captured due to the limited input constraints to the present system, e.g., precise accounting of present activities or focus (even such things as the likely emotions or present attention focus of the individual for which there may be a lack of sufficient measurable clues visa-vie the suggested input modalities. The natural language interface (perhaps an application for a language generation system) could communicate to the user its interpretation of his/her behavior and the statistical correlations with recommended autonomous actions. E.g., if the user is in his/her home study between 9-11 PM, she/he is likely to be engaged in work relative to a research publication thus an invitation to other colleagues in this area will be extended and/or communication requests accepted.to contact the user accordingly under these conditions. The system may detect similar conditions in which the user may reject requests to correspond by such individuals under these conditions, e.g., if the identity or identified context (or even context inferred from the identity) is inappropriate for that particular context of user activity. The user may provide another annotation to the rule which says that if she/he has recently corresponded with another individual(s) at that time/location, chances are that she/he is, in fact, in a social related mind set. As indicated, there are numerous potential inputs to the system, which could be considered in predicting what agent-mediated actions are, in fact, appropriate. The techniques of the parent patent application, if applied in this context, would allow us to make strong inferences about the particular mind set, reflecting present interests or preferences which the user is likely to be receptive to, presently based upon such clues as who the user is presently interacting with, the content profiles of the present real-time dialogues, e.g, typed or spoken through a communications network, (or simply passively collected off-line), the object profile of documents or web pages being interacted with. Activities may further be inferred by such indicators such as the particular physical location of the user, visa-vie LEIA, the particular sequence of location specific movement patterns, the particular types of devices with which the user is interacting) (and perhaps the nature and/or sequence of those interactions). More complex rules are certainly also conceivable, such, as the user will not interact, transact except under certain specific conditions, such as a commercial opportunity if the user fits a certain stereotype, i.e., similar to those previously interacted with for the nature or content of the proposed discussion, in light of the type of user, may be acceptable under certain circumstances, locations or mind sets experienced by the user. E.g., a young female in her twenties may not wish to be approached by 40 year old males unless the context of the interaction were purely business, e.g., a professional, or commercial or sales opportunity thus if she were in a purely social mindset such requests to interact would be denied. Likewise a busy executive in his/her 30's may deny such requests from the young female unless her request was purely of a social nature and he was not overly time constrained. There may be certain "professionally" prospective correspondents, however, which he may prefer over others based upon some additional interesting criteria as well such as other business/professional areas of commonality, common interest areas, even socially compatible or interest criteria.

Of course, SDI is able to extrapolate extremely sensitive features regarding interest preference and context which may establish a basis where two individuals or more individuals, to be mutually identified to one another and/or communicate accordingly or to not be mutually identified and/or accordingly communicate (SDI may even establish the basis for these mutually beneficial interactions even if revelation of this basis by one or more parties by the other is not permitted within the privacy policy of one or both of the parties). Of course, SDI may frequently identify individuals whose personal data revelation requires certain minimal requested personal data from the other party as a condition to such revelation (which SDI is capable of fully automating on behalf of both parties) or the user may request certain information and make a personal judgment in real time as to whether further information about him/herself should be revealed and/or whether introduction or communication is desirable. In these cases it may be difficult to always successfully achieve an introduction when appropriate as the user is unable to guarantee a). The revelation of certain information to the other use if that user reveals certain information accordingly, or b). Is willing to agree to be introduced if certain desired information is revealed by the other party (often busy executives have absolutely no time to disrupt their busy schedules to discuss certain opportunities when there is enough revealed about those opportunities to justify the correspondence. However, the nature of the opportunity is too sensitive a piece of information for the disclosing party to be able to reveal without certain guarantees that there is sufficient interest for the recipient to discuss the potential opportunity further. This quandry unquestionably poses a huge challenge, however, it can be somewhat overcome by:

a). SDI's ability to keep track of most, if not all activities, behaviors and correspondences, particularly acceptance or rejection of those SDI pre-qualified recommended interactions, b). Detailed information provided by the individual or entity to SDI as to the nature of the various types of individuals, entities and potential opportunities to conduct business which the individual is able to provide to SDI. SDI itself may apply human experts for the task of interpreting the compatibility of certain requests with the access correspondence policy of the individual, provide a rules based system (which can also learn with fuzzy rules) with which to automate some of the decision or, at least automate the "definitive" exclusions).

13.2.2.2 Applications

User and seller information—as detailed in the parent issued patent, specific details of what users and sellers may be looking to buy or sell respectively may be used to suggest the basis for a potential commercial transaction. The transaction may be large (but not necessarily so, e.g., real-estate, private investment in a small business or public stock). If a physical or on-line interaction with the other party is warranted (e.g., for larger commercial transactions), as is suggested later as in the present description, users may identify other users which form the most relevant "match" with their interest. At this point the agents can check for credentials, and then either communicate or calendar a meeting. Similarly, the agents may find the "best" match of users who happened to be physically proximal to the user at that particular time, or at some future time(s)/location(s) which is mutually compatible (similar applications are suggested for matching sales persons with prospective clients, identifying experts to work (individually or collaboratively) on a particular project or problem, to answer a question of an appropriate specialized nature to their area of expert knowledge.) The parent issued patent suggests at a general level these commercial applications. An additional feature described therein involves the use of a decision tree called "Rapid profiling" which can be used in the present context to identify from the most common needs of users and "goods" of sellers in general and the known profile data about each user and seller individually, a list of questions for each party which most briefly and efficiently determines the complete user/seller profile of each party individually.

Social Interests Profile Information—The parent issued patent also suggests the present application at a general level. For a dating application, users may be matched on the basis of their common interests/preferences and perhaps on the basis of certain information reflecting personality, social or cultural behavior/affinities or psychological attributes. On the other hand, for purposes of meeting casual acquaintances, users may be interested in another user who shares the above characteristics as well as someone who has recently shared similar experiences and/or personal challenges.

Professional Information/Qualifications—As in the application of matching users and sellers, a description of a user's needs or situation with relation to various professional services may be provided as additional data about the user. Examples may include: (as above) medical data, professional or business history (as well as legal history) which may be of interest to law firms, accounting firms or various business consultants. Personal, family or emotional difficulties may be of interest to psychologists or family counselors. Again, users may submit this information as a query for prospective matches, or they may be pseudonymous queries or automatically matched in accordance with criteria specified by the professional. The issued parent patent application also lists additional applications, which could as well be relevant within the usage context of virtual tags.

Employer/Employee Information—An employer may post a description as part of his/her virtual tag (and that associated with his/her company). His/her employees may also have provided ratings and/or annotations, which are further descriptive of his/her personality, leadership/management style and skills, work environment which s/he promotes and overall quality. A previous employee may allow him/herself to be contacted by the prospective candidate (e.g., in exchange for a fee).

Access Privileges Information—Users in an organization are frequently given privileged access to certain files within a corporate intranet but not others. Though there are many ways of profiling users according to their level of access privileges to information, the following example is considered: Based upon the position (e.g., responsibilities and tenure with the organization), users may be "classified" into groups according to different levels of access to confidential information. Virtual tags may be used to extend the capability by providing for immediate disclosure of a user's information access privileges to another employee in real-time and in a physical context. Also, if a user reads or accesses certain information, meets with a certain colleague or friend, then a user might send a message X. This message could be (for e.g.) a request to perform some task relating to part of that information, a reminder to address certain issue(s) while chatting with the colleague etc. or, per the request of an individual's employer or colleague if a given individual (a sales person) meets with user X send him/her message Y (which may refer to a previous encounter, experience or fact s/he should know pertaining to user X and which may have bearing upon their conversation or professional interaction.

Access restricted physical areas. In this case the virtual tag effectively may behave like an "electronic door key". A variation of the technique may be used for granting access to professional meetings, where information access privileges of users must match the anticipated confidentiality parameters for the scheduled meeting. Another application may include the ability to automatically enable access or restrict access, based on payment of fees, and whether or not an individual is a representative or partner of a competing company.

13.2.2.3 Business Introduction System

Another application domain for privacy-protected matchmaking, where users are anonymous until an agreement is struck is business to business introductions. For example, it might be useful to automatically identify synergies between businesses (e.g. in infrastructure, technology, or product)—for the purposes of pursuing an advantageous strategic relationship. If the meeting is between two employees of competing companies, then the system of match making could also ensure that a meeting is predicated on a particular task that does not cause conflicts with their respective companies.

Each business might state within SDI: 1) what entities or types of entities s/he would share resources with. 2) If so, on a per-entity or per-entity type basis, what types of their resources (e.g. type of skilled employee and for what TYPE of out-sourced task) would the entity share. It is an obvious extension to look at sharing of code, technology, intellectual property. A major challenge and limiting factor being how well informed SDI, the neutral intermediary can be made aware of the needs/requirements of a company such that it can make evaluations entirely on its own regarding highly confidential materials with which it can accurately predict the basis for a deal WITHOUT disclosing to the prospective recipient what the technology or know-how entails (which could compromise the value of that asset should a deal not eventuate).

Corporations may also use SDI to utilize the above information regarding their human and technology sharing synergies in order to detect and recommend strategic (e.g. equity sharing, merger, acquisition etc.) relationship opportunities between the entities. B to b and even b to c user centric SDI user behavior analysis combined with text analysis should also provide revealing clues about what types of companies tend to share similar customers and provide similar (complementary or competitive) products and services which may suggest that such synergies are potentially available. Of course the vendor centric SDI service may benefit from this information as well as provide information for other vendor identification of competition. Other data resources including electric payment protocols, EDI, automatic check payment, check services, etc. may be useful data resources as well.

Again the disclosure of detailed business information is very helpful and a data release policy defining the parameters for such strategic initiatives may be critical in order to determine what companies may be potential candidates for which initial feelers (of high level information disclosure) would be appropriate to put out to a prospective company to determine mutual interest and/or further basis for expected synergies.

13.2.2.4 Dynamic Annotation/Information Filtering

In this extended application of SDI, we allow users and other third parties to annotate objects (physical and virtual) with meta-information, either to remind themselves about a previous interaction in the future—or as a system of "knowledge learning", where systems of users leave useful information for other users. Information is left in the environment, leaving a trail for other users.

For example, the information that is tagged to an object, referred to as a "virtual tag", can contain a pointer to other relevant information, such as a survey of a film by a third party, or the user's own comments/feedback. For example, a restaurant listing could be annotated with meta-information about the quality of the food and service. Such information, when provided by a wide sample of users, can provide robust information about objects. The information that is used by a particular user can be filtered—for example, weighting the opinion of a respected restaurant critic, or weighting the opinion of users with common profiles (when that information is available).

Virtual tags (i.e. meta-information) can be assigned to objects with physical locations, and the information triggered based on the physical location of a user (using LEIA technology). Virtual tags can be assigned with expiration dates or other time-sensitive information. An individual user might leave an "action item", for example—next time I return to this object (e.g. web page/vendor) be sure to perform this task, enter this query, check this link for new information. As another example, after a conversation with an SDI-enabled user it is possible to tag that user with some notes, to remember the conversation the next time the two users meet.

The technical innovation that allows this use of virtual tags, in addition to the protection of privacy, is that we allow users to annotate information to objects that they do not directly own through a system that separates virtual tags from the content that is tagged. In particular, tags can be stored (either at the ISP-level proxy, or main SDI server) for associated web pages, and exchanged/retrieved automatically when the object is accessed. The virtual tags can be used in conjunction with target-object profiles that are generated through SDI for web pages (and approved by vendors). Virtual tags can be searched, using relevant terms, locations, or times, and can also contain links to authoritative information, such as audio and/or video.

For example, in accordance with the prediction that readily deployable visual video recording devices will become commonplace (even integrated into wearable computing hardware). Users who are amenable to releasing such information under terms of their privacy policy may allow other individuals subsequently visiting the same physical location physically or virtually to gain access to such information. Such information may range from detailed accounts, assessments of value, etc. A user could, for example, do a general query about locations e.g., what is the percentage breakdown of types by their pseudonymous attributes, who frequently visit this site which sites tend to have commentary of a particular topical nature of interest to user U, which sites are visited frequently by individuals similar to user U, which sites have had an event of a particular type or one which is similar to user U's user profile occur in the recent past (or where or how close did such event occur with respect to the recent location of user U and so forth).

Tags are encrypted, so that only SDI-enabled users can access them. Tags are also associated with the pseudonymous ID of the user that left the information (although they can be anonymous, an associated profile allows more accurate collaborative filtering techniques). Finally, users can leave data-disclosure policies, embedded into tags—to certify the properties of other users necessary to release the information. When tags automatically are time-stamped with location, and time, and other information we allow for this information to be "fuzzed", as disclosed in the section on Randomized Aggregates, to protect a user's identity.

In the physical world, implementation of meta-information in a user's physical information, can be viewed via head-up displays, video cam monitors, wearable computing devices, or audio pieces. The information itself can be embedded directly on physical objects, for example on magnetic strips or via. visual encoding techniques—or the appropriate information can be accessed from a secure remote database based on the user's physical location (using LEIA location technology); or bar-codes that provide a universal identifier for an object.

As an extension to this model, we also allow users, vendors, and other third parties to associate "meta-information" with other users and vendors. This information might be a user's opinion about his/her interaction with another user, an annotation that relates to a particular web page, or information about a physical object. The system of SDI enhances the value of this information by providing a secure environment where users can report meta-information (i.e. opinions) along with their profile information, to permit collaborative filtering techniques to generate appropriate meta-information about an object (user, physical object, vendor, web page, etc.) that will be useful to a particular user—given that user's own profile. We define "virtual tags" as any piece of information about an object (physical or virtual). The information may be authored by any party, but annotated accordingly. For example, the appropriate virtual tag provided by a user about his/her-self is the pseudonymous profile for that user,—and with SDI only the user his/her-self can gain access to the profile (either directly through editing, or indirectly through continuing transactions).

We might implement a Kasbah-style "reputation system" within such a virtual community. Initially users (under pseudonyms) have no reputation, and their opinion does not count for much, but after every positive interaction (as defined by other parties in an interaction), the "reputation" of a user can increase. (see the Kasbah system, MIT) [Kasbah 98] This reputation system is appropriate to a pseudonymous environment. Notice that gaining negative reputations is not useful when users can simply change identities. In one variation we can "block" certain users from providing information, when those users have negative reputations. Clearly, collaborative filtering or other data mining techniques could usefully allow for reputations when weighting information about an object.

13.2.2.5 Meeting Planning

The general application framework of matching users based on mutually beneficial and acceptable terms and conditions within a physical context, e.g., be it e commerce (as above described) business or social objectives, it is also useful to develop a mode which considers the schedules of the calendaring agents of the individuals, as well a. s the timing and (if relevant) the meeting opportunities which would be based upon mutually compatible meeting venues which are mutually time compatible). A statistical model could be developed which would take the above data (where appropriate) the geographic proximities (considering lengths of travel routes between users may travel to attend a meeting) in order to determine:

a. How to minimize the travel distance for individuals whose automatically scheduled meetings are combined as part of an existing travel activity might be if the meeting was scheduled, in part because it was of relevant values to the party (and it was at least relatively close to the existing intended travel route).

b. It was sufficiently important to mandate a separate trip. The idea is to determine the optimal physical locations of individuals to physically reside, (i.e. for residents or even hotel lodging as well as possible the physical locations of business such that when the above user agents—agent introduction meeting and scheduling functionalities for physical meetings is performed for the amount of physical distance which must be traversed is optimally optimized. The statistical method used in this calculation would be similar to a scheduling optimization method used to schedule flights and associated routes to minimize the total distance traveled by all flight routes collectively (see Princeton publication using genetic computing techniques). Of course, the above approach would be used for a more immediately practical application in which the objective would be to simply reduce the amount of distance a user traveled for his/her daily activities and to tie this framework into an existing scheduling system which is appropriate for the user. It is possible to also further define the ultimate objective to be reducing the actual travel time which a user spends in a vehicle (thus the optimization algorithm would further factor in the effect of time delays due to highway congestion which would affect the ultimate ideal locations of these physical sites.

A couple of concrete examples includes for example a real estate developer who develops clusters of home building sites or town homes which reflects the profiles of users sharing common or compatible profiles (e.g., socially, professionally or commercially) or recommending hotel lodging sites for individuals who share similar commonalties and happen to be visiting the same location or city. It is also possible to physically locate vendors at locations in which their most preferred customer prospects are most commonly physically traveling past or are physically situated (using LEIA) even considering where these prospects are during periods in which their shopper interest (or mood) for those items/services are heightened (or more generally factoring in both location and temporal (mood) factors into the user profile data as it is herein applied for this purpose. Whether users or vendors (subject to user consent) share customer data, there are other potentially interesting and relevant applications, for example, based upon LEIA a user's calendar schedule perhaps even verbal clues, it may be possible to coordinate meeting between users and professionals who can provide a useful service e.g., if a specialty physician happens to be situated in the user's present or anticipated locality and the physician would be available for an appointment at that time and location. It is possible that ad hoc use of shared clinic space may be available for such ad hoc appointments.

13.2.2.6 Investment Matchmaking/Venture Capital

This section describes a market place in which start-ups can propose a venture or other financing needs in order to elicit an auction between different Venture Capital funds. We can allow potential investors to leverage securely confidential information regarding the details of business present and anticipated strategic alliances and customers. Each company securely registers all of this confidential business information SDI. It is even possible for confidential information about future R&D initiatives proprietary know how and intellectual property to be entrusted with SDI such that potential synergies may be determined well in advance of the market.

A domain expert(s) within SDI then determines potential synergy's between the various commercial entities both for purposes of facilitating introductions on a customer/vendor level, strategic partner level, as well as what particular financing sources which are compatible for the level of the financing needs and other characteristics of the financing such as terms, involvement on a control and/or management level (as well as compatible commercial technology venue in which they participate). The key objective is to identify as first priority the commercial entities and customers which can provide the greatest degree of benefit to the vendor then to, secondly, determine which entities within the VC/financing community are able to bring the most valuable of these contacts to the table.

An investor may fund a small start-up and also improve the value of the start-up by facilitating a larger vendor becoming a customer. An investor might negotiate a special deal for such a vendor. In one variation SDI could be used to mediate the introduction of optimally strategic investment opportunities to an investor and to identify strategic synergies among and between different commercial entities who are already funded by an investor(s). In this way it may be possible to introduce these investors and create joint participation with the new prospective investor.

By leveraging SDI, the investors may even identify certain intriguing facts such as that the synergies between one of their own customers and the other investor are also significant and/or even dis-synergies exist between their own investors and themselves which do not exist with other investors (e.g. and investment in a competitor or customer of a competitor) that it would be mutually advantageous for the investors to entrust SDI with the job of making appropriate introductions for re-distributing equity ownership of the investors into those other companies which are more appropriate from a strategic standpoint. The motivation behind agreeing to these introductions of course must be bona fide, serious and not initiated with the malicious intent to capture otherwise confidential information (particularly for those investors at higher level financing levels such as higher level VCs, investment bankers and more generally investors who tend to be more minimally involved in direct management or marketing initiatives for the company) it is certainly reasonable to imagine that some of these investors may wish to apply some of the above suggested techniques for finding (or even exchange equity opportunities within the commercial market partially for the purpose of diversifying their risk by thus owning smaller equity stakes in more companies and particularly those which are most commercially strategic and mutually synergistic in nature.

The powerful data collections of SDI regarding comprehensive commercial/investment data which of relevance to predicting the nature of an market dynamics of the associated commercial entities, and to build insurance for an investor. The primary objective is to identify investments which are predicted (using a variety of methods both human intuition and empirically based) to behave very similarly (including e.g. possessing a very similar, upside and risk potential). A secondary objective (unlike the above variation) is to then evaluate and actually identify competing companies to the one(s) the investment in which is being insured where it is believed that the success of the competitor(s) would have a negative impact on that of the company. Thus risk is effectively diversified among the overall success of those companies. The insurance could include a deductible and premiums which are determined in accordance with the amount of coverage which the investor wishes to acquire. These premiums could be either paid in the form of cash or equity. In one variation "success" for insurance purposed could be measured as the success relative to the average of all of the others within the same similar group.

13.2.2.7 Ideas Market

Individuals can submit an idea to SDI along with the application framework, target market, or a list of vendors, which may most benefit as a result. Interested parties can then bid within SDI for the ideas. The system of SDI can operate the auction privately, and only provide bidders with a limited amount of information about the idea. The problem is to automatically appraise the value of an idea for a particular vendor without providing the vendor with the idea, so that when the auction is over only the agent that wins actually learns detailed information about the idea. The price paid may include an up-front price and promises of long-term royalties or equity, etc.

The privacy-secured ideas market is useful, because traditional negotiation processes fail: there is always a powerful motivation on the part of a commercial entity to steal the idea and leaving the originator with no compensation, consideration or acknowledgement. With SDI an individual with an idea is able to place an idea in the marketplace, so that commercial vendors can provide SDI with information regarding their business, to allow SDI to value the idea autonomously on behalf of the vendor; i.e. on the basis of current and future commercial research initiatives. SDI computes the estimated requirements and economic value that any given submitted idea would have towards that vendor.

Human experts may play a role in evaluating the value of an idea to a vendor. In a busy idea market there is the need for a scheme by which ideas are automatically routed to the most appropriate individual experts to evaluate that idea, which is either within SDI or within the organization which most likely needs the idea. This routing scheme could be based partially upon attributes associated with experts and features extracted from the description of an idea.

13.2.2.8 Negotiation Intermediation

Given the above general application framework for SDI in which commercial entities can securely entrust to SDI with their commercial marketing and technology related focus and objectives, it is a reasonable extension to further extend this data Rich framework to enable the above described exchange of confidential information among and between commercial entities to occur not merely in a purely general and non-dynamic fashion but to additionally incorporate timely information which may represent time sensitive and critical decision processes which are in the process of occurring at that particular time and which may be relevant to the mutual strategic discussions and negotiations between the entities. A very important application/example of this approach is the fact that commercial entities may be in the process of negotiation with another commercial entity regarding particular commercial or technology related opportunity very often (the majority of instances) the nature of these discussions and particularly the identity (identities) is maintained as strictly confidential information throughout the discourse of these negotiations. Though the following solution may not be appropriate for all cases of confidential discussions and negotiations there may be particular instances in which a knowledgeable "expert" within SDI could be confidentially kept apprised of the details of the negotiations as well as progress and any obstacles as they occur. Of course, SDI and the expert have additional knowledge about the general and temporally specific needs and objectives of other third parties who may be potentially interested in the nature of the deal in progress.

At a general level there may be the opportunity for the expert to provide high level probing questions to the appropriate parties or decision makers within the other commercial entities which certainly do not reveal any identifying information about the negotiating parties, do not reveal any proprietary technical details which would compromise the proprietary nature of this information and enable the identity (identities) of the parties to be indirectly inferred in this regard. However, business terms and perceived value exchange may be thus conveyed as limited facts in the abstract or possibly in more detail depending on the particular situation. There may also be particular critical junctures and impasses in the negotiation at which point the vendor may be compelled to concede. These points may be critical points at which it may be opportune for SDI to initiate or go into a deeper level of investigation with the other parties regarding the critical issues at hand. The above precedent may even be replicated among all other third parties, which SDI deems to be potentially receptive and legible to the prospective deal. This process is analogous to time of purchase competition in that if/when another potential deal is identified from another entity which is more desirable the original negotiating party may be informed (as well as possibly the other relevant parties). This process may be reiterated as well.

13.2.3. A Real Time Experts Market

In this section we suggest a market for expert opinions, in which users with an information-need are matched in real-time with "experts", that are prepared to provide information and opinions in return for a payment. This economic approach can be used for example, if a vendor would like a user to provide feedback about its products and/or services: the user becomes an "expert" and can receive payment in terms of discounts in the future. The information in SDI can be used for the automated selection and user targeting of tasks, based upon profile information.

We can allow users to be identified by another individual in which there are mutually beneficial opportunities for both parties to interact and terms/conditions for the disclosure to the other party is defined within the user's data disclosure policy. For example, issued U.S. Pat. No. 6,029,195 Herz, et al System for Customized Electronic Identification of Desirable Objects describes a "system methodology by which users are able to find a knowledge domain expert to answer a query, deliver personalized advice for a particular issue or problem to which they are extremely knowledgeable about, and provide references to other information sources.

The parent issued U.S. Pat. No. 5,754,939 describes techniques for identifying experts on a communication network based upon their profiles and the search profile of a requester. In the present methodology we further provide an economic mechanism to encourage well qualified experts to provide options, and find experts. There is currently within the prior art economic incentive schemes which can be adapted and effectively employed in this case in which it is possible to reward very well qualified (and truthful) opinions on a very broad range of issues and domains in which the accuracy of the ultimate outcome of a particular opinion is directly rewarded. This mechanism effectively insures the quality of the referrals/recommendations and is considerably more efficient then immediate payments for referrals where quality and truthfulness of the expert advice cannot be audited prior to payment, thus creating a disincentive to provide truly "valuable" advice.

The system of SDI can forward requests for information to experts within the same system as time-of-purchase competition, SDI acts as a CLEARING HO USE for requests for information, and experts can bid to provide responses. The system of SDI can also help users to choose between experts, based on proficiency profiles that are derived from the value of information that experts have provided to other users. We can allow experts to bid for the right to annotate and provide ratings for particular pieces of information, products, services, etc.

In a web annotation example, as users provide annotations and recommend links, and other users provide feedback about annotations, then the system of SDI can build a "proficiency profile" for a user, to indicate the ability of a user to add value to the browsing experiences of other users. The information retrieval and document clustering methods as taught within the parent case #57549398 provide a statistically sound methodology to develop a user profile that predicts the "proficiency" of a user to provide recommendations about objects that fall in particular clusters.

In the economic variation we can allow agents to bid for the right to receive high quality recommendations, at least in the case where recommendations are new and cannot be duplication on the basis of current recommendations. We can create an "experts market", where experts are assessed on their ability to provide quality to previous agents, as noted by those agents. SDI could also suggest a list of content categories that an expert might consider operating within. We can also apply the rapid profiling techniques in the parent case to assess a user's expertise based on his/her response to a set of questions. A rapid profiling tree is essentially a decision tree, which can be used to present a sequence of items to which a user "responds". The rapid profiling method enables a user profile to be constructed in the shortest possible sequence of inquiries to the user. In this case, the response is the user's recommendation links (which are then judged). With the benefit of a comprehensive proficiency profile of the user the system may identify and present items to the user automatically (if s/he is amenable) for which the user is predicted to be proficient. We may pay individuals based on bonus points or coupons with future redeemable value across a network of vendor sites (e.g., within that particular SDI recommended alliance of vendor sites which may be dynamically generated for each individual user). Experts that include links to pages could be paid for the value of increased value based on those links. Of course SDI can continue to ensure that users are not motivated to provide biased links because of this type of financial incentive, continuing to monitor how useful other users find the links and recommendations.

The market for experts and real-time information filtering can be applied to new content. Via collaborative-filtering based systems we can push new articles to appropriate users, so long as experts provide initial scores for articles. In such an automated news system users that represent particular types of customers can be paid to provide ratings of incoming news articles. Based on profile information these ratings then imply ratings for the customers of a news cutting service, therefore allowing filtering of news to the most appropriate and narrowly defined subgroup of users of interests.

It can further be combined within the framework of the present incentive scheme to encourage users who tend to individually find news, which is of particular relevance to their daily lives and unique interests to proactively collect information (including but not limited to digital recorded audio/video) and provide that information to news distribution systems. Collaborative filtering leveraging both the overall quality/interest of user content as well as of the nature of the new content which that particular user is providing can provide a nice method to filter and channel this information.

The above bidding scheme enables a highly individualized incentive driven distributed news reporting system, which can significantly increase the availability of content for individuals. Users can continue to rate specific stories that they receive, so that the profiles of users are dynamically updated, and experts can be swapped in and out based on the assessed value and accuracy of new clipping.

The present clustering techniques may also be used to identify users that are able to provide useful new content. This content may range from commentary, opinions, critiques and comparisons, but can typically be more robust than simple annotations, and may include articles by knowledgeable experts providing pertinent or new information which is interesting or timely within the present context of the site. The predicted value to the particular cluster of users is a function of both the object profile of the original page as well as (perhaps even more relevantly) the object profile of the new content.

We can also have experts bid for the right to participate in online discussions, where experts are selected that are polarized on a current controversial issue, in order to fiercely debate a particular issue. We could also select representative group members, from within different primary clusters, based on the domain knowledge, skills, life experiences, preferences social/political or religious view or opinions of users, to engage in an active dialogue, interview or debate with the high profile individuals. Other members of clusters can be invited to observe a discussion, and to provide feedback to maintain information about the quality of experts.

13.2.3.1 Expert Sales Consultants

A static application of the information in the system of SDI to on-line sales is to use the information to generate an ideal list of prospects for sales agents, and then help sales agents to target products and offers to individuals. We can provide information to salespeople about users, according to the profile of a salesperson (and reputation), and a user's personal terms for data-disclosure. Similarly, a system of SDI in conjunction with the methods taught in co-pending patent allow automatic detection of salespeople close to users (via an anonymous location market). The market allows matches to be made, but does not reveal anything about a user that the user does not authorize. User profiles can also be used to determine responses to offers and products (see the methods in patent application "System for the Automatic Determination of Customized Prices and Promotions" [U.S. patent application Ser. No. 10/262,123]. SDI allows profiles to be built from extended interactions across multiple vendors, so long as the user authorizes the same pseudonym for each vendor.

As an example, consider an SDI-based system for contacting prospective customers and making personalized offers. The first step is to access the SDI pseudonymous user data base and identify the ideal audience of prospects for a product offering(s); then the second-step is to use the pseudonymous request protocols to request a sales call dialogue (or some other form of dialogue) with the target prospect. The user's agent will then typically request further information (either before or after allowing access to even the pseudonymous profile database) such as what is the type of product (even possibly further associated details), and an associated approximate price range (which may be either negotiable or non-negotiable). The user may agree to allow a communication in the form of a targeted email that contains information content, or a link to a web page with additional information. This Web link and/or the e-mail can be personalized for the user, based on the user's profile. An email link on the web page could be used for direct Web-based IP telephony connection to the user (seller). Alternatively, a user's initial contact to web site could include encoded information about its profile, where the vendor can only receive the profile information if it can demonstrate certain profile properties. Large customers might then also receive specially hand-crafted information, if it is indicated that there is a large potential contract. The user is provided with a unique URL, or preferably the site is initialized so that when its pseudonym is provided the offer is customized appropriately.

A more interesting example is a dynamic "experts market", which is an application of dynamic matchmaking between users in real-time based on their profile information is to a system for a virtual sales force. Users can also use seller profiles, to decide whether or not to interact with a seller. The profile of a sales-person may show correlations between product sell-rate and the type of product, type of user, that the sales-person interacts with. Initially seller profiles may not be very well related to sales-performance, but instead based on general SDI-style profiling, and wider (e.g. professional) credentials. Later, as a seller gains experience, profiling can be based on a sales-person's track record (and this will subsume other information).

A consumer can indicate its preferences in its profile for "approach" by a sales agent, and then a match can be made with an appropriate sales agent dynamically in real-time via the above agent-agent matching and introduction process. The sales agent may be compensated when introductions lead to sales. The user could also receive preferential terms for a purchase, that can be realized online or in a physical store via coded print-coupons. This code with the time and identity of the (prospective) buyer as disclosed by the sales person. The buyer must authenticate that sales interaction (e.g., via disclosure of the code).

The criteria for matching the seller with a qualified prospective buyer is represented by client-provided meta-information associated with profile information, and can be used within a collaborative filtering system to determine the level of predicted interest which the buyer is likely to have for the items offered by a particular seller. The product space predicted to be useful to a buyer can be predicted based on his/her profile, browsing patterns, etc. Context can also play an important role, for example is the buyer currently engaged in browsing or buying related activities, can the buyer be persuaded to buy now with a good offer, or will the buyer never buy until he/she has performed more product search?

Vendors may also compete for sellers based on the profile information and success-profiles of a seller, and a perceived match with the products offered by the vendor. A seller may also work for numerous categories of products/services and vendors. Finally, the sellers in the market could enter into a market-based system, so that buyers bid for the right to work with a particular sales person.

Two other aspects of the present access to or by a prospective sales person include (1) In an off-line context, we can use a LEIA-based method to identify buyers and sellers with similar profiles in physical space, and dynamically reroute their paths to allow a meeting to discuss a possible trade.

(2) Personal "Chemistry". In addition to a pure "product-space" set of profile features, the system might also consider wider compatibility between sellers and buyers in making meetings, for example choosing to introduce agents that share similar hobbies and spare-time activities.

The problem might also be informational: e.g. find an expert on ancient American civilization for purposes of writing an article, or answering a specific question. Relevant information might include the expert's resume, and the expert's knowledge expertise profile developed from his/her activities in responding to previous queries.

We might use a "fuzzy rule" to determine whether a user has a profile that is sufficiently close to an agent's goal profile to allow an agent-agent interaction and exchange of information. When the rule does not quite fire the system of SDI might also seek to clarify points of uncertainty, requesting further information until there is enough information to decide on the appropriateness of a contact.

It is clearly desirable to automate information exchange as much as possible, so that the first thing that a user knows about an agent-agent negotiation is after a deal has been struck that satisfies a user's preferences.

One approach is to perform data analysis on a large data set of users who share very similar profiles and to perform very similar actions and behaviors in all aspects of their successful interactions with other agents. The data analysis might also be used to suggest to agents when there is a problem, and when it will be useful for a user to provide more accurate information about what types of actions it is looking to perform in certain scenarios, i.e. when the current level of confidence about the action desired by the user is low. In many cases the system might be able to identify with a high statistical confidence level an appropriate action based on the collective statistics of other similar users and conditions.

When uncertainty exists the system can suggest the actions that see reasonable, and allow the user to choose one action. A natural language interface might communicate to the user the system's interpretation of the user's current behavior, the statistical correlations with recommended autonomous actions.

For example, if a user is at home in his/her study between 9-11 PM she/he is likely to be engaged in work relative to a research publication thus an invitation to other colleagues in this area will be extended and/or communication requests accepted to contact the user accordingly under these conditions. The system may detect other conditions in which the user may reject requests to correspond with these individuals, when the user's current context is inappropriate. Given this kind of feedback about actions, a user may now periodically review and adopt rules. For example, a user could also state that whenever a user has recently corresponded with a particular individual then the user is in a social mind-set, and would rather not engage in work-related activities.

There are numerous potential inputs to the system which could be considered in predicting what agent-mediated actions are, in fact, appropriate. Strong inferences may be made about the particular mind set of a user; i.e. reflecting present interests or preferences which the user is likely to be receptive to, presently based upon such clues as who the user is presently interacting with, the content profiles of the present real-time dialogues, e.g, typed or spoken through a communications network, (or simply passively collected off-line), the object profile of documents or web pages being interacted with. Activities may further be inferred by such indicators such as the particular physical location of the user (i.e. within a LEIA-based system: the particular sequence of movements, the particular types of devices with which the user is interacting, etc.

More complex rules are certainly also conceivable, such as the user will not interact with other users except under specific conditions, i.e. I will only talk to a user of type X (salesperson) if I have done nothing for the past 10 minutes and have nothing scheduled in my meeting planner. Such rules are initially hard-coded, but can then be learned and/or validated based on inductive learning: i.e. is it the case that I am more receptive to certain types of activities at particular times of the day, etc?

In some cases SDI may identify individuals whose personal data revelation requires certain minimal requested personal data from the other party as a condition to an interaction, and SDI can again be used to automate this process is if it is well explained in a user's profile. When confidence is low the user may request additional information (anonymously, via SDI) and make a personal judgment in real time as to whether to continue an interaction and reveal more information, and whether or not an introduction is desirable.

When information is valuable and sensitive, then it is important that initial information exchange is via SDI, without the end-users receiving explicit information. In overview, a user states the types of conditions that are necessary for a continued one-on-one interaction, and the system of SDI states whether or not conditions have been met without giving any specifics. Of course the identities of the agents are not released until introductions are made. SDI can track all activities, behaviors, and correspondences in which each user engages, and build a complete picture of the profile of a user with regards to interactions and the exchange of information.

SDI may also use human experts to interpret requests and build rule-based systems to semi-automate decisions and automate easy cases.

A simple but related application could be applied in the e-commerce domain to connect on-line customers with human sales representatives. A current version of this, offered by eStara, uses Internet-based telephony technology to enable browsers of on-line catalog pages to talk with knowledgeable sales representatives, simply by clicking on a "talk" button displayed on the web page of interest. Integrated into this methodology is the ability of the sales representative to identify which particular web page the visitor is currently viewing, thus enabling him/her to more efficiently and intelligently assess the needs of the customer.

This methodology could be further enhanced through the tracking of the user's pseudonym and associated profile data provided via SDI, which represents a far richer set of information than that used by eStara (which only makes use of the current web page identifier). A customer's full profile can include demographics, previous purchases, previous web-site visits, physical measurements (for clothing purchases), health history, and income.

In a sense, individual sales representatives also have personal profiles; these can include experience, demographics, languages spoken, previous customer contacts, and product knowledge. An especially important factor is a representative's relative success in selling particular products—this history may reflect various personal strengths and weaknesses.

When the customer clicks on an on-line catalog's "talk" button, his profile is immediately forwarded to the sales system, along with the particular product he is viewing. Matching algorithms (as described elsewhere in the patent) then choose the most relevant sales representative currently available for on-line communications. The representative is presented with a screen containing facts pertinent to the sale (including product details and extracts of the customer's profile), and he is then linked to the customer via Internet telephony.

Extensions to this technology include:

1. Customized Price Discounts and Promotional Offer Recommendations

By combining the predicted affinity of a user toward a particular item with price elasticity metrics (gleaned from his/her transaction logs and from real-time feedback provided to the system by the sales representative (e.g., the customer appears to be in a happy and spending mood)), it is possible to calculate a "personalized" price that optimizes the expected profit from a sale. This optimized sales price is communicated to the sales representative, who is authorized to offer the discount to the customer. Digital coupon technology would be used to ensure that the offer is redeemed by that customer exclusively, and within a pre-set time limit.

2. Automated Sales Representative Support

While interacting with the customer, the sales representative is presented with constantly-updated screen that provides information to support his sales effort.

a. Rapid Profiling

If not much information is known about a customer, the representative would be guided through a script designed to elicit the maximum amount of information in the least number of questions. This information would be used to rapidly supplement the customer's profile.

b. Customized Sales Scripts

The representative's scripted sales pitch would be dynamically adjusted to reflect the profile and current attitude of the customer. For example, if a customer is having trouble making a decision to buy (which could be detected by voice analysis tools and the total time elapsed in the transaction), especially persuasive text, geared to the customer's demographic, would be presented to the representative.

c. Additional Offers

If separate, but related, products are predicted to be of special interest to the customer, the sales representative is alerted so that he can promote the additional offers while still in contact with the customer.

3. Barter Exchange for Personal Favors

In this variation, SDI can act as an exchange where professionals can exchange personal favors, for example one agent might indicate that it wishes to be introduced to another agent that can help with a particular professional problem. Both buyers and sellers can submit their respective needs, for example the need for a particular personal or professional favor, and in the case of sellers the ability to provide favors. Other personal information, for example: professional, political contacts, organizational affiliations, areas of competence, professional responsibility and spheres of influence etc. can be confidentially entrusted with SDI and used to make particular types of matches.

SDI can initially automatically define appropriate matches between the "buyers" and "sellers". Given sufficient data, humans may use content analysis techniques to define rules based upon certain key examples or commonly occurring request and matching solution pairs. The techniques of the parent patent application U.S. Pat. No. 5,754,938 can also be used to refine rules, and create new rules, for the cases in which the level of confidence with introductions based with the current rule set is too low. The mechanism for establishing the value at which favors are sold might involve a bidding scheme, but in this case professionals may bid a "personal favor" in return for another favor. I.e. the transaction becomes disintermediated from the outside economy, with a pure non-money based method for exchanging favors. A user with the ability to provide a favor receives bids from other users in need of the favor she/he is able to provide. Of course, the value of a given favor is likely to be worth more to some individuals than others.

The nature of the favor may range from very small and mundane, e.g., providing professional or personal advice or answers to a question, or it may be very significant and resource intensive from the standpoint of the provider, e.g., making a professional recommendation for a job position or political decision or providing recommendations/referrals for clients on a professional level or providing business recommendations to a partner or affiliate regarding a given individual or commercial entity with which to do business.

The techniques of peer-ratings within a reputation system can be introduced, and extended to cover a wide array of qualitative descriptive attributes to reveal the qualifications and ability of an individual, to allow some individuals in the bidding process to be excluded in an initial "filtering process", because they fall below expected standards of service and performance. An auction based model may establish a price for a particular type of favor, and for a particular individual, and therefore users with high performance ratings could be expected to sell for higher prices than other agents.

4. Barter Exchange For Favors

The qualification threshold of the provider of the favor is more important in some applications than in others. For example, if the favor involves an interaction with a particular individual for organization (e.g. a political favor) in which the individual's anticipated ability and qualifications may be a significant factor in the likelihood to achieve the desired results. And thresholds may be set relating to quality or qualifications in their regard depending upon the relevance of this factor and/or the importance of the favor, which depends upon the type of favor requested. The bidding process is typically a reverse auction in which the request favor is passed around to multiple individuals (or entities) which SDI deems qualified for the particular favor requested (thus the lowest price which fits the qualifications criteria is typically the offer which is accepted. In other (perhaps many) of the barter exchange for favors, the qualifications of the requester may be an important factor for the requestee. These qualifications may include, not only professional abilities, proficiencies and credentials, but potentially much more subtle attributes relating to the individual's interpersonal, social or psychological profile and/or behavioral profile, for example, how SDI predicts that the individual receiving the favor will integrate and adapt within a particular professional context and/or interpersonal context which defines the situation and/or environment with which that individual must interact and/or perform, e.g., as in a business deal, a professional opportunity, an educational opportunity, social opportunity, etc. In order for this pre-qualification of the requester to unilaterally work so as to assure the requestee with the level of confidence and trust in the requester which approaches that of a traditional favor (in which the requester and requestee are typically extremely knowledgeable and trusting in one another) requires a very efficient and perhaps fairly comprehensive reputation system revealing much about the above described personal and professional aspects of one of both parties. As suggested, in such a system and just as important, is the trustworthiness of the individual providing his/her opinion about the credentialed profiles of the parties. Indeed a political or decision maker in a large organization would be extremely remiss (and perhaps even politically harmed) if an office or position were provided to another individual (requester) in which weaknesses in that individual's professional and/or personality later became evident to the detriment of the organization or political entity, as an example.

It is even possible, that in some cases, the need may exist for a pricing model in which the individual providing these credentials through the reputation systems is compensated for the task. If such an individual must be fairly knowledgeable and assure to properly judge professional or subtle personality components, this individual may develop an independent reputation for effectively and truthfully judging these certain characteristics on a category or domain basis. If the subset of "judges" is fully distributed and ubiquitous permeating a substantial portion of the population as a default, if the qualifications of the judge are unable to be validated in advance, it may be preferable to provide payment following a reasonable level competency and success on the part of the requestee and requester. Or, in another variation, users are required whenever appreciated (and in accordance with their own judging qualifications) to provide opinions on the individuals (or other entities), and they must comply up to a certain quota and with truthful and accurate opinions in order to maintain privileges to engage in the service (e.g., www.favor.com) or other applications or services resulting from the reputation system. It is also, of course, critical to ensure the judge possesses with regards to the individual or entity with which he/she is affiliated. In this case, the assumption is that the barter exchange for favors could cover nearly any type of favor desired by a user and the reputation system is implemented for most individuals. Of course, the present system may also be extended within a business context in which the favors include those provided by in between businesses. In both the individual and business application context, it is necessary for the above described use of privacy policies to dictate what types of individuals or entities a user or organization to include, exclude or price discriminations against e.g. to various degrees).

The following section "Agent-Mediated Value Exchange in the Supply Chain" talks about an economic system methodology in which a "value chain" is established for which entities may compensate other entities for present or often future value, which is likely to be sustained as a result of certain actions performed on behalf of that entity. This value often conveyed in the form of "barterables" could also be provided in the form of "favors" between the commercial entities (or potentially in a variation, individuals).

13.2.3.2 A Market for Referrals

Situations frequently arise in a variety of contexts of human interaction (whether social or professional) in which a user may wish to refer the user they are in contact with to another individual. Often this occurs in a professional services context which a user has a particular need/or other characteristics which make him/her an appropriate match for the services provided by the other party. Or in a business context, often a user will forward a business contact or associate to another colleague who is deemed more appropriate for the particular context and/or scope of business. Likewise, in a personal or social context users may sometimes meet two or more individuals which they observe or perceive share common interests, goals or beliefs or perhaps possess complementary capabilities, knowledge, or characteristics. In each of the above scenarios, virtual tags may provide substantial benefits. For example, the referring user could forward the relevant portion of the profile and identified need of the user to the referring party whose user agent may determine the acceptability of the request and/or the priority with which a communication or meeting could be scheduled (e.g., as could be automatically arranged by/between the two party' calendaring agents). If the referring party's agent is unable to make a decision or priority assessment for scheduling purposes) on behalf of the user, the agent could instead try to contact the individual him/herself for assistance (and statistical feedback to the system's data model). In order for these types of referrals to be performed efficiently, the area of expertise required can be specified, and provisions can be made about the type of referrals that a professional will accept.

We can establish a market model for referring individuals within SDI, to compensate users for successful referrals. With SDI we can create a market that allows a wide set of criteria, including social/interpersonal skills, moral/ethical values, etc. to be used to find good prospects for referral. SDI might also provide information to allow a system to predict the tasks or professional occupations most suited for a user. The system can look for correlations between profile data and professional successes, based on the historical track record of successes and failures. SDI might compute a list of human descriptive qualities that will secure payment for referrals, i.e. relevant attributes which SDI infers may be associated with useful types of social or professional individuals.

The scheme might also be used to identify individuals with raw human potential that can perform well with the right type of training. We might use such a scheme to discover hidden talent within under-developed or impoverished regions of a country or the world.

13.2.3.3 Groupware

Collaborative Project Development

The present system framework is designed to provide a secure infrastructure to allow users who are most appropriate to provide a particular type of contribution, based on a precise contribution needed for a project. The project may be a collective project, developed by users who have all been introduced to the project within the same context. There is also a role for an evaluative component to compute relevance feedback in qualifying and quantifying the nature and quality of the contribution.

We can also use a query-based system to establish a user's relevance to a particular task, or another user, along the lines of the method in patent "System for Generation of User profiles for a System for Customized Electronic Identification of Desirable Objects" U.S. Pat. No. 5,754,939

Consider the problem of generating a team of individuals to author a document. This scheme can be deployed across intranets, extranets or the Internet. The degree of confidentiality provided and produced may determine whether certain credentials are required, e.g., the individuals belong to certain organizations and are under strict terms of confidentiality, etc., or whether the document's level of confidentiality is low enough to enable free access by users on the Internet who may want to, and are able to, usefully contribute. The idea behind the present scheme is to leverage techniques of natural language processing and/or information retrieval in order to develop profiles of individuals based upon the value of their past contributions to documents; for example informational content, style of authoring, etc. In a Web-based application the content can be graphical designed content, perhaps even video segments. Within SDI it is possible, based on feedback from previous articles, to anticipate how valuable the information is likely to be for a particular readership.

The problem might also be informational: e.g. find an expert on ancient American civilization for purposes of writing an article, or answering a specific question. Relevant information might include the expert's resume, and the expert's knowledge expertise profile developed from his/her activities in responding to previous queries. Level of expertise might also include the size of projects performed within a particular specialized area, and relevant education qualifications.

13.2.3.4 A System for Smart Consumer Research

There is a significant need within the field of consumer product creation and development to be able to more instantaneously, and on a larger scale, collect direct feedback from a large number of consumers in lieu of much more sparsely populated focus groups and "product development" experts. There is also a need to better characterize consumers whose feedback is utilized in any kind of market test analysis. Collaborative filtering can provide a very efficient solution to both of these problems by enabling focus of feedback from selectively chosen consumers whose attitudes and opinions (and even marketing ideas) are the most meaningful and representative of the large segments, comprising the majority of the consumer population for that product. We can further extend this methodology to determine and measure the "value" of certain individuals in the process of product assessment, i.e. to identify the "experts" in a particular area.

The information in SDI can be used to identify appropriate clusters of users for a particular product, so that a prototype or actual product can be presented to users, and feedback collected. The goal is to collect detailed feedback: across a variety of quality and consumer satisfaction criteria, more subjective opinions, areas of criticism and ideas for improvement or modification. The information in SDI on user profiles can be used to develop appropriate "test sets" of individuals for this purpose. In a cluster-based profile system, we might suggest that feedback is requested from agents that are close to the centroids of a cluster, i.e. the users that best represent a set of users. We can even selectively cluster users based on metrics to a new product.

Analysis can be used to determine how to market and price products and services to different clusters of users. The resulting feedback can be useful in determining in what ways to better adapt the product or modify the concept to better match the preferences and needs of the nearby larger cluster (i.e., larger market population of consumers) or (in another scenario) shift the acceptance rate from one consumer cluster with a high affinity to another with a lower affinity, however, with a larger market potential.

We can use the information in the multi-user SDI database to predict the ability of a consumer to generate useful ideas for product concepts, improvements or extensions. These individuals typically (but not necessarily, exclusively) will belong to the cluster of the product. These users could also be used to create and assess various marketing/promotional ideas.

Furthermore, we might build a system to provide incentives for individuals to identify commercial opportunities for a commercial entity. Again, profile information for the customer base of consumers might reveal possible synergies, and SDI might be able to derive descriptive summaries as to the type and nature of the opportunities which are best suited for a company, to allow easy future identification.

13.2.4 Information Exchange via Traditional Print Media

In this section we note that a personalized offer from a seller to a buyer can also be executed via traditional print media. We explain how a physical coupon can be printed, for example at the point-of-sale, or in some shop-based kiosk, or at an ATM. The coupon can digitally (e.g. Via a bar code) specify terms of a transaction, etc. The co-pending patent application entitled "System for the Automatic Determination of Customized Prices and Promotions" further describes the preferred implementation for implementing customized offers via coupons, through the use of cryptographically secure digital coupons which can authenticate the user and be delivered to the user in a non-transferable and non reusable manner.

Within the system of SDI we can also use secure user features in the SDI database to offer special offers to an individual. Of course, the vendor that requests coupon generation based on information about profiles can execute the request without knowing the profile or identity of the user.

As explained in the top-level SDI description, within the query-execution module rules can be specified that determine whether a profile is suitable for an offer, and the type of offer to make; and the system of SDI can automatically furnish the provider of the profile information with a coupon (as long as that is compatible with that user's requests). The offer to a user can therefore be flexible, based upon a user's profile. The user may be given an encrypted code to present to a cashier when it makes a purchase, allowing offers to be made by vendors that are not on-line, to encourage a user to drive to their physical stores. More information can be available within SDI, for example to allow a user to receive information about quality ratings of vendors, for the products and services that have been provided to other users. In return, the vendor may request certain purchase pattern data from the user. In another variation, the user might enter certain identifying information such as the first several words of the offer, and then receive an email or fax of a barcode to take to the shop for scanning.

This method of discounting can be extended to users with Personal Digital Assistants (e.g. palm computing devices) in a store, that can use a scanner to enter bar codes of products, and then enter into an agent-mediated negotiation to secure a good price for the product. The user may be requested to disclose certain personal data, if a "better" offer is to be provided. Again, even in the in-store application the vendor does not need to receive actual information associated with the user, the processing can be performed remotely either at the user's ISP proxy server or centrally on a SDI server, with the vendor providing methods to adjust prices and offers based on a user's profile, but without seeing the actual profile.

SDI may also implement time-of-purchase competition, soliciting and revealing to the user competitive offers from vendors in stores in a close physical proximity to the user's location. The user could also be prevented with other types of useful information, including: information for competitive products including (nearby) locations, price and functionality for eliciting time of purchase competition as well as previous customer complaints about each vendor.

Finally, an alternative to dynamic negotiation with the vendor is that price labels in stores could encode a strategy that the store proposes to use to price-negotiation with a user, and just download this strategy to SDI and combine it with the user's profile to compute the final offer. The user receives a validated offer from the vendor, that certifies that the user with his/her current pseudonym is able to receive the price or discount. The offer can be encrypted to prevent fraud by the user.

As suggested above, SDI acting on behalf of the user may selectively release only that information which based upon the presumed price/offer generation model used by the vendor will elicit a price decrease delivered to that user. Within this price negotiation process we can require that SDI releases just the right of information to optimize a user's price. This can be part of the understanding with a vendor (even though a vendor may commit to a strategy up-front). SDI cannot falsify information on behalf of a user, but is free to withhold information.

It is certainly conceivable that such a technique could be deployed by vendors, to allow customized pricing for users as they shop in a store via information encoded with product identities, and negotiated via profiles stored in decentralized SDI nodes. A useful default to make the system work for non-SDI based users could be to allow a user to user averaged ratings on various criteria, annotations, etc.

Extensions of the present scheme could include other delivery media such as radio, TV, billboard, etc. For example, a web site could be provided to access information about a digital and personalized coupon, or access could be provided via a web-enabled cell phone. Printed classifieds could allow a prospective buyer to access satisfaction ratings via a printed bar-code type device, to allow the user to enter the SDI database via its personal SDI device. A hybrid voice/telephone approach is also interesting, where a user automatically discloses certain types of information to the salesperson, but is left to explain other features that are not automatically provided. The LCD/browser of the phone might provide some of this information to the other user. This is an interesting hybrid: an SDI-enabled but human-mediated information exchange system. Profile information can be required of the party placing the call, so that a user can ascertain what kinds of information should be revealed to the caller, based on its profile.

Social or business related communications via physical mail could apply these same techniques, with a typical encounter made off-line, but additional information provided by SDI in response (electronically), and supplemented as necessary with other information provided by the recipient of the mailing. As discussed elsewhere in the patent, the initial contact can be pseudonymous, with agents only identified with mutual consent. The mailings can be sent directly by SDI as the result of executing a query.

13.2.5 Resale Markets

It could be useful to extend the system of time-of-purchase to allow individual sellers, in addition to vendors, to participate in requests for products from other agents in the system of SDI. For example, we could allow an individual seller to inform the system of SDI that it has product X for sale, and that it is happy to submit ask price $Y whenever a customer within its local geographical area is about to make a purchase of a similar item. For a one-time price the system of SDI could quite simply incorporate these individual sellers on a continuous basis within a double market for goods and services.

The system of SDI could even provide a more advanced service for sellers. An agent might inform the system that it has product X, and that it wishes to maximize its re-sale vs. usage value. The agent can indicate this time-cost tradeoff to the system of SDI, and then leave the system to track the average resale price, and determine an optimal time to provide the product for re-sale.

A variation of the resale market could include a "barter exchange" in which the seller receives another item, typically of comparable value, from another seller. I.e. agent 1 can state "I will barter A for B", agent 2 can state "I will barter B for C", etc. and the marketplace of SDI can look for a closed-loop of barters, such that every agent is happy. The user that buys a good can be an "advertiser" in a resale market, and other users 19 subscribe and specify controls over the personal information made available to sellers/buyers. We can use a variation on credentials to act as "digital deeds", such that the system of SDI validates when a product was purchased by the user, and whether it was new/used. This takes much of the uncertainty out of re-sale markets because then buyers are sure that the user is not falsifying information and items in the market. Digital deeds can act as credentials for ownership of a given product.

In fact, an agent can even be automatically asked by the system of SDI on completing any purchase whether it also wants to have the item listed and available for resale. If no, she/he is asked if/when at a later times she/he may change his/her mind. The system can request information from the agent about the price range that she/he would be interested to sell the item at, and the agent could be presented with a typical price range for the item. Of course, in a dynamic auction-based system this becomes the "reservation price", i.e. the lowest price that an agent is willing to accept. Just as buyers can have more information about sellers, the sellers in the marketplace can have more information (even though it remains private) about buyers. For example, a seller can specify rules such as:

"I will only enter into a contract to sell to an agent that has never defaulted on payment", etc.

Similarly, users (e.g. owners of kittens) may have certain personal interests for items of personal or sentimental value, and wish that they are sold to certain types of users. An interesting extension allows vendors to impose restrictions on the re-sale of items. The system of SDI can implement these systems for a vendor, so that at least within SDI products of certain types (e.g. software products) are not sold second-hand to other users for cheap duplication. Information goods can also be protected at source—for example with digital watermarks to prevent unidentifiable duplication.

Another variation is an auction scenario, where a seller brings an item to market, and buyers compete for the item. A professional, that makes a living by buying items and selling them on, might like an exclusive SDI-based auction site. Within the system of SDI we can support a network of auction-sites, that push agents around between sites and revenue-share, with source web-sites providing shares of revenue achieved in subsequent purchases on other sites. In another variation, the operator of a small site may be linked from a larger site, and provide a share of revenues to that larger site. SDI has a couple of important roles: monitoring purchases and ensuring that contracts are fulfilled, and also estimating the value of links if an up-front price is to be negotiated, based on information about the profiles of streams of customers to a particular site.

The information in SDI can be used to allow disintermediation of consumer-to-consumer markets, with agents able to reach ideal prospects based on personal information stored in the shared database, make an anonymous offer, and the consummate the trade of possible. This is likely the way of the future in this consumer-to-consumer market. Just as a vendor in current e-commerce systems can store information about its own user-base, and use that information to send personalized offers to users, within the system of shard information in SDI all agents can share information with all other agents, and the playing field is leveled. Users can query the pseudonymous user profile data and (if permitted), gain direct personal access to appropriate target customer prospect.

Conversely, prospective customers who are interested in a particular item(s) may query and access the database of users who are knowledgeable regarding that particular product/service (which may possibly be under a pseudonym), and also accessible to the user, i.e. available at an appropriate time and in an appropriate location.

13.2.6 Transportation Example

Another application of user profile database, in the case that the database contains also real-time information, is in an application to transport scheduling problems. The traffic systems in many large systems are congested. Via the system of SDI it would be possible to allow agents to represent the wishes of their uses within an SDI-enabled mechanism that controlled access to certain lanes on highways. The goal might be to control the flow of traffic, such that users agree to pool vehicles based on similarities across planned trips, and users also payments in return for the right to travel at certain times and in certain lanes. The goal is a more efficient system that maximizes the sum value to all agents.

This is an example of a more general application area, where agents can look for opportunities to change their actions and behavior in return for higher system efficiency, and/or payments. We describe below an application to user agents negotiating on behalf of individuals ("travelers") to optimize the efficiency of a shared transportation system. The fundamental idea is to embed multi-user awareness into the basic fabric of a transportation system, in which the system aims to maximize the efficiency of the system by allowing payments between individuals.

To accomplish this task, the system must be able to anticipate both the immediate direct effects, a particular accommodative action will have on another agent(s) (mobile entities) as well as the indirect (cumulative) effect on the other agents and the associated time delay impact on each agent and on the entire transportation system as a whole.

The techniques of the LEIA can be efficiently employed in tracking the present and anticipated activities, location and movement patterns of individuals who are in the process of traveling to a destination via simple or multiple modes of transportation, e.g., any combination of the following, i.e., pedestrians, automobiles, taxi, train, and bus (including public transportation). LEIA can be applied in both scheduling the flow of traffic for transportation media which are not subject to fixed time schedules (cabs, autos, pedestrians) as well as to dynamically improve overall efficiency of the movement patterns in order to assure that users on a collective basis arrive at their desired destinations with minimal delay. The system of SDI can implement a real-time market where agents make and receive payments in return for changed actions from other users. For example, agents with high priority may be prepared to pay more than other agents for the right to enter a highway at any particular moment in time.

The market pressures at any point in time are between the marginal cost to an individual for changing his/her plan, and the cumulative marginal benefit to other agents in the system. Within incentive-compatible mechanisms, such as the regular price-based market place (e.g. the Walrasian tatonnement model) with enough agents, then it is optimal for an agent to reveal its true value for different outcomes to the marketplace, and the system of SDI in "clearing" the market can maximize system efficiency.

The central contribution of the SDI system is that it acts as a trusted auctioneer, receiving information from agents, and implementing an outcome based on that information without releasing that information to other agents. All that agents see are requested actions, and payments received or payments to make.

We could model a core sample of individuals on an active basis to determine implied valuation functions for different types of users, based on feedback provided by those users about how happy they are at any point in time. Within an incentive compatible system it is optimal for an agent to have a truthful and complete representation of its valuation function. The problem is to discover that valuation function. Any help from SDI, via data mining techniques (i.e. similarities between my profile and the profile of another user that has rated his/her happiness) can be beneficial in reducing the costs of participation in such a scheme. Then, before taking a journey, the user could provide some explicit information regarding the nature of the travel, for example the level of importance in minimizing travel time, whether the trip is business or sightseeing, the time of day, etc. With this information the system can assess the user's valuation function, and then have the user participate within the market, and secure a plan based on actions from all agents. The system might compute price thresholds, that represent different things the user can achieve for different prices. The system based upon its determination of situations/context can presents the price and time and urgency inferred for a user prior; which can be reviewed and corrected by the user.

With this profile information, the auctioneer can now compute prices to clear the market and maximize economic efficiency in the system; taking the following approach:

1. Armed with statistical information about the users of the transportation system e.g. the highway for the next hour, compute static (fixed) prices for different options. The goal is to maximize the efficiency in the market through a simple pricing mechanism, that is computed based on information provided to the auctioneer in advance.

2. Announce the prices, and allow users to use the system as they desire, with appropriate payments made. Payments can be readily extracted from agents via automatic toll systems.

Of course over time the performance of such a system could be optimized, as the auctioneer (the SDI marketplace) learns about consumption patterns of the agents over time. One way to provide incentives for agents to provide information to the system to allow up-front computation of useful prices to support an efficient outcome would be provide discounts to the agents that provide information. When such a system works well then roadway traffic can be controlled, congestion controlled, via an automated price-based system. Additional information made available from within SDI might allow adjustments to prices, based on unexpected flows of traffic. Just because the prices are optimized once up-front, based on projections, and announced to agents using the system; it can still be possible to adjust prices during any particular period—so long as there is a method for that feedback to alter the actions of agents, i.e. there must always be an alternative to make such a system work. Consider a two-road system, one shorter and one longer, then the longer route would be priced less than the shorter route, and the price differential adjusted based on current levels of congestion.

Again, to clarify, SDI has a key role in this system. Agents are only prepared to reveal valuation and trip data within a system that carefully protects their privacy, and controls that information.

Via the optimization performed to compute appropriate prices the model takes into account the effect on congestion that consumption decisions have, i.e. there is a relationship between the value to an agent that selects option A and the number of agents that select option A. The auctioneer needs a model of the transportation system itself to perform this type of computation. Essentially, we compute the fixed point of a non-linear system of equations. Stochastic optimization techniques are suitable for such a calculation.

As the system collects more data it can be less important to require explicit information from agents within the system, unless it is believed that there is a special situation about to occur (for example a Flyers game), which will have unusual effects on traffic patterns.

Co-pending patent application entitled LEIA-TR describes flexible tools and automatic traffic ticketing which could be integrated in to the same transaction infrastructure. SDI would provide a methodology to elicit information from agents, and dynamically set the price of traffic tickets and parking meter tolls to maximize the performance of a City's parking resources. For example, one goal of the transportation authority can be to optimize the amount of revenues it can achieve, by charging more during "high-demand" travel periods.

Extensions of the present scheme could include coalition discounts, where coalitions of users can negotiate discounts based on group purchasing power (let us all use your system for a 10% discount or we will use an alternative road system). The coalitions may be formed automatically within SDI using shared profile information, allowing agents with non-competing interests to "pool their buying power". Finally, it is interesting to note that users who share identical travel objectives can be encouraged to share vehicles, and/or public transport can be provided as alternative means of transportation on a dynamic basis.

13.3. Client-Side Data Mining Applications

Finally, we describe applications of client-side data mining, where the private information about an agent remains on its local client machine. Personalized of services and products is performed by pushing methods to the client machine, where the methods compute based on local profile information the most appropriate information for the user. This is very useful because the user retains absolute control over his/her profile information, but can still receive the benefits of personalization. This is an extension of iamworthit: users still provide profile information to the central database, to allow central queries and to receive value for that information, but never release identified information to a vendor.

13.3.1 Client-Side Personalization

Client-side personalization allows vendors to push personalization rules to client machines that are special queries which use information store in a local client profile database to provide a user with personalized information and/or services. The personalization rules use locally stored profile information to compute an optimal product or service, or to allow a vendor to configure a virtual shop front. The answer to a query is returned to a vendor, to allow the vendor to push suitable commands to the client to enable appropriate displays to be created on the device with which the user interacts with the client.

Client side personalization is useful within the system of SDI because:

a) It allows vendors to leverage profile information across multiple profiles that belong to an individual without explicitly receiving the information.

b) It provides users with the convenience of using their true identities in payment and specification of delivery addresses for goods, because vendors do not need to receive any information about the profile of an individual except that which was learned during the transaction.

Although we describe methods to allow anonymous and/or pseudonymous payments and physical mailing of packages, through the use of third-parties or cryptographic techniques, it is useful to allow users to provide true identities because this fits better with traditional methods of business.

Personalization rules select the most appropriate information and products to display to a user. The client machine computes a selection, and responds to a vendor with its selection, so that the vendor can push personalized content and make customized offers. The traditional method of personalization has a user push profile information to a vendor, and the vendor push personalized information to the user. The provider can learn information about the preferences of the consumer, perhaps more information than the consumer trusts the provider with, given that the provider might sell the information to other agents, or use the information to determine the identity of the consumer.

In safe personalization the vendor pushes its evaluation method and generic information to the consumer. This provides the same level of personalization, but without releasing any explicit preference information about the user's preferences to the provider. The vendor can still perform collaborative filtering in the central SDI data warehouse, for example with anonymous profile information or without receiving the information explicitly but submitting a collaborative filtering program directly as a query. With safe personalization the user can (a) receive financial rewards for his/her profile information; (b) provide profile information to allow collaborative filtering but retain ownership over that information; (c) receive targeted products and services. The method is illustrated in FIG. 19.

The only information received by the vendor is implicit preference information based on the products or services that the consumer chooses as most appropriate. As a default, a user might choose to use a persistent pseudonym with a vendor, so that the vendor can collect profile information about the user across a number of interactions. The system of SDI also allows vendors to customize information on the basis of a user's transactions with other vendors, browsing activities across the web and also wider demographic information, all of which can be maintained at a user's client for safe personalization, and pushed to the central SDI data warehouse for collaborative filtering type applications.

One draw back for a vendor is that it provides the agent computer with methods to target information. For example, Amazon.com must provide the agent computer of a consumer with a method to allow it to personalize future transactions. The method is valuable information to Amazon. However, to protect this method from other possibly competing vendors, e.g. www.barnesnoble.com, Amazon can use encrypted codes to represent the results of a profiling query on the user-side profile database, and these encrypted codes can even change periodically, or from user to user.

In the basic variation of personalization the vendor pushes a personalization query to the agent, to be executed on the agent's computer in the client-side query-execution module on the basis of the agent's single-user data warehouse. This is illustrated in FIG. 18 above. The vendor then receives the result of the personalization query, which might state for example: "this user is very like my concept of what user Mary might want to buy", where Mary is an aggregate user that represents data mining the vendor has performed. Alternatively, the result might say something more direct like "show the user product X", or make special offer "Y". Whatever information the vendor receives in response to the query, it can then push commands to a user's agent computer to display graphics that represent its desired response. For example, in an Internet application with a user that is browsing via an Internet browser, the vendor could push HTTP commands for a personalized shop front for that user based on the results of its personalization query.

We can describe a number of variations on this basic concept, that describe different method to compute the best action to take given a vendor's personalization method and a user's profile information:

1. Every-time Client-side personalization. In this variation the vendor pushes a personalization method every time the user initiates a new interaction. The agent computer executes the personalization query, and makes its response to the vendor. The vendor can then send personalized content to the user.

2. Periodic Client-side personalization. In this variation the vendor maintains (either vendor-side or user-side) the data that the last personalization was performed and pushes a new personalization query to the user periodically, when it thinks that the user's profile will have changed or its personalization methods have changed. At all other times, the user maintains as part of its profile the result of the most recent personalization, to send to the vendor and allow the vendor to provide personalized service. Alternatively, if the user interacts with the vendor under the same pseudonym in the future then the vendor can store the result of personalization for that vendor.

3. One-time Client-side personalization. In this variation the agent computer only ever performs a single user-personalization step, which is then maintained by the user as part of its profile for that vendor and passed in the future to allow personalization.

It can be computationally complex to compute the result of a personalization query. For example, profiles about the objects on a vendors web page or in its inventory can be as large as the object descriptions themselves, and full decision tree representations to decide how to target a consumer can be very large and complex. In cases where this is a problem, and it is inefficient or infeasible for the vendor to push a complete decision tree to the user we propose the following solution:

4. Iterative Client-side Personalization. In iterative client-side personalization the vendor and the user, via their agent computers, participate in an iterative distributed protocol to compute a personalization result for a user based on its profile. A similar method was earlier disclosed in U.S. Pat. No. 5,753,938 The idea is to structure the decision tree, and for example pass initially the first few levels to the agent. The agent computes the result of those levels, responds to the vendor, and the vendor passes the next few levels that are relevant to the result received. In this way, only the parts of the decision tree which are actually used to compute the result of a personalization query are exchanged with the consumer's agent computer.

Specifically for collaborative filtering applications, a simple technique can be used to reduce the amount of information that must be provided to a user to compute the result of a personalization query. In collaborative filtering a vendor's decision about which objects are appropriate to show to a user is made on the basis of a similarity comparison between the user's profile and the profile of other users for which the vendor has information about how they responded to certain objects. The straightforward method is to pass the profiles for an entire user population to the agent's client machine. This is undesirable when there are many users in the population.

A better solution is to pass only cluster centers to the client, where the cluster centers are chosen to allow collaborative filtering to a sufficient degree of accuracy. For example, we illustrate below an efficient method for collaborative filtering at the client, and our proposed efficient implementation. This is illustrated in FIG. 20.

The idea is to select a subset of users that represent the entire space quite well, which the vendor has collected by performing data mining queries on the central SDI data warehouse, and then submit just those data points to the client. In the Figure we plot the complete set of user profiles in profile space, with each user profile associated with information about how to target a product or service to a user with that profile. A typical method to perform collaborative filtering with data of this kind is to find profiles in the neighborhood of a new data point, illustrated with * in the above diagram, and then base the decision on what was successful or unsuccessful for those users. Clustering replaces a set of similar users with one "cluster point" that represents what information a typical user in that region should be shown. This can be computed using standard cluster analysis techniques. The reduced space of data points, shown on the right, is sent to the client, and the client performs collaborative filtering over the cluster points to computer an approximate solution to the full personalization query. Completing the example, the agent computer can determine which "aggregate user" its profile is closest to, for example Mary or Yu-wen, and send this to the vendor.

Notice that the vendor does not even have to provide the "y-values", or the personalization methods which are associated with each user profile, it is sufficient for the agent to compute the closest cluster center and pass that information back to the vendor. This is useful to vendors because the information is not useful to anyone but themselves, because no-one else can interpret what it means to be like aggregate "Mary".

An alternative is to provide generic information to the client each time, and allow the client to display appropriate information automatically, without requesting information from the vendor. This removes the final handshake between client and vendor, and might be important if the user does not wish the vendor to receive any information about the result of personalization, not even how it decides to use the data provided by the vendor. The vendor only gets information in the case of a purchase.

A simple extension, permitted with the architecture as described, because the agent computer implements the central SDI data warehouse query-execution and pricing modules but with only profile information about the single user, is to allow the user to demand payment in return for allowing the vendor to make a personalized sales pitch.

13.3.1.1 Implementation Techniques

The implementation of our system for privacy-protected personalization requires the following functionality:
   (1) A vendor must be able to push generic information to a user's client machine
   (2) A vendor must be able to push methods to a user's client machine that allow that client to process the generic information locally, using a user's profile information as an input into a decision theoretic rule (that can be rule-based, collaborative filtering based, etc.)
   (3) A client machine must be able to process the generic information locally, together with a user's profile, and decide what information to display to the user.

A reasonable implementation of safe personalization within the system of Secure Data Interchange can leverage current World Wide Web standardization efforts that are based around the Extensible Meta Language (XML) [B97; CKR 97; KR97a; KR97b], and promoted by the World Wide Web consortium [W3C-XMLabc]. XML allows data to be structured and accompanied with a Data Description File that defines the semantics of the data, making it suitable for client-side processing by the receiving agent computer. The method to process the information can be for example implemented with the Java programming language, which will execute on a variety of different platforms via a Java Virtual machine. A vendor can send formatted data via XML and a Java program to target data to the user based on access to the user's profile information.

It is important that the SDI client-side proxy agent carefully controls the access that the Java method gets to an agent's profile information, but this can be structured in just the same way as with query-execution in the central SDI data warehouse. The method must maintain a separation between profile information and the execution state of the program, and check that all data access commands are consistent with a user's price rules (and data access rules).

Furthermore, it is important that the SDI client-side proxy agent executes the vendor's personalization query does not communicate profile information to other agents, and methods can be used to control the access of the query to communication ports, memory and disk space.

Clearly, standardization of user's profile information is necessary, so that all vendors can write methods that can access a user's profile. One solution that would support implementations from multiple providers of profiling functionality (i.e. would not require clients running standard SDI-profiling software) would be to provider "XML-data wrappers", that convert non-standard formats into a standard XML data format, that is used by all personalization methods. One language for representing user profiles has been proposed by the W3C consortium, known as PIDL (personalization definition language) [W3C-PIDL].

13.3.2 Real-Time Targeted Advertising

A useful application of SDI allows vendors to provide targeted advertisements to users based on their browsing behavior and other profile information, but without actually receiving explicit information about a user's profile. We propose an advertising-server, which controls the network of adverts on behalf of vendors and users. A user's client machine can receive a choice of adverts whenever it hits a web site in the iamworthit advertising network, with local evaluation based on the local profile information at a client to decide on an appropriate advert to display.

The system is designed to support dynamic personalized advertising, with vendor-side competition for the right to present an advert to a buyer, and buyer side criteria for accepting or refusing an advert. A technical solution is presented to allow vendors to select an appropriate bidding-policy, to maximize revenue from advertising. We use client-side profiling and advertising selection to support targeted advertising with absolute guarantees on the privacy of a buyer. The ad-server sends a selection of adverts to a user, and the user's client chooses to display the most appropriate advert.

With a limited capacity to display an advert to a user, it is necessary to control the adverts that vendors display. We propose an auction-based system to compute prices dynamically though competition between vendors. The auction is a second-price sealed-bid auction that encourages advertisers to bid truthfully without "gaming" the outcome of the auction. The advertising auction is implemented on a user's client machine.

In overview, the following steps are performed to support targeted advertising to users:

1. Buyer hits the web page of a vendor with an iamworthit advertising link.
2. Vendor pushes content to the buyer (possibly personalized).
3. Vendor contacts iamworthit ad server, requests an advert and pushes any profile information about the user.
4. The advertising server represents a number of companies that wish to advertise with appropriate users, and determines a short list of adverts to offer to the user's client based on profile information.
5. The user's client receives the choice of adverts and accepts an advert based on the values of bids and the likely suitability of an advert to a user.
6. The client requests the advert from the ad server, and then displays the ad.

Payment is collected for viewing the advert, and finally the user's response to the advert can be stored in the central SDI database for future tuning of advertising policies.

FIG. 21 illustrates the system. The novelty provided by the system of SDI is that: (a) advertisers can decide when to place adverts and how much to bid based on historical information stored in the central SDI data warehouse; (b) the final advert is selected dynamically at the client with local profile information stored about a user. The stored profile information about users stored within Secure Data Interchange allows vendors and client-side SDI proxies to estimate the probability that a user will respond to an advertisement, given its profile and records about how other users with similar profiles have previously responded.

Vendors, represented within the advertising-network server have access to some information about a user, and can compute an expected value of placing an advert, based on the final purchases made by other users that were shown adverts. Meanwhile, client-side machines have a more complete picture of a user's profile, and can compute the expected value of viewing an advert based on the advert and the price offered by vendors. In general, as the acceptability of an advert increases vendors will wish to bid more, and users will accept the advert for less money. Competition between vendors drives the bid price up, and allows users to receive the value of information about their profile to advertisers.

13.3.2.1 Example

Technique to Compute the Expected Value of an Advert

A collaborative filtering system can be used to predict the probability that a user with profile x will respond to an advert. The computation is based on historical information in the central SDI data warehouse for similar users to the advert, and also on the basis of historical information for similar users to similar advertisements if there is little information available about the actual advertisement. Information can be provided to advertisers anonymously in performing queries, and also randomized if necessary.

The basic technique is to select a set of users that have been shown the advert, or a similar advert, and are close in profile attributes to the current buyer. Call this the "relevant set". Given this, the probability $Hit(x, Ad)$ that a user with profile x will hit an advert with profile Ad can be computed as the ratio $Hit(x)=Num\_Hit/Num$, where $Num\_Hit$ is the number of users in the "relevant set" that responded to the advert, and Num is the total number of users in the relevant set.

Although subject to a certain level of necessary uncertainty, because buyer behavior cannot be predicted perfectly, ultimately it is useful to predict with as high an accuracy as possible whether a buyer will respond. Given a probability $Hit(x, Ad)$ that an individual buyer will respond to an advert, a vendor can define a bidding policy. The policy maps $Hit(x, Ad)$ to a value to bid for the right to target a buyer.

Assume in this section that the profiling system places buyers into one of several "classes" of buyers, C1 to Cn, given an advert with profile Ad, where each class has an associated hit rate, i.e. $x \in C1 \Rightarrow Hit(x, Ad)=Hit(C1, Ad)$. Furthermore, assume that the system also predicts the average amount spent by a user that hits on the advert, or the average value to the vendor from a hit, this can again depend on the class of buyer, and can be determined within a profiling system based on historical information about this advert, or about similar adverts. Let $Rev(C1, Ad)$ denote the value to a vendor with advert Ad of getting a hit with a buyer in class C1. Now, the vendor can determine its expected value for placing an advert to a user in each class, for example using the computation $Val(C1, Ad)=Hit(C1, Ad)*Rev(C1, Ad)$.

The system of vendor-side advert competition works as follows. Once a user hits a web page with an iamworthit-targeted advert, a choice of adverts are pushed to the user's client from the ad server. Each advert is represented as a three-tuple:

(link to location of advert, bidding function Bid(hit, rev), profiling function Profile(x, Ad), value function Rev(x, Ad))

The profiling function $Hit(x)=Proffle(x, Ad)$ is used to place a buyer into the appropriate class of buyers, and compute the hit probability for a buyer, $Hit(x)=Hit(x, Ad)=Hit(C, Ad)$, where x is the profile for the buyer, C is the class that the buyer's profile places it within, and $Hit(C, Ad)$ is the probability that a buyer in the class will respond to the advert. A possible implementation of the profiling function is to encode it using prototypical cluster centers for a buyer in each of the set of buyer class types, and then assign the buyer with profile x to the cluster that is closest (in some well-defined metric) to the cluster type. The metric does not need to be linear in each of the dimensions of a user profile, and in particular would be expected to be place more weight on terms that are important to the hit rate in a particular class of buyers.

As described, this method has the following useful characteristics:
  a) the hit probability for a buyer is computed at the client machine, using the profile that is stored at the client for the buyer. The client machine does not need to release the user's profile, and the user's privacy is assured.
  b) The information necessary to compute the hit probability can be encoded in space linear in the number of clusters, which is much more efficient that passing information about every relevant user profile to the client machine.

Without computational/communication restrictions one might pass historical information in the form of (Profile, Hit/Miss) pairs for users that have been shown the advert, or shown a similar advert. A nearest-neighbor algorithm could then be used to find the relevant set of profiles for a new profile x and compute the expected hit-rate from the ratio of users with similar profiles that historically hit/missed the advert.

The cluster centers approximate this solution, representing the average hit-rate of "close" profiles so that the client machine can simply locate the closest cluster center and use that as a proxy for the probability that its user will hit the advert.

A similar technique can be used to compute the expected revenue from a buyer with profile x that hits an advert. In fact, this information can be computed using the same method, simply by associating an expected revenue with each cluster center.

13.3.2.2 Client-side Advertising Reverse Auction

The client implements an auction for the right to show an advert to a user. The auction is a Vickrey auction between all the adverts that are passed by the ad server to the client. The Vickrey auction (Vickrey, 1961) is a second-price sealed-bid auction. Given bids b1, b2 . . . , bn the auction sells the right to show an advert to a buyer to the vendor that bids the highest value for the value of the second-highest bid. The Vickrey auction is useful because it is truth-revealing. The optimal strategy of each vendor is to bid its true value for showing an advert to a user. For example, with a profit-margin of 20%, it is optimal for a vendor to submit bid=0.2*hit*rev. If accepted, it will pay at most bid, and it will pay only enough to shave the bid of its nearest competitor. The auction is sealed, so competitors do not ever see the information in failed bids. Cryptographic techniques can also be applied to ensure that the bids are not inflated by the auctioneer.

A user can also define an acceptance function in the auction, which represents her reservation price to view a particular advert. Assume that the reservation price depends on the hit rate hit of the advert, and represent the price as Accept(hit).

The client-side advert auction runs as follows:
1. For every advert Ad, Compute the hit rate of advert Ad, given the profiling function Profile(x, Ad) and the buyer's profile x, and the expected revenue from showing the advert to the user, rev.
2. For every advert Ad, with hit rate hit=Hit(x, Ad), compute the acceptance level accept=Accept(Hit) for the buyer and the bid for the vendor with the advert, bid=Bid(hit, rev). If accept >bid then reject the bid for advert. If no adverts remain, jump to step 7 (in this case no advert is shown to the user).
3. Given the bids that are not rejected by the client, sort them in order of increasing value, and insert a "buy" bid from the buyer equal to the value of its acceptance level for the advert with the bid of highest value.
4. Accept the advert with the greatest bid, and charge the vendor the price of the second-highest bid.
5. Fetch the graphics and URL for the advert, and display the advert to the user.
6. The client monitors the actions of the buyer, and records (to be later transmitted to the iamworthit server) whether the buyer responds to the advert.

The buy bid in Step 3 will be less than the bid for that advert, because the advert was not rejected in step 2. However, this buy bid might be greater than the value of the second-highest bid for an advert, and is required to make sure that the price paid by the vendor that wins the auction is greater than the buyer's acceptance level. We make sure that the user cannot cheat by bidding just below the highest bid received by requiring that the user states his/her reservation value before the value of bids are revealed.

A more general system for dynamic customized advertising might allow a vendor to specify a bid for each type of buyer, and also a maximum budget, so that the vendor that places adverts can maintain control over its spending.

We might also allow users to specify in their advert acceptance policy how many adverts they are prepared to receive a day, so that they are not inundated with too many adverts, even if they receive financial compensation.

13.3.2.3 Numerical Example

The advert auction message from the ad server arrives with a choice of three adverts, Ad1, Ad2, and Ad3. Each advert is associated with a profiling function, a bidding function, and a value function. The client machine computes the hit rate for each advert, based on the profiling functions and its local profile for the buyer. Suppose hit1=30%, hit2=5% and hit3=15%. The client machine also computes the expected revenue if the buyer hits an advert, rev1=$2, rev2=$8, rev3=$3. The hit rate and revenue are used to compute bids for each advert, using the bidding function. Suppose that the bids are bid1=$0.50, bid2=$0.70 and bid3=$0.40.

Now, the client also computes the acceptance level for each advert, based on the hit rates predicted within the iamworthit system. Suppose accept1=$0.30, accept2=$1.00 and accept3=$0.30. The bid for advert 2 is rejected because it is below the accept value. The bids for adverts 1 and 3 are accepted. Now, the auction is constructed with bids bid1 and bid3, and accept1 because that is the accept-value for the bid with the highest value that is not rejected. The auction takes the bids (0.50, 0.40, 0.30), and sells the right to advertise to the user to vendor 1 for $0.40 (the value of the bid from vendor 3).

Finally, the client fetches the graphics and URL link information for the advert from vendor 1, and transfers payment from the vendor to the user for the right to show the advert.

13.3.2.4 Tuning an Advertising Strategy

Although the optimal strategy for a bidding agent in a single Vickrey auction is to reveal its true value for the right to show an advert to the user, the vendors are bidding over a number of different auctions, and might have a limited advertising budget.

Selecting Appropriate Users.

One good approach is to start with a reasonable policy and then adjust it dynamically, based on feedback received from adverts using techniques from reinforcement learning (see [RN 97] for an introduction). Off line simulation with methods such as Monte Carlo simulations can provide good initial policies, based on information about a simulated population of users, which could be provided anonymously by the system of Secure Data Interchange. Users can be provided with incentives to reveal information anonymously about their acceptance functions, to allow this type of off line modeling.

A vendor can tune an advertising policy with a random sample of users, simulating the auction that runs on a user's client machine. Metrics such as the average number of times that an advert is shown to a user of each type, and the average amount that the vendor pays to show the advert provide information to allow optimization. For example, the analysis might show that although a particular class of buyers are most likely to hit an advert, there is also a lot of competition to show adverts to buyers in that class, and the average cost to show an advert is high. In this case a vendor can conclude that it is more cost-effective to advertise to buyers in cheaper but less relevant classes. The analysis can also be used to check that the average buyer is not setting an acceptance level higher than the vendor's bid, which again would indicate that the policy should target a different set of buyers.

Selecting Appropriate Adverts.

The system that we have described can be extended to allow a vendor to select an advert to display to a user based on the type of profile of a user. For example, a vendor can pay for the right to be one of N vendors that compete in an auction for the right to advertise to users that hit the web page of a particular vendor. We can allow a vendor to not only tune its bid to the profile of a particular user that hits a web page, so that only users with a good fit with the service offered receive the web page, but we can also allow a vendor to tune the advert that it shows to a user.

We allow a vendor to submit a number of different adverts and bid functions via the advertising network server. The client-side auction can be expanded to allow multiple bids from each vendor, where each vendor can submit a number of bids, but only pays the second highest price bid from another vendor. Again, the auction is truth-revealing for a vendor.

13.3.2.5 Automatic Advert-Replacement Systems

Although there are potential copyright violations in any system which alters the content of information published by a vendor before displaying that information to a user, we comment that the above described system can be applied even with vendors web pages that do not subscribe to the advertising network in SDI. Adverts can either be replaced, or added in separate windows. This enables any user that subscribes to SDI to receive personalized adverts and revenue from advertisers, irrespective of whether or not pages are within the SDI network.

The key problem in ad replacement is to identify an advertisement within a page, i.e. information that is not related to the core purpose of the page. At present adverts may take one of two forms:

(a) They can be statically, or dynamically, generated at the web server of the web page that the user hits, and pushed to the user directly at the same time as the general content.

(b) They can be pushed to the user in parallel with the other non-advertising data on a web page, for example with a link to an advertising network.

The adverts in (b) can be identified by tracking ad server URLs that are embedded in the source code of web pages. Case (a) is more difficult because there is no identifying URL to indicate the content of the section of a web page. However, there are solutions to advert identification in these cases, for example via regular expression identification and the location of ad banners, as described in www.junkbusters.com and the "block files" that allow a proxy server at junk busters to strip adverts from pages. Another technique is to identity URL's that allow a user to click to another domain from within the current page. These might likely be adverts, consider for example, a link to www.buyanewcar.com on the New York Times web page.

Another variation applies to television commercials and other broadcast medium, especially as the data storage capacity of local set top boxes increases. For example, a code is transmitted by national networks to cue local adverts from local network stations, allowing the replacement by personalized adverts from advertisers in the SDI ad network. In the future it is also likely that we will use digital storage devices to receive entertainment and television programs that are broadcast, storing the information for future viewing, or even slightly delayed "on demand" viewing. With digital media and storage, it is possible to replace adverts inserted into programs by the producers with SDI targeted adverts, either with or without the cooperation of the source of the information.

13.3 Additional Applications

1. Use of Real Time and Anticipated Vehicle Location Data to Provide Real Time Traffic Reporting and Predicted Traffic/Congestion Modeling a. Real Time Traffic Reporting A simple but useful application of LEIA involves on an opt-in basis real time transmission of a sample of driver's location information to a regional traffic-reporting bureau. Though existing prior art approaches are reasonably efficient, there are common circumstances in which congestion may have just occurred (e.g., following an accident) or wherein congestion has recently cleared up and such up to the minute information is not available to the traffic bureau. Moreover, this approach could be extremely advantageous in providing optimal navigational assistance for drivers wishing to optimally reduce driving time to a particular destination, which she/he submits to the system. The present system would consider the comparative length of different routes from the user's present location to the destination in combination with the anticipated average speed based on that of other vehicles traveling those particular routes. This enables real time recommendations to be presented to the user, based on this real time data.

b. Predictive Modeling of Traffic Patterns Based upon Real Time Location Data from Vehicles It is possible to apply certain statistical techniques in order to predictively anticipate traffic patterns for some marginal period of time into the future based upon real time location data regarding the present case sample of vehicles. One may consider recent past traffic patterns compared to present traffic patterns (i.e., change in speed as a function of time by segment of highway as well as absolute and rate of change in traffic volume). There are pre-existing models which are able to anticipate the corresponding effects of congestion at the moment in which it begins to occur which utilize these variables. This model must also consider the rate of change in average speed over each segment as well as the predicted impact of changes in traffic volume from feeder highways based upon changes in volume occurring dynamically thereupon. It is a key objective of the navigational assistance feature to utilize future predictive traffic models, in order to optimize the reduction in transit time for the most number of users possible, i.e., considering the volume of traffic which is predicted on a segment by segment basis in combination with the traffic models for the impact of these volumes upon transit time (including the rate of increase thereof). With this data, the system can determine, in advance, on an individual driver basis, which route for a given requested destination, will provide the shortest drive time for the user, while insuring that a near optimal transit time is achieved, across all segments of the highway system, as a result of each individual system recommendation to each driver. For example, an anticipated compounding congestion problem would warrant the vast majority of vehicles to take alternate routes until the congestion or predicted congestion is alleviated in that segment.

2. Use of LEIA for Creating Traffic Models for Purposes of Mapping Commercial Industrial and Residential Real Estate Market Opportunities—

A very useful application of LEIA involves the collection of traffic pattern data on a time-specific basis (the day of the week and time of day) for the traffic, as it passes each piece of real estate. An electronic map which is ideally Web based (potentially nationwide is generated and constantly updated based upon this data. Additional information may be provided which may include (but is not limited to):

a. Origin and destination information of the vehicular traffic (as captured by LEIA) which may, especially if correlated with time, suggest the nature and context of the driver's activities, e.g., rush hour traffic, errand traffic, etc. It may be useful to factor in the type of neighborhood the vehicle returns to every night, the type of commercial or business entity she/he drives to work to each day, etc.

b. Other activity-related clues which the user is willing to release, e.g., devices interacted with, content interacted with or transmitted information, etc., which may provide insights into the mind-set of which users tend to experience when in the vicinity of the real estate property.

c. User Profile Data—Aggregate purchase and content affinities as well as price elasticity data (gleaned from purchase statistics) could be very useful information to commercial real estate developers and purveyors. Users with the right profile and a receptive mindset are of particular interest.

It should be noted that the present system may be extended to residential real estate. E.g., what types of jobs (such as quality of jobs) do local commuters have? What are their numbers? How far do they commute (particularly if they tend to commute further than the present real estate site)? Do their commuting routes tend to pass the current potential real estate site? The last three questions would also be particularly relevant as well for a prospective industrial real estate development opportunity.

Industrial real estate developers also may be interested in mapped models of real estate depicting the professional and known likely educational characteristics of the associated local residents in that region? What are the other businesses at which they work? (If available) what are their particular positions/responsibilities?

3. Use of LEIA for Creating Traffic and User Profile Models of Traffic Passing Billboard Sites and Providing a Map of Such Information on an Available Billboard Site Basis—

The presently described techniques for providing dynamically updated informational maps containing detailed statistical data regarding vehicular traffic passing real estate sites can be further extended to similar maps of interest to advertisers which contain locations for available highway billboards. The present system further provides Web-based access, which enables advertisers to make reservations and purchases of such billboards. In one preferred variation, an economic model is deployed to optimally price the billboards. I.e., a varied representative sample of each type of billboard sharing similar traffic/user profile features with others is auctioned for this purpose. In another variation this on-line auction model is deployed for all billboards available by the system in order to provide a novel service to advertisers which is a "billboard auction" site.

4. Use of LEIA for Enabling Drivers to Identify and View Sales Opportunities and Offers Associated with Physical Objects in the Surrounding Environment Utilizing Heads-Up Display Technology The present system is an extension of the virtual tag methodology in which physical objects contain meta-data and in which the location of such objects with respect to the user is determinable either by transmission of a signal, which contains the exact physical coordinates of the object or a scheme by which this information may be pre-loaded, which is typically from a server, which contains such information (thus "non-wired" objects may be identified accordingly) to the user's device, e.g., as she/he physically travels in the vicinity of such items. In either case, the present physical location of the object must be known in addition to that of the user (in the case of fixed objects, of course, the dynamic location tracking techniques are unnecessary). A primary commercial application of the present scheme applies to purchasable items. The user may submit his/her interest profile to SDI for purposes of being dynamically notified and disclosed of purchasables which match his/her user profile or specifically requested search criteria. The metadata may include a brief description and any additional level of information which the seller may be willing to disclose to that particular user. The seller may possibly request details regarding price elasticity of the buyer (purchase appetite) before quitting any discounts to the existing price. Prime example applications of the present scheme may include:

1. Revealing used car sales opportunities to drivers (by actually flagging relevant vehicles which the driver passes (or which pass the driver);

2. Real estate and home sales opportunities (as well as apartment and commercial real estate rental/leasing opportunities;

3. User-user introductions in which one or both users may be extremely interested in the other based upon matching criteria within their associated social, information and/or professional desires and assets.

The preferred underlying technology for the present heads-up display system involves a technique for tracking the orientation of the user's head as well as the direction of his/her pupils (it may be possible, however, to implement the system by detecting pupillary direction based solely upon the position of the pupils relative to one another, using a 3-D optical tracking device. The iris of the user may also be utilized as a bio-metric identity of the particular user (see issued patents assigned to IrisScan Corp.) In the preferred implementation, the head-up projection device projects the virtual flagger upon the portion of the windshield or window(s) which is in direct line of site between the user's pupils and the physical object of interest. The technique may utilize heads-up windshield display technology and/or remote projection (e.g., for projection upon the side windows).

In another more advanced version of the system, the holographic projection system using micro-mechanical techniques may project the information directly upon the user's retina. This technique is detailed in co-pending patent application entitled "Remote Retinal Imaging Projection System" The variety of other potential applications of the present technologies are also conceivable which include:

System for Providing Remote Access and Modification Capability of Documents and E-Mail by a Sender The present system involves the use of a technique which enables the sender of a document, upon permission of the recipient, to provide subsequent updates and revisions to that document remotely and automatically in the absence of the recipient. Utilizing the computer's modem and e-mail delivery system, these updates could be provided remotely by the original sender (who alone can gain appropriate access privileges through a unique access code or authentication). The sender may also be able to identify whether or not the old version had been accessed by the recipient and possibly even at the level of the particular segment, or segments in which the specific changes had been made. (This capability could also be two way in which certification of not only receipt, but also access particular portions of the information by the intended recipient could be positively confirmed by the sender however, subject to approval by the recipient). If the recipient is amenable, such receipt confirmation could also be automatically time stamped by a secure trusted agent on the recipient's machine. The system could also perform the appropriate modifications in different drives on which the document is stored. If the appropriate modification was performed on the hard drive, but not a copy on the floppy(s), the recipient could be notified and prompted to insert the floppy(s) for appropriate updating until all versions of the original document are updated. It should be noted that such latter functionality would even be of independent utility to standard modifications as performed with word processing systems. The above same features could also be provided for e-mail as well (in a variation, time stamped receipt could also be applied to voice mail as well). The recipient if he/she had not approved the remote modification in advance, the sender could request the access/modification privilege of the recipient via e-mail or instant messaging service for example. The recipient may also be able to identify a digital time stamp for the relevant portion(s) of the document (or e-mail) as modified/updated by the sender. In a variation, XML metadata containing digital time stamps could also be utilized for the standard modifications, which occur throughout the document, i.e., the nature of the modification, i.e., the addition, change or deletion, the time it was performed, on which machine, under which password and if relevant by which remote user. Outside of the context of the present remote modification system this function could be integrated into a standard word processing system with standard comparison check function. Such digital time stamps would help in proving identity and date of authorship at a detailed level.

In a variation of the present system, a user could also receive automatic notification if/when a recipient has accessed (or provided an associated modification to) a document, portion thereof, e-mail or voice mail. This would require the recipient to provide approval of the above privileges for the sender in response to a request prompt. In another variation of the present system, the provider of a URL may receive time-stamped verification of a user having accessed a URL (which may request a uniquely identifying access code or other authentication or the Web page may be accessed by that user who is provided with a completely unique URL, thus verifying access by that user for remote access, modification and associated time stamping. If the URL is not under control of the requestor of the verification the accessor's client or Web-centric script (associated with his/her access account) could notify him accordingly with similar time-stamped verification of access. In another related application of the present capability, the accessor's script could carry-out certified verification of more diverse or complex actions by a desired accessor, for example:

1. Verify (and if desired notify) the requester of the accessor having sent or received and read document (or e-mail) with content X to or from recipient or sender Y. For example, knowing that recipient had read a message or document sent by the sender (or another sender) or otherwise accessed may prompt requestor to take the next action or communicate with recipient.
   Or verify (and if desired notify) the requester (e.g., an employer) of the accessor (e.g., an employee) having made telephone contact with X individual(s) or phone number(s) at a certain time(s) (or within a certain time frame and/or containing certain message-type or content). Or the content (contextual profile) of the conversation(s) may be revealed or confirmed as being within a target contextual domain(s).
2. Verify (and if desired, notify) the requestor (e.g., an employer) of the accessor (e.g., an employee) having performed certain definable and/or desirable volume of on-line tasks, e.g., typed certain type(s) of content, performed certain accounting, billing (telephone handling courteous) prompt or other administrative functions. Knowledge by requestor (e.g., via notification) may then prompt requestor to take a subsequent action (or e.g., communicate again with accessor).
3. For any of the above notify requester (e.g., employer) of the failure of the accessor to perform certain desired (and/or volume) of tasks with pre-defined threshold parameters.
4. Verify and, if desired, notify requestor (e.g., teacher or parent) of accessor (e.g., student or child respectively) of certain on-line content consumed, e.g., Web pages, paragraph by paragraph content (including wireless e-books) or on-line homework, such as quizzes, essays, reports, in conjunction with or independent from such on-line content.
5. Verify and, if desired, notify requestor (e.g., employer or teacher/parent) of accessor (employee or student/child respectively) of accessing, generating or conversing (acoustically/telephonically or textually) certain content which falls outside of a certain defined set of content clusters which are deemed "appropriate" within certain time periods (e.g., work-time such as when the user is "clocked-in", homework time, etc.) or in general. And/or verify or notify accessor of certain clusters, which are accessed or generated within certain content clusters. The above cluster based identification rules may also be definable by not only time of day or day of week, but domain, e.g., e-mails and phone conversations of a "social" context or style are inappropriate while pornography is inappropriate during work time for employees or anytime for students or children. The present "conversation" based variation, may even be implemented in conjunction with a passively collected acoustic monitoring via the client's microphone of an employee's, student's or child's spoken conversations in/around his/her (or a) client machine. Identity may be determined in conjunction with associated voice print information and bias results to documents, which match that style in accordance with the appropriate weighting criterion matching the user profile.

6. Give the user a set of selection criteria to bias the search (or recommended navigational links) by those styles, which s/he desires presently.

In addition, the present system could further actually use style as an additional means for identifying documents, which may be relevant to a search, e.g., determine what style(s) a preponderance of document in the present search tend to possess, then add this criteria as an additional weighting criteria to determining document relevance (or finding new potentially relevant documents). I.e., as part of the information retrieval (attribute cluster) model, use "style" as an additional attribute for and similarity to other documents and queries.

System for Mining User Reactions and Responses to On-line Media by User Profile Characteristics:

As described, are some primary examples of how the present technique can usefully be deployed. User profiling may also be usefully applied for purposes of collecting feedback about various types of user reactions and responses to various on-line stimuli (e.g. general Web and e-commerce sites to various products such as movies, music, interactive content, advertising news, interactions with other users etc. A somewhat related methodology was disclosed in the parent patent involving a technique for allowing users to rate vendors according to a variety of criteria and enabling the vendors (e.g. for marketing purposes) and/or users to observe statistical correlations between the user profile characteristics and ratings (using data mining techniques). In a simple example, application of the present methodology, the users viewing a Web page (containing any of the above suggested informational types) are allowed to provide their personal comments about the page or about their own experience in viewing the page. Informational retrieval and statistical NLP techniques may be used to cluster (using standard clustering techniques) both the comments (by similarity of their content profiles) as well as the users (by similarity of their user profiles). In the first instance, the comment cluster exemplars are extracted, used as the comments which most closely exemplify each of their associated clusters and thus presented to vendors and/or users. The aggregate (average) of the user profiles associated with that cluster, the user profile of the user who provided the exemplar comment or the subset of user profiles which characterize subclusters of the comment clusters (wherein the subclustering routine is based upon the profiles of users within each comment cluster) are also presented to the users or associated vendors in conjunction with the exemplary comment most closely associated with that stereotypical profile of users. In a variation, which could be an automatically selected alternative if the exemplar fails to provide a clear representation of the various comments in the cluster (if further subclustering does not adequately achieve this objective), it may be possible to "combine" these various comments which are closest to the clusters' centroid by identifying those portions of the comments which are similar in meaning and those portions which are different. For similar portions, by preferentially utilizing the counterparts which are closest to the centroid and adding to it those portions which are different in piecemeal fashion, the desired objective may be achieved.

In a variation, the different types of comments may be clustered and accessible to users via a hierarchical cluster tree used to create a menu of automatically labelled clusters (see parent patent detailing this general method). Users may access such menus by combining querying (of user or content attribute with menu navigation).

It is of course reasonable to combine the technique in the parent patent application for statistically correlating user profile attributes with ratings associated with the users possessing those attributes.

It is also reasonable to apply the present technique to video (or streaming video content) whereby during the course of viewing the content relevant survey questions are presented to users and if desired, the correlation statistics of the results with the associated user attributes are presented to the content owner and/or (preferably) also future viewers. In a novel and advanced variation, time shifted video technology would enable the ability to capture audio or full video/audio versions of the comments of the user.

In a very novel application, it is possible upon permission of the associated users, to automatically construct menu trees (in accordance with the above method as disclosed in the parent case) of live voice or text chat in real-time dynamic fashion. Spoken conversations may be automatically profiled using acoustic speech-to-text methods. In accordance with the methods for automatic construction of virtual communities (in this case for dynamic chat) as disclosed in the parent case, these communities can be constructed automatically and on-the-fly based upon similarities of chat content, queries, navigational (content) selection from automatically constructed menu and/or user profile similarity or attributes of the profiles of the users which may be selected. Thus, in the former case a user could in the case of a pull down menu gain access by title of key phrase (which are ideally automatically and dynamically created and updated in accordance with the content of dynamic spoken or recorded conversation spoken or typed in real time and which may be further dynamically categorized and re-categorized within a hierarchical menu structure format. Although, the present system is implemented specifically for Web sites, a generalized user interface approach is certainly a very appropriate use of the present methodology.

Thus, in the former case a user could in the case of a pull down menu gain access by title or key phrase (which are ideally automatically and dynamically created and updated in accordance with the content of dynamic spoken or recorded conversation spoken or typed in real time from potentially any other user and which may be further dynamically categorized and re-categorized within a hierarchical menu structure format. Of course, these other users could, if desired, also specify constraints, e.g., by profile attribute of the user (accessor). If a chat dialog of a particular type of subject is scheduled in advance, the user could also be made aware of such posting if his/her profile so allows.

The user could even select key terms or phrases which are most highly predicted to be of interest/relevance to the user based upon his/her profile. In any event, the queries could also be provided as persistent queries this enabling the user to be notified while on-line (e.g., while on his/her lap-top, PDA, television, or telephone whenever highly relevant dialogs appear (or even off-line if designated to be important enough, e.g., via a phone, pager, in an automobile, etc.). It is presumed that many of the interfaces to these devices will be speech enabled, thus speech-to-text techniques for purposes of the present application are likely to become increasingly pervasive. The issued patent, "System for Customized Electronic Identification of Desirable Objects" further offices a technique which uses similarity measures for profiling users according to their proficiency knowledge in various informational domains by analyzing their ability to provide intelligent responses to questions of almost any sort and informational domain presented to them by other inquiring users.

Accordingly, it is reasonable to also suggest to users functionality which allows them to be able to be notified of and/or receive messages, e.g., such as via an instant messenger service or a voice-enabled version thereof, in which potential recipients are able to select certain types of content as manually entered or selected via the menu tree which they would be interested in being made aware of or to be notified if/when individuals possessing attributes and, which may include proficiency attributes by topic, sub-topic or key word(s)/phrase(s) (again, so long as the user's profile is within the disclosure policy of the transmitting user. If a willing recipient so desires for both the chat and instant messaging variations, s/he may receive a copy of the text or voice transmission or if the user is not able to access it in real-time or otherwise. Conversely, the user may as a sender wish to sent the transmission to 1. All users who have indicated potential interest in the contents (and/or profile or identity of the sender) or users who match a particular user profile (e.g., interest or proficiency such as which is of measured similarity to the contents of the transmission) and/or 2. Users who are in the process of engaging in a user-user (or multi-user) dialog, which is of measured similarity to that of the transmission.

An example application of the present system includes, for TV viewers, the ability to gain access to different types of feedback from other users who are also presently viewing or had previously viewed a particular TV program, e.g., a comedy, a news story or political speech in which the present technique could be used effectively as a filter allowing certain types of user or user attributes to reach the user and others to be suppressed or squelched. In the latter example, a user who considers herself to be a female liberal may provide settings during a campaign speech by a conservative Republican speaking out against abortion to listen to acoustic/verbal gestures by other liberal females advocating abortion). Audible comments may be unfiltered and heard by the user, if desired.

If the program is a re-broadcast, more elaborate filtering capabilities are conceivable involving statistical analysis of the spoken language content (such could be conceivably performed for real time live information, however, at the expense of a slight delay). As suggested, it may be also possible to observe textually (e.g., through speech to text techniques) or hear spoken conversations as they exist between individuals possessing desired attributes, containing content characterized by key words or phrases from a menu selection or provided by/between a desired individual or individuals respectively.

In another application, users viewing video or streaming video content may upon their permission, agree to disclose their user profiles and be acoustically monitored such that comments, verbal, verbal/audible gestures and expressions and/or video of Effected thereby may be of interest to users In conjunction with an educational program a user may wish to observe comments by those other individuals who are extremely knowledgeable in the field (to collect supplemental information and other feed back about the presently viewed content). Similarly, in the political speech example the user may desire to hear the gestures and/or spoken comments, reactions and/or brief dialogues occurring during the course of the political speech by individuals sharing the same political views as the user and which are considered to be part of the educated elite. In another variation, individuals who represent the exemplars of different cluster of users (and/or those which are manually selected as providing interesting and/or entertaining feedback) could be heard by the user collectively and the reactions expressed as acoustic feedback could be statistically analyzed in dynamic fashion and presented to the user as a breakdown of the user attributes which presently characterize the present reaction or response of the virtual audience.

In a future application, such system could be extended to such things as emersive virtual reality (stationary or non-stationary) systems and/or video gaining systems in which the reactions of characters (or even different "personals") to various situations and events could be developed from data collected from the reactions of actual users comprising the different user clusters as above suggested.

Applications to Constructing User Profiles and Matching Users by Similarities in Their Social and Psychological Profiles and/or Life Circumstances and Experiences There is an untapped opportunity with potentially considerable and deep implications which could be used to enable very detailed assessment and associated profiling of individuals. The parent patent describes a very comprehensive methodology by which users could potentially be profiled so as to define their preferences across almost any kind of content or commercial products and services. Surveys used to reveal psychological traits are also used. In the present extension, we first suggest a primary system methodology in which extremely detailed information is collected and aggregated into the user profile particularly pertaining to the user" psychological profile (user preference/interest information demographics, etc. are also useful data in that there are likely correlations which exist with certain psychological attributes of the user). In the clinical field of psychoanalysis, much information regarding the psychological and psycho-pathological characteristics of the user is determined, however in compliance with the confidentiality requirements of the doctor-patient privilege, most if not all of this information remains isolated and never accessible by a large-scale statistical database for purposes of cross-correlation of psychological characteristics, phenomena, psycho-pathology (as well as other clinical pathology), as well as behavior, interests, preferences and more specifically identifiable behavior patterns as well as notable life experiences. Part of the answer to this dilemma may well lie in the application of secure data disclosure to SDI, the pseudonym proxy server and (for extra security) randomized aggregates for purposes of harvesting the statistical value within the data and (if needed), interacting with the user while maintaining completely secure and private individual user data. The present system suggests that there may be much greater accuracy which could be achieved in the profiling of individuals for use in a number of applications such as the psychological modeling of patients for use in the diagnosis, treatment, prediction (including predictive treatment) of psycho-pathology, the matching of "similar" patients together (for group therapy and/or pseudonymous electronic or physical mail correspondences) for providing support, inter-patient communication, counseling, etc. (for which present traumatic life experiences, if relevant, may be quite applicable as well).,as well as the extended/improved modeling/prediction of user interests/preferences enabled by SDI.

Another correlated data type could be employee file databases through which correlations and predictions of employee behavior and performance, recommendation as to remedies for existing problems and performance enhancing tactics again could be achieved. Unfortunately not all data is likely to be accessible for all users (e.g., browsing/transaction histories are likely to be available but often not information regarding a user's life experiences or psychological history). To fill in this missing data, rapid profiling techniques could be applied (see parent patent). Key aspects of a user's psychological profile for example, could be acquired, anything from their personal experience, beliefs, fantasies, habits, personality traits social behavior, etc., for preventative life style patterns. In an obvious example application, an individual could be very accurately profiled, psychologically in order to predictively determine likely strengths and weaknesses in his/her psychological and psycho-social aspects and thus determine recommendations for preventative life style patterns (which could be provided by professionals and/or determined statistically or confirmed/disproven in order to enhance potential strength and avoid or remedy potential or existing weaknesses (in as much as the pseudonymous statistical database would, of course, also contain the results of certain lifestyle therapeutic or pharmacological treatment approaches). It is believed that in the future, genetic sequence data which could be stored in the pseudonymous user database could also provide valuable clues as to the complete medical, psychological and psycho-social make-up of individuals. Another potential methodology could be to present particular emotion-evoking stimuli as a textual, verbal (or most ideally) multimedia videographic or even emersive virtual reality) presentation, capture details about the user's emotional response, comments, gestures, e.g., crying, laughing repulsion, mortification feeding of physical illness, etc., and perhaps even physiological feedback, if accessible. With such large quantities of such sensitive data regarding individuals, SDI offers users a very powerful and compelling solution by which user's SDI agent can for any given application or circumstance select only those potions of his/her profile which will ultimately benefit the user. I.e., there are typically for most relevant applications, e.g., employee hiring by corporate HR departments, health insurances, etc., extremely crude metrics which are used in the determination and/or terms of a prospective contract between such commercial entities and a user. There is, thus, considerable opportunity for SDI agents of the user to analyze user profile data in light of predetermined models of what features and metrics are most significant in determining selection and/or terms of service or a professional relationship with that user based on historical data (through feedback) or publicly available informational models (e.g., as in the highly regulated health insurance industry). In order to initialize the statistical model for the more subjective example of employee selection and terms, the present system could, for example, disclose to the employer "Mr.X has a psychological profile feature which is highly correlated with a high aptitude for the present job which s/he is applying for and past job experience Y is 50% more likely than the average employee for that position to lead to a subsequent promotion and several "employee of the month awards"

Application to Identifying Similar Individuals Behaving Under Similar Circumstance The present user profile information could also be extremely relevant for a novel Internet based service by which individuals could pseudonymously release their profiles and/or define specific situations and/or conditions (which could be actual, hypothetical or combination thereof) and the system will identify other scenarios (of like pseudonymous individuals and/or circumstances) to the general scenario and emphasizing and prioritizing certain particular aspects thereof. Examples include identifying individuals who had previously (or are presently) in the process of making a very similar professional decision, interpersonal decision (such as regarding a present or a potential spouse). Ideally, such interpersonal decisions would involve a very similar situation (such as a decision), a very similar individual in the analogous position of the user (and ideally, if possible other similar party(s) fulfilling the analogous role(s) as the present situation which confronts the user. The relative importance (priority) of the degree of similarity of various analogous roles in an analogous situation is determined in part by the type of information which the user would like to determine. For example, determining what a particular individual would do in a similar circumstance may depend upon how dependent that user's action .or decision is upon the circumstances and conditions versus another individual(s) (and which individual(s) and/or the two (or more) individuals involved to which the context of the situation primarily relates. Of course, the nature of the action in question may predicate the relative importance of one or more of the above factors. These determinations are often quite subjective in nature. Requestees may also (if the choice exists) be situations which are either of a historical nature (i.e., the situation had occurred in the past) or of a present nature. In some cases in the latter case, is preferable as the user may actively request, e.g., the party to which s/he directly relates or is potentially affected by to provide advice and/or feedback or to what s/he would do under a particular "what if" scenario which could be very specific and relevant to the present circumstances of the user. In a novel variation of the method, the party to which the user relates is commissioned by the user to do or say something in order to receive a reaction or response. Depending upon how similar the situation actually is, the prompt could be very similar or partially relevant to the action contemplated by the user in his/her own analogous situation. Or the user may wish to collect feedback from analogous individuals in similar situations regarding several hypothetical actions (perhaps acted out among several different groups) resulting from decisions in order to enhance the user's information about the user(s) and the associated situation. Alternatively, historical cases could include requests for valuable advice (as the experiences and the associated consequences are more likely to have been lived out). Typically it is most valuable (if a number of similar circumstances exist) to collect multiple reactions/responses with which to form a statistical basis for the information. The biggest problem with the present system is collection of relevant and sufficiently detailed data relating to the relevant circumstances which must be identified and accessed. Psychotherapeutic (clinical) databases would be one source, as would be spoken or typed synchronous or asynchronous communications between individual as well as (the emerging) ubiquitous computing environments in which users' actions in spoken communications could be potentially monitored persistently off-line as well as on-line (for which SDI's privacy-enhanced profiling architecture would be particularly appropriate). Certainly, if the circumstances affecting the user (requester) are of a long-term nature, periodic informational updates could be provided to him/her and/or the mutual sharing and advising of the similar experience could be the basis for a two-way exchange of information between the parties on a short or long-term basis.

Automated Learning of User Behavior as Part of an Enhanced Meeting Scheduler and Correspondence Filter The present section provides application level extensions to similar inference-based rules recommendation and generation functionality such as is described in conjunction with the Smart Home description, smart office as well as the learning based methods disclosed within the section entitled "Resolution credentials" in the access reachability introduction and profile disclosure between two or more parties as disclosed In order to utilize LEIA as a user agent, which is integral and ubiquitous within the work environment, it is necessary to make its learning as seamless and invisible from the user's perspective as possible.

The next level in applying the capabilities of LEIA is in being able to implicitly learn the context of the user's present temporal activities as well as establish relative priorities of the activities that the user (and others who intend to interface with the user) are engaged in and from the user's previous behavior to similar conditions automatically generate appropriateness functions (or rules) to automate the process of handling meeting schedules and filtering real time requests for correspondence with the user. It is possible to infer:

1. The content profiles which are associated with the user's present activities.

2. (Often obviously) The nature of the user's present activities by observing what sorts of actions the user is engaged in, in the office.

These content profiles and activity indicators may be passively observed by the user's present interactions (and timing thereof) with his/her PC, other smart appliances and data and voice communications which the user engages in (telephonically or from standard face to face dialogues) e.g., suggesting when the user is reading the morning news, checking phone messages, responding to e-mail, engaged in a particular project, etc. If these clues are not observable (or not positively identifiable) cyclical time dependent patterns may be used as implicit indicators of the user's present activities (see the above section entitled "Further Applications of LEIA"). Alternatively, the system could prompt a request of confirmation of the user's present activities and possibly on clues such as verbal regarding present and future established or changing activities and plans These same methods for utilizing time pattern elements which are used to predict the location of the user may be readily extended to predict or help to substantiate other statistical user variables relating to the types of actions and content related profiles characterizing the user's temporal behavior patterns. The following application of these techniques is used to enhance the automatic meeting scheduler:

The identity of the task or request, the activity and content attributes of the task or request profiles (target object profiles) may be developed utilizing the priority of that task relative to the user. This priority is estimated from the priority of the task/request (and its associated attributes) over other tasks/requests by the user. In order to better substantiate the relative importance to the user as inferred regarding these activities, the system should also display the scalar ratings which the user could adjust manually.

Nonetheless, there may be a degree of uncertainty in the user's intentions and LEIA's inference of the user's intentions. Moreover, unanticipated changeability by the user (uncertainty) may occur perhaps with increased frequency under certain variables like the identity of the requester, the time of day, context of the users other present activities or when other meetings and obligations are pending which possess a relatively greater priority with the user (i.e., if they often occur spontaneously). In order to take this uncertainty factor into consideration, an overall statistical estimate may then be calculated taking into account the predicted statistical probability of each party ultimately being available for the meeting. This serves the purpose of both refining the automatic scheduling process and informing would be visitors before hand as to the relative importance that their prospective meeting is (or increasingly becomes as the meeting time approaches) to the employee as well as the overall estimated degree of certainty of the meeting. This feature my be particularly useful for impromptu visitors where considerable uncertainty exists as to whether and to what degree the visitor is imposing upon the employee's schedule.

The temporal context of user behavior (using temporal time series analysis in conjunction with use of content analysis and user behavior assessment may be both important predictors as to whether a prospective meeting of a disclosed purpose is worthwhile for the employee based on present/future priorities and at which most likely times. By far, its most valuable application, however is in its ability to perform content analysis and user behavior assessment in real time in order to enhance LEIA's ability to determine whether and to what degree a would-be unannounced visitor or telephone or intercom callers unannounced contact is relevant to the employee" present activities and if not to coordinate with the visitor's agent the time or times when it would be most relevant to the employees anticipated activities for example there are certain activities during which an employee doesn't wish to be usually disturbed, e.g. while reading the morning news, taking a coffee break, calling home, responding to an important email message, ten minutes before an important meeting. Often within an organization individuals will attempt to speak with one another as such, the intended duration affects priority as does the identity of the individual in the organization. Often this variable can be automatically predicted by LEIA. In such a situation, the relative priority of the user's preexisting priority tasks is weighted against the priority of the requested tasks prior to notification. The above application can be readily extended as well to phone calls, in which the user could be automatically prompted by LEIA to disclose his/her purpose of the call and/or his/her identity if necessary. This application would be a useful extension to the telephony variation of the email filter described in issued patent entitled "System and Method for Electronic Identification of Desirable Objects in which the above additional inputs about employees and visitors may provide additional useful feedback in automatically determining the rules dictating how to best handle the call or forward it to a more appropriate employee on behalf of the employee. If there is a certain degree of uncertainty in the agent's priority determination or assessment of the task affected the most appropriate rule the employee may observe the rule just prior to automatic implementation, or the action which it represents. The present value of the contextual employee activity assessment method as disclosed, if extended to advertising could be significant. For example the knowledge of the context of the user's present activities could determine what type and when an advertisement targeted to an employee, e.g. a decision maker will most likely elicit the best response (where the advertisement matches the professional interest profile) is an ad which corresponds with particular activities of the user (e.g., which relate in some way with the ad/promotion. As discussed direct voice telephony and email dialogues may provide very useful clues (using natural language techniques) as to the particular profile interest summary which the user currently is experiencing at that moment both what types of user interactions and advertising is like to be most appropriate. Patent entitled System and Method for Customization Electronic Identification of Desirable Objects" suggests a variation of virtual community creation in which the use of present dialogue of users is provided as a means for determining whether or and if so which ongoing meeting dialogues within the organization would be most relevant for the user to be introduced to)

either physically or virtually. For example, virtual work groups (E. G. over industry wide extranets could use the above profiling approach in the creation of the group (by matching the employees' professional interest summaries with the project profile as well as in the dynamic ad hoc introductions of other experts who have a professional interest profile which matches the projects attributes such as human skill sets and proficiencies. There are also personality traits of users which may predispose a team towards success if an appropriate complementarity of these traits is exhibited within certain members of the team, e.g. the designers and engineers may be compliant, methodical and meticulous while the group leader may be impulsive results driven and flamboyant. Some members may be analytical and idea oriented, others more concerned with the end result and implementation strategy. Issued patent entitled "System and method for customized electronic identification of desirable objects" describes how queries may be routed to knowledge domain experts in an organization environment. LEIA may also identify and prioritize individuals who may be useful candidates to join into a meeting or address a specific request who are physically in proximity to the meeting location.

While the invention has been particularly shown and described with reference to a preferred embodiment, it will be understood by those skilled in the art that various changes in form and detail may be made therein without departing from the spirit and scope of the invention.

What is claimed is:

1. A method of allowing access to data over a distributed data processing system, the method comprising:
   providing an automated infrastructure for the exchange of information between multiple self-interested parties;
   providing a trusted server with at least one data warehouse for the storage of said information, wherein the trusted server includes a processor;
   associating a price rule with particular data records of said information which establishes a cost of accessing said particular data records, and which controls the access to that data;
   wherein said price rule enables a data owner associated with said data to specify a different price for different types and amounts of information access;
   within said trusted server, providing a data processing platform which is accessible to multiple third-party data processing software programs which operate as software agents;
   wherein a plurality of seller-side software agents have defined relationships to said price rules and associated data records, and maintain absolute access control to said data records;
   wherein a plurality of buyer-side software agents have regulated query access to said data processing platform and may request pricing information from said seller-side software agents;
   wherein said plurality of seller-side software agents and said plurality of buyer-side software agents operate as persistent data processing systems which interact with one another repeatedly over time and which thus define a virtual marketplace.

2. The method of claim 1 wherein said trusted server is accessed via a network.

3. The method of claim 2 wherein said network is a wireless network.

4. The method of claim 2 wherein said network is a cellular network.

5. The method of claim 2 wherein said network is the Internet.

6. The method of claim 1 wherein said software agents are associated with at least one individual.

7. The method of claim 1 wherein said software agents are associated with at least one company.

8. The method of claim 1 wherein said cost of accessing said particular data records is the price that said buyer-side software agents must pay before accessing said particular data records.

9. The method of claim 1 wherein said information access is encrypted through the use of a security certificate.

10. The method of claim 9 wherein said security certificate is managed by a public key infrastructure.

* * * * *

UNITED STATES PATENT AND TRADEMARK OFFICE
CERTIFICATE OF CORRECTION

PATENT NO.      : 7,630,986 B1
APPLICATION NO. : 09/699098
DATED           : December 8, 2009
INVENTOR(S)     : Herz et al.

It is certified that error appears in the above-identified patent and that said Letters Patent is hereby corrected as shown below:

In the Claims:

Column 235, line 33, please delete "the";

Column 235, line 36, please replace "the" with -- a --;

Column 235, line 41, please replace "that" with -- the --;

Column 236, line 2, please replace "said" with -- the --;

Column 236, line 9, please delete "said";

Column 236, line 11, please replace "said data records" with -- said associated data records --;

Column 236, line 14, please delete "may";

Column 236, line 16, please replace "said" with -- the --;

Column 236, line 17, please replace "said" with -- the --.

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,630,986 B1  Page 1 of 1
APPLICATION NO. : 09/699098
DATED : December 8, 2009
INVENTOR(S) : Herz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 102 days.

Signed and Sealed this

Second Day of November, 2010

David J. Kappos
*Director of the United States Patent and Trademark Office*